(12) United States Patent
Arai et al.

(10) Patent No.: US 7,342,851 B2
(45) Date of Patent: *Mar. 11, 2008

(54) OPTICAL PICKUP APPARATUS, RECORDING/REPRODUCING APPARATUS PROVIDED WITH THE OPTICAL PICKUP APPARATUS, OPTICAL ELEMENT, AND INFORMATION RECORDING/REPRODUCING METHOD

(75) Inventors: Norikazu Arai, Hachioji (JP); Toshiyuki Kojima, Hachioji (JP); Toshihiko Kiriki, Hachioji (JP); Kohei Ota, Hachioji (JP); Shinichiro Saito, Hachioji (JP)

(73) Assignee: Konica Corporation, Tokyo (JP)

( * ) Notice: Subject to any disclaimer, the term of this patent is extended or adjusted under 35 U.S.C. 154(b) by 106 days.

This patent is subject to a terminal disclaimer.

(21) Appl. No.: 11/138,955

(22) Filed: May 27, 2005

(65) Prior Publication Data

US 2005/0254397 A1 Nov. 17, 2005

Related U.S. Application Data

(63) Continuation of application No. 10/743,110, filed on Dec. 23, 2003, now Pat. No. 7,173,897, which is a continuation of application No. 09/487,928, filed on Jan. 20, 2000, now Pat. No. 6,870,805.

(30) Foreign Application Priority Data

| Jan. 22, 1999 | (JP) | ................................. 11-015010 |
| Feb. 19, 1999 | (JP) | ................................. 11-041925 |
| Apr. 1, 1999 | (JP) | ................................. 11-095347 |
| Apr. 5, 1999 | (JP) | ................................. 11-097480 |
| Sep. 10, 1999 | (JP) | ................................. 11-257466 |
| Nov. 2, 1999 | (JP) | ................................. 11-312701 |

(51) Int. Cl.
*G11B 7/00* (2006.01)
*G11B 7/135* (2006.01)

(52) U.S. Cl. .............................. 369/44.23; 369/44.37; 369/112.03; 369/112.01; 369/94

(58) Field of Classification Search ........... 369/112.01, 369/44.37, 112.03, 94, 121, 44.23, 112.25, 369/112.07, 112.02, 44.34, 53.3
See application file for complete search history.

(56) References Cited

U.S. PATENT DOCUMENTS 5,349,471 A 9/1994 Morris et al.

(Continued)

OTHER PUBLICATIONS

The partial European Search Report under Rule 45 EPC dated Dec. 2, 2001.

(Continued)

FOREIGN PATENT DOCUMENTS

DE 199 29 623 A1 12/1999

(Continued)

*Primary Examiner*—Andrea Wellington
*Assistant Examiner*—Kim-Kwok Chu
(74) *Attorney, Agent, or Firm*—Finnegan, Henderson, Farabow, Garrett & Dunner, L.L.P.

(57) ABSTRACT

An optical pickup apparatus for reproducing information from an optical information recording medium or for recording information onto an optical information recording medium, is provided with a first light source for emitting first light flux having a first wavelength; a second light source for emitting second light flux having a second wavelength, the first wavelength being different from the second wavelength; a converging optical system having an optical axis and a diffractive portion, and a photo detector; wherein in case that the first light flux passes through the diffractive portion to generate at least one diffracted ray, an amount of n-th ordered diffracted ray of the first light flux is greater than that of any other ordered diffracted ray of the first light flux, and in case that the second light flux passes through the diffractive portion to generate at least one diffracted ray, an amount of n-th ordered diffracted ray of the second light flux is greater than that of any other ordered diffracted ray of the second light flux, where n stands for an integer other than zero.

12 Claims, 81 Drawing Sheets

U.S. PATENT DOCUMENTS

| | | | |
|---|---|---|---|
| 5,526,338 A | 6/1996 | Hasman et al. | |
| 5,696,749 A | 12/1997 | Brazas, Jr. et al. | |
| 5,696,750 A | 12/1997 | Katayama | |
| 5,703,856 A | 12/1997 | Hayashi et al. | |
| 5,717,674 A | 2/1998 | Mori et al. | |
| 5,757,758 A * | 5/1998 | Yagi et al. | 369/112.25 |
| 5,777,803 A | 7/1998 | Ju et al. | |
| 5,777,970 A | 7/1998 | Kajiyama et al. | |
| 5,889,748 A | 3/1999 | Shimano et al. | |
| 5,903,536 A | 5/1999 | Lee et al. | |
| 5,917,791 A | 6/1999 | Tsuchiya et al. | |
| 5,936,782 A | 8/1999 | Nomura et al. | |
| 6,023,449 A | 2/2000 | Chung | |
| 6,043,935 A | 3/2000 | Lee | |
| 6,084,843 A | 7/2000 | Abe et al. | |
| 6,088,322 A | 7/2000 | Broome et al. | |
| 6,118,594 A | 9/2000 | Maruyama | |
| 6,154,433 A | 11/2000 | Hoshino et al. | |
| 6,191,889 B1 | 2/2001 | Maruyama | |
| 6,192,021 B1 | 2/2001 | Saito et al. | |
| 6,222,812 B1 | 4/2001 | Yoo et al. | |
| 6,324,150 B1 | 11/2001 | Ju | |
| 6,337,841 B1 | 1/2002 | Kim et al. | |
| 6,363,046 B1 | 3/2002 | Yoo et al. | |
| 6,442,124 B1 | 8/2002 | Chung et al. | |
| 6,834,036 B1 | 12/2004 | Shiono et al. | |
| 6,950,384 B2 | 9/2005 | Arai et al. | |
| 7,164,625 B2 * | 1/2007 | Arai et al. | 369/44.23 |

FOREIGN PATENT DOCUMENTS

| | | |
|---|---|---|
| EP | 0 828 244 A2 | 3/1988 |
| EP | 1 109 164 A2 | 6/1996 |
| EP | 0 747 893 A2 | 12/1996 |
| EP | 0 774 751 A2 | 5/1997 |
| EP | 0 789 355 A1 | 8/1997 |
| EP | 0 836 178 A1 | 4/1998 |
| EP | 0 881 634 A1 | 12/1998 |
| EP | 0 936 604 A1 | 8/1999 |
| EP | 0 991 062 A1 | 4/2000 |
| JP | 02-183453 | 7/1990 |
| JP | 06-242373 | 9/1994 |
| JP | 08-055363 | 2/1996 |
| JP | 09-054973 | 2/1997 |
| JP | 09-073654 | 3/1997 |
| JP | 09-286954 | 11/1997 |
| JP | 10-092010 | 4/1998 |
| JP | 10-283668 | 10/1998 |
| WO | WO 97/08691 | 3/1997 |
| WO | WO 00/00964 | 1/2000 |

OTHER PUBLICATIONS

European Search Report, dated Jan. 2, 2002.
Preliminary Amendment for U.S. Appl. No. 09/487,928, filed Jan. 20, 2000.
Preliminary Amendment for U.S. Appl. No. 09/791,889, filed Feb. 26, 2001.
Preliminary Amendment for U.S. Appl. No. 10/612,019, filed Jul. 3, 2003.
Preliminary Amendment for U.S. Appl. No. 10/612,056, filed Jul. 3, 2003.
Preliminary Amendment for U.S. Appl. No. 10/611,920, filed Jul. 3, 2003.
Preliminary Amendment for U.S. Appl. No. 10/612,168, filed Jul. 3, 2003.
Preliminary Amendment for U.S. Appl. No. 10/743,110, filed Dec. 23, 2003.

* cited by examiner

CROSS SECTIONAL VIEW OF EXAMPLE 6 AND ILLUSTRATION SHOWING OPTICAL PATH FOR WAVELENGTH $\lambda$ =650nm CROSS SECTIONAL VIEW OF EXAMPLE 6 AND ILLUSTRATION SHOWING OPTICAL PATH FOR WAVELENGTH $\lambda$ =780nm (NA0.5)

DIAGRAM SHOWING SPHERICAL ABERRATION FOR WAVELENGTH λ=650±10nm IN EXAMPLE 6

DIAGRAM SHOWING SPHERICAL ABERRATION (NA0.5) FOR WAVELENGTH $\lambda = 780 \pm 10$ nm IN EXAMPLE 6

DIAGRAM SHOWING WAVEFRONT ABERRATION RMS FOR WAVELENGTH $\lambda = 650\text{nm}$ IN EXAMPLE 6

DIAGRAM SHOWING WAVEFRONT ABERRATION RMS FOR WAVELENGTH $\lambda$ =780nm (NA0.5) IN EXAMPLE 6

CROSS SECTIONAL VIEW OF EXAMPLE 7 AND ILLUSTRATION SHOWING OPTICAL PATH FOR WAVELENGTH $\lambda$ =650nm CROSS SECTIONAL VIEW OF EXAMPLE 7 AND ILLUSTRATION
SHOWING OPTICAL PATH FOR WAVELENGTH $\lambda = 780$nm (NA0.5)

DIAGRAM SHOWING SPHERICAL ABERRATION
FOR WAVELENGTH $\lambda = 650 \pm 10$nm IN EXAMPLE 7

DIAGRAM SHOWING SPHERICAL ABERRATION (NA0.50) FOR WAVELENGTH $\lambda = 780 \pm 10$nm IN EXAMPLE 7

DIAGRAM SHOWING WAVEFRONT ABERRATION RMS FOR WAVELENGTH $\lambda=780$nm IN EXAMPLE 7

CROSS SECTIONAL VIEW OF EXAMPLE 8 AND ILLUSTRATION SHOWING OPTICAL PATH FOR WAVELENGTH $\lambda=650$nm CROSS SECTIONAL VIEW OF EXAMPLE 8 AND ILLUSTRATION
SHOWING OPTICAL PATH FOR WAVELENGTH $\lambda = 780$nm DIAGRAM SHOWING SPHERICAL ABERRATION
FOR WAVELENGTH $\lambda = 650 \pm 10$nm IN EXAMPLE 8

DIAGRAM SHOWING SPHERICAL ABERRATION FOR WAVELENGTH λ=780±10nm IN EXAMPLE 8

DIAGRAM SHOWING SPHERICAL ABERRATION
FOR WAVELENGTH λ=780nm (NA0.60) IN EXAMPLE 8

RELATIONSHIP BETWEEN NUMBER OF DIFFRACTING ANNULAR BANDS AND HEIGHT FROM THE OPTICAL AXIS IN EXAMPLE 7

SPHERICAL ABERRATION

CROSS SECTIONAL VIEW OF OBJECTIVE LENS AND ILLUSTRATION
SHOWING OPTICAL PATH FOR WAVELENGTH λ=400nm

FIG. 112 (a)    FIG. 112 (b)
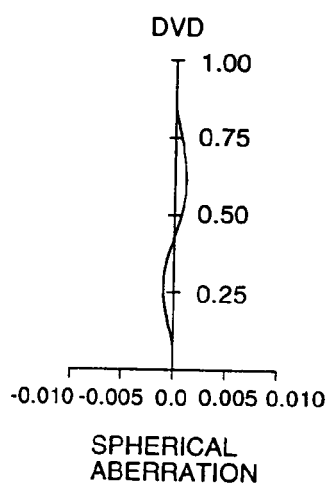
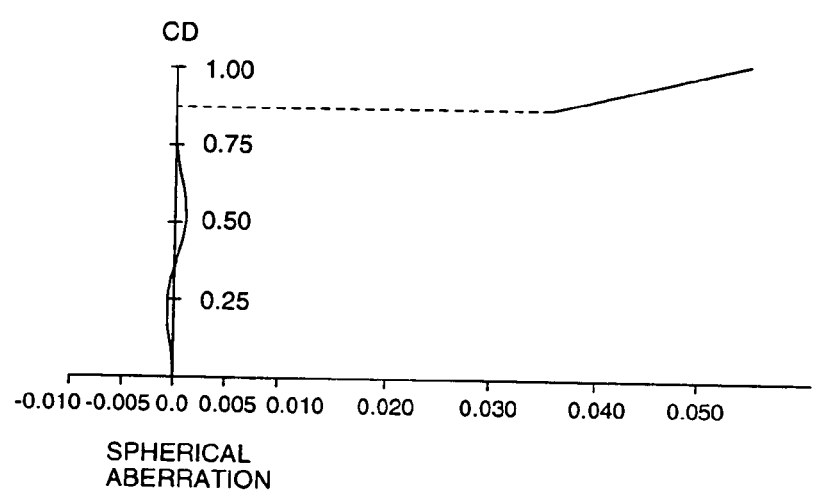

FIG. 115 (a)     FIG. 115 (b)
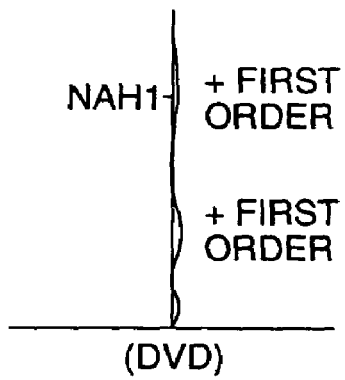
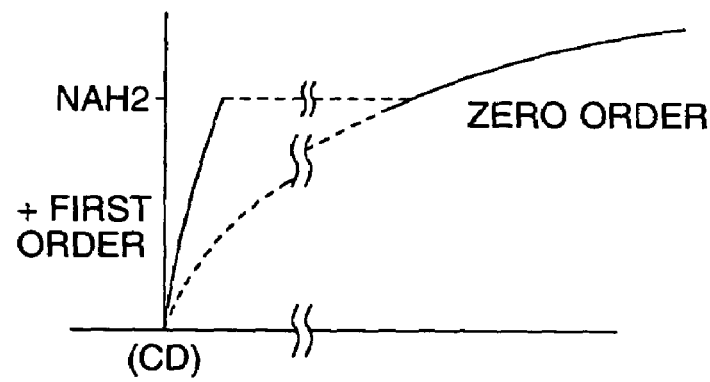
FIG. 116 (a)     FIG. 116 (b)
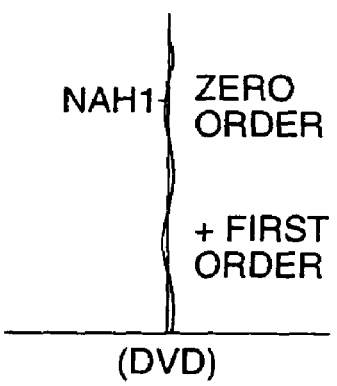
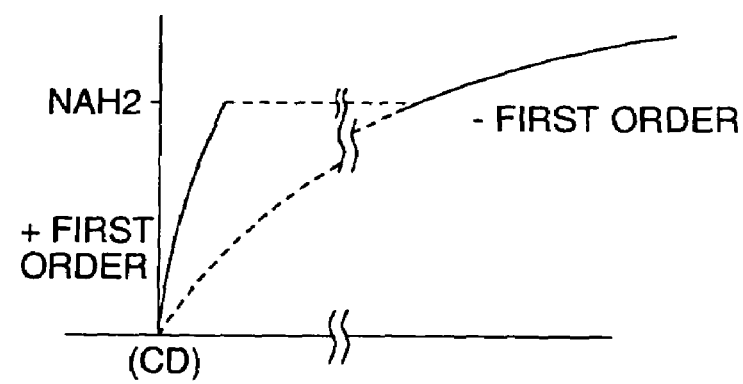

OPTICAL PICKUP APPARATUS, RECORDING/REPRODUCING APPARATUS PROVIDED WITH THE OPTICAL PICKUP APPARATUS, OPTICAL ELEMENT, AND INFORMATION RECORDING/REPRODUCING METHOD

CROSS REFERENCE TO RELATED APPLICATIONS

This application is a continuation of U.S. patent application Ser. No. 10/743,110, filed Dec. 23, 2003 and now U.S. Pat. No. 7,173,897, which is a continuation of U.S. patent application Ser. No. 09/487,928, filed Jan. 20, 2000, which issued as U.S. Pat. No. 6,870,805.

BACKGROUND OF THE INVENTION

The present invention relates to an optical pickup apparatus, a recording/reproducing apparatus with the optical pickup apparatus, an optical element, and an information recording/reproducing method.

Recently, as the practical application of the short wavelength red laser, a DVD which is a high density optical information recording medium (called also optical disk) having almost the same dimension as a CD (compact disk) and the larger capacity, comes into the production. In a DVD recording/reproducing apparatus, the numerical aperture NA on the optical disk side of an objective lens when a semiconductor laser of 650 nm is used, is 0.6-0.65. The DVD has a track pitch of 0.74 μm, and the minimum pit length of 0.4 μm, and is in densification, in which dimensions are lower than a half as compared to the CD having the track pitch of 1.6 μm and the minimum pit length of 0.83 μm. Further, in the DVD, in ordered to suppress the coma which is generated when the optical disk is inclined to the optical axis, to be small, the transparent substrate thickness is 0.6 mm, which is the half of the transparent substrate thickness of the CD.

Further, other than the above-described CD or DVD, various standard optical disks in which the light source wavelength or the transparent substrate thickness is different, for example, CD-R, RW (post script type compact disk), VD (video disk), MD (mini-disk), MO (photo-electro-magnetic disk), etc., come in the market and are spread. Further, the wavelength of the semiconductor laser is further shortened, and the short wavelength blue laser having the emission wavelength of about 400 nm is being into practical use. When the wavelength is shortened, even if the same numerical aperture as that of the DVD is used, the capacity of the optical information recording medium can be further increased.

Further, in the same dimension as the CD which is the above-described conventional optical information recording medium, the development of a plurality of optical information recording media, such as the CD-R in which recording and reproducing can be carried out, or the DVD whose recording density is increased, in which the transparent substrate thickness of the recording surface, or the wavelength of the laser light for recording and reproducing is different, is advanced, therefore, it is required that the recording and reproducing by the same optical pickup can be conducted to these optical information recording medium. Accordingly, various optical pickups which have a plurality of laser light sources corresponding to the using wavelength, and by which the laser light is converged onto the recording surface by the same objective lens by the necessary numerical aperture, are proposed (for example, Japanese Tokkaihei No. 8-55363, Japanese Tokkaihei No. 10-92010, etc.).

In the above description, in Japanese Tokkaihei No. 9-54973, an optical system using a hologram optical element in which 635 nm is used for the transmitted light (zero ordered diffracted ray) and 785 nm is used for −first ordered diffracted ray, and an optical system using a hologram optical system in which 635 nm is used for +first ordered diffracted ray and 785 nm is used for the transmitted light (zero ordered diffracted ray), are disclosed. Further, in Japanese Tokkaihei No. 10-283668, an optical system in which, the wavelength is 650 nm, a hologram ring lens is transmitted at 100%, and when 780 nm, the light is first ordered diffracted by the hologram ring lens, is disclosed.

However, in these hologram element and hologram-shaped ring lens, when diffraction efficiency of zero ordered light is made to be 100% for the wavelength on one side, there surely is a limitation for diffraction efficiency of +first ordered diffracted ray or of −first ordered diffracted ray for the wavelength on the other side, and thereby, desirable high diffraction efficiency can not be obtained, a loss of a quantity of light is caused, and efficiency of using a quantity of light is worsened, which has been a problem. When a loss of a quantity of light is caused, a laser of higher power is required, especially in recording of information.

Further, in the hologram element and the hologram-shaped ring lens, when diffraction efficiency of zero ordered light is made to be 100% for the wavelength on one side, and when diffraction efficiency of +first ordered diffracted ray or of −first ordered diffracted ray is made to be great by prohibiting zero ordered light from being transmitted as far as possible, for the wavelength on the other side, the hologram has been made to be as deep as 3.8-5.18 μm. Therefore, when a function of a hologram optical element or of a hologram-shaped ring lens is integrated in an objective lens in particular, it is very difficult to process a metal mold and to mold, which has been a problem.

Further, the present inventors previously proposed an objective lens (Japanese Tokuganhei No. 9-286954) which can structure a optical pickup which is composed of a plurality of divided surface which are divided into concentric circular-like ones, and in which each divided surface is aberration corrected to the diffraction limit to a plurality of light sources having different wavelength, and/or to the transparent substrate having the different thickness of the recording surface, and the structure is simplified. This objective lens has a function by which a necessary aperture can be automatically obtained corresponding to the using wavelength and/or the thickness of the transparent substrate. However, when a laser/detector integrated unit in which the laser light source and light detector are integrated, is used, there is a problem that a case occurs that the detection can not be correctly conducted due to a flare light entering into the light detector. This is conspicuous particularly in the laser/detector integrated unit of a type by which the light flux is deflected and introduced into the light detector by using the hologram. Further, when high speed recording is carried out in recordable disks in the DVD system (DVD-RAM, DVD-R, DVD-RW, DVD+R, etc.) or recordable disks in the CD system (CD-R, CD-RW, etc.), because a partial light beam becomes flare, the efficiency of use of the light amount is bad as compared to the optical system using the exclusive use lens, therefore, it is necessary to increase the power of laser light source.

To both the DVD and CD whose using wavelength and transparent substrate thickness are different from each other, various interchangeable optical systems, in which one objective lens is used for recording and/or reproducing the information without generating large spherical aberration or chromatic aberration, are proposed. However, the optical systems which are in practical use, are structured such that the divergence degree of the divergent light flux from the light source is weakened by a coupling lens, or the divergent light flux is made to the parallel light flux or the weak convergent light flux, and the light flux is converged onto the information recording surface through the objective lens and the transparent substrate of the optical information recording medium, and accordingly, 2 lenses of the coupling lens and the objective lens are necessary. Accordingly, it is difficult that the size of the optical pickup apparatus is reduced to be small and thin, and there is a problem that the cost is increased.

On the one hand, as described above, various optical disks except the CD and DVD are spread, and therefore, an optical system which is interchangeable to these optical disks, and whose structure is simple, and the optical pickup apparatus provided with the optical system are necessary.

SUMMARY OF THE INVENTION

An object of the invention is to provide a pickup apparatus, a recording and reproducing apparatus, an optical element and a recording and reproducing method, wherein one pickup apparatus can conduct recording and/or reproducing of different types of optical information recording media employing rays of light with at least two different wavelengths.

Further object is to make information recording and/or information reproducing to be conducted by one pickup apparatus, for each different optical information recording medium without generating serious spherical aberration and chromatic aberration even in the case of using rays of light having at least two different wavelengths and applying to different types of optical information recording media. In addition to that, another object is to provide an optical pickup apparatus having s simple structure. In particular, when using different types of optical information recording media each having a transparent substrate with a different thickness, the problem of spherical aberration becomes more serious. Further object is that one pickup apparatus can conduct recording and/or reproducing of information for different types of optical information recording media without generating serious spherical aberration and chromatic aberration, even in the aforesaid occasion.

In addition, still further object is that detection of light by an photo detector can be conducted satisfactorily and sigmoid characteristics in detection are made to be satisfactory, without irradiation of flare light which affects the detection adversely on an photo detector, even in the case of a pickup apparatus employing an integrated unit composed of plural lasers and plural detectors. Furthermore, providing an optical pickup apparatus wherein a loss of a quantity of light is less and efficiency of using a quantity of light is excellent, a recording and reproducing apparatus, an optical element and a recording and reproducing method is also an object of the invention.

The above object can be attained by the following structures and methods.

(1) An optical pickup apparatus for reproducing information from an optical information recording medium or for recording information onto an optical information recording medium, comprises:
a first light source for emitting first light flux having a first wavelength;
a second light source for emitting second light flux having a second wavelength, the first wavelength being different from the second wavelength;
a converging optical system having an optical axis and a diffractive portion, and
a photo detector;

wherein in case that the first light flux passes through the diffractive portion to generate at least one diffracted ray, an amount of n-th ordered diffracted ray of the first light flux is greater than that of any other ordered diffracted ray of the first light flux, and in case that the second light flux passes through the diffractive portion to generate at least one diffracted ray, an amount of n-th-ordered diffracted ray of the second light flux is greater than that of any other ordered diffracted ray of the second light flux,
where n stands for an integer other than zero.

(2) An optical element for use in an optical pickup apparatus for reproducing information from an optical information recording medium or for recoding information onto an optical information recording medium, comprises:
an optical axis, and
a diffractive portion, wherein in case that the first light flux passes through the diffractive portion to generate at least one diffracted ray, an amount of n-th ordered diffracted ray of the first light flux is greater than that of any other ordered diffracted ray of the first light flux, and in case that the second light flux whose wavelength is different from that of the first light flux passes through the diffractive portion to generate at least one diffracted ray, an amount of n-th ordered diffracted ray of the second light flux is greater than that of any other ordered diffracted ray of the second light flux,
wherein a difference in wavelength between the first light flux and the second light flux is 80 nm to 400 nm and n stands for an integer other than zero.

(3) An apparatus for reproducing information from an optical information recording medium or for recording information onto the optical information recording medium comprises;
an optical pickup apparatus, comprising
a first light source for emitting first light flux having a first wavelength;
a second light source for emitting second light flux having a second wavelength, the first wavelength being different from the second wavelength;
a converging optical system having an optical axis, a diffractive portion, and
a photo detector, wherein in case that the first light flux passes through the diffractive portion to generate at least one diffracted ray, an amount of n-th ordered diffracted ray of the first light flux is greater than that of any other ordered diffracted ray of the first light flux, and in case that the second light flux passes through the diffractive portion to generate at least one diffracted ray, an amount of n-th ordered diffracted ray of the second light flux is greater than that of any other ordered diffracted ray of the second light flux, where n stands for an integer other than zero.

(4) A method of reproducing information from or recording information on at least two kinds of optical information recording media by an optical pickup apparatus comprising a first light source, a second light source, a photo detector and a converging optical system having an optical axis and a diffractive portion, the method comprises steps of;

emitting first light flux from the first light source or second light flux from the second light flux, wherein a wavelength of the second light flux is different from a wavelength of the first light flux;

letting the first light or the second light flux pass through the diffractive portion to generate at least one diffracted ray of the first light flux or a least one diffracted ray of the second light flux, wherein when an amount of n-th ordered diffracted ray among the at least one diffracted ray of the first light flux is greater than an amount of any other ordered diffracted ray of the first light flux, an amount of n-th ordered diffracted ray among the at least one diffracted ray of the second light flux is greater than an amount of any other ordered diffracted ray of the second light flux, converging, by the converging optical system, the n-th ordered diffracted ray of the first light flux onto a first information recording plane of a first optical information recording medium or the n-th ordered diffracted ray of the second light flux onto a second information recording plane of a second optical information recording medium in order for the optical pickup apparatus to record the information onto or reproduce the information from the first information recording plane or the second information recording plane, detecting, by a photo detector, a first reflected light flux of the converged n-th ordered diffracted light from the first information recording plane or a second reflected light flux of the converged n-th ordered diffracted light from the second information recording plane;

where n stands for an integer other than zero.

BRIEF DESCRIPTION OF THE DRAWINGS

FIG. 112 is a view of the spherical aberration of Example 15.

FIG. 115 is a typical view showing an influence of +first ordered diffraction on the spherical aberration of the objective lens according to Embodiment 8 of the present invention.

FIG. 116 is a typical view showing an influence of −first ordered diffraction on the spherical aberration of the objective lens according to Embodiment 8 of the present invention.

FIG. 120 is a view of the optical path of the diffraction optical lens in the case where the thickness of the transparent substrate of the optical information medium is larger than that in FIG. 118, in Example 15.

FIG. 121 is a view of the spherical aberration up to the numerical aperture 0.60 to the wavelength $\lambda$=770, 780, 790 nm of the diffraction optical lens in FIG. 120.

FIG. 122 is a view of the optical path of the diffraction optical lens (the objective lens having the diffraction surface) which is the objective lens in Example 16 according to Embodiment 7 of the present invention.

FIG. 123 is a view of the spherical aberration up to the numerical aperture 0.60 to the wavelength ($\lambda$)=640, 650, 660 nm of the diffraction optical lens in FIG. 122.

FIG. 124 is a view of the optical path of the diffraction optical lens in the case where the thickness of the transparent substrate of the optical information medium is larger than that in FIG. 122, in Example 16.

FIG. 125 is a view of the spherical aberration up to the numerical aperture 0.60 to the wavelength ($\lambda$)=770, 780, 790 nm of the diffraction optical lens in FIG. 124.

FIG. 126 is a view of the optical path of the diffraction optical lens (the objective lens having the diffraction surface) which is the objective lens in Example 17 according to Embodiment 7 of the present invention.

FIG. 127 is a view of the spherical aberration up to the numerical aperture 0.60 to the wavelength ($\lambda$)=640, 650, 660 nm of the diffraction optical lens in FIG. 126.

FIG. 128 is a view of the optical path of the diffraction optical lens in the case where the thickness of the transparent substrate of the optical information medium is larger than that in FIG. 126, in Example 17.

FIG. 129 is a view of the spherical aberration up to the numerical aperture 0.60 to the wavelength ($\lambda$)=770, 780, 790 nm of the diffraction optical lens in FIG. 128.

FIG. 130 is a view of the optical path of the diffraction optical lens (the objective lens having the diffraction surface) which is the objective lens in Example 18 according to Embodiment 7 of the present invention.

FIG. 131 is a view of the spherical aberration up to the numerical aperture 0.70 to the wavelength ($\lambda$)=390, 400, 410 nm of the diffraction optical lens in FIG. 130.

Figure 130:
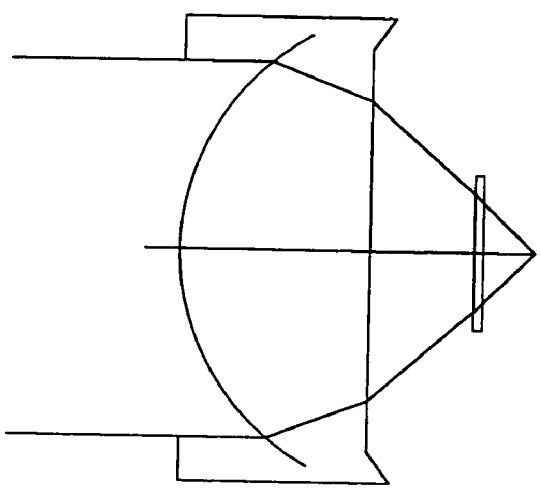
Figure 132:
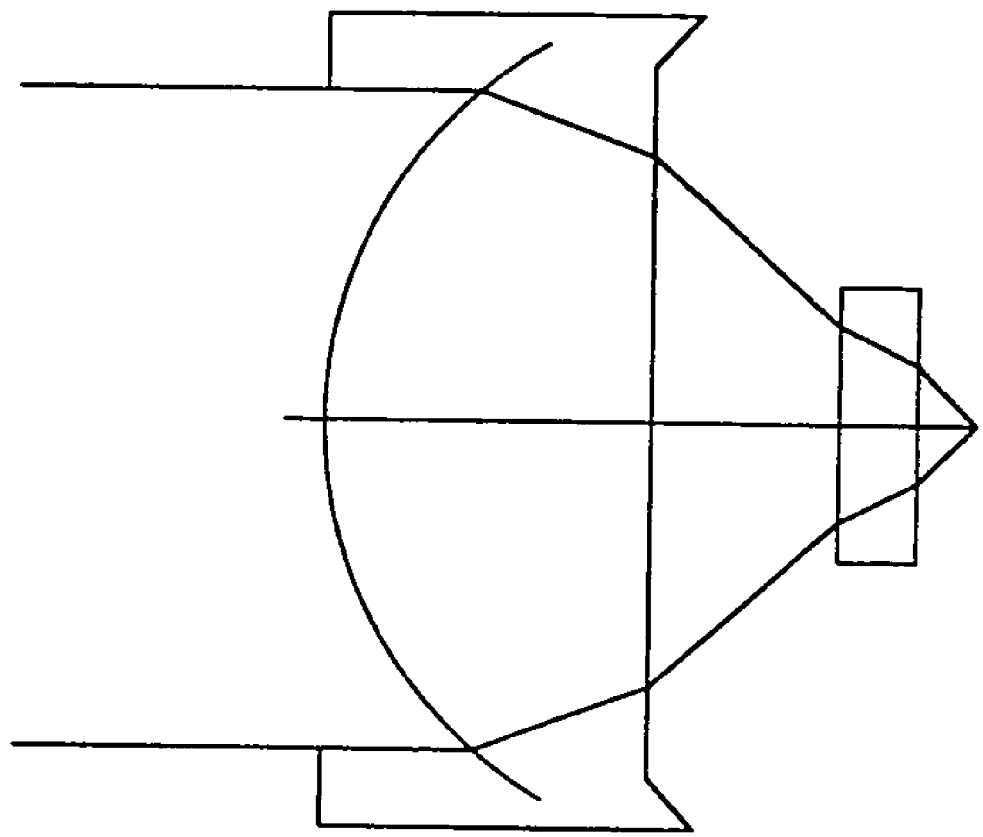

FIG. 132 is a view of the optical path of the diffraction optical lens in the case where the thickness of the transparent substrate of the optical information medium is larger than that in FIG. 130, in Example 18.

Figure 133:
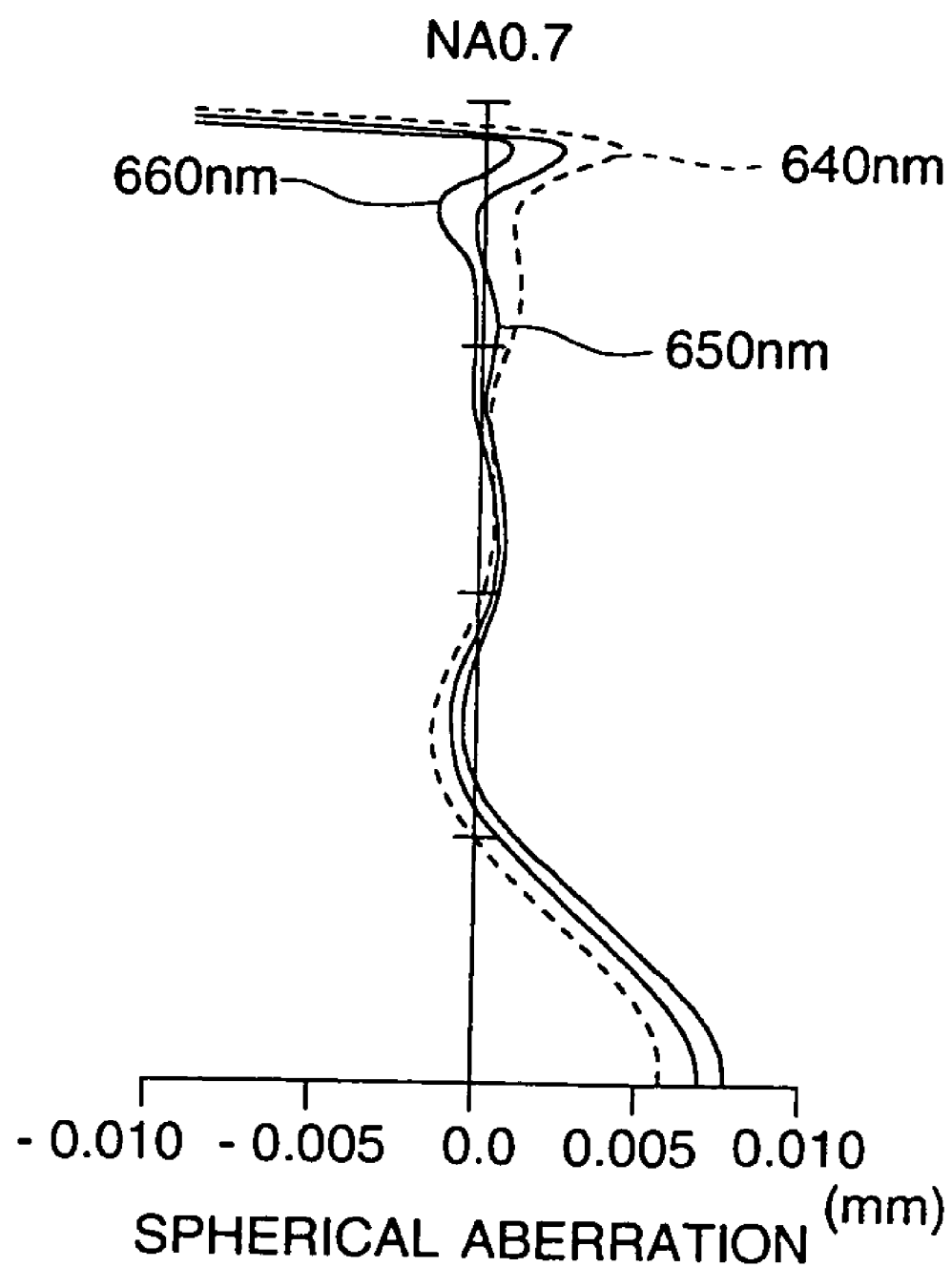

FIG. 133 is a view of the spherical aberration up to the numerical aperture 0.70 to the wavelength $\lambda$=640, 650, 660 nm of the diffraction optical lens in FIG. 132.

Figure 134:
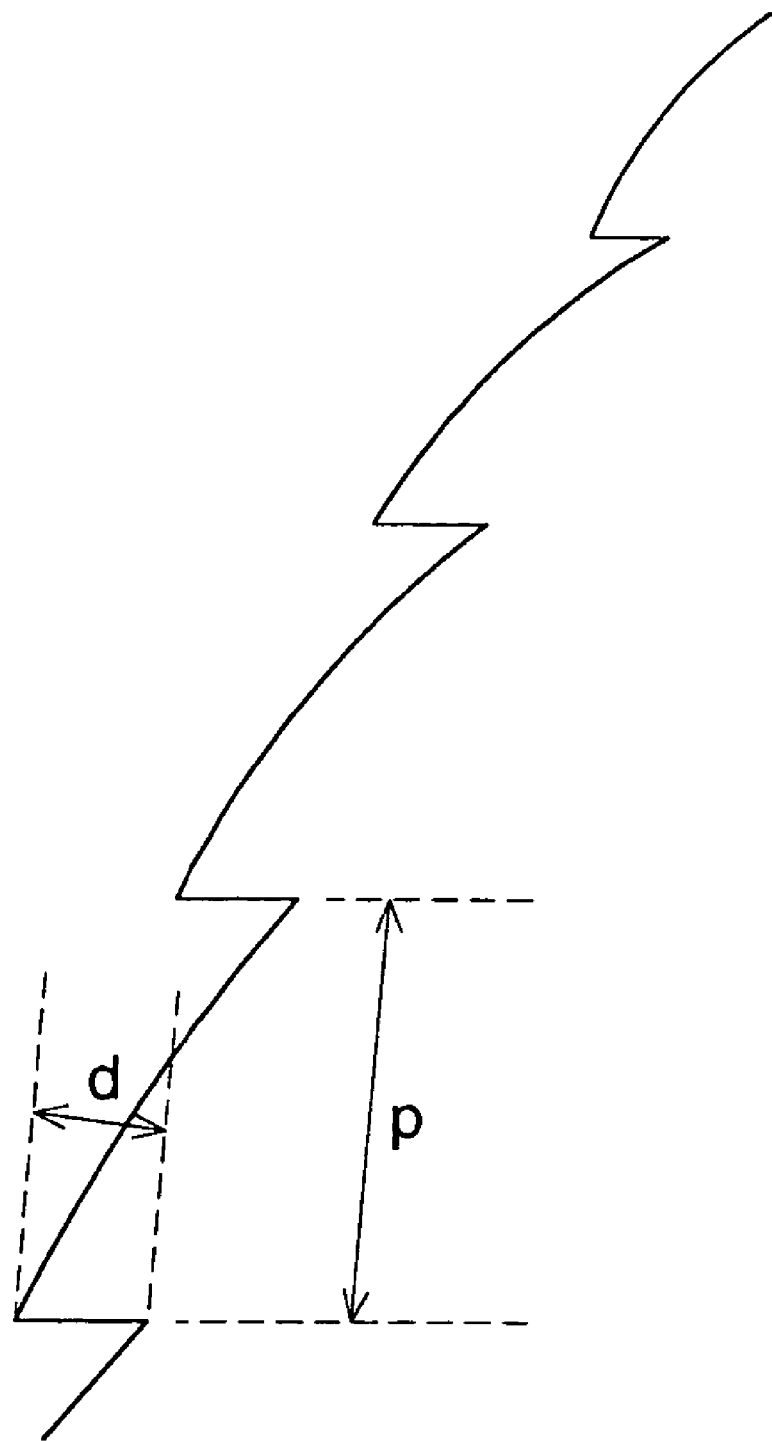

FIG. 134 is an illustration showing a cross sectional view of a diffractive annular band.

DETAILED DESCRIPTION OF THE PREFERRED EMBODIMENT

An optical pickup apparatus for reproducing information from an optical information recording medium or for recording information onto an optical information recording medium has therein a first light source for emitting first light flux having a first wavelength, a second light source for emitting second light flux having a second wavelength, the first wavelength being different from the second wavelength, a converging optical system having an optical axis, a diffractive portion, and a photo detector. Further, the diffractive portion generates more n-th ordered diffracted ray than other ordered diffracted ray in the first light flux which has passed the diffractive portion, and generates more n-th ordered diffracted ray than other ordered diffracted ray also in the second light flux which has passed the diffractive portion. n stands for an integer other than zero. The optical element of the invention is one having a diffraction portion which makes the aforesaid embodiment possible. An apparatus for reproducing information from an optical information recording medium or for recording information onto the optical information recording medium has the optical pickup apparatus stated above.

(11-1)

Incidentally, "an amount of n-th ordered diffracted ray being greater than that of any other ordered diffracted ray 11" means that the diffraction efficiency for the n-th ordered diffracted ray is higher than that for the other ordered diffracted ray other than the n-th ordered diffracted ray. Further, n in n-th ordered includes also a sign, and when +first ordered diffracted ray is generated more than other ordered diffracted ray in the first light flux which has passed the diffractive portion, it is intended that +first ordered diffracted ray is generated more than other ordered diffracted ray even in the second light flux which has passed the diffractive portion, and it does not include that −first ordered diffracted ray is generated more than other ordered diffracted ray in the second light flux which has passed the diffractive portion.

(11-2)

The optical pickup apparatus of the invention is one wherein one pickup apparatus can conduct recording and/or reproducing optical information recording media in different types employing at least two wavelengths each being different from others. Namely, the optical pickup apparatus of the invention is one used for recording/reproducing of different information recording media such as a first optical information recording medium and a second optical information recording medium. A first light source of the optical pickup apparatus emits first light flux for reproducing information from a first optical information recording medium or for recording information onto the first optical information recording medium, while, a second light source of the optical pickup apparatus emits second light flux for reproducing information from a second optical information recording medium or for recording information onto the second optical information recording medium. Usually, an optical information recording medium has a transparent substrate on an information recording plane.

(11-3)

When putting the function of the invention in another way, the converging optical system is capable of converging "n-th ordered diffracted ray of the first light flux", which is generated at the diffractive portion by the first light flux being reached the diffractive portion, on a first information recording plane of the first optical information recording medium through a first transparent substrate, to reproduce information recorded in the first optical information recording medium or to record information onto the first optical information recording medium, and the converging optical system is capable of converging "n-th ordered diffracted ray in the second light flux", which is generated at the diffractive portion by the second light flux being reached the diffractive portion, on a second information recording plane of the second optical information recording medium through a second transparent substrate, to reproduce information recorded in the second optical information recording medium or to record information onto the second optical information recording medium, and the photo detector is capable of receiving light flux reflected from the first information recording plane or the second information recording plane.

(11-4)

There will be shown as follows the embodiment which is more preferable, wherein the converging optical system is capable of converging n-th ordered diffracted ray in the first light flux on a first information recording plane of the first optical information recording medium under the state that wave-front aberration is not larger than 0.07 λrms within the prescribed numerical aperture of the first optical information recording medium in the first light flux on the image side of the objective lens (in other words, under the state wherein the light flux within the prescribed numerical aperture takes diffraction limit capacity or less in the best image point (best focus)), and the converging optical system is capable of converging n-th ordered diffracted ray in the second light flux on a second information recording plane of the second optical information recording medium under the state that wave-front aberration is not larger than 0.07 λrms within the prescribed numerical aperture of the second optical information recording medium in the second light flux on the image side of the objective lens (in other words, under the state wherein the light flux within the prescribed numerical aperture takes diffraction limit capacity or less in the best image point (best focus)).

Further, it is preferable that n-th ordered diffracted ray is converged under the state that wave-front aberration is not larger than 0.07 λrms within the prescribed numerical aperture on the image side of the objective lens on each information recording plane, even in the case of wavelength shift of about ±10 nm or less caused by temperature fluctuation and electric current fluctuation, in the first light source or in the second light source. In particular, it is especially preferable that n-th ordered diffracted ray is converged under the state of 0.07 λrms or less within the prescribed numerical aperture on the image side of the objective lens, even when the first light flux or the second light flux is one having a wavelength of 600 nm or less (for example, 350 nm-480 nm) and wavelength shifting of about ±10 nm or less is generated.

(11-5)

Incidentally, when n-th ordered diffracted ray is +first ordered diffracted ray or first ordered diffracted ray, a loss of a quantity of light is less than that in an occasion where a diffracted ray of higher ordered than ±first ordered is used, which is preferable.

Further, when a diffraction efficiency of n-th ordered diffracted ray of the first light flux in the diffractive portion is represented by A% and a diffraction efficiency of diffracted ray of other certain-th ordered (preferably, the number of ordered with the greatest diffraction efficiency among number of ordered other than n) is represented by B%, it is preferable to satisfy A−B≧10, while, when a diffraction efficiency of n-th ordered diffracted ray of the second light flux in the diffractive portion is represented by A'% and a diffraction efficiency of diffracted ray of other certain-th ordered is represented by B'%, it is preferable to satisfy A'−B'≧10. The condition of A−B≧30 and A'−B'≧30 is more preferable, that of A−B≧50 and A'−B'≧50 is still more preferable, and that of A−B≧70 and A'−B'≧70 is further more preferable.

(11-6)

When both of the first light flux and second light flux are used for recording of information on optical information recording medium, it is preferable that diffraction efficiency of n-th ordered diffracted ray in the diffractive portion is made to be maximum at the wavelength between the wavelength of the first light flux and the wavelength of the second light flux.

(11-7)

When either of the first light flux and second light flux alone is used for recording of information on optical information recording medium and the other light flux is used for reproduction only, it is preferable that diffraction efficiency of n-th ordered diffracted ray in the diffractive portion is made to be minimum at the wavelength between the wavelength of the first light flux and the wavelength of the second light flux. The more preferable is that the diffraction efficiency of the n-th ordered diffracted ray in the diffractive portion is made to be maximum at one of the wavelength of the first light flux and the wavelength of the second light flux in using for recording of information.

(11-8)

As an optical element on which the diffractive portion is provided, a lens having a refraction surface and a flat type element both provided on the converging optical system are given, though there is no limitation in particular.

When a lens having a refraction surface as an optical element on which a diffractive portion is provided, there are given an objective lens, a collimator lens and a coupling lens as a concrete example of the optical element. On the refraction surfaces on each of these lenses, a diffractive portion can be provided. A flat-shaped or lens-shaped optical element which is intended only to be provided with a diffractive portion may also be added to a converging optical system.

Incidentally, when providing a diffraction portion on a refraction surface of an objective lens, it is preferable that an outside diameter of the objective lens (outside diameter including a flange if the flange is provided) is larger than an aperture diameter by 0.4 mm-2 mm.

(11-9)

The diffractive portion may be provided either on an optical surface of the optical element on the light source side, or on the image side (optical information recording medium side), or on both sides. Further, the diffractive portion may be provided either on the convex surface or on the concave surface.

(11-10)

When a diffractive portion is provided on an objective lens, it is more preferable because the number of parts is reduced and errors in assembly of an optical pickup apparatus in manufacturing can be reduced. In that case, it is preferable that the objective lens is of a single-element type, but it may also be of a two-element type. A plastic lens is preferable, but a glass lens is also acceptable. It is also possible to provide on the surface of a glass lens a resin layer on which a diffractive portion is formed. It is preferable that the objective lens on which the diffractive portion is provided has on its outer circumference a flange section having a surface extending in the direction perpendicular to an optical axis. This makes it easy to mount on the pickup apparatus accurately, and makes it possible to obtain stable performance even when ambient temperature fluctuates. It is further preferable that the refraction surface of the objective lens is an aspheric surface and a diffractive portion is provided on the aspheric surface. The diffractive portion may naturally be provided either on one side of the objective lens or on both sides thereof.

(11-11)

Further, it is preferable that an optical element on which a diffractive portion is provided is made of a material with Abbe's number vd of not less than 50 and not more than 100. It may either be made of plastic or be made of glass. Incidentally, in the case of a plastic lens, it is preferable that a refractive index of its material is in a range of 1.4-1.75, and the range of 1.48-1.6 is more preferable and that of 1.5-1.56 is further preferable.

When the diffractive portion is provided on a lens (preferably on a plastic lens), it is preferable that the following conditional expression is satisfied, for obtaining an optical pickup apparatus and an optical element which are stable against temperature fluctuation.

$$-0.0002/°C. < \Delta n/\Delta T < -0.00005° C.$$

wherein,

ΔT: Temperature fluctuation

Δn: Amount of change of refractive index of the lens

It is further preferable to satisfy the following conditional expression.

$$0.05 \text{ nm}/°C. < \Delta \lambda 1/\Delta T < 0.5 \text{ nm}/°C.$$

wherein,

Δλ1 (nm): Amount of change of wavelength of first light source for temperature fluctuation ΔT (11-12)

The diffractive portion is preferably a phase type one from the viewpoint of efficiency of using light, though it may also be an amplitude type one. It is preferable that the diffractive pattern of the diffractive portion is shaped to be symmetry rotatable in relation to the optical axis. It is preferable that the diffractive portion has plural annular bands when viewed in the direction of the optical axis, and these plural annular bands are formed mostly on the concentric circle whose center is on the optical axis or in the vicinity of the optical axis. A circle is preferable, but it may also be an ellipse. A blaze type ring-zonal diffraction surface having steps is especially preferable. It may further be a ring-zonal diffraction surface which is formed stepwise. It may further be a ring-zonal diffraction surface which is formed stepwise as annular bands which shift discretely in the direction where lens thickness is greater as its position becomes more distant from the optical axis. Incidentally, it is preferable that the diffractive portion is ring-zonal, but it may also be a 1-dimensional diffraction grating.

(11-13)

When the diffraction portion represents concentric circles in a ring-zonal form, a pitch of diffraction annular bands is defined by the use of a phase difference function or an optical path difference function. In this case, it is preferable that a coefficient other than zero is owned by at least one term other than a squared term in a phase difference function expressed by a power series which shows positions of plural annular bands. Due to this structure, it is possible to correct spherical aberration of chromatic aberration caused by rays of light each having a different wavelength.

(11-14)

When a coefficient other than zero is owned by a squared term in a phase difference function expressed by a power series which shows positions of plural annular bands of the diffractive portion, paraxial chromatic aberration can be corrected, which is preferable. However, when it is important not to make a pitch of diffraction annular bands to be too small, it is also possible to make the phase difference function expressed by a power series which shows positions of plural annular bands of the diffractive portion to include no squared term.

(11-15)

Incidentally, it is preferable that the number of steps of diffraction annular bands of the diffractive portion is in a range from 2 to 45. The more preferable is not more than 40. Still further preferable is not more than 15. Incidentally, counting of the number of steps is achieved by counting the number of stepped sections of annular bands.

Further, it is preferable that a depth of the stepped section of diffraction annular bands of the diffraction portion in the direction of the optical axis is not more than 2 μm. Due to this structure, an optical element can be manufactured easily, and n-th ordered diffracted ray can easily be made to be +first ordered diffracted ray or −first ordered diffracted ray.

Further, when providing a diffraction portion on the surface of an optical element on the light source side, it is preferable that a depth of a stepped section becomes greater as the stepped section becomes more distant from an optical axis.

(11-16)

With regard to the effect of the diffractive portion to deflect the light flux, in the present specification, the case that the light flux is deflected toward the optical axis is called as the positive effect, on the other hand, the case that the light flux is deflected so as to be shifted away from the optical axis is called as the negative effect.

With regard to the pitch on the ring-zonal diffraction surface, there may also be provided a pitch wherein a pitch is provided to be inversely proportional to a height from an optical axis. It is also possible to provide a pitch having aspheric characteristics wherein the way of providing a pitch is not inversely proportional to a height from an optical axis.

In particular, when providing a pitch having aspheric characteristics, namely, when a pitch is not provided to be inversely proportional to a height from an optical axis, it is preferable that there is no point of inflection in the function of optical path difference, though there may also be the point of inflection.

Figure 47:
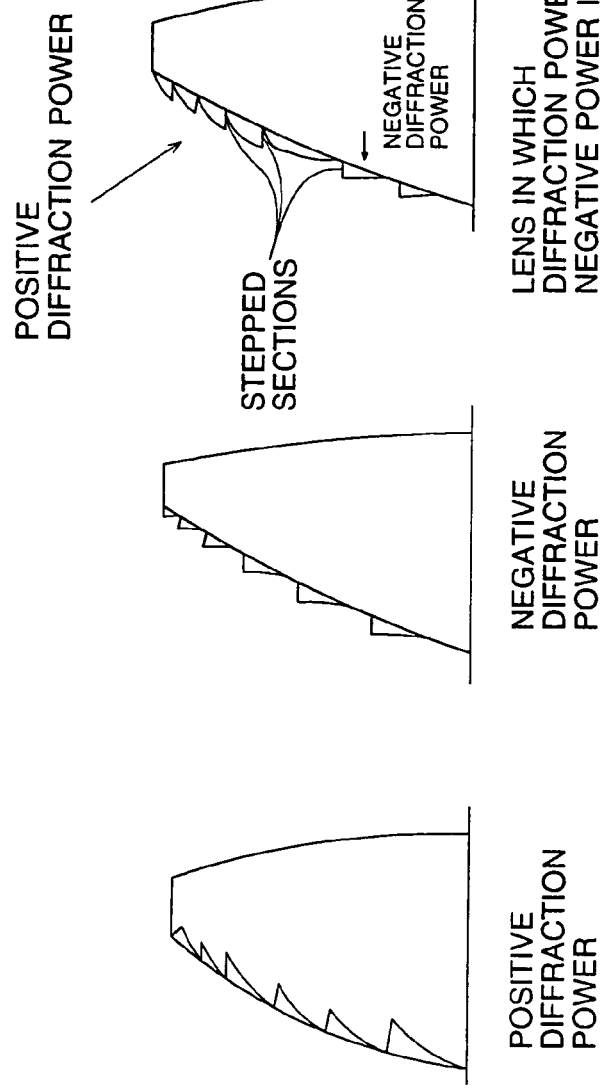
FIG. 47 is a view typically showing the relationship of the diffraction lens power and the lens shape of the diffraction optical lens according to Examples of the present invention.

Further, the diffraction effect added in the diffractive portion may either be positive on the entire surface of the diffractive portion, or be negative on the entire surface of the diffractive portion. It is also possible to arrange so that a plus or minus sign of the diffraction effect added in the diffractive portion is switched at least one time in the direction to become more distant from the optical axis in the direction perpendicular to the optical axis. For example, there is given a type wherein a sign is changed from minus to plus in the direction to become more distant from the optical axis in the direction perpendicular to the optical axis, as shown in FIG. 47(c). In other words, it can be said that plural annular bands of the diffractive portion are blazed, and on the diffractive annular band closer to the optical axis, its stepped section is positioned to be away from the optical axis, and on the diffractive annular band farther from the optical axis, its stepped section is positioned to be closer to the optical axis. There can also be given a type wherein a sign is changed from plus to minus in the direction to become more distant from the optical axis in the direction perpendicular to the optical axis, as shown in FIG. 47(*d*). In other words again, it can be said that plural annular bands of the diffractive portion are blazed, and on the aforesaid diffractive annular band closer to the optical axis, its stepped section is positioned to be closer to the optical axis, and on the diffractive annular band farther from the optical axis, its stepped section is positioned to be farther from the optical axis.

Incidentally, the pitch (zone distance) of diffraction annular bands means distance p in FIG. 134 between a step of a annular band and a step of its adjacent annular band in the direction perpendicular to the optical axis, while, a depth of the step means length d in FIG. 134 of the step in the optical direction.

(11-17)

Incidentally, when the pitch is smaller, converging effect and diverging effect on that portion become stronger, and when pitch is greater, converging effect and diverging effect on that portion become weaker Further, the diffractive portion may also be provided on the entire portion of the surface through which a light flux passes, in an optical element having a diffractive portion. In other words, it can be said that it is also possible to arrange so that the all light flux within the maximum numerical aperture at an image side of an objective lens may pass through the diffractive portion. A diffractive portion may also be provided simply on the entire portion on one optical surface of an optical element, or not less than 70% (not less than 80% is preferable and not less than 90% is more preferable) of one optical surface of the optical element may be made to be a diffractive portion.

(11-18)

Further, the diffractive portion may also be provided on only a part of the surface of an optical element through which a light flux passes, to make another area to be a refraction surface or a transmission surface, in an optical element. When a diffractive portion is provided only on a part of the surface through which a light flux passes, the diffractive portion may be provided only on a portion in the vicinity of an optical axis including the optical axis, or the diffractive portion may be provided to be in a ring shape, without being provided to be in the vicinity of the optical axis. For example, a diffractive portion may be provided on 10% or more and less than 90% of one surface in optical surfaces of an optical element. Or, 10% or more and less than 50% of one surface may be made to be a diffractive portion.

(11-19)

Incidentally, when providing a diffractive portion only on a part of the surface of an optical element through which a light flux passes, NA1>NAH1, NAH1≧NA2, NA2≧NAL1≧0 is preferable in the case of NA1>NA2. In the case of NA2>NA1, NA2>NAH2, NAH2≧NA1, NA1≧NAL2≧0 is preferable. Incidentally, each of NA1 and NA2 is a prescribed numerical aperture of an objective lens on the image side, when using the first light flux and the second light flux respectively. Each of NAH1 and NAH2 is a numerical aperture of the objective lens on the image side for each of the first light flux and the second light flux passing through the outermost side of the diffractive portion. Each of NAL1 and NAL2 is a numerical aperture of the objective lens on the image side for each of the first light flux and the second light flux passing through the innermost side of the diffractive portion.

(11-20)

When the diffractive portion is provided only on a part of the surface of an optical element through which a light flux passes, it is preferable that the light flux which has passed the diffraction portion at NA1 or less in the first light flux and light which has passed the refraction surface at NA1 or less other than the diffractive portion are converged at mostly the same position, in the case of NA1>NA2. In the case of NA2>NA1, it is preferable that the light flux which has passed the diffraction portion at NA2 or less in the second light flux and light which has passed the refraction surface at NA2 or less other than the diffractive portion are converged at mostly the same position.

An embodiment wherein the diffractive portion has the first diffraction pattern and the second diffraction pattern, and the second diffraction pattern is farther than the first diffraction pattern in terms of a distance from the optical axis. It is possible to combine a diffractive portion and a refraction surface having no diffractive portion on the same plane.

(11-21)

When two types of diffraction patterns are used, it is also possible to arrange so that n-th ordered diffracted ray is generated more than other ordered diffracted ray in the first light flux which has passed the first diffraction pattern of the diffractive portion and is capable to be converged on a first information recording plane, and n-th ordered diffracted ray is generated more than other ordered diffracted ray also in the second light flux which has passed the first diffraction pattern of the diffractive portion and is capable to be converged on a second information recording plane, and n-th ordered diffracted ray is generated more than other ordered diffracted ray in the first light flux which has passed the second diffraction pattern of the diffractive portion and is capable to be converged on a first information recording plane, while, 0-th ordered light representing transmitted light is generated more than other ordered diffracted ray in the second light flux which has passed the second diffraction pattern of the diffractive portion. The n-th ordered in this case is preferably first ordered.

(11-22)

Further, in another embodiment, n-th ordered diffracted ray is generated more than other ordered diffracted ray in the first light flux which has passed the first diffraction pattern of the diffractive portion and is capable to be converged on a first information recording plane, and n-th ordered diffracted ray is generated more than other ordered diffracted ray also in the second light flux which has passed the first diffraction pattern of the diffractive portion and is capable to be converged on a second information recording plane, and 0-th ordered diffracted ray is generated more than other ordered diffracted ray in the first light flux which has passed the second diffraction pattern of the diffractive portion and is capable to be converged on a first information recording plane, while, diffracted ray not of n-th ordered but of negative ordered is generated more than other ordered diffracted ray in the second light flux which has passed the second diffraction pattern of the diffractive portion. The n-th ordered in this case is preferably +first ordered, and negative ordered is preferably −first ordered.

(11-23)

In the case of an optical pickup apparatus or an optical element used in plural optical information recording media each having a different thickness of a transparent substrate, it is especially preferable that a pitch of annular bands of the diffraction portion satisfies the following conditional expression.

$$0.4 <= |(Ph/Pf)-2| <= 25$$

The more preferable is $0.8 \leq |(Ph/Pf)-2| \leq 6$, and further preferable is $1.2 \leq |(Ph/Pf)-2| \leq 2$ (11-24)

A pitch of annular bands of the diffractive portion corresponding to the maximum numerical aperture of the objective lens on the image side is represented by Pf, and a pitch of annular bands of the diffractive portion corresponding to ½ of the maximum numerical aperture is represented by Ph. Incidentally, with regard to the maximum numerical aperture, the greatest one among prescribed numerical apertures of some types of optical information recording media subjected to information reading/recording in an optical pickup apparatus is regarded as the maximum numerical aperture. Incidentally, the prescribed numerical aperture means a numerical aperture which makes reading/recording of information on optical information recording medium by a light flux which has a prescribed wavelength possible in its optical pickup apparatus, but it may also be a numerical aperture stipulated by the standard of a certain optical information recording medium. Further, "a pitch of annular bands of the diffractive portion corresponding to the maximum numerical aperture of the objective lens on the image side" means a pitch of annular bands located at the outermost portion of the light flux passing through the diffraction portion in the case of the maximum numerical aperture. "A pitch of annular bands of the diffractive portion corresponding to ½ of the maximum numerical aperture" means a pitch of annular bands located at the outermost portion of the light flux passing through the diffraction portion in the case of the numerical aperture which is a half of the maximum numerical aperture.

(11-25)

Incidentally, there will be accepted an optical pickup apparatus wherein up to the prescribed numerical aperture is made to be no-aberration for one light flux among two light fluxes respectively from two light sources, and for the portion outside the prescribed numerical aperture, aberration is made to be flare.

(11-26)

In other words, it can be said as follows. The first light flux which is within a prescribed numerical aperture, of a first optical information recording medium, of the objective lens on the image side in the case of using a first light flux is converged on a first information recording plane of the first optical information recording medium under the state of 0.07 λrms or less, and the first light flux passing through the outside of the prescribed numerical aperture of the objective lens on the image side in the case of using a first light flux is made to be greater than 0.07 λrms on a first information recording plane, and the second light flux passing through the prescribed numerical aperture of the objective lens on the image side in the case of using a first light flux as well as the second light flux passing through the outside of the aforesaid numerical aperture are converged on a second information recording plane under the state of 0.07 λrms or less. In this case, NA1 is smaller than NA2, and a light flux between NA1 and NA2 is made to be flare when recording and reproducing the first optical information recording medium.

(11-27)

Or, the second light flux which is within a prescribed numerical aperture, of a second optical information recording medium, of the objective lens on the image side in the case of using a second light flux is converged on a second information recording plane of the second optical information recording medium under the state of 0.07 λrms or less, and the second light flux passing through the outside of a prescribed numerical aperture of the objective lens on the image side in the case of using a second light flux is made to be greater than 0.07 λrms on a second information recording plane, and the first light flux passing through the prescribed numerical aperture of the objective lens on the image side in the case of using a second light flux as well as the first light flux passing through the outside of the aforesaid numerical aperture are converged on a first information recording plane under the state of 0.07 λrms or less. In this case, NA1 is greater than NA2, and a light flux between NA2 and NA1 is made to be flare, when recording and reproducing the second optical information recording medium.

These embodiments can be established voluntarily by the design of a diffraction portion. For example, it is possible either to provide a diffractive portion on the entire surface of an optical element and thereby to generate flare at the prescribed numerical aperture or more by designing the diffractive portion, or to provide a diffractive portion on a part of the surface of an optical element and to make the other part to be a refraction surface so that flare may be generated by the refraction surface and the diffractive portion.

(11-28)

In the embodiment to generate flare stated above, it is preferable that an aperture regulating means to block or diffract the first light flux outside a prescribed numerical aperture of the objective lens on the image side in the case of using the first light flux and to transmit the second light flux and an aperture regulating means to block or diffract the second light flux outside a prescribed numerical aperture of the objective lens on the image side in the case of using the second light flux and to transmit the first light flux are not provided. Namely, it is preferable to provide an ordinary aperture only without providing a dichroic filter or a hologram filter. If the diffractive portion is only designed to satisfy the aforesaid function, it is enough to provide only an ordinary aperture, which is preferable because a mechanism is simple.

(11-29)

However, it is also possible to use a filter such as a hologram filter to generate flare. Incidentally, when providing a filter such as a hologram filter, a separated filter may be provided in the optical converging system, or a filter may be provided on the objective lens.

It is possible either to provide flare to be under for the position to make the minimum spot when the light flux located where the prescribed numerical aperture is more smaller are converged, or to provide flare to be over. The preferable is to provide to be over.

When generating flare as stated above, it is possible to generate flare continuously on the spherical aberration diagram or to generate flare discontinuously.

Further, an another embodiment, there is given an embodiment of an optical pickup apparatus wherein no flare is generated. The following one is given.

(11-30)

In other words, it is possible to express as follows. The first light flux which is within a prescribed numerical aperture, of a first optical information recoding medium, of the objective lens on the image side in the case of using the first light flux is converged on a first information recording plane of a first optical information recording medium under the state of 0.07 λrms or less, and the first light flux which has passed the outside of a prescribed numerical aperture of the objective lens on the image side in the case of using the first light flux is converged on the first information recording plane under the state of 0.07 λrms or less, or it is blocked and does not reach the first information recording plane. The second light flux which has passed the inside of a prescribed numerical aperture of the objective lens on the image side in the case of using the first light flux, and the second light flux which has passed the outside of a prescribed numerical aperture are converged on a second information recording plane of a second optical information recording medium under the state of 0.07 λrms or less. In this case, NA1 is smaller than NA2, and a light flux between NA1 and NA2 is also converged or blocked, when conducting recording or reproducing for the first optical information recording medium.

(11-31)

Or, the second light flux which is within a prescribed numerical aperture, of a second optical information recoding medium, of the objective lens on the image side in the case of using the second light flux is converged on a second information recording plane of a second optical information recording medium under the state of 0.07 λrms or less, and the second light flux which has passed the outside of a prescribed numerical aperture of the objective lens on the image side in the case of using the second light flux is converged on the second information recording plane under the state of 0.07 λrms or less, or it is blocked and does not reach the second information recording plane. The first light flux which has passed the inside of a prescribed numerical aperture of the objective lens on the image side in the case of using the second light flux, and the first light flux which has passed the outside of a prescribed numerical aperture are converged on a first information recording plane of a first optical information recording medium under the state of 0.07 λrms or less. In this case, NA1 is greater than NA2, and a light flux between NA2 and NA1 is also converged or blocked, when conducting recording or reproducing for the second optical information recording medium.

These embodiments can be established voluntarily by the design of the diffractive portion.

(11-32)

In the embodiment wherein the flare is not generated and a light flux between NA1 and NA2 or between NA2 and NA1 is blocked, it is preferable to provide an aperture regulating means which blocks the first light flux which is outside a prescribed numerical aperture of the objective lens on the image side in the case of using the first light flux and transmits the second light flux, or an aperture regulating means which blocks the second light flux which is outside a prescribed numerical aperture of the objective lens on the image side in the case of using the second light flux and transmits the first light flux. Or, it is preferable to provide an aperture regulating means wherein each light flux has its own prescribed numerical aperture.

(11-33)

Namely, it is preferable that a light flux is blocked by a ring-zonal filter such as a dichroic filter or a hologram filter representing an aperture regulating means at the prescribed numerical aperture or more for either one of the first light flux or the second light flux. Incidentally, when providing a dichroic filter or a hologram filter, a separate filter may be provided in an optical converging system, or a filter may be provided on an objective lens.

(11-34)

However, even when no flare is generated, it is also possible to make all light fluxes within the maximum numerical aperture to be converged on an information recording plane by providing only an ordinary aperture without providing a dichroic filter or a hologram filter. In other words, it is also possible to make the first light flux and the second light flux within the maximum numerical aperture of the objective lens on the image side to be converged on an information recording plane under the state of 0.07 λrms. It may be preferable that no flare is generated by the above embodiment when NA1=NA2.

(11-35)

Incidentally, the first optical information recording medium and the second optical information recording medium both representing different information recording media mean information recording media each having a different wavelength of light used for each recording/reproducing. A thickness and a refractive index of a transparent substrate may either be the same or be different. A prescribed numerical aperture may either be the same or be different. A prescribed numerical aperture may either be the same or be different, and the recording density for information also may be the same or be different.

Paraxial chromatic aberration and spherical aberration caused by a difference of a wavelength of light used for recording/reproducing of each of different information recording media are corrected by the diffractive portion of the invention. Incidentally, it is most preferable that both spherical aberration and paraxial chromatic aberration are corrected, and an embodiment wherein spherical aberration only is corrected and paraxial chromatic aberration is not corrected is preferable next, while, an embodiment wherein paraxial chromatic aberration only is corrected and spherical aberration is not corrected is also acceptable. Incidentally, as a concrete embodiment of the optical information recording medium, CD, CD-R, CD-RW, DVD, DVD-RAM, LD, MD, MO and so on may be listed. However, it may be not limited to these. Further, an optical information recording medium employing blue laser may be used.

(11-36)

Even in the case where a thickness of a transparent substrate is different in different information recording media, and spherical aberration is caused based on the thickness of the transparent substrate, the spherical aberration is corrected by the diffractive portion of the invention. Incidentally, when a thickness of a transparent substrate is different in a first optical information recording medium and a second optical information recording medium, a level of the caused spherical aberration is higher, and therefore, the effect of the invention is more remarkable, which is preferable.

(11-37)

Incidentally, it is preferable that a difference between the wavelength of the first light flux and the wavelength of the second light flux is in a range from 80 nm to 400 nm. The more preferable is in a range from 100 nm to 200 nm. Further preferable is in a range from 120 nm to 200 nm. As the first light source and the second light source, it is possible to select two types of light sources from those emitting light of wavelengths 760-820 nm, 630-670 nm and 350-480 nm, for example, to combine them for use. Three light sources or four light sources are naturally acceptable. When the third light source emitting the third light flux and the fourth light source emitting the fourth light flux are provided, it is preferable that n-th ordered diffracted ray is generated more than other ordered diffracted ray even in the third light flux and the fourth light flux which have passed the diffractive portion.

(11-38)

When the wavelength of the second light flux is longer than the wavelength of the first light flux, it is preferable that paraxial chromatic aberration in the second light flux and that in the first light flux satisfy the following conditional expression.

$$-\lambda_2/(2NA_2^2) \leq Z \leq \lambda_2/(2NA_2^2)$$

$\lambda_2$: Wavelength of the second light flux $NA_2$: Prescribed numerical aperture, of the second optical information recording medium, of the objective lens on the image side for the second light flux (11-39)

When a recording medium having a different thickness of a transparent substrate is used, it is preferable that the following expression is satisfied in the case of t2>t1 and $\lambda 2 < \lambda 1$.

$$0.2 \times 10^{-6}/°C. < \Delta WSA3 \cdot \lambda 1/\{f \cdot (NA1)^4 \times \Delta T\} < 2.2 \times 10^{-6}/°C.$$

NA1: Prescribed numerical aperture, of the first optical information recording medium, of the objective lens on the image side for the use of the first light flux $\lambda 1$: Wavelength of the first light flux f1: Focal length of the objective lens for the first light flux $\Delta T$: Ambient temperature fluctuation $\Delta WSA3$ ($\lambda$ 1rms): An amount of fluctuation of 3-ordered spherical aberration component of spherical aberration of a light flux converged on an optical information recording plane in the case of reproducing or recording the optical information recording medium by the use of the first light flux (11-40)

It is also possible to arrange so that the first light flux representing a non-collimated light flux such as diverged light or converged light is made to enter the objective lens in the case of using the first light flux, and the second light flux representing a non-collimated light flux such as diverged light or converged light is made to enter the objective lens in the case of using the second light flux.

(11-41)

Or, the first light flux representing a collimated light flux may be made to enter the objective lens in the case of using the first light flux, and the second light flux representing a non-collimated light flux such as diverged light or converged light may also be made to enter the objective lens in the case of using the second light flux. Or, it is also possible to arrange so that the first light flux representing a non-collimated light flux such as diverged light or converged light is made to enter the objective lens in the case of using the first light flux, and the second light flux representing a collimated light is made to enter the objective lens in the case of using the second light flux.

When using a non-collimated light flux in either of the first light flux and the second light flux, or in both light fluxes of them, it is preferable that an absolute value of a difference between magnification m1 of an objective lens in using the first light flux and magnification m2 of an objective lens in using the second light flux is in a range of 0-1/15. The more preferable range is 0-1/18. In the case of $\lambda 2 > \lambda 1$ and t2>t1, it is preferable that m1 is greater. In particular, when using the second light flux and the first light flux respectively for CD and DVD, the aforesaid range is preferable. Incidentally, a wavelength of the first light source is represented by $\lambda 1$, a wavelength of the second light source is represented by $\lambda 2$, a thickness of the first transparent substrate is represented by t1 and a thickness of the second transparent substrate is represented by t2.

Or, it is also possible to arrange so that the first light flux representing a collimated light flux and the second light flux representing a collimated light flux may also be made to enter the objective lens. In this case, it is preferable that the diffractive portion is in the form shown in FIGS. 47(a) and 47(b), although it may also be in the form shown in FIGS. 47(b) and 47(c). (11-42)

Further, it is also possible to provide, on an optical pickup apparatus, a divergence changing means which changes divergence of a light flux entering an objective lens, and thereby to change divergence of a light flux entering an objective lens in the first light flux and the second light flux.

Incidentally, when a diverged light enters an objective lens, it is preferable that the objective lens is a glass lens.

Incidentally, when reproducing and recording can be conducted only for either one of the first information recording medium and the second information recording medium, and reproducing only is conducted for the other one of them, it is preferable that an image forming magnification of the total optical pickup apparatus for the first light flux is different from an image forming magnification of the total optical pickup apparatus for the second light flux, in the optical pickup apparatus. In this case, an image forming magnification of the objective lens for the first light flux may either be equal to or be different from an image forming magnification of the objective lens for the second light flux.

Further, when reproducing and recording can be conducted only for the first information recording medium, and reproducing only is conducted for the second information recording medium in the case of $\lambda 1 < \lambda 2$ and t1<t2, it is preferable that the image forming magnification of the total optical pickup apparatus for the first light flux is smaller than that of the total optical pickup apparatus for the second light flux. Further, when the foregoing is satisfied in the case of 0.61<NA1<0.66, it is preferable that a coupling lens which changes a magnification is provided between the first light source and a collimator lens in the optical converging system, and a collimator lens for the first light flux and a collimator lens for the second light flux are provided separately in the optical converging system. Incidentally, it is preferable that both of the image forming magnification of the objective lens for the first light flux and the image forming magnification of the objective lens for the second light flux are zero. Incidentally, a wavelength of the first light source is represented by $\lambda 1$, a wavelength of the second light source is represented by $\lambda 2$, a thickness of the first transparent substrate is represented by t1, a thickness of the second transparent substrate is represented by t2, and a prescribed numerical aperture of the objective lens which is necessary for recording or reproducing of the first optical information recording medium on the image side is represented by NA1.

Further, when reproducing and recording can be conducted only for the second information recording medium, and reproducing only is conducted for the first information recording medium in the case of $\lambda1<\lambda2$ and $t1<t2$, it is preferable that the image forming magnification of the total optical pickup apparatus for the first light flux is greater than that of the total optical pickup apparatus for the second light flux. Incidentally, it is preferable that both of the image forming magnification of the objective lens for the first light flux and the image forming magnification of the objective lens for the second light flux are zero.

Incidentally, when reproducing and recording can be conducted for both the first information recording medium and the second information recording medium, or when reproducing only is conducted for both of them, it is preferable that an image forming magnification of the total optical pickup apparatus for the first light flux is the almost same with an image forming magnification of the total optical pickup apparatus for the second light flux, in the optical pickup apparatus. In this case, an image forming magnification of the objective lens for the first light flux may either be equal to or be different from an image forming magnification of the objective lens for the second light flux.

(11-43)

Further, the photo detector may be made to be common for both the first light flux and the second light flux. Or, it is also possible to provide a second photo detector so that the photo detector is made to be for the first light flux, and the second photo detector is made to be for the second light flux.

(11-44)

The photo detector and the first light source or the photo detector and the second light flux may be unitized. Or, the photo detector, the first light source and the second light source may be unitized. Or, the photo detector, the second photo detector, the first light source and the second light source may all be unitized integrally. Further, the first light source and second light source only may be unitized.

In particular, when the first light source and the second light source are unitized respectively and are arranged side by side on the same plane, it is preferable to provide the first light source on the optical axis of the objective lens in the case of NA1>NA2, and it is preferable to provide the second light source on the optical axis of the objective lens in the case of NA1<NA2. Incidentally, a prescribed numerical aperture of the objective lens which is necessary for recording or reproducing of the first optical information recording medium on the image side is represented by NA1, and a prescribed numerical aperture of the objective lens which is necessary for recording or reproducing of the second optical information recording medium on the image side is represented by NA2.

Incidentally, when WD1 represents a working distance in recording and reproducing the first optical information recording medium and WD2 represents a working distance in recording and reproducing the second optical information recording medium, $|WD1-WD2| \leq 0.29$ mm is preferable. In this case, it is preferable that a magnification for recording and reproducing of the first optical information recording medium is the same as that for recording and reproducing of the second optical information recording medium. The more preferable is that the magnification is zero. Further, in the case of $t1<t2$ and $\lambda1<\lambda2$, $WD1 \geq WD2$ is preferable. These conditions about a working distance are especially preferable when the first optical information recording medium is DVD AND the second optical information recording medium is CD. Incidentally, when the aforesaid working distance is satisfied, the form of the diffractive portion shown in FIGS. 47(b) and 47(c) is more preferable than that shown in FIGS. 47(a) and 47(d).

Further, the converging optical system or the optical element such as an objective lens forms a spot so that a light flux may be converged on an information recording plane of an optical information recording medium for recording and reproducing of information. In particular, when NA1 is greater than NA2 and $\lambda1$ is smaller than $\lambda2$, and a light flux outside NA2 is made to be flare (wave-front aberration on an image forming plane is made to be greater than 0.07 $\lambda$2rms) on the second information recording plane of the second optical information recording medium, concerning the second light flux, it is preferable that the spot satisfies the following conditions.

$$0.66\ \lambda2/NA2 \leq w \leq 1.15\ \lambda2/NA2$$

$$w > 0.83\ \lambda2/NA1$$

$\lambda1$: Wavelength of first light flux
$\lambda2$: Wavelength of second light flux
NA1: Prescribed numerical aperture of a first optical information recording medium for first light flux
NA2: Prescribed numerical aperture of a second optical information recording medium for second light flux
w: Beam diameter of 13.5% intensity of second light flux on image forming plane Incidentally, when the spot is not a complete round, it is preferable that the beam diameter in the direction where the beam diameter is converged most is made to be the aforesaid beam diameter (w).

It is more preferable that the following conditions are satisfied.

$$0.74\ \lambda2/NA2 \leq w \leq 0.98\ \lambda2/NA2$$

With regard to a form of the spot, it may either be one wherein a spot of high light intensity used for recording and reproducing is located at the center, and flare which is low in terms of light intensity to the degree not to affect the detection adversely is located continuously around the spot, or be one wherein a spot of high light intensity used for recording and reproducing is located at the center, and flare is located around the spot in the form of a doughnut.

(11-45)

Further, in order to detect information very well, it may be preferable that S-shaped characteristic is good. More concretely, it may be preferable that over shoot is 0% to 20%.

When $\lambda1$ represents a wavelength of the first light source, $\lambda2$ represents a wavelength of the second light source, t1 represents a thickness of the first transparent substrate, t2 represents a thickness of the second transparent substrate, NA1 represents a prescribed numerical aperture of an objective lens on the image side which is needed for recording or reproducing the first optical information recording medium by first light flux, and NA2 represents a prescribed numerical aperture of an objective lens on the image side which is needed for recording or reproducing the second optical information recording medium by second light flux, there is given the following conditional expression as a preferable example. In this case, it is preferable that n-th ordered diffracted ray is positive first ordered diffracted ray. A preferable embodiment is not naturally limited to the following conditional expression.

$\lambda1 < \lambda2$ $t1 < t2$ $NA1 > NA2$ (preferably, $NA1 > NA2 > 0.5 \times NA1$)

In the case that the above conditional formula is satisfied, the objective lens of the converging optical system comprises a diffractive portion, and in the case that the converging optical system converges the n-th ordered diffracted ray in the second light flux having passed over the diffractive portion on the second information recording plane of the second information recording medium, the spherical aberration may comprises a discontinuing section in at least one place as shown in FIG. 112.

In case of comprising the discontinuing section, at a place near NA2, it may be preferable that the spherical aberration may comprises a discontinuing section. For example, following case may be listed. At a place where NA=0.45, the spherical aberration comprises a discontinuing section, and at a place where NA=0.5, the spherical aberration comprises a discontinuing section.

In case that the spherical aberration comprises a discontinuing section, the converging optical system converges the n-th ordered diffracted ray having a numerical aperture smaller than NA1 in the first light flux having passed over the diffractive portion on the first information recording plane of the first recording medium such that the wave-front aberration at the best image point is 0.07 λrms and the converging optical system converges the n-th ordered diffracted ray having a numerical aperture smaller than that of the discontinuing section in the second light flux having passed over the diffractive portion on the second information recording plane of the second recording medium such that the wave-front aberration at the best image point is 0.07 λrms.

Figure 27:
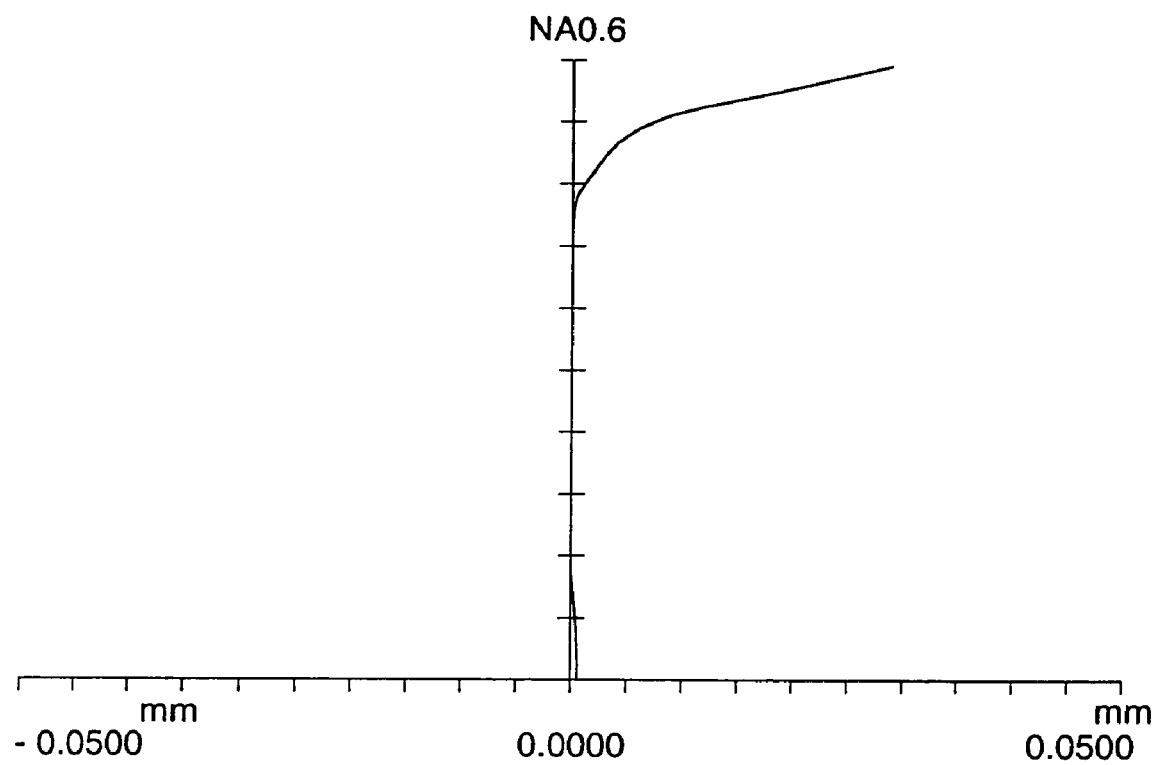
FIG. 27 is a view of the spherical aberration up to the numeral aperture 0.60 to the wavelength $\lambda=780$ nm, by the diffraction optical lens of Example 6 of the present invention.

Further, in the case that the above conditional formula is satisfied, it may be that the conversion optical system comprises an objective lens, and the objective lens has a diffractive portion, in case that the converging optical system converges the n-th ordered diffracted ray of the second light flux having passed over the diffractive portion on the second information recording plane of the second optical information recording medium in order to conduct the recording or the reproducing for the second optical information recording medium, the spherical aberration is continued without having a discontinuing section as shown in FIG. 27.

In the case that the spherical aberration is continued without having a discontinuing section, it may be preferable that the spherical aberration at NA1 is not smaller than 20 μm and the spherical aberration at NA2 is not larger than 10 μm. It may be more preferable tht the spherical aberration at NA1 is not smaller than 50 μm and the spherical aberration at NA2 is not larger than 2 μm.

(11-46)

There is given the following embodiment as a concrete and preferable example wherein one type of DVD is used as a first optical information recording medium and one type of CD is used as a second optical information recording medium in the aforesaid condition, to which the invention is not limited.

0.55 mm $< t1 <$ 0.65 mm 1.1 mm $< t2 <$ 1.3 mm 630 nm $< \lambda1 <$ 670 nm 760 nm $< \lambda2 <$ 820 nm 0.55 $<$ NA1 $<$ 0.68

0.40 $<$ NA2 $<$ 0.55

When the diffractive portion is ring-zonal diffraction in the case of the aforesaid range, it is preferable that the diffraction portion corresponding to NA2 or less is not more than 19 annular bands or not less than 21 annular bands. It is also preferable that the total diffraction portion is not less than 35 annular bands or not more than 33 annular bands.

(11-47)

Further, in the case that the above range is satisfied, it may be preferable that the diameter of spot satisfy the following embodiment. The conversion optical system comprises an objective lens, the objective lens has a diffractive portion, $\lambda1=650$ nm, $t1=0.6$ mm, and NA1=0.6, and wherein in case that the first light flux which is composed of parallel rays and have a uniform intensity distribution are introduced in the objective lens and are converged on the first information recording plane through the first transparent substrate, a diameter of converged spot is 0.88 μm to 0.91 μm at the best focusing condition.

Further, it may be preferable that $\lambda1=650$ nm, $t1=0.6$ mm, and NA1=0.65 and wherein in case that the first light flux which is composed of parallel rays and have a uniform intensity distribution are introduced in the objective lens and are converged on the first information recording plane through the first transparent substrate, a diameter of converged spot is 0.81 μm to 0.84 μm at the best focusing condition.

Furthermore, in the case that the above range is satisfied and the diffractive portion is provided on an objective lens, a pitch of the diffractive portion at NA=0.4 is 10 μm to 70 μm. It may be more preferable that the pitch is 20 μm to 50 μm.

Further, there is given the following embodiment as a concrete and preferable example in the aforesaid condition, but the invention is not limited to this. When conducting also recording for CD as a second optical information recording medium, in particular, it is preferable that NA2 is 0.5. Further, when conducting recording also for the first optical information recording medium as DVD, NA1 which is 0.65 is preferable.

$t1=0.6$ mm $t2=1.2$ mm $\lambda1=650$ nm $\lambda2=780$ nm

NA1=0.6

NA2=0.45

(11-48)

The following embodiment is also acceptable. In the case of the following embodiment, it is preferable that n-th ordered diffracted ray is negative first ordered light.

$\lambda1 < \lambda2$ $t1 > t2$ (11-49)

As a concrete example of an optical information recording medium reproducing or recording apparatus for reproducing information from an optical information recording medium or for recording information onto the optical information recording medium, having an optical pickup apparatus of the invention, there are given a DVD/CD reproducing apparatus, a DVD/CD/CD-R recording and reproducing apparatus, a DVD-RAM/DVD/CD-R/CD recording and reproducing apparatus, a DVD/CD/CD-RW recording and reproducing apparatus, a DVD/LD reproducing apparatus, DVD/an optical information recording medium recording and reproducing apparatus employing blue laser, CD/and an optical information recording medium recording and reproducing apparatus employing blue laser, to which the invention is not limited. These optical information recording medium reproducing or recording apparatuses have a power supply and a spindle motor in addition to the optical pickup apparatus.

Next, a preferable embodiment of the present invention will be explained.

In ordered to attain the above object, an optical system of Item 1 includes more than 1 optical element, and in the optical system used for at least either one of recording or reproducing of the information onto or from an information recording medium, at least one of the optical elements has a diffraction surface which selectively generates the same ordered diffracted ray for the light of at least 2 wavelengths which are different from each other.

According to Item 1, because the optical element has the diffraction surface, the spherical aberration can be corrected for the light of at least 2 wavelengths which are different from each other, and the axial chromatic aberration can also be corrected. That is, by a simple structure in which many optical elements such as the objective lens, or similar lenses, are used in common with each other, the spherical aberration and the axial chromatic aberration can be corrected, thereby, the size and weight of the optical system can be reduced, and the cost can be reduced. Further, because the optical system has a diffraction surface which selectively generates the same ordered diffracted ray for the light of at least 2 wavelengths which are different from each other, the loss of the light amount can be reduced, and even when the necessary numerical apertures are different, for example, by using the common objective lens, a sufficient light amount can be obtained.

Further, in the optical system of Item 2, in an optical system in which more than 1 optical element is included and which is used for at least one of recording and reproducing of the information onto or from the information recording medium, the diffraction surface which selectively generates respectively a specific ordered of the diffracted ray for the light having at least 2 wavelengths which are different from each other is formed on almost entire surface of at least one optical surface of at least one optical element of the above-described optical elements.

According to Item 2, because the diffraction surface is formed on the optical element, in the same manner as Item 1, the spherical aberration and the axial chromatic aberration can be corrected for the light having at least 2 wavelengths which are different from each other. Further, because the diffraction surface is formed on almost entire surface of at least one optical surface of the optical element, the correction can be more effectively carried out.

Incidentally, each term is defined as follows. Initially, an optical element indicates each of all optical elements applicable to the optical system to record the information onto the information recording medium and/or to reproduce the information on the information recording medium, and generally, a coupling lens, objective lens, polarizing beam splitter, ¼ wavelength plate, or beam splitter to synthesize the light from more than 2 light sources, or the like, are listed, however, the optical element is not limited to these. Further, the optical element which is provided with only the diffractive portion of the present invention and has not the other function, may be used.

Further, an optical system in the present invention is more than 1 assemblage of the optical elements to enable recording of the information onto or reproducing of the information on, for example, the CD and DVD, and may mean not only the whole optical system to enable recording of the information onto the information recording medium and/or reproducing of the information on the information recording medium, but also may means a portion of the optical system, and an optical system includes at least 1 optical element as described above.

As the information recording medium in the present invention, the disk-like information recording media, for example, each kind of CD such as the CD, CD-R, CD-RW, CD-Video, CD-ROM, etc., or each kind of DVD such as the DVD, DVD-ROM, DVD-RAM, DVD-R, DVD-RW, etc., or the MD, LD, MO or the like, are listed. Generally, a transparent substrate exists on the information recording surface of the information recording medium. Needless to say, the information recording media is not limited the above. The information recording media used in the present invention comprises an optical information recording media such as a blue laser available in a current market.

In the present invention, recording of the information onto the information recording medium, or reproducing of the information on the information recording medium mean to record the information onto the information recording surface of the information recording medium, and to reproducing the information recorded on the information recording surface. The pickup apparatus and the optical system in the present invention may a pickup apparatus and be an optical system used for only recording, or only reproducing, and may also be a pickup apparatus and an optical system used for both of recording and reproducing. Further, the pickup apparatus and the optical system may be used for recording onto one information recording medium and for reproducing from another information recording medium, or for recording and reproducing for one information recording medium, and for recording and reproducing for another information recording medium. Incidentally, the reproducing used herein includes only reading-out of the information.

Further, the pickup apparatus and the optical system used for at least either one of recording or reproducing for the information recording medium includes a pickup apparatus and an optical system, of course, applicable for the above purpose, and also a pickup apparatus and an optical system which is actually used, or intended to be used for such the purpose.

In the present invention, the light having at least 2 wavelengths which are different from each other, may be the light having 2 different wavelengths, for example, the light having 780 nm wavelength used for the CD, and 635 nm or 650 nm wavelength used for the DVD, and may be the light having 3 different wavelengths, which further includes, for example, the light having 400 nm wavelength for recording and/or reproducing of the large capacity information recording medium which is densification-recorded. Of course, the light having more than 4 different wavelengths may be allowable. Further, even in the optical system in which, actually, more than 3 different wavelengths are used, or the optical system in which that is intended, of course, it means the light having at least 2 different wavelengths in them. As a matter of course, a combination of 400 nm and 780 nm or a combination of 400 nm and 650 nm may be used.

In the present invention, the light having different wavelength means the light having a plurality of wavelengths with a sufficient difference of wavelength from each other, which is used corresponding to kinds of the information recording medium, as described above, or the difference of the recording density, however, it does not means the light having the wavelength which differs due to the temporary shift within about ±10 nm caused by the temperature change or output change of 1 light source which outputs the light having 1 wavelength. Further, as factors that the light having different wavelengths is used, other than the above-described kinds of the information recording media or the difference of recording density, for example, the difference of the thickness of the transparent substrate of the information recording medium, or the difference between recording and reproducing, is listed.

Further, the diffraction surface means the surface in which a relief is provided on the surface of the optical element, for example, on the surface of the lens, and which has the function to converge or diverge the flux of light by the diffraction, and when there is an area in which the diffraction occurs, and an area in which the diffraction does not occur on the same optical surface, it means the area in which the diffraction occurs. As the shape of the relief, for example, a concentric ring band is formed around the optical axis on the surface of the optical element, and when the cross section is viewed on the plane including the optical axis, it is known that each ring band, (hereinafter, the ring band is called the annular band), has the saw tooth-like shape, and the diffraction surface includes such the shape.

Generally, from the diffraction surface, the infinite ordered diffracted ray, such as zero ordered light, ±first ordered light, ±second ordered light, . . . , is generated, and in the case of the diffraction surface in which the meridian cross section has the saw-toothed relief as described above, the shape of the relief can be set so that the diffraction efficiency of the specific ordered is made higher than that of the other ordered, or in a certain circumstance, the diffraction efficiency of a specific one ordered (for example, +first ordered light) is made almost 100%. In the present invention, the diffracted ray of the specific ordered is selectively generated, means that, to the light having a predetermined wavelength, the diffraction efficiency of the diffracted ray of the specific ordered is higher than that of respective diffracted ray of the other ordered except the specific ordered, and to the respective light having 2 wavelength which are different from each other, the specific ordered of the specific ordered diffracted ray which is respectively selectively generated, is the same ordered, means that the same ordered diffracted ray is selectively generated. Herein, the ordered of the diffracted ray is the same, means that the ordered of the diffracted ray is the same including its sign.

Further, the diffraction efficiency is obtained such that the rate of the light amount of the diffracted ray of respective ordereds to the all diffracted ray is obtained according to the shape of the diffraction surface (the shape of the relief), and obtained by a calculation by the simulation in which the wavelength of the light to be irradiated is set to a predetermined wavelength. As the predetermined wavelength, as an example, the wavelength of 780 nm, or 650 nm is listed.

Further, the diffraction surface is formed on almost entire surface of at least one optical surface of the optical element, means that the diffraction structure (relief) is provided on at least almost all of the range through which the light flux passes on the optical surface, and that it is not the optical element in which the diffraction structure is provided on a portion of the optical surface, for example, the diffraction structure is provided, for example, on only the peripheral portion. In this case, the range through which the light flux from the light source passes to the information recording medium side, is determined by the aperture diaphragm used for the optical system or the optical pickup apparatus. The range in which the diffraction surface is formed, ranges over almost all surface of the optical surface when it is viewed as the optical element single body provided with the diffraction surface, however, generally, the optical surface is formed also on the peripheral portion through which the light flux does not pass, with a certain degree of the margin, therefore, when this portion is considered being included in the optical surface as an available area as the optical surface, it is preferable that the ratio of the area of the diffraction surface in the optical surface is at least more than half as the optical element single body, and more preferably it is almost 100%.

Further, the optical system in Item 3 is characterized in that the specific ordered of the diffracted ray respectively generated selectively is the same ordered to the respective light having 2 wavelengths which are different from each other.

According to Item 3, because the diffraction surface makes the diffraction efficiency of the diffracted ray of the same ordered, maximum to the respective light having at least 2 wavelengths, the loss of the light amount is smaller as compared to the case in which the diffraction surface makes the diffraction efficiency of the diffracted ray of the different ordered, maximum.

Further, the optical system in Item 4 is characterized in that the same ordered diffracted ray is the first ordered diffracted ray. The first ordered diffracted ray may be +first ordered diffracted ray, or −first ordered diffracted ray.

According to Item 4, because the same ordered diffracted ray is the first ordered diffracted ray, the loss of the light amount is smaller as compared to the case in which the same ordered diffracted ray is the higher ordered diffracted ray than the first ordered diffracted ray.

Further, the optical system in Item 5 is characterized in that at least 1 optical element of the optical element having the diffraction surface is a lens having the refraction power. The optical system in Item 5 may be the optical system in which a fine structure (relief) for the diffraction is further formed on the surface of the lens having the refraction power. In this case, the enveloping surface of the fine structure for diffraction is the shape of diffraction surface of the lens. For example, so called blaze type diffraction surface is provided on at least one surface of the aspherical single lens objective lens, and it may be a lens, on the entire surface of which the annular band whose meridian cross section is the saw-toothed shape is provided.

According to Item 5, because the optical element having the diffraction surface is the lens having the refraction power, both of the spherical aberration and the chromatic aberration can be corrected, and the number of parts can be reduced.

Further, the optical system in Item 6 is characterized in that the shape of the diffraction surface of the lens is aspherical.

Further, the optical system in Item 7 is characterized in that the lens makes the diffraction efficiency of the diffracted ray for the light having a certain 1 wavelength which is the wavelength between the maximum wavelength and the minimum wavelength of the at least 2 wavelengths which are different from each other, larger than the diffraction efficiency of the diffracted ray for the light having the maximum wavelength and the minimum wavelength.

Further, the optical system in Item 8 is characterized in that the lens makes the diffraction efficiency of the diffracted ray for the light having the maximum wavelength and the minimum wavelength of the at least 2 wavelengths which are different from each other, larger than the diffraction efficiency of the diffracted ray for the light having the wavelength which is the wavelength between the maximum wavelength and the minimum wavelength of the at least 2 wavelengths which are different from each other.

Further, the optical system in Item 9 is characterized in that the positive and negative signs of the diffraction effect which is added by the diffraction surface of the lens are switched at least one time in the direction separating from the optical axis perpendicularly to the optical axis.

According to Item 9, because the positive and negative signs of the diffraction effect which is added by the diffraction surface of the lens are switched at least one time in the direction separating from the optical axis perpendicularly to the optical axis, thereby, the variation of the wavelength of the spherical aberration can be suppressed.

Further, the optical system in Item 10 is characterized in that the diffraction effect which is added by the diffraction surface of the lens are switched one time from the negative to the positive in the direction separating from the optical axis perpendicularly to the optical axis.

According to Item 10, because the diffraction power which is added by the diffraction surface of the lens is switched one time from the negative to the positive in the direction separating from the optical axis perpendicularly to the optical axis, thereby, when, for example, the parallel light flux enters into the objective lens in the CD system and the DVD system, the influence on the spherical aberration due to the difference of the thickness of the transparent substrate of the information recording medium can be effectively corrected without making the annular band pitch of the diffraction surface too small.

Relating to the diffraction power, particularly, in the case of the optical element provided with the optical surface having the refraction action and the diffraction action, in other words, in the case of the optical element in which the diffraction surface is provided on the optical surface having the refraction action, by the action of the diffraction surface, the action to converge or diverge the light flux is added to the refraction action of the refraction surface which is the base. In this case, when converging action is added to the light ray which is in actual finite height, not limited to the paraxial area, in the present invention, the following is defined: a predetermined position of the refraction surface has the positive diffraction power, and when the diverging action is added, it has the negative power.

The optical system in Item 11 is characterized in that the diffraction surface is formed of a plurality of annular bands viewed from the optical axis, and the plurality of annular bands are formed into almost concentric circle-like one around the optical axis or a point near the optical axis. That is, the diffraction surface of Item 11 is, for example, as disclosed in Japanese Tokkaihei No. 6-242373, formed stepwise as the annular band, which shifts discretely in the direction in which the lens thickness is increased as being separated from the optical axis.

Further, the optical system in Item 12 is characterized in that the phase difference function expressed by the power series showing each position of the plurality of annular bands has a factor except zero in at least 1 term except the 2nd power term.

According to Item 12, the spherical aberration can be controlled between 2 different wavelengths. Herein, "can be controlled" means that the difference of the spherical aberration can be made very small between 2 wavelengths, and the difference necessary for the optical specification can be provided.

Further, the optical system in Item 13 is characterized in that the phase difference function expressed by the power series showing each position of the plurality of annular bands has a factor except zero in 2nd power term.

According to Item 14, the correction of the chromatic aberration in the paraxial area can be effectively conducted.

Further, the optical system in Item 13 is characterized in that the phase difference function expressed by the power series showing each position of the plurality of annular bands does not include the 2nd power term.

According to Item 14, because the phase difference function does not include the 2nd power term, the paraxial power of the diffraction surface becomes 0, and only the term more than 4th power is used, thereby, the pitch of the diffraction annular band is not too small, and the spherical aberration can be controlled.

The optical system in Item 15 is characterized in that the objective lens is included in the more than 1 optical element, and to each of the light having at least 2 wavelengths (wavelength $\lambda$) which are different from each other, the wave front aberration on the image formation surface is not more than 0.07 $\lambda$rms in a predetermined numerical aperture on the image side of the objective lens.

According to Item 15, because the wave front aberration is not more than 0.07 $\lambda$rms, which is Mareshall's allowable value, in a predetermined numerical aperture on the image side of the objective lens, thereby, an excellent optical characteristic in which the spherical aberration is fully small, can be obtained.

The optical system in Item 16 is characterized in that, even if one wavelength $\lambda_1$ of at least 2 wavelengths which are different from each other, varies within the range of ±10 nm, the wave front aberration on the image formation surface is not more than 0.07 $\lambda_1$rms in the predetermined numerical aperture on the image side of the objective lens.

According to Item 16, even if the wavelength $\lambda_1$ varies within the range of ±10 nm, an excellent optical characteristic in which the spherical aberration is fully small, can be obtained.

Further, the optical system in Item 17 is characterized in that the light having the wavelength $\lambda_2$ of at least 2 wavelengths which are different from each other, and to the light having the another wavelength in which the numerical aperture on the image side of the objective lens is larger than the predetermined numerical aperture of the light having the wavelength $\lambda_2$, the wave front aberration on the image formation surface of the light having the wavelength $\lambda_2$ is not smaller than 0.07 $\lambda_2$rms in the predetermined numerical aperture of the light having another wavelength.

According to Item 17, because the wave front aberration of the light having the wavelength $\lambda_2$ is not smaller than 0.07 $\lambda_2$rms in the predetermined numerical aperture (which is not smaller than the predetermined numerical aperture of the light having the wavelength $\lambda_2$) of the light having another wavelength, the appropriate spot diameter can be obtained for the light having the wavelength $\lambda_2$. That is, to the numerical number in the actual use, the aberration is made almost zero, and for the outside portions thereof, the aberration is made into the flare, thereby, the predetermined effects can be obtained.

Further, the optical system in Item 18 is characterized in that the front wave aberration of the light having the wavelength $\lambda_2$ on the image formation surface is not less than 0.10 $\lambda_2$rms in the predetermined numerical aperture of the light having another wavelength.

According to Item 18, because the front wave aberration of the light having the wavelength $\lambda_2$ is not less than 0.10 $\lambda_2$rms in the predetermined numerical aperture (which is larger than the predetermined numerical aperture for the light having the wavelength $\lambda_2$) of the light having another wavelength, the more appropriate spot diameter can be obtained for the light having the wavelength $\lambda_2$.

The optical system i Item 19 is characterized in that, when the predetermined numerical aperture of the light having another wavelength is NA1, and the predetermined numerical aperture of the light having wavelength $\lambda_2$ is NA2, the optical system satisfies NA1>NA2>0.5 NA1.

Further, the optical system in Item 20 is characterized in that the parallel light flux for the light having at least 1 wavelength of at least 2 wavelengths which are different from each other, is entered into the objective lens, and non-parallel light flux for the light having another wavelength, is entered into the objective lens.

According to Item 20, because the parallel light flux for the light having at least 1 wavelength of at least 2 wavelengths which are different from each other, is entered into the objective lens, and non-parallel light flux for the light having at least one other wavelength, is entered into the objective lens, thereby, to the variation of about 10 nm of the wavelengths of respective light having at least 2 wavelengths, the variation of spherical aberration can be suppressed to a very small amount.

Further, the optical system in Item 21 is characterized in that the parallel light flux for the light having at least 2 wavelength of at least 2 wavelengths which are different from each other, is entered into the objective lens.

Further, the optical system in Item 22 is characterized in that non-parallel light flux for the light having at least 2 wavelengths, of at least 2 wavelength which are different from each other, is entered into the objective lens.

Further, the optical system in Item 23 is characterized in that, when the longer wavelength of any 2 wavelengths of at least 2 wavelengths which are different from each other is defined as $\lambda_3$, and the predetermined numerical aperture on the image side of the objective lens for the light having the wavelength $\lambda_3$, is defined as NA, the axial chromatic aberration between the wavelength $\lambda_3$ and the shorter wavelength is not less than $-\lambda_3/(2NA^2)$ and not more than $+\lambda_3/(2NA^2)$ According to Item 23, when the wavelength is switched, because the focus is hardly changed, the focus servo is not necessary, and the movement range by the focus servo can be narrowed.

Further, the optical system in Item 24 is characterized in that the light having at least 2 wavelengths which are different from each other, are respectively used for the information recording media whose transparent substrate thickness are different from each other.

Further, the optical system in Item 25 is characterized in that at least 2 wavelengths which are different from each other, are 3 wavelengths which are different from each other.

Further, the optical system in Item 26 is characterized in that, when 3 wavelengths which are different from each other, are defined respectively as $\lambda 1$, $\lambda 2$, and 3 ($\lambda 1<\lambda 2<\lambda 3$), and the predetermined numerical apertures on the image side of the objective lens for each of 3 wavelengths which are different from each other are respectively defined as NA1, NA2, and NA3, the following expressions are satisfied:

$$0.60 \leq NA1, 0.60 \leq NA2, 0.40 \leq NA3 \leq 0.50$$

Further, the optical system in Item 27 is characterized in that a filter which can shield at least one portion of the light entered into the objective lens at the outside of the smallest predetermined numerical aperture of the predetermined numerical aperture, is provided.

Further, the optical systems in Item 28 and Item 29 are characterized in that the optical element having the diffraction surface is an objective lens.

Further, the optical system in Item 30 is characterized in that the objective lens comprises a piece of lens.

Further, the optical system in Item 31 is characterized in that the diffraction surface is provided on both surfaces of the objective lens.

Further, the optical system in Item 32 is characterized in that Abbe's number vd of the material of the objective lens is not smaller than 50.

According to Item 32, when the axial chromatic aberration is corrected for the light source having 2 different wavelengths, the second ordered spectrum can be reduced.

Further, the optical system in Item 33 is characterized in that the objective lens is made of plastics. According to Item 33, the optical system which is a low cost and light in the weight, can be obtained. Further, the optical system in Item 34 is characterized in that the objective lens is made of glass. According to Item 33 and Item 34, the optical system which is very strong in the temperature change, can be obtained.

Further, the optical system in Item 35 is characterized in that the objective lens has a resin layer in which the diffraction surface is formed, on the surface of the glass lens. According to Item 35, because the resin layer in which the diffraction structure can be easily formed, is provided on the glass lens, thereby, the optical system which is very strong for the temperature change and advantageous in the cost, can be obtained.

Further, the optical system in Item 36 is characterized in that the difference of wavelength between at least 2 wavelengths which are different from each other, is not less than 80 nm.

Further, the optical system in Item 37 is characterized in that the difference of wavelength between at least 2 wavelengths which are different from each other, is not more than 400 nm.

Further, the optical system in Item 38 is characterized in that the difference of wavelength between at least 2 wavelengths which are different from each other, is not less than 100 nm and not more than 200 nm.

Further, the optical system in Item 39 is characterized in that, to each of the light having at least 2 wavelengths which are different from each other, the diffraction efficiency of the specific ordereded diffracted ray which is selectively generated, is higher by more than 10% than the diffraction efficiency of respective diffracted ray with the ordered except the specific ordered.

Further, the optical system in Item 40 is characterized in that, to each of the light having at least 2 wavelengths which are different from each other, the diffraction efficiency of the specific ordereded diffracted ray which is selectively generated respectively, is higher by more than 30% than the diffraction efficiency of respective diffracted ray with the ordered except the specific ordered.

Further, the optical system in Item 41 is characterized in that, to each of the light having at least 2 wavelengths which are different from each other, the diffraction efficiency of the specific ordereded diffracted ray which is selectively generated respectively, is more than 50%.

Further, the optical system in Item 42 is characterized in that, to each of the light having at least 2 wavelengths which are different from each other, the diffraction efficiency of the specific ordereded diffracted ray which is selectively generated respectively, is more than 70%.

Further, the optical system in Item 43 is characterized in that, when the specific ordereded diffracted ray which is selectively generated, which has at least 2 wavelengths which are different from each other, focuses, because the diffracted surface is provided, the spherical aberration is improved as compared to the case of no diffraction surface.

Further, the optical system in Item 44 is characterized in that, to each of the light (wavelength $\lambda$) having at least 2 wavelengths which are different from each other, the wave front aberration on the image formation surface of the specific ordereded diffracted ray which is selectively generated respectively, is not more than 0.07 $\lambda$rms.

Further, the item 45 is a optical pickup apparatus characterized in that it has above-described each optical system.

Further, the optical pickup apparatus in Item 46 which comprises: at least 2 light sources which output the light having the wavelengths which are different from each other; an optical system including more than 1 optical element by which the light from the light source is converged onto the information recording medium; and a light detector to detect the transmitted light from the information recording medium or the reflected light from the information recording medium, wherein at least one optical element of the optical elements has the diffraction surface which selectively generates the same ordereded diffracted ray as the light having 2 different wavelengths outputted from at least 2 light sources.

Further, the optical pickup apparatus in item 47 which comprises: at least 2 light sources which output the light having the wavelengths which are different from each other; an optical system including more than 1 optical element by which the light from the light source is converged onto the information recording medium; and a light detector to detect the transmitted light from the information recording medium or the reflected light from the information recording medium, wherein the diffraction surface which selectively generates respectively specific ordereded diffracted ray to respective light having 2 different wavelengths outputted from at least 2 light sources, is formed on the almost entire surface of at least one optical surface of at least one optical element of the optical elements.

Further, the optical pickup apparatus in Item 48 is characterized in that at least one optical element of the optical elements having the diffraction surface described in Item 46 or Item 47 is a lens having the diffraction power.

Further, the optical pickup apparatus in Item 49 is characterized in that the lens makes the diffraction efficiency of the diffracted ray to the light having a certain wavelength between the maximum wavelength or the minimum wavelength of 2 different wavelengths outputted from at least 2 light sources, larger than the diffraction efficiency of the diffracted ray to the light having the maximum wavelength and the minimum wavelength.

Further, the optical pickup apparatus in Item 50 is characterized in that the lens makes the diffraction efficiency of the diffracted ray to the light having the maximum wavelength or the minimum wavelength of 2 different wavelengths outputted from at least 2 light sources, larger than the diffraction efficiency of the diffracted ray to the light having a wavelength between the maximum wavelength and the minimum wavelength of at least 2 different wavelengths which are different from each other.

Further, the optical pickup apparatus in Item 51 is characterized in that the lens has a flange portion on its outer periphery. Further, the optical pickup apparatus in Item 52 is characterized in that the flange portion has a surface extending in almost vertical direction to the optical axis of the lens. By this flange portion, the lens can be easily attached to the optical pickup apparatus, and when a surface extending in almost vertical direction to the optical axis is provided, the more accurate attachment can be easily carried out.

Further, the optical pickup apparatus in Item 53 is characterized in that the objective lens is included in at least more than 1 optical element, and the wave front aberration on the image formation surface to each of the light (wavelength $\lambda$) having 2 different wavelengths outputted from at least 2 light sources, is not more than 0.07 $\lambda$rms in the predetermined numerical aperture on the image side of the objective lens.

Further, the optical pickup apparatus in Item 54 is characterized in that the objective lens is included in at least more than 1 optical element, and the wave front aberration on the image formation surface to each of the light (wavelength $\lambda$) having 2 different wavelengths outputted from at least 2 light sources, is not more than 0.07 $\lambda$rms in the maximum numerical aperture on the image side of the objective lens.

Further, the optical pickup apparatus in Item 55 is characterized in that, even when one wavelength $\lambda_1$ of 2 different wavelengths outputted from at least 2 light sources, varies within the range of ±10 nm, the wave front aberration on the image formation surface is not more than 0.07 $\lambda_1$rms in the predetermined numerical aperture on the image side of the objective lens.

Further, the optical pickup apparatus in Item 56 is characterized in that, to the light having the wavelength $\lambda_2$ of 2 different wavelengths outputted from at least 2 light sources, and the light having another wavelength in which the predetermined numerical aperture on the image side of the objective lens is larger than the predetermined numerical aperture of the light having the wavelength $\lambda_2$, the wave front aberration on the image formation surface of the light having the wavelength $\lambda_2$ is not less than 0.07 $\lambda_2$rms in the predetermined numerical aperture of the light having another wavelength.

Further, the image pick-up apparatus in Item 57 is characterized in that the wave front aberration on the image formation surface of the light having the wavelength $\lambda_2$ is not less than 0.10 $\lambda_2$rms in the predetermined numerical aperture of the light having another wavelength.

Further, the image pick-up apparatus in Item 58 is characterized in that, when the predetermined numerical aperture of the light having another wavelength is defined as NA1, and the predetermined numerical aperture of the light having the wavelength $\lambda_2$ is defined as NA2, the following expression is satisfied:

$$NA1 > NA2 > 0.5 \times NA1.$$

Further, the image pick-up apparatus in Item 59 is characterized in that the parallel light flux for the light having at least 1 wavelength in 2 different wavelengths outputted from at least 2 light sources, is entered into the objective lens, and the non-parallel light flux for the light having at least another wavelength is entered into the objective lens.

Further, the image pick-up apparatus in Item 60 is characterized in that the parallel light flux for the light having 2 different wavelengths outputted from at least 2 light sources, is entered into the objective lens.

Further, the image pick-up apparatus in Item 61 is characterized in that the non-parallel light flux for the light having 2 different wavelengths outputted from at least 2 light sources, is entered into the objective lens.

Further, the image pick-up apparatus in Item 62 is characterized in that, when the longer wavelength in 2 different wavelengths outputted from at least 2 light sources is defined as $\lambda_3$, and the predetermined numerical aperture on the image side of the objective lens for the light having the wavelength $\lambda_3$ is defined as NA, the axial chromatic aberration between the wavelength $\lambda_3$ and the shorter wavelength is not less than $-\lambda_3/(2NA^2)$ and not more than $+\lambda_3/(2NA^2)$.

Further, the image pick-up apparatus in Item 63 is characterized in that the light having 2 different wavelengths outputted from at least 2 light sources are respectively used for the information recording media in which the thickness of the transparent substrates are different.

Further, the image pick-up apparatus in Item 64 is characterized in that the diffraction surface is formed of a plurality of annular bands viewed from the optical axis direction, and the plurality of annular bands are formed almost concentric circular around the optical axis or a point in the vicinity of the optical axis, and between the pitch Pf of the annular band corresponding to the maximum numerical aperture on the image side of the objective lens and the pitch Ph of the annular band corresponding to ½ numerical aperture in the maximum numerical aperture, the following relationship is established:

$$0.4 \leq (Ph/Pf)-2| \leq 25.$$

According to Item 64, in the case of more than the lower limit of the above relationship, the action of the diffraction to correct the higher ordered spherical aberration is not weakened, and accordingly, the difference of the spherical aberration between 2 wavelengths generated by the difference of the thickness of the transparent substrate can be corrected by the action of the diffraction. Further, in the case of less than the upper limit, a portion in which the pitch of the diffraction annular band is too small, is hardly generated, thereby, a lens which is the diffraction efficiency is high, can be produced. Further, the above-described relational expression is preferably, $0.8 \leq |(Ph/Pf)-2| \leq 6.0$, and more preferably, $1.2 \leq |(Ph/Pf)-2| \leq 2.0$.

Further, the optical pickup apparatus in Item 65 is characterized in that at least 2 light sources are 3 light sources.

Further, the optical pickup apparatus in Item 66 is characterized in that, when the light having 3 different wavelengths outputted from the 3 light sources are respectively defined as $\lambda 1$, $\lambda 2$, and $\lambda 3$ ($\lambda 1 < \lambda 2 < \lambda 3$), and the predetermined numerical apertures on the image side of the objective lens for each of these 3 different wavelengths are defined as NA1, NA2, and NA3, the following relationships are satisfied:

$$0.60 \leq NA1, \ 0.60 \leq NA2, \ 0.40 \leq NA3 \leq 0.5.$$

Further, the optical pickup apparatus in Item 67 is characterized in that a filter by which at least one portion of the light entered into the objective lens at the outside of the smallest numerical aperture in the predetermined numerical apertures can be shielded, is provided.

Further, the optical pickup apparatus in Item 68 is characterized in that an aperture limitation means is provided so that the predetermined numerical aperture can be obtained for each of the light having the 2 different wavelengths.

Further, the optical pickup apparatus in Item 69 is characterized in that there is no aperture limitation by which the predetermined numerical aperture can be obtained for one of the light having the 2 different wavelengths. For example, concretely, the maximum numerical aperture has the aperture limitation, and the aperture limitation is not provided for the smaller predetermined numerical aperture. Thereby, the aperture limitation means such as a filter having the wavelength selectivity is made not necessary, therefore, the cost can be lower, and the size can be reduced.

Further, the optical pickup apparatus in Item 70 is characterized in that the objective lens is included in the more than 1 optical elements, and the objective lens is used in common when the light having the wavelengths which are different from each other, are respectively converged onto the information recording medium.

Further, the optical pickup apparatus in Item 71 is characterized in that a unit into which the at least 2 light sources and the object are integrated, is driven at least parallelly to the main surface of the information recording medium.

Further, the optical pickup apparatus in Item 72 is characterized in that the unit is vertically driven to the main surface of the information recording medium.

Further, Item 73 is a recording and reproducing apparatus which is characterized in that the optical pickup apparatus is mounted, and at least either one of an audio or an image can be recorded or played back.

Further, a lens in Item 74 is characterized in that, in the lens which is used for at least either one of the recording or reproducing of the information for the information recording medium, and has the refraction power, and the diffraction surface on at least one of the optical surfaces, the positive and the negative signs of the diffraction power added from the diffraction surface are switched at least one time in the direction separating from the optical axis vertically to the optical axis.

Further, the lens in Item 75 is characterized in that, in the lens in Item 74, the diffraction surface has a plurality of blazed diffraction annular bands, and its stepped portion is positioned at a separated side from the optical axis in the diffraction annular band on the near side to the optical axis, and in the diffraction annular band on the separated side from the optical axis, its stepped portion is positioned on a near side to the optical axis. Further, the lens in Item 76 is characterized in that the diffraction surface has a plurality of blazed diffraction annular bands, and its stepped portion is positioned on a near side to the optical axis in the diffraction annular band on the near side to the optical axis, and in the diffraction annular band on the separated side from the optical axis, its stepped portion is positioned on a separated side from the optical axis.

Further, the Item 77 is an optical element which can be applied to the optical system for recording and/or reproducing of the information into or from the information recording medium, the optical element is characterized in that, when it is used in the optical system for recording and/or reproducing of the information into or from the information recording medium, in which the light having at least 2 wavelengths which are different from each other are used, it has the diffraction surface to selectively generate the same ordereded diffracted ray to the light having at least 2 wavelengths which are different from each other.

Further, Item 78 is a lens which can be applied as an objective lens in the optical system for recording and/or reproducing of the information into or from the information recording medium, the lens is characterize in that, when it is used as the objective lens in the optical system for recording and/or reproducing of the information into or from the information recording medium, in which the light having at least 2 wavelengths which are different from each other are used, it has the diffraction surface to selectively generate the diffraction efficiency of the same ordereded diffracted ray to the light having at least 2 wavelengths which are different from each other.

Further, Item 79 is an optical element which can be applied in the optical system for recording and/or reproducing of the information into or from the information recording medium, the optical element is characterized in that, when it is used in the optical system for recording and/or reproducing of the information into or from the information recording medium, in which the light having at least 2 wavelengths which are different from each other are used, the diffraction surface to selectively generate the specific ordereded diffracted ray to the light having at least 2 wavelengths which are different from each other, is formed on almost entire surface of at least one optical surface.

Further, Item 80 is a lens which can be applied as an objective lens in the optical system for recording and/or reproducing of the information into or from the information recording medium, the lens is characterize in that, when it is used as the objective lens in the optical system for recording and/or reproducing of the information into or from the information recording medium, in which the light having at least 2 wavelengths which are different from each other are used, the diffraction surface to selectively generate the specific ordereded diffracted ray to the light having at least 2 wavelengths which are different from each other, is formed on almost entire surface of at least one optical surface.

Further, a diffraction optical system for the optical disk in Item 81 is characterized in that, in the recording and reproducing optical system which has 2 light source having different wavelengths and records and plays back by the same optical system, the optical system includes the optical surface on which the diffraction annular band lens is provided on the refraction surface, and the aberration generated by the difference of the wavelength on the refraction surface and the aberration generated by the diffraction annular band lens are cancelled, and the diffracted ray used for the canceling is the same ordereded diffracted ray to the wavelengths of 2 light source.

As described above, this diffraction optical system is characterized in that it includes the optical surface on which the diffraction annular band lens is provided on the refraction surface, and to each of the light sources having 2 different wavelengths, a certain 1 same ordereded diffracted ray and the spherical aberration by the diffraction surface are cancelled, thereby, these are corrected to no aberration, which is almost equal to the diffraction limit. The same ordereded diffracted ray is preferably first ordered diffracted ray.

A method to make the same ordereded diffracted ray to correspond to each wavelength of 2 light sources as the present invention, has an advantage in which totally the loss of the light amount is smaller, as compared to the case in which the diffracted ray of the different ordered is made to correspond to. For example, in the case where 2 wavelengths of 780 nm and 635 nm are used, when the first ordered diffracted ray is used for the light of both wavelengths, totally the loss of the light amount is smaller than the case in which the first ordered diffracted ray is used for one wavelength, and the zero ordered diffracted ray is used for the other wavelength. Further, in the case where the same ordered diffracted ray is used for the light of both wavelength, when the first ordered diffracted ray is used, the loss of the light amount is smaller than the case where high ordereded diffracted ray is used.

Further, a diffraction optical system for an optical disk in Item 82 is characterized in that the canceled aberration is the spherical aberration and/or the chromatic aberration.

Further, a diffraction optical system for an optical disk in Item 83 is characterized in that the diffracted ray of the same ordered is the first ordered diffracted ray.

Further, a diffraction optical system for an optical disk in Item 84 is characterized in that the light sources of 2 different wavelengths correspond to the optical disks whose transparent substrate thickness are respectively different.

Further, a diffraction optical system for an optical disk in Item 85 is characterized in that the wavelength of the light source of the shorter wavelength in 2 wavelengths which are different from each other is not larger than 700 nm.

Further, a diffraction optical system for an optical disk in Item 86 is characterized in that the wavelength of the light source of the longer wavelength in 2 wavelengths which are different from each other is not shorter than 600 nm.

Further, a diffraction optical system for an optical disk in Item 87 is characterized in that, in the diffraction annular band lens, the phase function expressing the position of the annular band includes factors of terms except second power of power series.

Further, a diffraction optical system for an optical disk in Item 88 is characterized in that the optical refraction surface is aspherical.

Further, a diffraction optical system for an optical disk in Item 89 is characterized in that, to the light sources of 2 different wavelengths which are different from each other, the diffraction efficiency of the diffracted ray is maximum at the almost intermediate wavelength thereof.

Further, a diffraction optical system for an optical disk in Item 90 is characterized in that, to the light sources of 2 different wavelengths which are different from each other, the diffraction efficiency of the diffracted ray is maximum at one of wavelengths of the light sources.

Further, a diffraction optical system for an optical disk in Item 91 is characterized in that, in the diffraction annular band lens on the optical surface, the spherical aberration is corrected to an under value, and in the aspherical surface of the optical surface, the spherical aberration is corrected to an over value.

Further, in a diffraction optical system for an optical disk in Item 91,when the objective lens is used for the parallel light incidence for both of, for example, CD system (for example, the wavelength is 780 nm, the substrate thickness is 1.2 mm) and DVD system (for example, the wavelength is 650 nm, the substrate thickness is 0.6 mm), in the CD system, because the thickness of the substrate is thick, the spherical aberration has an over value compared to that of DVD system, however, because this spherical aberration is corrected by the difference of the wavelength of the diffraction lens, the spherical aberration of the diffraction lens is made under. Incidentally, in this case, in the long wavelength of the CD system, the spherical aberration of the diffraction lens becomes largely under, therefore, the influence due to the thickness of the substrate is corrected. In the aspherical surface, the influence of the difference of the substrate thickness is not corrected, and in both of the CD system and DVD system, the spherical aberration is overly corrected to almost the same degree. In the above description, it is utilized that, when high ordered terms of the diffraction are used, the wave motion of the spherical aberration can be largely controlled.

Further, in a diffraction optical system for an optical disk in Item 92, its difference of the wavelength is not less than 80 nm in the light sources having 2 different wavelengths.

Further, a diffraction optical system for an optical disk in Item 93 is characterized in that, in the objective lens optical system of the optical disk, when the diffraction annular band lens is provided on the optical surface, the axial chromatic aberration of a certain one of the same ordereded diffracted ray is corrected to each of the light sources having 2 different wavelengths.

Further, a diffraction optical system for an optical disk in Item 94 is characterized in that the difference of the wavelengths of the light sources having 2 different wavelengths is not less than 80 nm, and the diffraction optical system has a single objective lens which satisfies the following relationship: vd>50, where, vd is Abbe's number of the glass material of the objective lens.

Further, a diffraction optical system for an optical disk in Item 95 is characterized in that, in the lens performance to 2 different wavelengths, either one is no-aberration up to the aperture in the practical use, and in its outside portion, the aberration is made a flare.

Further, a diffraction optical system for an optical disk in Item 96 is characterized in that, in the lens performance to 2 different wavelengths, when the numerical number to the wavelength which is no-aberration in the open aperture, is defined as NA1, and the numerical aperture of the other wavelength in the practical use is defined as NA2, the following relationship is satisfied:

$$NA1 > NA2 > 0.5 \times NA1.$$

Further, a diffraction optical system for an optical disk in Item 97 is characterized in that the thickness of the optical disk to the 2 different wavelengths is different.

Further, a optical pickup apparatus in Item 98 is a optical pickup apparatus used for the recording and reproducing optical system which has at least more than 2 light sources having the different wavelengths, and in which the divergent light flux from each of light sources is used for recording the information onto and/or reproducing the information on the information recording surface of the optical information recording medium by the same one objective lens through the transparent substrate, the optical pickup apparatus in Item 98 is characterized in that the objective lens includes the optical surface in which the ring band-like diffraction surface is provided on the refraction surface, and to at least 1 light source, the light flux transmitted through the objective lens and the transparent substrate has the diffraction limit performance at the best image point.

Herein, the diffraction limit performance means that the wave front aberration is measured, and the root mean square value (rms value) of the wave front aberration of the entire light flux is not more than 0.07 times of the wavelength which is Mareshal's allowance. Further, the aperture in the practical use means the numerical aperture which is regulated by respective standards of the optical information recording medium, and corresponds to the numerical aperture of the objective lens of the diffraction limit performance by which the spot diameter necessary for recording or reproducing of the information to respective optical information recording media, can be obtained.

As described above, because the numerical aperture in the practical use is regulated to the optical information recording medium, the numerical aperture on the optical information recording medium side of the actual light flux passing through the optical system of the pick-up apparatus may be larger than the numerical aperture in the practical use.

Further, in the present invention, it may be preferable that the maximum numerical aperture preferably means the maximum one in the numerical aperture in the practical use. That is, in the case of the pick-up apparatus interchangeably used for a plurality of optical information recording media, a plurality of numerical apertures in the practical use are defined, and it may be preferable that the maximum one in these numerical apertures is defined as the maximum numerical aperture. Further, a predetermined numerical aperture and necessary numerical aperture are the same meaning as the numerical aperture in the practical use.

Incidentally, in the case where the information is recorded onto or played back from the optical information recording medium, when the light source having the different wavelength from that of the light source regulated by the standard is used in the actual optical pickup apparatus, the actually used numerical aperture is set so that the ratio of the regulated wavelength and the regulated numerical aperture, and the ratio of the actually used wavelength and the actually used numerical aperture, becomes constant. As an example, in the CD, when the light source with 780 nm wavelength in the standard is used, the numerical aperture is 0.45, however, when the light source with 650 nm wavelength is used, the numerical aperture is 0.38.

Further, a optical pickup apparatus in Item 99 is a optical pickup apparatus used for the recording and reproducing optical system which has at least more than 2 light sources having the different wavelengths, and in which the divergent light flux from each of light sources is used for recording the information onto and/or reproducing the information on the information recording surface of the optical information recording medium by the same one objective lens through the transparent substrate, the optical pickup apparatus in Item 99 is characterized in that the objective lens includes the optical surface in which the ring band-like diffraction surface is pro vied on the refraction surface, and to at least 1 light source, the light flux transmitted through the objective lens and the transparent substrate has the diffraction limit performance at the best image point, and to at least 1 light source, in the light flux transmitted through the objective lens and the transparent substrate, the light flux up to the aperture in the practical use has the diffraction limit performance at the best image point, and the ring band-like diffraction surface is provided so that the outside portion thereof becomes the flare.

Further, the optical pickup apparatus in Item 100 is characterized in that the above-described apparatus has at least 3 light sources having different wavelengths.

Further, the optical pickup apparatus in Item 101 is characterized in that the above-described apparatus includes the optical surface on which at least more than 2 ring band-like diffraction surfaces are provided.

Further, the optical pickup apparatus in Item 102 is characterized in that the above-described apparatus includes a ring band-like filter to shield a portion of the light flux outside of the actually used aperture in the light flux entering into the objective lens.

Further, the optical pickup apparatus in Item 103 is characterized in that, in the above-described apparatus, the unit including the light source and the objective lens, is driven parallely at least to the optical information recording medium.

Further, the optical pickup apparatus in Item 104 is characterized in that, in the above-described apparatus, the unit including the light source and the objective lens, is further driven vertically to the optical information recording medium.

Further, the invention according to Item 105 is an audio and/or image recording, and/or an audio and/or image reproducing apparatus characterized in that the above-described optical pickup apparatus is mounted.

Further, an objective lens in Item 106 is an objective lens used for the recording and reproducing optical system which has at least more than 2 light sources having the different wavelengths, and in which the divergent light flux from each of light sources is used for recording the information onto and/or reproducing the information on the information recording surface of the optical information recording medium by the same one objective lens through the transparent substrate, the objective lens is characterized in that it includes the optical surface in which the ring band-like diffraction surface is provided on the refraction surface, and to at least 1 light source, the light flux transmitted through the objective lens and the transparent substrate has the diffraction limit performance at the best image point.

Further, an objective lens in Item 107 is an objective lens used for the recording and reproducing optical system which has at least more than 2 light sources having the different wavelengths, and in which the divergent light flux from each of light sources is used for recording the information onto and/or reproducing the information on the information recording surface of the optical information recording medium by the same one objective lens through the transparent substrate, the objective lens is characterized in that it includes the optical surface in which the ring band-like diffraction surface is provided on the refraction surface, and to at least 1 light source, the light flux transmitted through the objective lens and the transparent substrate has the diffraction limit performance at the best image point, and to at least 1 light source, in the light flux transmitted through the objective lens and the transparent substrate, the light flux up to the aperture in the practical use has the diffraction limit performance at the best image point, and the ring band-like diffraction surface is provided so that the outside portion thereof becomes the flare.

Further, the optical pickup apparatus in Item 108 in which the light flux emitted from the light source is converged onto the information recording surface by the light converging optical system including the objective lens through the transparent substrate of the optical information recording medium, and which has the first light source having the wavelength λ1 to record/reproducing the first optical information recording medium, the second light source having the wavelength λ2 to record/reproducing the second optical information recording medium, and the third light source having the wavelength λ3 to record/reproducing the third optical information recording medium, whose wavelengths are different from each other, and records and plays back the optical information recording medium, the optical pickup apparatus is characterized in that, on at least one surface of the objective lens, the diffraction surface by which the spherical aberration is corrected to almost the same degree as the diffraction limit or smaller than it by a certain same ordereded diffracted ray to each of optical information recording media, is formed.

Further, the optical pickup apparatus in Item 109 in which the light flux emitted from the light source is converged onto the information recording surface by the light converging optical system including the objective lens through the transparent substrate of the optical information recording medium, and which has the first light source having the wavelength λ1 to record/reproducing the first optical information recording medium, the second light source having the wavelength λ2 to record/reproducing the second optical information recording medium, and the third light source having the wavelength λ3 to record/reproducing the third optical information recording medium, whose wavelengths are different from each other, and records and plays back the optical information recording medium, the optical pickup apparatus is characterized in that, on at least one surface of the objective lens, a certain same ordereded diffracted ray is used for each of optical information recording media, and for at least one optical information recording medium, the aberration up to the aperture in the practical use is made to almost the same degree as the diffraction limit or smaller than it, and the aberration in a portion outside the aperture is made to the flare.

In the optical pickup apparatus in Item 109 to record and/or reproduce the optical information recording medium, the objective lens formed the diffraction surface uses a certain same ordereded diffracted ray for each of optical information recording media, and for at least one optical information recording medium, the aberration up to the aperture in the practical use is made to almost the same degree as the diffraction limit or smaller than it, and the aberration in a portion outside the aperture is made to the flare.

Further, as will be described in following Items, it is preferable that the diffraction surface is formed on both surfaces of the objective lens, and the diffracted ray is the first ordered diffracted ray. The following is characterized: the diffraction surface is formed to ring band-like around the optical axis of the objective lens, and the phase function to express the position of the annular band includes factors of terms except 2 power term in the power series, however, the phase function may include the 2 power term in the power series, or may not include it. Further, it is preferable that, in the diffraction surface, the diffraction efficiency of the diffracted ray is maximum in the wavelength of both ends or of intermediate area, to each of the first light source, the second light source, and the third light source. Further, the objective lens has at least one surface which is aspherical, and the spherical aberration is corrected to under on the diffraction surface, and the spherical aberration is corrected to over on the aspherical surface, thereby, the above-described function can be provided.

Further, the optical pickup apparatus in Item 110 is characterized in that the diffraction surface is formed on both sides of the objective lens.

Further, the optical pickup apparatus in Item 111 is characterized in that the same ordereded diffracted ray is the first ordered diffracted ray.

Further, the optical pickup apparatus in Item 112 is characterized in that the diffraction surface is formed to ring band-like around the optical axis of the objective lens, and the phase function to express the position of the annular band includes the factors of terms except the second power term in the power series.

Further, the optical pickup apparatus in Item 113 is characterized in that the diffraction surface is formed to ring band-like around the optical axis of the objective lens, and the phase function to express the position of the annular band includes the factor of the second power term in the power series.

Further, the optical pickup apparatus in Item 114 is characterized in that the diffraction surface is formed to ring band-like around the optical axis of the objective lens, and the phase function to express the position of the annular band does not include the factor of the second power term in the power series.

Further, the optical pickup apparatus in Item 115 is characterized in that the diffraction efficiency of the diffracted ray is maximum in the wavelength of both ends or of intermediate area, to each of the first light source, the second light source, and the third light source.

Further, the optical pickup apparatus in Item 116 is characterized in that at least one surface of the objective lens is aspherical, and the spherical aberration is corrected to under on the diffraction surface, and the spherical aberration is corrected to over on the aspherical surface.

Further, the invention in Item 117 is an audio and/or image writing, and/or an audio and/or image reproducing apparatus, which is characterized in that the optical pickup apparatus described in any of Items 108-116 having the first light source, the second light source and the third light source, is mounted.

Further, an objective lens in Item 118 used for the optical pickup apparatus in which the light flux emitted from the light source is converged onto the information recording surface by the light converging optical system through the transparent substrate of the optical information recording medium, and which has the first light source having the wavelength $\lambda 1$ to record/reproducing the first optical information recording medium, the second light source having the wavelength $\lambda 2$ to record/reproducing the second optical information recording medium, and the third light source having the wavelength $\lambda 3$ to record/reproducing the third optical information recording medium, whose wavelengths are different from each other, and records and plays back the optical information recording medium, the objective lens is characterized in that, on at least one surface of the objective lens, the diffraction surface is formed, in which the spherical aberration is corrected by a certain same ordereded diffracted ray for each of optical information recording media, to almost the same degree as the diffraction limit or smaller than it.

Further, an objective lens in Item 119 used for the optical pickup apparatus in which the light flux emitted from the light source is converged onto the information recording surface by the light converging optical system through the transparent substrate of the optical information recording medium, and which has the first light source having the wavelength $\lambda 1$ to record/reproducing the first optical information recording medium, the second light source having the wavelength $\lambda 2$ to record/reproducing the second optical information recording medium, and the third light source having the wavelength $\lambda 3$ to record/reproducing the third optical information recording medium, whose wavelengths are different from each other, and records and plays back the optical information recording medium, the objective lens is characterized in that, on at least one surface of the objective lens, a certain same ordereded diffracted ray is used for each of optical information recording media, and to at least one optical information recording medium, the spherical aberration is corrected up to the aperture in the practical use to almost the same degree as the diffraction limit or smaller than it, and to the portion outside it, the aberration is made to the flare.

Further, the optical pickup apparatus in Item 120 in which the light flux emitted from the light source is converged onto the information recording surface by the light converging optical system through the transparent substrate of the optical information recording medium, and which has the first light source having the wavelength $\lambda 1$ to record/reproducing the first optical information recording medium, the second light source having the wavelength $\lambda 2$ to record/reproducing the second optical information recording medium, and the third light source having the wavelength $\lambda 3$ to record/reproducing the third optical information recording medium, whose wavelengths are different from each other, and records and plays back the optical information recording medium, the optical pickup apparatus is characterized in that, on at least one surface of the light converging optical system, the diffraction surface is formed, in which the spherical aberration is corrected by a certain same ordereded diffracted ray for each of optical information recording media, to almost the same degree as the diffraction limit or smaller than it.

Further, the optical pickup apparatus in Item 121 in which the light flux emitted from the light source is converged onto the information recording surface by the light converging optical system through the transparent substrate of the optical information recording medium, and which has the first light source having the wavelength $\lambda 1$ to record/reproducing the first optical information recording medium, the second light source having the wavelength $\lambda 2$ to record/reproducing the second optical information recording medium, and the third light source having the wavelength $\lambda 3$ to record/reproducing the third optical information recording medium, whose wavelengths are different from each other, and records and plays back the optical information recording medium, the optical pickup apparatus is characterized in that, on at least one surface of the light converging optical system, the diffraction surface is provided, in which a certain same ordereded diffracted ray is used for each of optical information recording media, and for at least one optical information recording medium, the aberration is corrected to almost the same degree as the diffraction limit or smaller than it, up to the aperture in the practical use, and to the portion outside it, the aberration is made to the flare.

Further, the optical pickup apparatus in Item 122 has: the first light source with the wavelength $\lambda 1$, the second light source with the wavelength $\lambda 2$ ($\lambda 2 \neq \lambda 1$); the objective lens which has the diffraction pattern on at least one surface, and converges the light flux from each of the light sources onto the information recording surface of the optical information recording medium through the transparent substrate; and the light detector to receive the reflected light of the emitted light flux from the first light source and the second light source from the optical information recording medium, and when, at least, the m-ordered diffracted ray (m is an integer except 0) from the diffraction pattern of the objective lens of the light flux from the first light source is used, the first optical information recording medium, in which the thickness of the transparent substrate is t1, is recorded and/or played back, and when, at least, the n-th ordered diffracted ray (n=m) from the diffraction pattern of the objective lens of the light flux from the first light source is used, the second optical information recording medium, in which the thickness of the transparent substrate is t2 (t2 $\neq$t1), is recorded and/or played back.

Further, the optical pickup apparatus in Item 123 is a optical pickup apparatus used in the relationship in which the wavelengths $\lambda 1$ and $\lambda 2$ of the first and the second light sources are $\lambda 1 < \lambda 2$, and the thickness of the transparent substrate t1 and t2 are t1<t2, the optical pickup apparatus is characterized in that the m-ordered and n-th ordered diffracted ray are both +first ordered diffracted ray.

Further, the optical pickup apparatus in Item 124 is a optical pickup apparatus used in the relationship in which the wavelengths $\lambda 1$ and $\lambda 2$ of the first and the second light sources are $\lambda 1 < \lambda 2$, and the thickness of the transparent substrate t1 and t2 are t1>t2, the optical pickup apparatus is characterized in that the m-ordered and n-th ordered diffracted ray are both −first ordered diffracted ray.

Further, the optical pickup apparatus in Item 125 is characterized in that, in the apparatus in Item 122, when the necessary numerical aperture on the optical information recording medium side of the objective lens required for recording and/or reproducing the first optical information recording medium in which the thickness of the transparent substrate is t1, by the first light source with the wavelength λ1, is defined as NA1, and the necessary numerical aperture on the optical information recording medium side of the objective lens required for recording and/or reproducing the second optical information recording medium in which the thickness of the transparent substrate is t2 (t2>t1), by the second light source with the wavelength λ2 (λ2>λ1), is defined as NA2 (NA2<NA1), the diffraction pattern provided on at least one surface of the objective lens is the rotation symmetry to the optical axis, and +first ordered diffracted ray from the circumference most separated from the optical axis of the diffraction pattern of the objective lens of the light flux from the first light source is converted into the light flux whose numerical aperture on the optical information recording medium side is NAH1, and +first ordered diffracted ray from the circumference nearest to the optical axis side of the diffraction pattern of the objective lens of the light flux from the first light source is converted into the light flux whose numerical aperture on the optical information recording medium side is NAL1, and the following relationship is satisfied:

NAH1<NA1, 0≦NAL1≦NA2.

Further, the optical pickup apparatus in Item 126 is characterized in that, in the apparatus in Item 122, when the necessary numerical aperture on the optical information recording medium side of the objective lens required for recording and/or reproducing the first optical information recording medium in which the thickness of the transparent substrate is t1, by the first light source with the wavelength λ1, is defined as NA1, and the necessary numerical aperture on the optical information recording medium side of the objective lens required for recording and/or reproducing the second optical information recording medium in which the thickness of the transparent substrate is t2 (t2>t1), by the second light source with the wavelength λ2 (λ2>λ1), is defined as NA2 (NA2>NA1), the diffraction pattern provided on at least one surface of the objective lens is the rotation symmetry to the optical axis, and +first ordered diffracted ray from the circumference most separated from the optical axis of the diffraction pattern of the objective lens of the light flux from the first light source is converted into the light flux whose numerical aperture on the optical information recording medium side is NAH1, and +first ordered diffracted ray from the circumference nearest to the optical axis side of the diffraction pattern of the objective lens of the light flux from the first light source is converted into the light flux whose numerical aperture on the optical information recording medium side is NAL1, and the following relationship is satisfied:

NAH1<NA2, 0≦NAL1≦NA1.

Further, the optical pickup apparatus in Item 127 is characterized in that, in the apparatus in Item 122, when the necessary numerical aperture on the optical information recording medium side of the objective lens required for recording and/or reproducing the first optical information recording medium in which the thickness of the transparent substrate is t1, by the first light source with the wavelength λ1, is defined as NA1, and the necessary numerical aperture on the optical information recording medium side of the objective lens required for recording and/or reproducing the second optical information recording medium in which the thickness of the transparent substrate is t2 (t2<t1), by the second light source with the wavelength λ2 (λ2>λ1), is defined as NA2 (NA2<NA1), the diffraction pattern provided on at least one surface of the objective lens is the rotation symmetry to the optical axis, and −first ordered diffracted ray from the circumference most separated from the optical axis of the diffraction pattern of the objective lens of the light flux from the first light source is converted into the light flux whose numerical aperture on the optical information recording medium side is NAH1, and −first ordered diffracted ray from the circumference nearest to the optical axis side of the diffraction pattern of the objective lens of the light flux from the first light source is converted into the light flux whose numerical aperture on the optical information recording medium side is NAL1, and the following relationship is satisfied:

NAH1<NA1, 0≦NAL1≦NA2.

Further, the optical pickup apparatus in Item 128 is characterized in that, in the apparatus in Item 122, when the necessary numerical aperture on the optical information recording medium side of the objective lens required for recording and/or reproducing the first optical information recording medium in which the thickness of the transparent substrate is t1, by the first light source with the wavelength λ1, is defined as NA1, and the necessary numerical aperture on the optical information recording medium side of the objective lens required for recording and/or reproducing the second optical information recording medium in which the thickness of the transparent substrate is t2 (t2<t1), by the second light source with the wavelength λ2 (λ2>λ1), is defined as NA2 (NA2>NA1), the diffraction pattern provided on at least one surface of the objective lens is the rotation symmetry to the optical axis, and −first ordered diffracted ray from the circumference most separated from the optical axis of the diffraction pattern of the objective lens of the light flux from the first light source is converted into the light flux whose numerical aperture on the optical information recording medium side is NAH1, and −first ordered diffracted ray from the circumference nearest to the optical axis side of the diffraction pattern of the objective lens of the light flux from the first light source is converted into the light flux whose numerical aperture on the optical information recording medium side is NAL1, and the following relationship is satisfied:

NAH1<NA2, 0≦NAL1≦NA1.

Further, the optical pickup apparatus in Item 129 is characterized in that, in the apparatus in Item 125, in the light flux from the first light source, the light converging position of the light flux whose numerical aperture is not more than NA1 when the light flux passes through the objective lens and which does not pass through the diffraction pattern, is almost the same as the light converging position of the light flux which passes through the diffraction pattern.

Further, the optical pickup apparatus in Item 130 is characterized in that, in the apparatus in Item 126, in the light flux from the second light source, the light converging position of the light flux whose numerical aperture is not more than NA2 when the light flux passes through the objective lens and which does not passes through the diffraction pattern, is almost the same as the light converging position of the light flux which passes through the diffraction pattern.

Further, the optical pickup apparatus in Item 131 is characterized in that, in the apparatus in Item 127, in the light flux from the first light source, the light converging position of the light flux whose numerical aperture is not more than NA1 when the light flux passes through the objective lens and which does not pass through the diffraction pattern, is almost the same as the light converging position of the light flux which passes through the diffraction pattern.

Further, the optical pickup apparatus in Item 132 is characterized in that, in the apparatus in Item 128, in the light flux from the second light source, the light converging position of the light flux whose numerical aperture is not more than NA2 when the light flux passes through the objective lens and which does not passes through the diffraction pattern, is almost the same as the light converging position of the light flux which passes through the diffraction pattern.

Further, the optical pickup apparatus in Item 133 is characterized in that, in the apparatus in Item 129, +first ordered diffracted ray from the circumference most separated from the optical axis of the diffraction pattern of the objective lens of the light flux from the second light source is converted into the light flux whose numerical aperture on the optical information recording medium side is NAH2, and +first ordered diffracted ray from the circumference nearest to the optical axis of the diffraction pattern of the objective lens of the light flux from the second light source is converted into the light flux whose numerical aperture on the optical information recording medium side is NAL2, and the spherical aberration of the light flux which passes through the objective lens is set such that, in the light flux from the first light source, the light flux whose numerical aperture is not more than NA1 when the light flux passes through the objective lens is used and spots are converged on the information recording surface of the optical information recording medium so that recording and/or reproducing of the first optical information recording medium can be conducted, and in the light flux from the second light source, the light flux whose numerical aperture is not more than NAH2 when the light flux passes through the objective lens is used and spots are converged on the information recording surface of the optical information recording medium so that recording and/or reproducing of the second optical information recording medium can be conducted.

Further, the optical pickup apparatus in Item 134 is characterized in that, in the apparatus in Item 130, +first ordered diffracted ray from the circumference most separated from the optical axis of the diffraction pattern of the objective lens of the light flux from the second light source is converted into the light flux whose numerical aperture on the optical information recording medium side is NAH2, and +first ordered diffracted ray from the circumference nearest to the optical axis of the diffraction pattern of the objective lens of the light flux from the second light source is converted into the light flux whose numerical aperture on the optical information recording medium side is NAL2, and the spherical aberration of the light flux which passes through the objective lens is set such that, in the light flux from the first light source, the light flux whose numerical aperture is not more than NAH1 when the light flux passes through the objective lens is used and spots are converged on the information recording surface of the optical information recording medium so that recording and/or reproducing of the first optical information recording medium can be conducted, and in the light flux from the second light source, the light flux whose numerical aperture is not more than NA2 when the light flux passes through the objective lens is used and spots are converged on the information recording surface of the optical information recording medium so that recording and/or reproducing of the second optical information recording medium can be conducted.

Further, the optical pickup apparatus in Item 135 is characterized in that, in the apparatus in Item 131, −first ordered diffracted ray from the circumference most separated from the optical axis of the diffraction pattern of the objective lens of the light flux from the second light source is converted into the light flux whose numerical aperture on the optical information recording medium side is NAH2, and −first ordered diffracted ray from the circumference nearest to the optical axis of the diffraction pattern of the objective lens of the light flux from the second light source is converted into the light flux whose numerical aperture on the optical information recording medium side is NAL2, and the spherical aberration of the light flux which passes through the objective lens is set such that, in the light flux from the first light source, the light flux whose numerical aperture is not more than NA1 when the light flux passes through the objective lens, is used, and spots are converged on the information recording surface of the optical information recording medium so that recording and/or reproducing of the first optical information recording medium can be conducted, and in the light flux from the second light source, the light flux whose numerical aperture is not more than NAH2 when the light flux passes through the objective lens, is used, and spots are converged on the information recording surface of the optical information recording medium so that recording and/or reproducing of the second optical information recording medium can be conducted.

Further, the optical pickup apparatus in Item 136 is characterized in that, in the apparatus in Item 132, −first ordered diffracted ray from the circumference most separated from the optical axis of the diffraction pattern of the objective lens of the light flux from the second light source is converted into the light flux whose numerical aperture on the optical information recording medium side is NAH2, and −first ordered diffracted ray from the circumference nearest to the optical axis of the diffraction pattern of the objective lens of the light flux from the second light source is converted into the light flux whose numerical aperture on the optical information recording medium side is NAL2, and the spherical aberration of the light flux which passes through the objective lens is set such that, in the light flux from the first light source, the light flux whose numerical aperture is not more than NAH1 when the light flux passes through the objective lens is used and spots are converged on the information recording surface of the optical information recording medium so that recording and/or reproducing of the first optical information recording medium can be conducted, and in the light flux from the second light source, the light flux whose numerical aperture is not more than NA2 when the light flux passes through the objective lens is used and spots are converged on the information recording surface of the optical information recording medium so that recording and/or reproducing of the second optical information recording medium can be conducted.

Further, the optical pickup apparatus in Item 137 is characterized in that, in the apparatus in Item 133, in the light flux from the first light source, the wave front aberration of the light flux whose numerical aperture is not more than NA1 when the light flux passes through the objective lens, at the best image point through the transparent substrate of the first optical information recording medium is not more than 0.07 λrms, and in the light flux from the second light source, the wave front aberration of the light flux whose numerical aperture is not more than NAH2 when the light flux passes through the objective lens, at the best image point through the transparent substrate of the second optical information recording medium is not more than 0.07 λrms.

Further, the optical pickup apparatus in Item 138 is characterized in that, in the apparatus in Item 134, in the light flux from the first light source, the wave front aberration of the light flux whose numerical aperture is not more than NAH1 when the light flux passes through the objective lens, at the best image point through the transparent substrate of the first optical information recording medium is not more than 0.07 λrms, and in the light flux from the second light source, the wave front aberration of the light flux whose numerical aperture is not more than NA2 when the light flux passes through the objective lens, at the best image point through the transparent substrate of the second optical information recording medium is not more than 0.07 λrms.

Further, the optical pickup apparatus in Item 139 is characterized in that, in the apparatus in Item 135, in the light flux from the first light source, the wave front aberration of the light flux whose numerical aperture is not more than NA1 when the light flux passes through the objective lens, at the best image point through the transparent substrate of the first optical information recording medium is not more than 0.07 λrms, and in the light flux from the second light source, the wave front aberration of the light flux whose numerical aperture is not more than NAH2 when the light flux passes through the objective lens, at the best image point through the transparent substrate of the second optical information recording medium is not more than 0.07 λrms.

Further, the optical pickup apparatus in Item 140 is characterized in that, in the apparatus in Item 136, in the light flux from the first light source, the wave front aberration of the light flux whose numerical aperture is not more than NAH1 when the light flux passes through the objective lens, at the best image point through the transparent substrate of the first optical information recording medium is not more than 0.07 λrms, and in the light flux from the second light source, the wave front aberration of the light flux whose numerical aperture is not more than NA2 when the light flux passes through the objective lens, at the best image point through the transparent substrate of the second optical information recording medium is not more than 0.07 λrms.

Further, the optical pickup apparatus in Item 141 is characterized in that, in the apparatus in any one Item of Items 122-140, at least one collimator is included between the first light source and the objective lens, and between the second light source and the objective lens, and the light flux entering into the objective lens from the first light source and the light flux entering into the objective lens from the second light source are respectively parallel light.

Further, the optical pickup apparatus in Item 142 is characterized in that, in the apparatus in Item 141, the paraxial focus position of the objective lens for the light flux form the first light source and the paraxial focus position of the objective lens for the light flux from the second light source almost coincide with each other.

Further, the optical pickup apparatus in Item 143 is characterized in that, in the apparatus in Items 129, 133 and 137, the second diffraction pattern is provided outside the diffraction pattern, and the second diffraction pattern is set such that +first ordered diffracted ray of the second diffraction pattern to the light flux from the first light source is converged onto the light converging position, and the light flux from the second light source is not diffracted by the second diffraction pattern.

Further, the optical pickup apparatus in Item 144 is characterized in that, in the apparatus in Items 130, 134 and 138, the second diffraction pattern is provided outside the diffraction pattern, and the second diffraction pattern is set such that the light flux from the first light source becomes mainly +first ordered diffracted ray in the second diffraction pattern, and the light flux from the second light source is transmitted through the second diffraction pattern and is converged onto the light converging position.

Further, the optical pickup apparatus in Item 145 is characterized in that, in the apparatus in Items 131, 135 and 139, the second diffraction pattern is provided outside the diffraction pattern, and the second diffraction pattern is set such that −first ordered diffracted ray in the second diffraction pattern is converged onto the light converging position to the light flux from the first light source, and the light flux from the second light source is not diffracted by the second diffraction pattern.

Further, the optical pickup apparatus in Item 146 is characterized in that, in the apparatus in Items 132, 136 and 140, the second diffraction pattern is provided outside the diffraction pattern, and the second diffraction pattern is set such that the light flux from the first light source becomes mainly −first ordered diffracted ray in the second diffraction pattern, and the light flux from the second light source is transmitted through the second diffraction pattern and is converged onto the light converging position.

Further, the optical pickup apparatus in Item 147 is characterized in that, in the apparatus in Items 129, 133 and 137, the second diffraction pattern is provided outside the diffraction pattern, and the second diffraction pattern is set such that the transmitted light of the second diffraction pattern to the light flux from the first light source is converged onto the light converging position, and the light flux from the second light source becomes mainly −first ordered diffracted ray in the second diffraction pattern.

Further, the optical pickup apparatus in Item 148 is characterized in that, in the apparatus in Items 130, 134 and 138, the second diffraction pattern is provided outside the diffraction pattern, and the second diffraction pattern is set such that the light flux from the first light source passes through the second diffraction pattern, and the light flux from the second light source becomes mainly −first ordered diffracted ray in the second diffraction pattern, and is converged onto the light converging position.

Further, the optical pickup apparatus in Item 149 is characterized in that, in the apparatus in Items 131, 135 and 139, the second diffraction pattern is provided outside the diffraction pattern, and the second diffraction pattern is set such that the transmitted light of the second diffraction pattern to the light flux from the first light source is converged onto the light converging position, and the light flux from the second light source becomes mainly +first ordered diffracted ray in the second diffraction pattern.

Further, the optical pickup apparatus in Item 150 is characterized in that, in the apparatus in Items 132, 136 and 140, the second diffraction pattern is provided outside the diffraction pattern, and the second diffraction pattern is set such that the light flux from the first light source passes through the second diffraction pattern, and the light flux from the second light source becomes mainly +first ordered diffracted ray in the second diffraction pattern, and is converged onto the light converging position.

Further, the optical pickup apparatus in Item 151 is characterized in that, in the apparatus in Items 129, 131, 133, 135 137 or 139, the apparatus includes a light wave composing means by which the emitted light flux from the first light source and the emitted light flux from the second light source can be composed, and has the opening limiting means which transmits the light flux from the first light source, and in the light flux from the second light source, which does not transmit the flux which passes through the opposite side area to the optical axis of the diffraction pattern, between the light wave composing means and the optical information recording medium.

Further, the optical pickup apparatus in Item 151 is characterized in that, in the apparatus in Items 129, 131, 133, 135 137 or 139, the apparatus includes a light wave composing means by which the emitted light flux from the first light source and the emitted light flux from the second light source can be composed, and has the opening limiting means which transmits the light flux from the second light source, and in the light flux from the first light source, which does not transmit the flux which passes through the opposite side area to the optical axis of the diffraction pattern, between the light wave composing means and the optical information recording medium.

Further, the optical pickup apparatus in Item 153 is characterized in that, in the apparatus in Item 151, the opening limiting means is a annular band filter, which transmits the light flux from the first light source, and in the light flux of the second light source, which reflects or absorbs the flux which passes through the opposite side area to the optical axis of the diffraction pattern.

Further, the optical pickup apparatus in Item 154 is characterized in that, in the apparatus in Item 152, the opening limiting means is a annular band filter, which transmits the light flux from the second light source, and in the light flux of the first light source, which reflects or absorbs the flux which passes through the opposite side area to the optical axis of the diffraction pattern.

Further, the optical pickup apparatus in Item 155 is characterized in that, in the apparatus in Item 151, the opening limiting means is a annular band filter, which transmits the light flux from the first light source, and in the light flux of the second light source, which diffracts the flux which passes through the opposite side area to the optical axis of the diffraction pattern.

Further, the optical pickup apparatus in Item 156 is characterized in that, in the apparatus in Item 152, the opening limiting means is a annular band filter, which transmits the light flux from the second light source, and in the light flux of the first light source, which diffracts the flux which passes through the opposite side area to the optical axis of the diffraction pattern.

Further, the optical pickup apparatus in Item 157 is characterized in that, in the apparatus in any one Item of Items 122-156, the light detector is in common to the first light source and the second light source.

Further, the optical pickup apparatus in Item 158 is characterized in that, in the apparatus in any one Item of Items 122-156, the light detector is provided separately the first light detector for the first light source and the second light detector for the second light source, and these are spatially separated position respectively.

Further, the optical pickup apparatus in Item 159 is characterized in that, in the apparatus in Item 158, at last a pair of the first light source and the first light detector or the second light source and the second light detector, is formed into a unit.

Further, the optical pickup apparatus in Item 160 is characterized in that, in the apparatus in Item 157, the first light source, the second light source, and a common light detector (a single light detector) are formed into a unit.

Further, the optical pickup apparatus in Item 161 is characterized in that, in the apparatus in. Item 158, in the light detector, the first light detector of the first light source and the second light detector of the second light source are separately provided, and the first light source, the second light source, the first light detector and the second light source are formed into a unit.

Further, the optical pickup apparatus in Item 162 is characterized in that, in the apparatus in any one Item of Items 122-161, further the light detector to detect the transmitted light from the optical disk, is provided.

Further, the optical pickup apparatus in Item 163 which has: the first light source with the wavelength $\lambda 1$; the second light source with the wavelength $\lambda 2$ ($\lambda 1 \neq \lambda 2$); the wave composing means by which the emitted light flux from the first light source and the emitted light flux from the second light source can be composed; the diffraction optical element having the diffraction pattern on at least one surface; the objective lens by which the light flux from respective light sources are converged onto the information recording surface of the optical information recording medium through the transparent substrate; and the light detector which receives the reflected light of the emitted light flux from the first light source and the second light source, from the optical information recording medium, the optical pickup apparatus is characterized in that the m-ordered diffracted ray (where, m is an integer except 0) from the diffraction pattern of the objective lens of the light flux from the first light source is at least used, thereby, the first optical information recording medium in which the thickness of the transparent substrate is t1 is recorded and/or played back, and the n-th ordered diffracted ray (where, n=m) from the diffraction pattern of the objective lens of the light flux from the second light source is at least used, thereby, the second optical information recording medium in which the thickness of the transparent substrate is t2 ($t2 \neq t1$) is recorded and/or played back.

Further, the optical pickup apparatus in Item 164 is characterized in that, in the apparatus in Item 163, the optical pickup apparatus is used under the relationship that the wavelengths $\lambda 1$ and $\lambda 2$ of the first light source and the second light source are $\lambda 1 < \lambda 2$, and the thickness t1 and t2 of the transparent substrates are t1<t2, and the m-ordered and n-th ordered diffracted ray are both +first ordered diffracted ray.

Further, the optical pickup apparatus in Item 165 is characterized in that, in the apparatus in Item 163, the optical pickup apparatus is used under the relationship that the wavelengths $\lambda 1$ and $\lambda 2$ of the first light source and the second light source are $\lambda 1 < \lambda 2$, and the thickness t1 and t2 of the transparent substrates are t1>t2, and the m-ordered and n-th ordered diffracted ray are both −first ordered diffracted ray.

Further, the optical pickup apparatus in Item 166 is characterized in that, in the apparatus in Items 163, 164 and 165, the diffraction optical element and the objective lens are integrally driven.

Further, the optical pickup apparatus in Item 167 is characterized in that, in the apparatus in Items 122-166, the depth in the optical axis of the first diffraction pattern is not more than 2 μm.

Further, the objective lens for the optical pickup apparatus in Item 168 is characterized in that it has the diffraction pattern on at least one surface, and when the light flux of the wavelength λ1 enters, at least m-ordered diffracted ray (where, m is an integer except 0) from the diffraction pattern is converged onto the first light converging position and when the light flux of the wavelength λ2 enters, at least n-th ordered diffracted ray (where, n=m) from the diffraction pattern is converged onto the second light converging position which is different from the first light converging position.

Further, the objective lens for the optical pickup apparatus in Item 169 is characterized in that, when the wavelengths λ1, λ2 are λ1<λ2, the first light converging position is the light converging position to the first optical information recording medium in which the thickness of the transparent substrate is t1, the second light converging position is the light converging position to the second optical information recording medium in which the thickness of the transparent substrate is t2, and the thickness t1, t2 of the transparent substrate are t1<t2, the m-ordered and n-th ordered diffracted ray are both +first ordered diffracted ray.

Further, the objective lens for the optical pickup apparatus in Item 170 is characterized in that, when the wavelengths λ1, λ2 are λ1<λ2, the first light converging position is the light converging position to the first optical information recording medium in which the thickness of the transparent substrate is t1, the second light converging position is the light converging position to the second optical information recording medium in which the thickness of the transparent substrate is t2, and the thickness t1, t2 of the transparent substrate are t1>t2, the m-ordered and n-th ordered diffracted ray are both −first ordered diffracted ray.

Further, the objective lens for the optical pickup apparatus in Item 171 is characterized in that it has the diffraction pattern on at least one surface, and when the light flux of the wavelength λ1 enters, at least m-ordered diffracted ray (where, m is an integer except 0) from the diffraction pattern has the light converging position which is used for recording and/or reproducing the first optical information recording medium in which the thickness of the transparent substrate is t1, and when the light flux of the wavelength λ2 (where, λ2≠λ1) enters, at least n-th ordered diffracted ray (where, n=m) from the diffraction pattern has the light converging position which is used for recording and/or reproducing the second optical information recording medium in which the thickness of the transparent substrate is t2 (where, t2≠t1).

Further, the objective lens for the optical pickup apparatus in Item 172 is characterized in that, in the objective lens in Item 171, when the wavelengths λ1, λ2 are λ1<λ2, and the thickness t1, t2 of the transparent substrates are t1<t2, the m-ordered and n-th ordered diffracted ray are both +first ordered diffracted ray.

Further, the objective lens for the optical pickup apparatus in Item 173 is characterized in that, in the objective lens in Item 171, when the wavelengths λ1, λ2 are λ1<λ2, and the thickness t1, t2 of the transparent substrates are t1>t2, the m-ordered and n-th ordered diffracted ray are both −first ordered diffracted ray.

Further, the objective lens for the optical pickup apparatus in Item 174 is characterized in that, in the objective lens in Item 172, when the necessary numerical aperture on the optical information recording medium side of the objective lens necessary for recording and/or reproducing the first optical information recording medium in which the thickness of the transparent substrate is t1, by the first light source with the wavelength λ1, is NA1, and the necessary numerical aperture on the optical information recording medium side of the objective lens necessary for recording and/or reproducing the second optical information recording medium in which the thickness of the transparent substrate is t2 (t2>t1), by the second light source with the wavelength λ2 (λ2>λ1), is NA2 (NA2<NA1), the diffraction pattern provided on at least one surface of the objective lens is the rotation symmetry to the optical axis, and +first ordered diffracted ray from the circumference most separated from the optical axis of the diffraction pattern of the objective lens of the light flux from the first light source is converted into the light flux whose numerical aperture on the optical information recording medium side is NAH1, and +first ordered diffracted ray from the circumference nearest to the optical axis of the diffraction pattern of the objective lens of the light flux from the first light source is converted into the light flux whose numerical aperture on the optical information recording medium side is NAL1, and the following conditions are satisfied:

$$NAH1 < NA1, \ 0 \leq NAL1 \leq NA2.$$

Further, the objective lens for the optical pickup apparatus in Item 175 is characterized in that, in the objective lens in Item 172, when the necessary numerical aperture on the optical information recording medium side of the objective lens necessary for recording and/or reproducing the first optical information recording medium in +which the thickness of the transparent substrate is t1, by the first light source with the wavelength λ1, is NA1, and the necessary numerical aperture on the optical information recording medium side of the objective lens necessary for recording and/or reproducing the second optical information recording medium in which the thickness of the transparent substrate is t2 (t2>t1), by the second light source with the wavelength λ2 (λ2>λ1), is NA2 (NA2>NA1), the diffraction pattern provided on at least one surface of the objective lens is the rotation symmetry to the optical axis, and +first ordered diffracted ray from the circumference most separated from the optical axis of the diffraction pattern of the objective lens of the light flux from the first light source is converted into the light flux whose numerical aperture on the optical information recording medium side is NAH1, and +first ordered diffracted ray from the circumference nearest to the optical axis of the diffraction pattern of the objective lens of the light flux from the first light source is converted into the light flux whose numerical aperture on the optical information recording medium side is NAL1, and the following conditions are satisfied:

$$NAH1 < NA2, \ 0 \leq NAL1 \leq NA1.$$

Further, the objective lens for the optical pickup apparatus in Item 176 is characterized in that, in the objective lens in Item 173, when the necessary numerical aperture on the optical information recording medium side of the objective lens necessary for recording and/or reproducing the first optical information recording medium in which the thickness of the transparent substrate is t1, by the first light source with the wavelength λ1, is NA1, and the necessary numerical aperture on the optical information recording medium side of the objective lens necessary for recording and/or reproducing the second optical information recording medium in which the thickness of the transparent substrate is t2 (t2<t1), by the second light source with the wavelength λ2 (λ2>λ1), is NA2 (NA2<NA1), the diffraction pattern provided on at least one surface of the objective lens is the rotation symmetry to the optical axis, and −first ordered diffracted ray from the circumference most separated from the optical axis of the diffraction pattern of the objective lens of the light flux from the first light source is converted into the light flux whose numerical aperture on the optical information recording medium side is NAH1, and −first ordered diffracted ray from the circumference nearest to the optical axis of the diffraction pattern of the objective lens of the light flux from the first light source is converted into the light flux whose numerical aperture on the optical information recording medium side is NAL1, and the following conditions are satisfied:

$$NAH1<NA1, 0×NAL1 \leqq NA2.$$

Further, the objective lens for the optical pickup apparatus in Item 177 is characterized in that, in the objective lens in Item 173, when the necessary numerical aperture on the optical information recording medium side of the objective lens necessary for recording and/or reproducing the first optical information recording medium in which the thickness of the transparent substrate is t1, by the first light source with the wavelength λ1, is NA1, and the necessary numerical aperture on the optical information recording medium side of the objective lens necessary for recording and/or reproducing the second optical information recording medium in which the thickness of the transparent substrate is t2 (t2<t1), by the second light source with the wavelength λ2 (λ2>λ1), is NA2 (NA2>NA1), the diffraction pattern provided on at least one surface of the objective lens is the rotation symmetry to the optical axis, and −first ordered diffracted ray from the circumference most separated from the optical axis of the diffraction pattern of the objective lens of the light flux from the first light source is converted into the light flux whose numerical aperture on the optical information recording medium side is NAH1, and −first ordered diffracted ray from the circumference nearest to the optical axis of the diffraction pattern of the objective lens of the light flux from the first light source is converted into the light flux whose numerical aperture on the optical information recording medium side is NAL1, and the following conditions are satisfied:

$$NAH1<NA2, 0 \leqq NAL1 \leqq NA1.$$

Further, the objective lens for the optical pickup apparatus in Item 178 is characterized in that, in the objective lens in any one Item of Items 168-177, the optical surface includes the diffraction pattern portion and the refraction portion, and the bordered between the diffraction portion and the refraction portion includes the difference in level not less than 5 μm.

Further, the objective lens for the optical pickup apparatus in Item 179 is characterized in that, in the objective lens in any one Item of Items 168-177, the average depth of the diffraction pattern of the diffraction portion nearest to the optical axis side is not more than 2 μm.

Further, the objective lens for the optical pickup apparatus in Item 180 is characterized in that, in the objective lens in Item 179, the average depth of the diffraction pattern of the diffraction portion nearest to the optical axis side is not more than 2 μm, and the average depth of the diffraction pattern of the diffraction portion most separated from the optical axis side is not less than 2 μm.

Further, the objective lens for the optical pickup apparatus in Item 181 is characterized in that, in the objective lens in any one Item of Items 168-180, the diffraction pattern of the optical surface includes the optical axis portion.

Further, the objective lens for the optical pickup apparatus in Item 182 is characterized in that, in the objective lens in any one Item of Items 168-180, the optical axis portion of the optical surface is not provided with the diffraction pattern, and is the refraction surface.

Further, the objective lens for the optical pickup apparatus in Item 183 is characterized in that, in the objective lens in Items 168, 169, 171, 172 or 174, when an image is formed on the information recording surface at a predetermined image forming magnification through the transparent substrate of the thickness 0.6 mm at the wavelength of the light source of 650 nm, it has the diffraction limit performance up to at least numerical aperture 0.6, and when an image is formed on the information recording surface at a predetermined image forming magnification through the transparent substrate of the thickness 1.2 mm at the wavelength of the light source of 780 nm, it has the diffraction limit performance up to at least numerical aperture 0.45.

Further, the objective lens for the optical pickup apparatus in Item 184 is characterized in that, in the objective lens in Item 183, the number of steps of the diffraction pattern is not more than 15.

Further, the objective lens for the optical pickup apparatus in Item 185 is characterized in that, in the objective lens in any one Item of Items 168-184, the optical surface on which the diffraction pattern is provided is a convex surface.

Further, the objective lens for the optical pickup apparatus in Item 186 is characterized in that, in the objective lens in Item 185, the refraction portion of the optical surface on which the diffraction pattern is provided, is aspherical.

Further, the objective lens for the optical pickup apparatus in Item 187 is characterized in that, in the objective lens in Item 186, the diffraction pattern includes at least one aspherical refraction portion.

Further, the objective lens for the optical pickup apparatus in Item 188 is characterized in that, in the objective lens in any one Item of Items 168-187, the objective lens is a single lens.

Further, the objective lens for the optical pickup apparatus in Item 189 is characterized in that, in the objective lens in Item 188, the diffraction pattern is provided on only one optical surface of the single lens.

Further, the objective lens for the optical pickup apparatus in Item 185 is characterized in that, in the objective lens in Item 188, the diffraction pattern is provided on only one optical surface of the single lens, and the other optical surface is aspherical.

No-aberration parallel light is entered from the first light source into such that objective lens, and by using an exclusive use objective lens which is designed such that the parallel light is converged with no-aberration through the transparent substrate (the thickness is t1) of the first optical information recording medium, the case where the parallel light with no-aberration enters from the second light source to this objective lens and passes through the transparent substrate (thickness t2, t2>t1) of the second optical information recording medium, will be considered as follows.

To the entered parallel light, when there is no substrate and the wavelength is λ1, the back focus is fB1, and when the wavelength is λ2 (λ2>λ1), the back focus is fB2.

In this case, the axial chromatic aberration ΔfB is defined as $$\Delta fB = fB2 - fB1 \tag{1},$$

when the objective lens is a refraction type aspherical single lens, ΔfB>0.

Further, when the wavelength is λ2 and the light is converged through the transparent substrate of the second optical information recording medium, the spherical aberration when the axial focus position is made to be the reference, does not become 0 due to the following factors:
(1) The spherical aberration due to the wavelength dependency of the refractive index of the objective lens by the change of the wavelength from λ1 to λ2.
(2) The spherical aberration generated by the difference between the thickness t1 of the transparent substrate of the first optical information recording medium and the thickness t2 of the transparent substrate of the second optical information recording medium.
(3) The spherical aberration due to the difference between the refractive index nd1 (λ1) of the transparent substrate of the first optical information recording medium and the refractive index nd2 (λ2) of the transparent substrate of the second optical information recording medium.

When the objective lens is the refraction type aspherical single lens, the spherical aberration due to factor (1) becomes over. The spherical aberration due to factor (2) becomes also over. Further, nd2<nd1, and the spherical aberration due to factor (3) becomes also over.

In the over-spherical aberration which is generated due to factors (1)-(3), the spherical aberration due to factor (2) is almost all, and that due to factor (1) is next to it. The spherical aberration due to factor (3) can be almost neglected.

The above-described presupposition corresponds to the case in which, for example, the first optical information recording medium is the DVD, the wavelength λ1 of the first light source is 650 nm, and the second optical information recording medium is the CD, the wavelength λ2 of the second light source is 780 nm, and in the DVD (thickness t1=0.6 mm) and the CD (thickness t2=1.2 mm), the material of the transparent substrate is the same, but the thickness is different.

Next, when the +first ordered diffracted ray of the diffraction pattern which is the rotation symmetry to the optical axis is viewed, as shown in FIG. 113(a), when the wavelength is longer, the diffraction angle of the +first ordered light is larger, and the +first ordered light is more diffracted to the optical axis side, and is bent to more under side. That is, when the parallel light flux with no-aberration enters from the second light source with the wavelength λ2, the +first ordered light has an action to make the axial chromatic aberration and the spherical aberration under, as compared to the case where the parallel light flux with no-aberration enters from the first light source with the wavelength λ1. By using this action, the difference between the spherical aberration when the light is through the transparent substrate of the second optical information recording medium with the wavelength λ2 and the spherical aberration when the light is through the transparent substrate of the first optical information recording medium with the wavelength λ1, can be reduced by introducing the diffraction pattern of the rotation symmetry and using the +first ordered diffracted ray.

Figure 12:
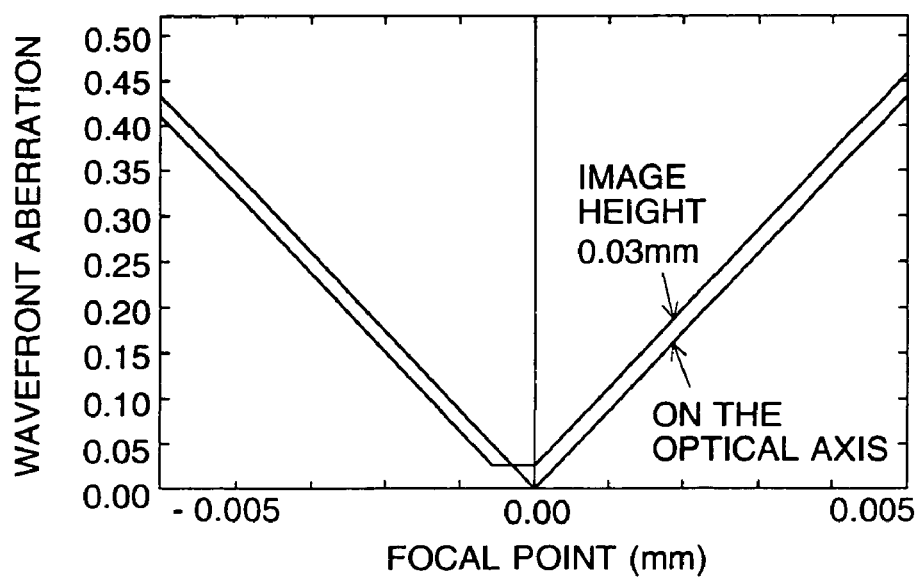
FIG. 12 is a view of the wave front aberration to the wavelength $\lambda=635$ nm by the diffraction optical lens of Example 2 of the present invention.

When the thickness t1 of the substrate of the first optical information recording medium is larger than the thickness t2 of the transparent substrate of the second optical information recording medium, the spherical aberration due to the factor (2) becomes under, and as shown in FIG. 12(b), by using the −first ordered diffracted ray having the action by which the axial chromatic aberration and the spherical aberration to be generated, become over, the aberration can be reduced.

In the present invention, in the case where the +first ordered diffracted ray is used, when the refractive index of the material of the objective lens at the wavelength λ1 is n(λ1), and the refractive index of the material of the objective lens at the wavelength λ2 is n(λ2), the depth of the diffraction pattern is λ1/{n(λ1)−1} or λ2/{n(λ2)−1}, and even if the plastic material with comparatively small refractive index is used, the depth is not more than 2 μm, therefore, the production of the objective lens to which the diffraction pattern is integrated, is easier than the conventional hologram optical element, or the hologram type ring lens.

Further, the optical pickup apparatus in Item 191, which has: the first light source with the wavelength λ1; the second light source with the wavelength λ2 (λ1≠λ2; the objective lens having the diffraction pattern on at least one surface, and converging the light flux from respective light sources onto the information recording surface of the optical information recording medium through the transparent substrate; and the light detector receiving the reflected light from the optical information recording medium of the emitted light flux from the first light source and the second light source, the optical pickup apparatus is characterized in that, by using at least m-ordered diffracted ray (where, m is an integer except 0) from the diffraction pattern of the objective lens of the light flux from the first light source, the optical pickup apparatus conducts at least either one of recording and reproducing of the information to the first optical information recording medium in which the thickness of the transparent substrate is t1, and by using at least n-th ordered diffracted ray (where, n=m) from the diffraction pattern of the objective lens of the light flux from the second light source, the optical pickup apparatus conducts at least either one of recording and reproducing of the information to the second optical information recording medium in which the thickness of the transparent substrate is t2 (t2≠t1), the objective lens is made of plastic material, the plastic material satisfies the relationship of the following: when the temperature changes by ΔT (° C.), the changed amount of refractive index is defined as Δn, then, −0.0002/° C.<Δn/ΔT<−0.00005/° C., and the first light source satisfies the following: when the temperature changes by ΔT (° C.), the changed amount of the emission wavelength is defined as Δλ1 (nm), then, 0.05 nm/° C.<Δλ1/ΔT<0.5 nm/° C.

According to Item 191, the characteristic variation of the optical pickup apparatus due to the temperature change of the refractive index in the objective lens of plastic and the characteristic variation of the optical pickup apparatus due to the temperature change of the wavelength in the light source are acted toward the direction to be cancelled with each other, and the compensation effect can be obtained, thereby, the pick-up apparatus which is very strong to the temperature change, can be obtained.

Further, the optical: pickup apparatus in Item 192 which is provided with: the first light source with the wavelength λ1; the second light source with the wavelength λ2 (λ1≠λ2); the objective lens having the diffraction pattern on at least one surface, and converging the light flux from respective light sources onto the information recording surface of the optical information recording medium through the transparent substrate; and the light detector receiving the reflected light from the optical information recording medium of the emitted light flux from the first light source and the second light source, the optical pickup apparatus is characterized in that, by using at least m-ordered diffracted ray (where, m is an integer except 0) from the diffraction pattern of the objective lens of the light flux from the first light source, the optical pickup apparatus conducts at least either one of recording and reproducing of the information to the first optical information recording medium in which the thickness of the transparent substrate is t1, and by using at least n-th ordered diffracted ray (where, n=m) from the diffraction pattern of the objective lens of the light flux from the second light source, the optical pickup apparatus conducts at least either one of recording and reproducing of the information to the second optical information recording medium in which the thickness of the transparent substrate is t2 (t2≠t1), and the wavelengths λ1, λ2, and the thickness of the transparent substrates t1 and t2 have the relationship λ2>λ1, t2>t1, and in the case where the necessary numerical aperture on the optical information recording medium side of the objective lens necessary for recording and/or reproducing the first optical information recording medium by the first light source is NA1, the focal distance of the objective lens at the wavelength λ1 (mm) is f1 (mm), and the environmental temperature change is ΔT(° C.), when the changed amount of the third-ordered spherical aberration component of the wave front aberration of the light flux converged onto the information recording surface of the first information recording medium is ΔWSA3 (λ1 rms), the following relationship is satisfied:

$$0.2 \times 10^{-6}/°C. < \Delta WSA3 - \lambda 1/\{f \cdot (NA1)^4 \cdot \Delta T\} < 2.2 \times 10^{-6}/°C.$$

According to Item 192, when the value of the objective term is not more than the upper limit, even if the environmental temperature changes, the characteristic as the pick-up apparatus can be easily maintained, and when the value of the objective term is not less than the lower limit, even when only the wavelength changes, the characteristic as the pick-up apparatus can be easily maintained.

Further, the optical pickup apparatus in Item 193 is characterized in that, in Items 191 or 192, at least one collimator is included between the first light source and the objective lens, and the second light source and the objective lens, and the light flux entering from the first light source to the objective lens and the light flux entering from the second light source to the objective lens, are respectively almost parallel light.

Further, the optical pickup apparatus in Item 194 is characterized in that, in Items 191, 192 or 193, t1 is 0.55 mm-0.65 mm, t2 is 1.1 mm-1.3 mm, λ1 is 630 nm-670 nm, and λ2 is 760 nm-820 nm.

Further, the optical pickup apparatus in Item 192 which is provided with: the first light source with the wavelength λ1; the second light source with the wavelength λ2 (λ1≠λ2); the objective lens having the diffraction pattern on at least one surface, and converging the light flux from respective light sources onto the information recording surface of the optical information recording medium through the transparent substrate; and the light detector receiving the reflected light from the optical information recording medium of the emitted light flux from the first light source and the second light source, the optical pickup apparatus is characterized in that, by using at least m-ordered diffracted ray (where, m is an integer except 0) from the diffraction pattern of the objective lens of the light flux from the first light source, the optical pickup apparatus conducts at least either one of recording or reproducing of the information to the first optical information recording medium in which the thickness of the transparent substrate is t1, and by using at least n-th ordered diffracted ray (where, n=m) from the diffraction pattern of the objective lens of the light flux from the second light source, the optical pickup apparatus conducts at least either one of recording or reproducing of the information to the second optical information recording medium in which the thickness of the transparent substrate is t2 (t2≠t1), and has a correction means for compensating the divergence degree of the light flux entering from at least one light source of the first and the second light sources into the objective lens.

According to Item 195, by compensating the divergence degree of the light flux entering into the objective lens, the third-ordered spherical aberration of the whole optical system including the objective lens can be corrected according to the design value.

Further, the optical pickup apparatus in Item 196 which, in Item 195, includes at least a collimator between the first light source and the objective lens, and the second light source and the objective lens, and the optical pickup apparatus in Item 197 is characterized in that the correction of the divergence degree by the correction means is conducted by changing the distance between the first and/or the second light source and at least one collimator. The correction of the divergence degree by the correction means is characterized in that it is conducted by changing the distance between the first and/or the second light source and at least one collimator. By changing the distance between the light source and the collimator, the divergence degree of the light flux entering from at least one light source into the objective lens can be corrected.

Further, the optical pickup apparatus in Item 192 which is provided with: the first light source with the wavelength λ1; the second light source with the wavelength λ2 (λ1≠λ2); the objective lens having the diffraction pattern on at least one surface, and converging the light flux from respective light sources onto the information recording surface of the optical information recording medium through the transparent substrate; and the light detector receiving the reflected light from the optical information recording medium of the emitted light flux from the first light source and the second light source, the optical pickup apparatus is characterized in that, by using at least m-ordered diffracted ray (where, m is an integer except 0) from the diffraction pattern of the objective lens of the light flux from the first light source, the optical pickup apparatus conducts at least either one of recording or reproducing of the information to the first optical in formation recording medium in which the thickness of the transparent substrate is t1, and by using at least n-th ordered diffracted ray (where, n m) from the diffraction pattern of the objective lens of the light flux from the second light source, the optical pickup apparatus conducts at least either one of recording or reproducing of the information to the second optical information recording medium in which the thickness of the transparent substrate is t2 (t2≠t1), and the wave front aberration on the image formation surface is not more than 0.07 λrms in the maximum numerical aperture on the image side of the objective lens, to each of the light having 2 different wavelengths (λ) outputted from the first and the second light sources.

According to Item 198, there is no flare on each information recording surface and the light detector in recording and/or reproducing of the first and the second information recording medium, thereby, the characteristic of the optical pickup apparatus becomes excellent.

Further, the optical pickup apparatus in Item 199 is characterized in that, in any one Item of Items 122-156, and 198, the first light source and the second light source are formed into a unit, and the light detector is in common to the first light source and the second light source.

Hereinafter, referring to the drawings, detailed embodiments of the present invention will be described.

An optical system of the first embodiment of the present invention is basically a 2-sided aspherical single lens, and diffraction annular bands (ring zonal diffraction surface) are provided on one aspherical surface. Generally, in the aspherical refractive surface, when the spherical aberration is corrected to a certain dominant wavelength light, to the wavelength light whose wavelength is shorter than that of the dominant wavelength light, the spherical aberration becomes under (insufficient correction). Reversely, in a diffraction lens which is a lens having the diffraction surface, when the spherical aberration is corrected by the dominant wavelength light, the spherical aberration can be over (excessive correction) at the wavelength which is shorter than that of the dominant wavelength light. Accordingly, when an aspherical coefficient of the aspherical surface lens by the refraction, and an coefficient of the phase difference function of the diffraction lens are properly selected and the refraction power and diffraction power are combined, the spherical aberration can be finely corrected by both of 2 different wavelength light.

Further, generally, the pitch of the diffraction annular band is defined by using the phase difference function or the optical path difference function, which will be detailed in a later example. Concretely, the phase difference function $\Phi_B$ is expressed in the following [Equation 1] in radian unit, and the optical path difference function $\Phi_b$ is expressed by [Equation 2] in mm unit.

$$\Phi_B = \sum_{i=1}^{\infty} B_{2i} h_{2i} \qquad \text{[Equation 1]}$$

$$\Phi_b = \sum_{i=1}^{\infty} b_{2i} h_{2i} \qquad \text{[Equation 2]}$$

These 2 expression methods are, although the unit is different from each other, equal to each other in a meaning that these express the pitch of the diffraction annular band. That is, to the dominant wavelength $\lambda$ (mm unit), when the coefficient B of the phase difference function is multiplied by $\lambda/2\pi$, it can be converted into the coefficient b of the optical path difference function, or reversely, when the coefficient B of the optical-path difference function is multiplied by $2\pi/\lambda$, it can be converted into the coefficient B of the phase difference function.

Herein, for a simple explanation, the diffraction lens which uses first ordered diffracted ray, will be described. In the case of the optical path difference function, the annular band is notched for each time when the function value exceeds the integer times of the dominant wavelength $\lambda$, and in the case of the phase difference function, the annular band is notched for each time when the function value exceeds the integer times of $2\pi$.

For example, a lens in which the diffraction annular band is notched on the side of 2-sided cylindrical material having no refraction power, is considered, and when the dominant wavelength is 0.5 μm=0.0005 mm, the second power coefficient (second power term) of the optical path difference function is −0.05 (when converted into the second power coefficient of the phase difference function, it is −628.3), and other power coefficients are all zero, the diameter of the first annular band is h=0.1 mm, and the diameter of the second annular band is h=0.141 mm. Further, as for the focal distance f of this diffraction lens, to second power coefficient b2 of the optical path difference function b2=−0.05, f=−1/(2·b2)=10 mm is known.

Herein, in the case where the above definition is used as the base, when the second power coefficient of the phase difference function or the optical path difference function is a value of not zero, the chromatic aberration near the optical axis, so-called in the paraxial area, can be corrected. Further, when coefficients other than the second power coefficient of the phase difference function or the optical path difference function, for example, fourth power coefficient, sixth power coefficient, eighth power coefficient, tenth power coefficients, etc., are made to a value of not zero, the spherical aberration between 2 wavelengths can be controlled. Incidentally, herein, "control" means that the difference of spherical aberration between 2 wavelengths can be made very small, and the difference which is necessary for the optical specification can also be provided.

As the concrete application of the above description, when collimate light (parallel light) from 2 light sources having different wavelengths are made to simultaneously enter into the objective lens, and to image-form on the optical disk, it is preferable that, initially, the paraxial axial chromatic aberration is corrected by using the second power coefficient of the phase difference function or the optical path difference function, and further, the difference between 2 wavelengths of the spherical aberration is made smaller so that it is within the allowable value, by using the coefficients of the fourth power and subsequent powers of the phase difference function or the optical path difference function.

Further, as another example, the specification in which one objective lens is used for the light from 2 light sources having different wavelengths, and for the light of one wavelength, the aberration is corrected for the disk having the thickness (the thickness of the transparent substrate) of t1, and for the light of the other wavelength, the aberration is corrected for the disk having the thickness of t2, will be considered below. In this case, when the coefficients subsequent to fourth power of the phase difference function or the optical path difference function are mainly used, the difference of the spherical aberration between 2 wavelengths is provided, and the spherical aberration can be made to be corrected by respective wavelengths for respective thickness. Further, in both cases, for the refraction surface, the aspherical surface is better than the spherical surface for easy aberration correction between 2 wavelengths.

The above-described aspherical refraction surface has respective different refraction powers for different wavelengths, and has different light converging points, therefore, respective light converging points can correspond to optical disks having respective substrate thickness. In this case, the shorter wavelength of the light source is not more than 700 nm, the longer wavelength of the light source is not less than 600 nm, and it is preferable that the difference of the wavelengths is not less then 80 nm. Further, it is more preferable that the difference of the wavelengths is not more than 400 nm, and further preferably, the difference of the wavelengths is not less than 100 nm, and not more than 200 nm. It is desirable that the diffraction surface has, to the light having 2 different wavelengths, the maximum diffraction efficiency at almost the middle wavelength thereof, however, the diffraction surf ace may have the maximum diffraction efficiency at either one wavelength.

By using the same action as the correction of the spherical aberration, the diffraction annular band lens is provided on the optical surface, and for each of the light sources with 2 different wavelengths, the axial chromatic aberration can be corrected by a certain one same ordereded diffracted ray. That is, the axial chromatic aberration for the light of the light sources with 2 different wavelengths can be corrected within the range of ±λ/(2NA2). Where, λ is the longer wavelength of 2 wavelengths, and NA is an image side numerical aperture corresponding to the longer wavelength.

Further, when the difference of wavelengths of the light sources with 2 different wavelengths is not less than 80 nm, and Abbe's number of the glass material of the objective lens is νd, the following conditional expression $$\nu d > 50 \quad (1)$$

is desirably satisfied. The conditional expression (1) is a condition to reduce the second ordered spectrum when the axial chromatic aberration is corrected for the light sources with 2 different wavelengths.

Next, when the diffraction surface is provided on one surface of a thin single lens, the whole single lens is considered as the composition of the refraction lens as a base from which the diffraction relief is taken off and the diffraction surface, and the chromatic aberration of this composition lens will be considered below. The achromatic condition by a certain wavelength λx and the wavelength λy (λx<λy) is as follow.

fR·νR+fD·νD=0 Where, fR, fD: a focal distance of respective refraction lens and diffraction surface, and νR, νD: Abbe's number of respective refraction lens and diffraction surface, and are determined by the following expressions:

$$\nu R = (n0-1)/(nx-ny)$$

$$\nu D = \lambda 0/(\lambda x - \lambda y)$$

Where, n0: the refractive index at the reference wavelength, and λ0: the reference wavelength.

In this case, the chromatic aberration δf to a certain wavelength λz is expressed by the following equation:

$$\delta f = f(\theta R - \theta D)/(\nu R - \nu D) \quad (2)$$

Where, θR, θD: respective partial variance ratios of the refraction lens and the diffraction surface, and are determined by the following equations.

$$\theta R = (nx-nz)/(nx-ny)$$

$$\theta D = (\lambda x - \lambda z)/(\lambda x - \lambda y)$$

where, nz: the refractive index at the wavelength λz.

As an example, when λ0=λx=635 nm, λy=78.0 nm, λz=650 nm, and the glass material of the refraction lens as the base is BSC7 (νd=64.2) made by Hoya Co., then, νR=134.5, νD−4.38, θR=0.128, θD=0.103, are obtained, and then, δf=0.18×10$^{-3}$f is obtained.

Further, when the glass material of the refraction lens as the base is changed to E-FD1(νd=29.5) made by Hoya Co., then, νR=70.5, θR=0.136 are obtained, and then, δf 0.44× 10$^{-3}$f is obtained.

As described above, in Equation (2), in the denominator of the right side (νR−νD), because |νD| is very smaller than |νR|, the change of Abbe's number νR of the refraction lens is dominant over the change of the chromatic aberration δf by replacing the glass material of the refraction lens. On the one hand, θR and θD are determined only by the wavelength, and the contribution of the change of the numerator (θR−θD) of the right side is smaller than that of the denominator (νR−νD) of the right side.

According to the above description, in the lens having the diffraction surface, in ordered to suppress the secondary spectrum δf small, it is understood that the selection of the material having the larger Abbe's number νR is effective for the material of the refraction lens. The conditional expression (1) shows the effective limit to suppress the secondary spectrum so as to cope with the change of wavelength of the light source.

Further, in the case where the achromatic processing is conducted without using the diffraction surface and by adhering the refraction lenses of 2 kinds of materials, when, for respective materials, θR=a+b·νR+ΔθR (a, b are constant) is expressed, if ΔθR is small, and there is no abnormal dispersibility, the secondary spectrum δf does not depend on Abbe's number νR of 2 refraction lenses. Accordingly, it is understood that the expression (1) is a condition specific to the diffraction optical system.

In ordered to easily produce the diffractive lens in the present embodiment, it is preferable that the objective lens is composed of plastic material. AS the plastic material to satisfy the conditional expression (1), acrylic system, polyolefine system plastic materials are used, however, from the view point of humidity resistance and heat resistance, the polyolefine system is preferable.

Next, the objective lens of the second embodiment of the present invention and the structure of the optical pickup apparatus provided with the objective lens will be concretely described.

Figure 48:
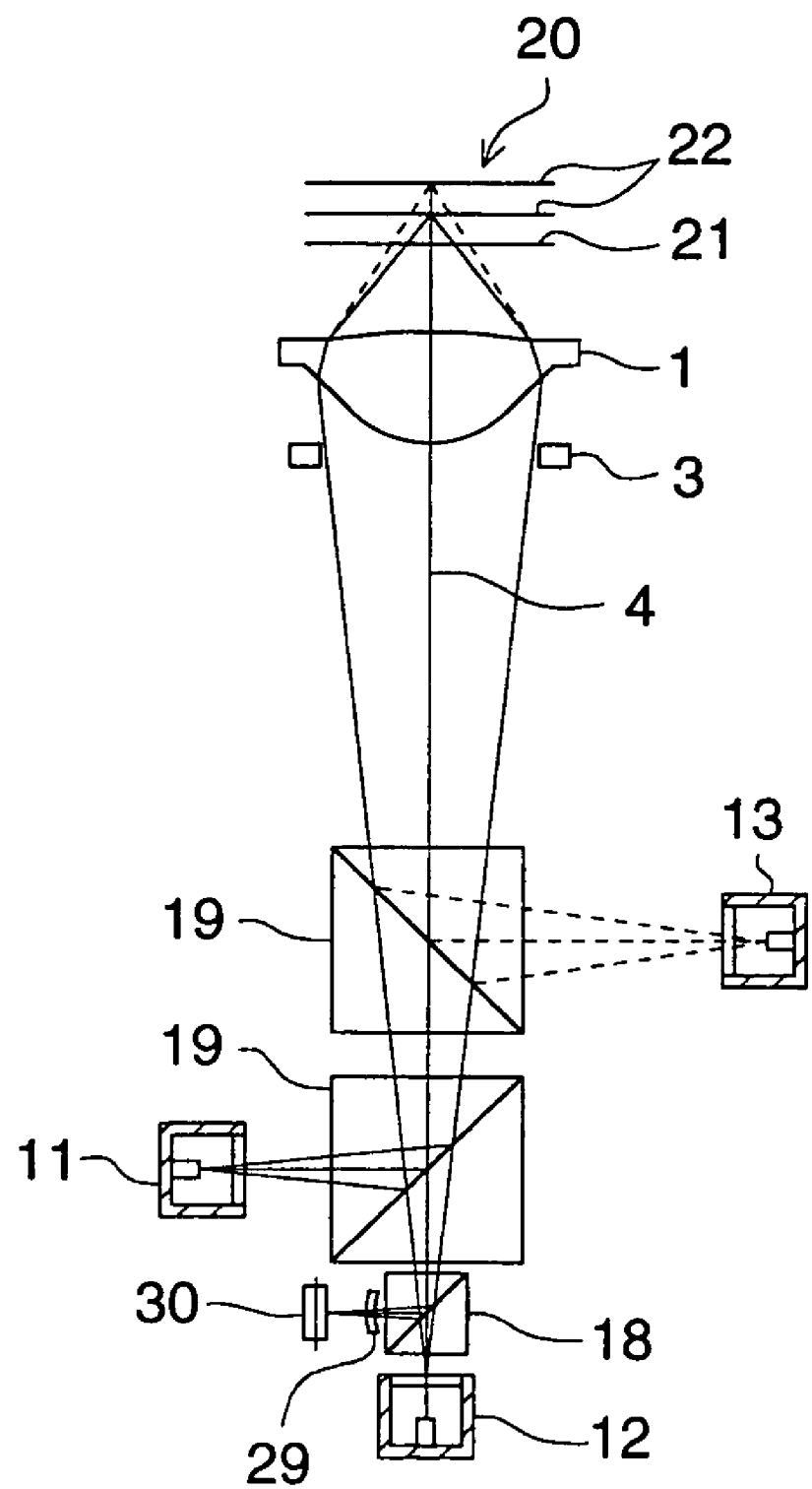
FIG. 48 is a view of the optical path showing the structure of the optical pickup apparatus according to the second embodiment of the present invention.

In FIG. 48, the schematic structural view of the optical pickup apparatus of the present embodiment will be shown. The optical disks 20 which are optical information recording media onto which or from which the information is recorded and/or played back by the optical pickup apparatus, are 3 types of disks which are the first optical disk (for example, a DVD) whose transparent substrate thickness is t1 and the second optical disk (for example, a blue laser use next-generation high density optical disk), and the third optical disk (for example, a CD) whose transparent substrate thickness is t2 different from t1, and hereinafter, these disks will be described as optical disks 20. Herein, the transparent substrate thickness t1=0.6 mm, and t2=1.2 mm.

The optical pickup apparatus shown in the drawing has, as the light sources, the first semiconductor laser 11 (wavelength $\lambda_1$=610 nm-670 nm) which is the first light source, the blue laser 12 (wavelength $\lambda_2$=400 nm-440 nm) which is the second light source, and the second semiconductor laser 13 (wavelength $\lambda_3$=740 nm-870 mm) which is the third light source, and has the objective lens 1 as a part of the optical system. The first light source, second light source and third light source are selectively used corresponding to the optical disks to record and/or reproduce the information.

The diverging light flux emitted from the first semiconductor laser 11, the blue laser 12 or the second semiconductor laser 13 transmits through the transparent substrate 21 of the optical disk 20 through the beam splitter 19 and the diaphragm 3, and is converged onto respective information recording surfaces 22 by the objective lens 1, and forms spots.

The incident light from each laser becomes modulated reflected light by the information pit on the information recording surface 22, and enters into the common light detector 30 through the beam splitter 18 and a toric lens 29, and by using its output signal, the read-out signal of the information recorded on the optical disk 20, the focusing detection signal and the track detection signal are obtained.

Further, the diaphragm 3 provided in the optical path is, in this example, a diaphragm having the fixed numeral aperture (NA 0.65), and superfluous mechanism is not needed, therefore, cost reduction can be realized. Incidentally, when the third disk is recorded and/or played back, the numeral aperture of the diaphragm 3 may be changeable so that the unnecessary light (more than NA 0.45) can be removed.

When the zonal filter is integrally formed on the optical surface of the objective lens 1 so that the light flux of a part of the outside of the practically used aperture is shielded, the flare light of the outside of the practically used aperture can also be easily removed by the low cost structure.

When a definite conjugation type optical system is used as in the present embodiment, it is necessary that the relationship between the light source and light converging optical system is kept constant to maintain the light converging performance, and it is desirable that as the movement for focusing or tracking, the light sources 11, 12 and 13 and the objective lens 1 are moved as one unit.

Next, the objective lens and the structure of the optical pickup apparatus including the objective lens of the third embodiment of the present invention, will be concretely described.

Figure 49:
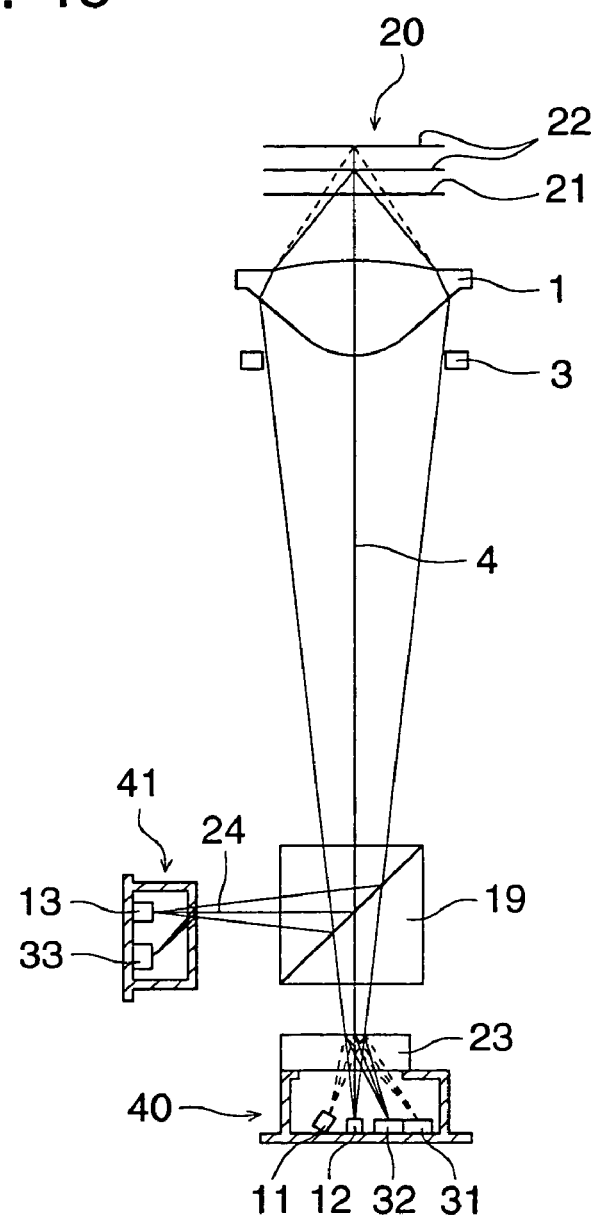
FIG. 49 is a view of the optical path showing the structure of the optical pickup apparatus according to the third embodiment of the present invention.

In FIG. 49, the schematic structural view of the optical pickup apparatus of the present embodiment will be shown. The optical pickup apparatus shown in FIG. 49 is an example in which the laser/detector integration unit 40 into which the laser, light detector, and hologram are structured as a unit, is used, and the same components as in FIG. 48 are shown by the same numeral codes. In this optical pickup apparatus, the first semiconductor laser 11, blue laser 12, the first light detection means 31, the second light detection means 32 and the hologram beam splitter 23 are structured into a unit as the laser/detector integration unit 40.

When the first optical disk is played back, the light flux emitted from the first semiconductor laser 11 transmits trough the hologram beam splitter 23, and is stopped down by the diaphragm 3, and converged onto the information recording surface 22 by the objective lens 1 through the transparent substrate 21 of the first optical disk 20. Then, the light flux modulated by the information pit and reflected on the information recording surface 22 is diffracted again on the surface of the disk side of the hologram beam splitter 23 through the objective lens 1 and the diaphragm 3, and enters onto the first light detector 31 corresponding to the first semiconductor laser 11. Then, by using the output signal of the first light detector 31, the read-out signal of the information recorded on the first optical disk 20, focusing detection signal, and track detection signal are obtained.

When the second optical disk is played back, the light flux emitted from the blue laser 12 is diffracted by the surface on the laser side of the hologram beam splitter 23, and advances on the same optical path as the light flux from the first semiconductor laser 11. That is, the surface on the semiconductor laser side of the hologram beam splitter 23 functions as the light composition means. Further, this light flux is converged onto the information recording surface 22 through the diaphragm 3, objective lens 1, and through the transparent substrate 21 of the second optical disk 20. Then, the light flux modulated by the information pit and reflected on the information recording surface 22, is diffracted by the surface on the disk side of the hologram beam splitter 23 through the objective lens 1 and the diaphragm 3, and enters onto the second light detector 32 corresponding to the blue laser 12. Then, by using the output signal of the second light detector 32, the read-out signal of the information recorded on the second optical disk 20, focusing detection signal, and track detection signal are obtained.

Further, when the third optical disk is played back, the laser/detector integration unit 41, which is structured into a unit by the second semiconductor laser 13, the third light detecting means 33, and the hologram beam splitter 24, is used. The light flux emitted from the second semiconductor laser 13 transmits through the hologram beam splitter 24, and is reflected by the beam splitter 19 which is the composition means of the emitted light, stopped down by the diaphragm 3, and converged onto the information recording surface 22 through the transparent substrate 21 of the optical disk 20 by the objective lens 1. Then, the light flux modulated by the information-pit and reflected on the information recording surface 22 is diffracted by the hologram beam splitter 24 again through the objective lens 1, the diaphragm 3, and the beam splitter 19, and entered onto the light detector 33. Then, by using the output signal of the third light detector 33, the read-out signal of the information recorded on the third optical disk 20, focusing detection signal, and track detection signal are obtained.

In the optical pickup apparatus in the second and third embodiments, the zonal diffraction surface concentric with the optical axis 4 is structured on the aspherical refraction surface of the objective lens 1. Generally, in the case where the objective lens is structured only by the aspherical refraction surface, when the spherical aberration is corrected for a certain wavelength $\lambda a$, the spherical aberration becomes under for the wavelength $\lambda b$ shorter than $\lambda a$. On the one hand, in the case where the diffraction surface is used, when the spherical aberration is corrected for a certain wavelength $\lambda a$, the spherical aberration becomes over for the wavelength $\lambda b$ shorter than $\lambda a$. Accordingly, when the aspherical surface optical design by the refraction surface, and the coefficient of the phase difference function of the diffraction surface is appropriately selected, and the refraction power and the diffraction power are combined, the spherical aberration between different wavelengths can be corrected. Further, on the aspherical refraction surface, when the wavelength is different, the refraction power also changes, and the light converging position is also different. Accordingly, when the aspherical refraction surface is appropriately designed, the light with the different wavelength can also be converged onto the information recording surface 22 of each transparent substrate 21.

Further, in the objective lens 1 of the second and third embodiments, when the phase difference function of the aspherical refraction surface and the ring zonal diffraction surface is appropriately designed, the spherical aberration generated by the difference of the thickness of the transparent substrates 21 of the optical disks 20 is corrected for each light flux emitted from the first semiconductor laser 11, blue laser 12, or the second semiconductor laser 13. Further, on the ring zonal diffraction surface, when the coefficients of 4th power and subsequent terms of the power series are used as the phase difference function expressing the position of the annular band, the chromatic aberration of the spherical aberration can be corrected. Incidentally, as for the third optical disk (CD), the aperture in the practical use is NA 0.45, and on the third optical disk, the spherical aberration is corrected within NA 0.45, and the spherical aberration in the outside area of NA 0.45 is made the flare. By these corrections, for each optical disk 20, the aberration of the light converging spot on the image recording surface 22 becomes almost the same degree as the diffraction limit (0.07 $\lambda$rms) or lower than it.

Above-described optical pickup apparatus in the second and third embodiments can be mounted in a recording apparatus for the audio and/or image, or a reproducing apparatus for the audio and/or image of a compatible player or drive, or an AV device in which these are assembled, personal computer, and other information terminals, for arbitrary different 2 or more of, that is, for a plurality of optical information recording media, such as, for example, a CD, CD-R, CD-RW, CD-Video, CD-ROM, DVD, DVD-ROM, DVD-RAM, DVD-R, DVD-RW, MD, etc.

Next, the structure of the objective lens and the optical pickup apparatus including it of the fourth embodiment of the present invention will be concretely described.

Figure 67:
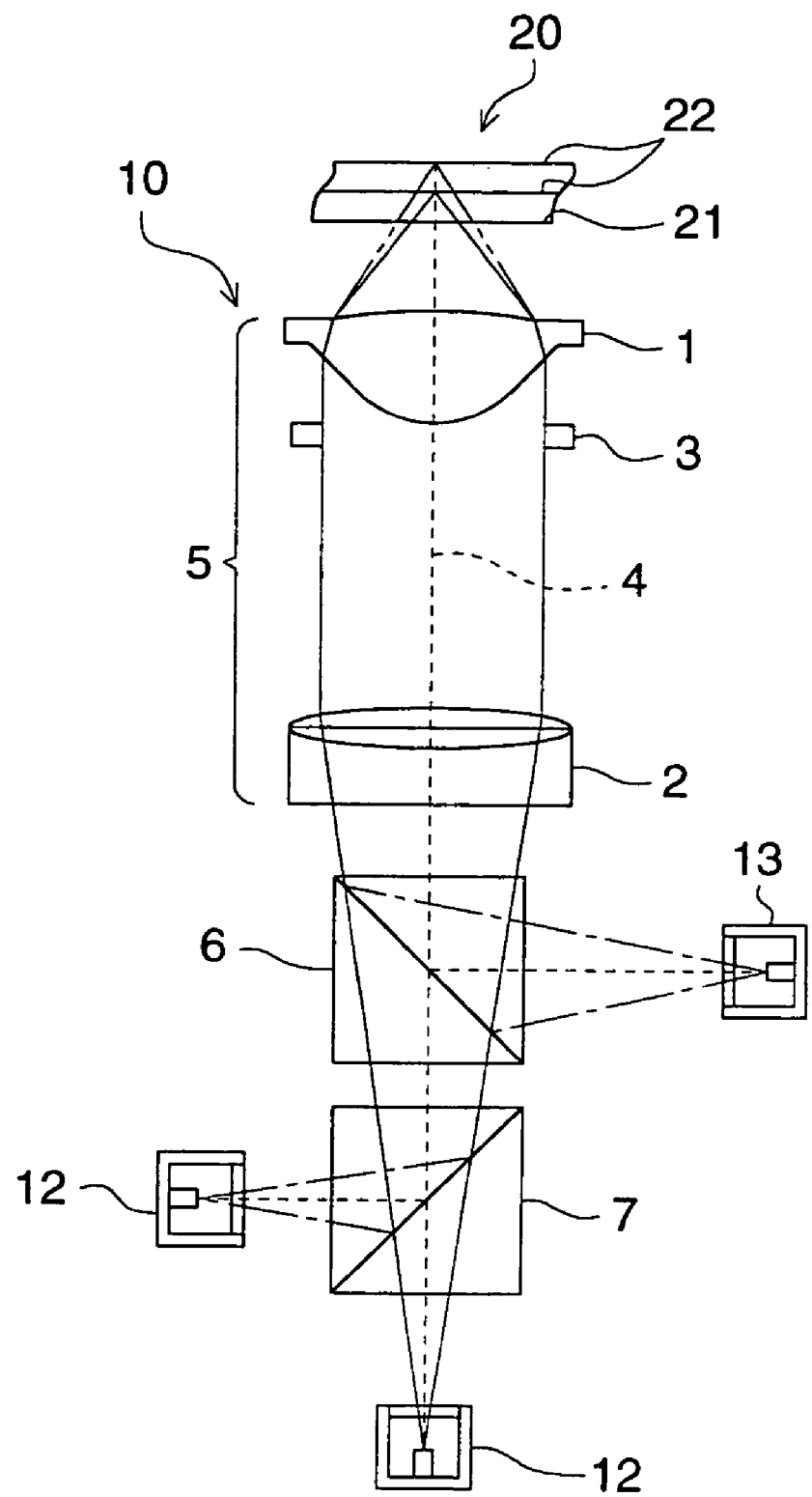
FIG. 67 is a view showing the structure of the optical pickup apparatus according to Embodiment 4 of the present invention.

FIG. 67 is a schematic structural view of the optical pickup apparatus 10 of the present embodiment. In FIG. 67, the common members to those in the second and the third embodiments are sometimes denoted by the same numeral code. In FIG. 67, the optical pickup apparatus 10 records/plays back a plurality of optical disks 20 which are optical information recording media. Hereinafter, the plurality of optical disks 20 will be described as the first optical disk (DVD) whose transparent substrate thickness is t1, and the second optical disk (blue laser use next-generation high density optical disk), and the third optical disk (CD) having the thickness t2 of the transparent substrate, which is different from t1. Herein, the thickness of the transparent substrate t1=0.6 mm, t2=1.2 mm.

The optical pickup apparatus 10 has, as the light source, the first semiconductor laser 11 (the wavelength $\lambda_1$=610 nm-670 nm) which is the first light source, the blue laser 12 (the wavelength $\lambda_2$=400 nm-440 nm) which is the second light source, and the second semiconductor laser 13 (the wavelength $\lambda_3$=740 nm-870 nm) which is the third light source. These first light source, second light source, and third light source are exclusively used corresponding to the optical disk to be recorded/played back.

The light converging optical system 5 is a means for converging the light flux emitted from the first semiconductor laser 11, blue laser 12 and second semiconductor laser 13 onto the information recording surface 22 through the transparent substrate 21 of the optical disk 20 and for forming the spot. In the present example, the light converging optical system 5 has the collimator lens 2 to convert the light flux emitted from the light source into the parallel light (may be almost parallel), and the objective lens 1 to converge the light flux converted to the parallel light by the collimator lens 2.

On both surfaces of the objective lens 1, the ring zonal diffraction surfaces which are concentric with the optical axis 4, are structured. Generally, in the case where the light converging optical system 5 is structured by only the aspherical refraction surface, when the spherical aberration is corrected for a certain wavelength $\lambda a$, the spherical aberration becomes under for the wavelength $\lambda b$ shorter than $\lambda a$. On the one hand, in the case where the refraction surface is used, when the spherical aberration is corrected for a certain wavelength $\lambda a$, the spherical aberration becomes over for the wavelength $\lambda b$ shorter than $\lambda a$. Accordingly, when the aspherical surface optical design by the refraction surface, and the coefficient of the phase difference function of the diffraction surface is appropriately selected, and the refraction power and the diffraction power are combined, the spherical aberration between different wavelengths can be corrected. Further, on the aspherical refraction surface, when the wavelength is different, the refraction power also changes, and the light converging position is also different. Accordingly, when the aspherical refraction surface is appropriately designed, the light with the different wavelength can also be conversed onto the information recording surface 22 of each transparent substrate 21.

On the above-described ring zonal diffraction surface, the aberration is corrected by using the first ordered diffracted ray for each light flux emitted from the first semiconductor laser 11, the blue laser 12 or the second semiconductor laser 13. When the same ordered diffracted ray corresponds to the light flux, the loss of the light amount is smaller than the case where the different ordered diffracted ray corresponds to the light flux, and further, when the first ordered diffracted ray is used, the loss of the light amount is smaller than the case where the higher ordered diffracted ray corresponds to the light flux. Accordingly, the objective lens 1 of the present embodiment is effective in the optical pickup apparatus to record the information onto the optical disk such as the DVD-RAM, into which the high density information is recorded. Further, the diffracted surface is desirable in that, for the light with 3 different wavelengths, the diffraction efficiency is maximum at the middle wavelength thereof, however, it may have the maximum diffraction efficiency at the wavelengths on the both ends thereof.

Further, when the phase difference function of the aspherical surface refraction surface and the ring zonal diffraction surface is appropriately designed, the spherical aberration generated by the difference of the thickness of the transparent substrate 21 of the optical disk 20 is corrected for each light flux emitted from the first semiconductor laser 11, blue laser 12 and second semiconductor laser 13. Further, in the phase difference function to show the position of the annular band formed on the objective lens 1, when the coefficient of the fourth power term and subsequent terms in the power series is used, the chromatic aberration of the spherical aberration can be corrected. Incidentally, as for the third optical disk (CD), the aperture in the practical use is NA 0.45, and the spherical aberration is corrected within NA 0.45, and the spherical aberration in the outside range of NA 0.45 is made the flare. The light flux passing through an area within NA 0.45 forms the light spot on the information recording surface, and the flare light passing the outside of NA 0.45 passes through a distant area from the light spot on the information recording surface so that it does not affect badly. According to these corrections, for each optical disk 20, the aberration of the light converging spot on the information recording surface becomes almost the same degree as the diffraction limit (0.07 $\lambda$rms) or lower than that.

In the present embodiment, the diaphragm 3 provided in the optical path is a diaphragm having the fixed numeral aperture (NA 0.65), and superfluous mechanism is not needed, therefore, cost reduction can be realized. Incidentally, when the third disk is recorded and/or played back, the numeral aperture of the diaphragm 3 may be changeable so that the unnecessary light (more than NA 0.45) can be removed. Further, the beam splitter 67 is used for adjusting the optical axis of each laser light. The light detector (not shown) may be, as well known, respectively provided for each of light sources, or one light detector may receive the reflected light corresponding to 3 light sources 11, 12 and 13.

Next, the objective lens of the fifth embodiment of the present invention will be described.

In the present embodiment, on the ring zonal diffraction surface, only a point that the phase difference function to express the position of the annular band uses the coefficient of second power term in the power series, is different from the objective lens in the above described fourth embodiment, and thereby, the axial chromatic aberration can also be corrected. Further, according to the objective lens of the present embodiment, in the same manner as the fourth embodiment, for each optical disk 20, the aberration of the light converging spot on the information recording surface 22 becomes almost the same degree as the diffraction limit (0.07 $\lambda$rms) or smaller than that.

Next, the optical pickup apparatus of the sixth embodiment of the present invention will be described.

In the optical pickup apparatus of the present embodiment, for the first optical disk (for example, DVD) and the second optical disk (for example, blue laser use next-generation high density optical disk), the light flux emitted from the light source is made into the parallel light by the coupling lens, and for the third optical disk (for example, CD), the light flux emitted from the light source is made into the divergent light by the coupling lens, and these are respectively converged by the objective lens. The thickness of the transparent substrates 21 of the first and the second optical disks is 0.6 mm, and the thickness of the transparent substrate 21 of the third optical disk is 1.2 mm.

In the present embodiment, both of the spherical aberration of the first optical disk and the second optical disk are corrected within the diffraction limit by the effect of the diffraction surface, and for the third optical disk, the spherical aberration generated by the thickness of the disk larger than that of the first and second optical disks is mainly cancelled by the spherical aberration generated by entrance of the divergent light flux into the objective lens, and the spherical aberration at the numerical aperture lower than a predetermined numerical aperture NA necessary for recording/reproducing of the third optical disk, for example, NA 0.5, or NA 0.45, is made to be corrected within the diffraction limit.

Accordingly, when, for the optical information recording media corresponding to each wavelength of $\lambda_1$, $\lambda_2$, $\lambda_3$ ($\lambda_1 < \lambda_2 < \lambda_3$), predetermined numerical apertures necessary for recording/reproducing them are NA1, NA2 and NA3, for respective wavelengths, RMS of the wave front aberration can be corrected to a lower value than 0.07 $\lambda_1$ within the range of NA1, to a lower value than 0.07 $\lambda_2$ within the range of NA2, and to a lower value than 0.07 $\lambda_3$ within the range of NA3.

Further, for the third optical disk, it is not preferable that the beam spot diameter becomes too small by the light flux of the numerical aperture NA larger than a predetermined numerical aperture NA. Accordingly, it is preferable that, in the same manner as the fourth embodiment, in the numerical aperture larger than a necessary numerical aperture, the spherical aberration is made the flare.

The above-described optical pickup apparatus having 3 light sources with different wavelength light in the fourth- the sixth embodiments, can be mounted in a recording apparatus for the audio and/or image, or a reproducing apparatus for the audio and/or image of a compatible player or drive, or an AV device in which these are assembled, personal computer, and other information terminals, for arbitrary different 2 or more of, that is, for a plurality of optical information recording media, such as, for example, a CD, CD-R, CD-RW, CD-Video, CD-ROM, DVD, DVD-ROM, DVD-RAM, DVD-R, DVD-RW, MD, etc.

EXAMPLE

Examples of the objective lens of the present invention will be described below.

Examples 1-8

The objective lens in Examples 1-8 is concrete examples of the objective lens according to the first embodiment, and has the aspherical shape expressed by the following [Equation 3] on the refraction surface.

$$Z = \frac{h_2/R_o}{1+\sqrt{1-(1+\kappa)(h/R_o)_2}} + \sum_{i=2}^{\infty} A_{2i}h_{2i} \quad \text{[Equation 3]}$$

Where, Z is an axis in the optical axis direction, h is an axis in the perpendicular direction to the optical axis (height from the optical axis: an advance direction of the light is positive), R0 is the paraxial radius of curvature, $\kappa$ is a conical coefficient, A is an aspherical coefficient, and 2i is an exponent of the aspherical surface. Further, in Examples 1-3, 6-8, the diffraction surface is expressed by [Equation 1] as the phase difference function $\Phi B$ in a unit of radian, and in the same manner, in Examples 4 and 5, the diffraction surface is expressed by [Equation 2] as the optical path difference function $\Phi b$ in a unit of mm.

$$\Phi_B = \sum_{i=1}^{\infty} B_{2i}h_{2i} \quad \text{[Equation 1]}$$

$$\Phi_b = \sum_{i=1}^{\infty} b_{2i}h_{2i} \quad \text{[Equation 2]}$$

Example 1

Figure 1:
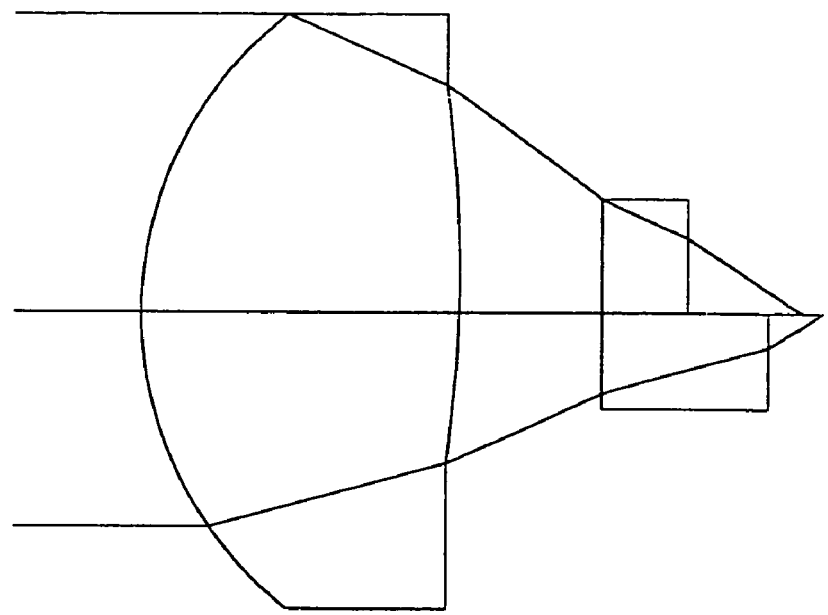
FIG. 1 is a view of the optical path of a diffraction optical lens of Example 1 of the present invention.
Figure 2:
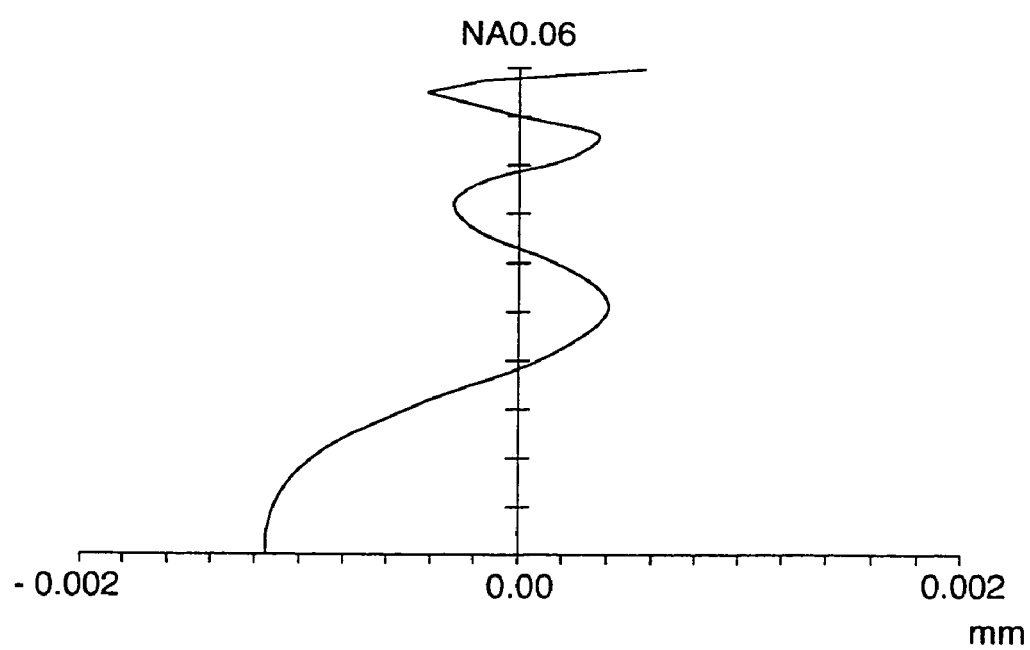
FIG. 2 is a view of the spherical aberration to a wavelength $\lambda=635$ nm by the diffraction optical lens of Example 1 of the present invention.
Figure 3:
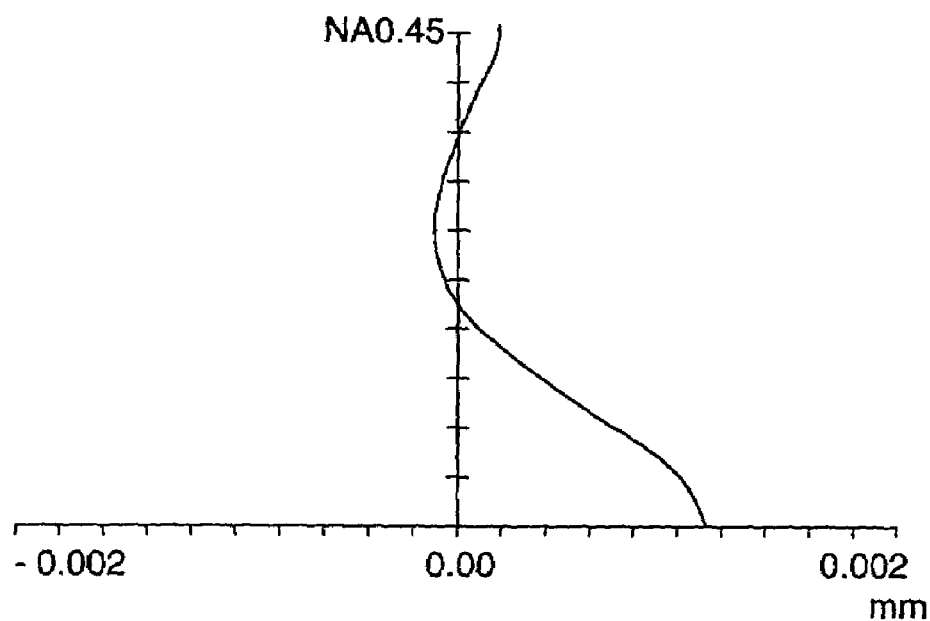
FIG. 3 is a view of the spherical aberration up to NA 0.45 to a wavelength $\lambda=780$ nm by the diffraction optical lens of Example 1 of the present invention.
Figure 4:
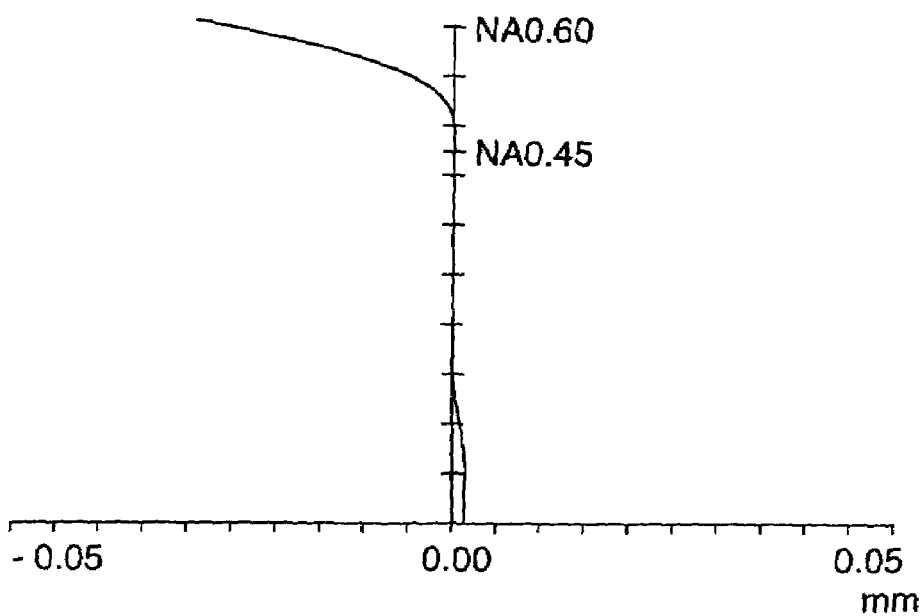
FIG. 4 is a view of the spherical aberration up to NA 0.60 to the wavelength $\lambda=780$ nm by the diffraction optical lens of Example 1 of the present invention.

A view of the optical path of the diffraction optical lens (the objective lens having the diffraction surface) which is the objective lens in Example 1, is shown in FIG. 1. A view of the spherical aberration up to the numerical aperture 0.60 to $\lambda$=635 nm for the diffraction optical lens in Example 1, is shown in FIG. 2. Further, views of the spherical aberration up to the numerical apertures 0.45 and 0.60 to the wavelength $\lambda$=780 nm for the diffraction optical lens in Example 1, are shown in FIG. 3 and FIG. 4. Incidentally, although the diffractive lens shown in FIG. 1 is provided blazed type coaxial annular bands on its entire lens surface, a relief shape of the diffractive section is omitted in this figure. Also, in the following figures, the relief shape of the diffractive section is omitted.

According to the diffraction optical lens in Example 1, as shown in FIG. 2, at all apertures up to NA 0.60 to the wavelength $\lambda$=635 nm, there is almost no aberration. Further, as shown in FIG. 3, to the wavelength $\lambda$=780 nm, up to NA 0.45 which is a range of practical use, there is almost no aberration. In the portion of NA 0.45-0.60 of the outside of it, as shown in FIG. 4, the spherical aberration is largely under, and is made the flare. According to this, an appropriate spot diameter can be obtained.

Figure 5:
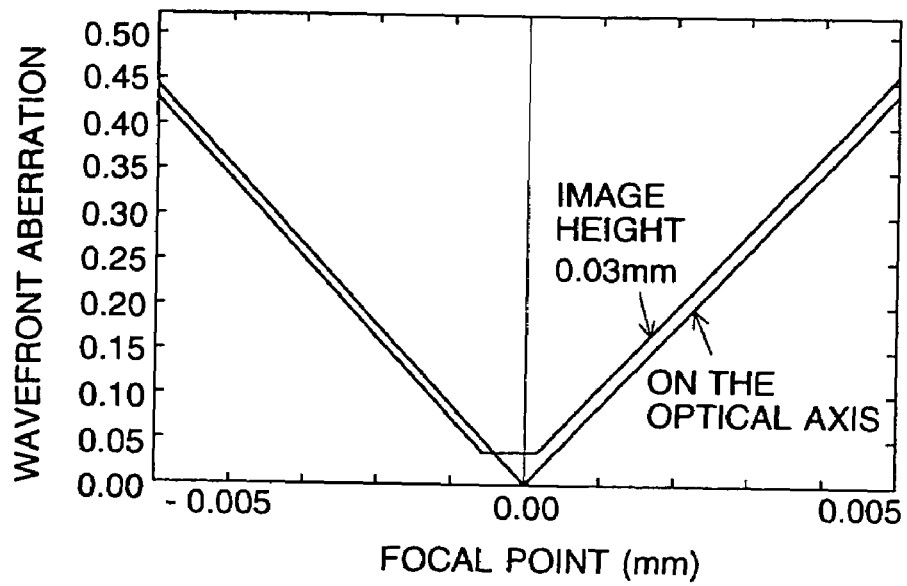
FIG. 5 is a view of the wave front aberration to the wavelength $\lambda=635$ nm by the diffraction optical lens of Example 1 of the present invention.
Figure 6:
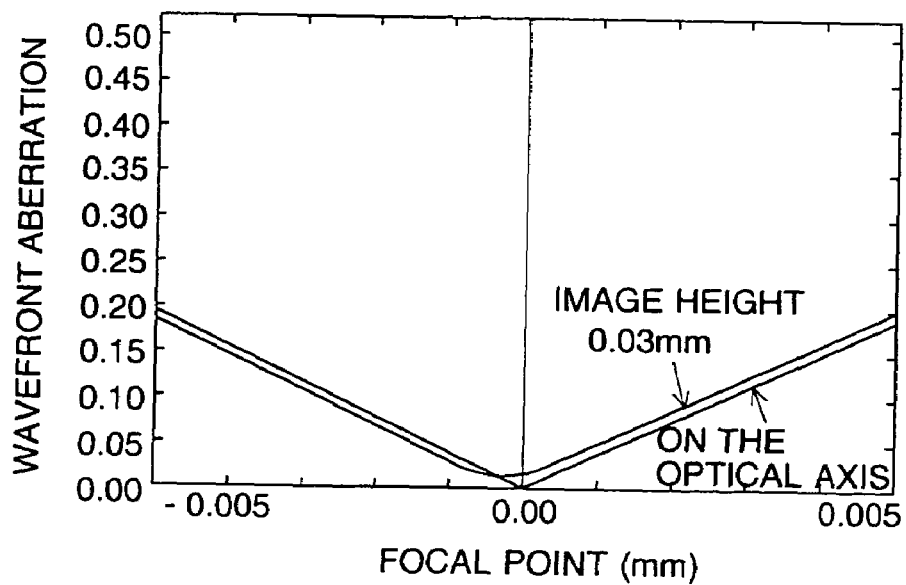
FIG. 6 is a view of the wave front aberration to the wavelength $\lambda=780$ nm by the diffraction optical lens of Example 1 of the present invention.

Views of the wave front aberration to the wavelengths $\lambda$=635 nm and $\lambda$=780 nm of the diffraction lens in Example 1 are respectively shown in FIG. 5 and FIG. 6. As can be seen from these views, according to the diffraction optical lens in Example 1, to any wavelength, there is no aberration on the optical axis, and even in the case of the image height 0.03, the aberration is on the level of almost no aberration in the practical use.

Lens data of Example 1 will be shown as follows. In [Table 1], R is the radius of curvature, d is the space between surfaces, n is the refractive index at the main wavelength, and $\nu$ is Abbe's number.

Example 1

When the wavelength of the light source $\lambda1=635$ nm, the focal distance f1=3.34, the numerical aperture NA1=0.60, infinity specification.

When the wavelength of the light source $\lambda2=780$ nm, the focal distance f2=3.36, the numerical aperture NA2=0.45, infinity specification.

In this embodiment, in the light flux of $\lambda1$, an amount of +first ordered diffracted ray is generated to be greater than that of any other ordered diffracted ray. Also, in the light flux of $\lambda2$, an amount of +first ordered diffracted ray is generated to be greater than that of any other ordered diffracted ray. Assuming that the diffracting efficiency of +first ordered diffracted ray for the light flux of $\lambda1$ is 100%, the diffracting efficiency for the light flux of $\lambda2$ is 84%. Further, assuming that the diffracting efficiency of +first ordered diffracted ray for the light flux of $\lambda2$ is 100%, the diffracting efficiency for the light flux of $\lambda1$ is 89%.

TABLE 1

| Surface No. | R | $d_1$ | $d_2$ | $n_1$ | $n_2$ | vd | nd |
|---|---|---|---|---|---|---|---|
| 1 (Aspherical surface 1 · diffraction surface) | 2.126 | 2.2 | 2.2 | 1.53829 | 1.53388 | 56 | 1.5404 |
| 2 (Aspherical surface 2) | −7.370 | 1.0 | 1.0 | | | | |
| 3 Cover glass | ∞ | 0.6 | 1.2 | 1.58139 | 1.57346 | 30 | 1.585 |
| 4 | ∞ | | | | | | |

(Subscript 1 is at $\lambda_1 = 635$ nm, subscript 2 is at $\lambda_2 = 780$ nm, vd and nd respectively show values to d-line.)

Aspherical coefficient

| Aspherical surface 1 | Aspherical surface 2 |
|---|---|
| $\kappa = -0.10721$ | $\kappa = -11.653$ |
| $A4 = -0.0032315$ | $A4 = 0.0038456$ |
| $A6 = -0.00058160$ | $A6 = -0.020800$ |
| $A8 = -4.6316 \times 10^{-5}$ | $A8 = 0.0078684$ |
| $A10 = -3.79858 \times 10^{-5}$ | $A10 = -0.0019431$ |
| $A12 = -6.0308 \times 10^{-6}$ | $A12 = 0.00024343$ |

Diffraction surface coefficient $B2 = -96.766$
$B4 = -2.9950$
$B6 = 2.1306$
$B8 = -0.12614$
$B10 = -0.095285$

Example 2, Example 3

Figure 7:
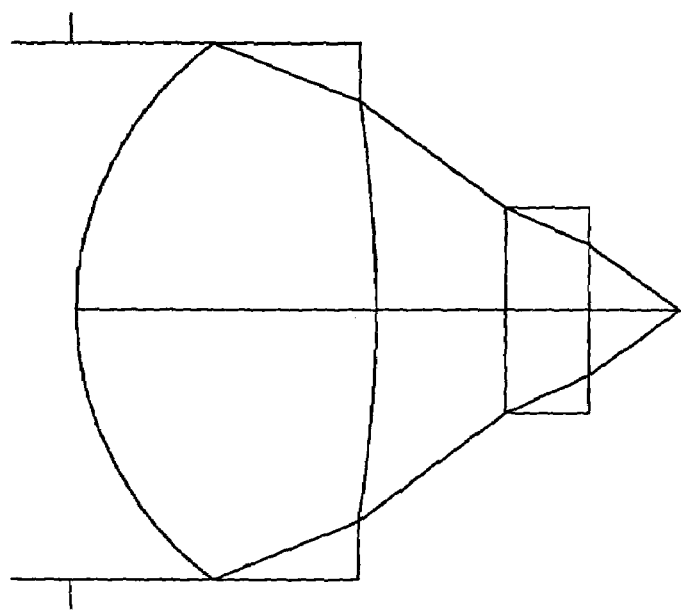
FIG. 7 is a view of the optical path to the wavelength 405 nm by a diffraction optical lens of Example 2 of the present invention.
Figure 9:
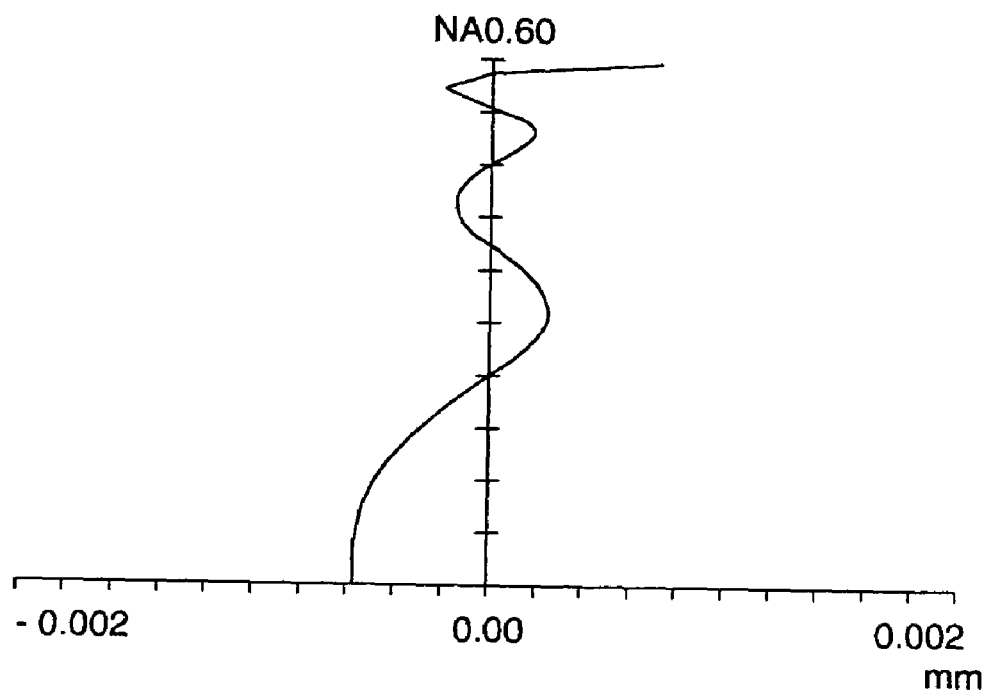
FIG. 9 is a view of the spherical aberration to the wavelength $\lambda=405$ nm by the diffraction optical lens of Example 2 of the present invention.
Figure 10:
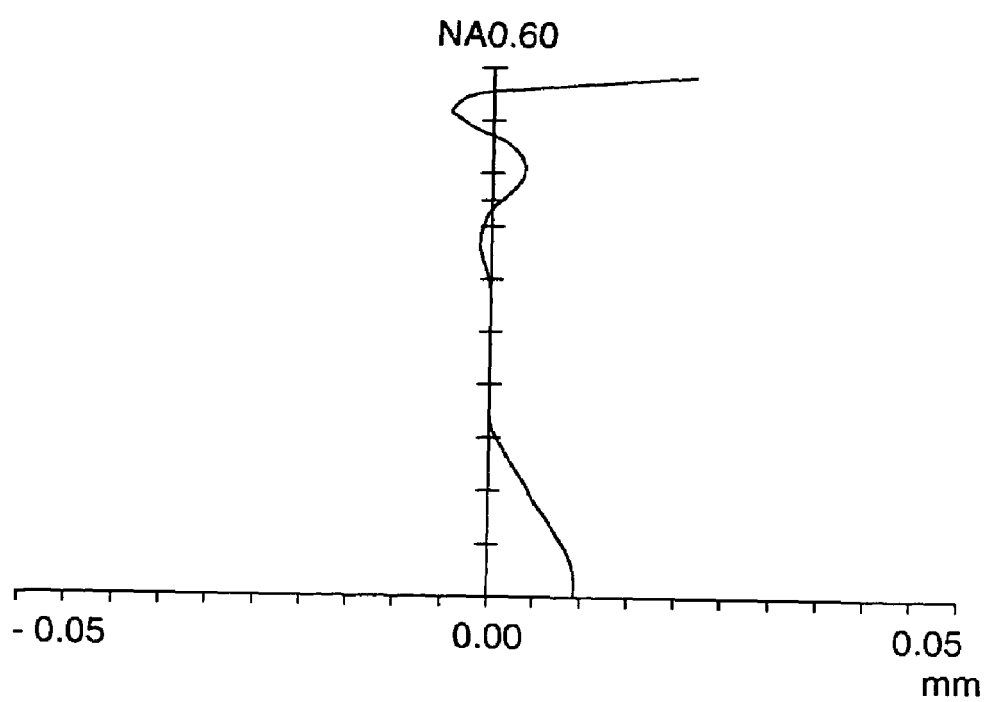
FIG. 10 is a view of the spherical aberration to the wavelength $\lambda=635$ nm by the diffraction optical lens of Example 2 of the present invention.
Figure 11:
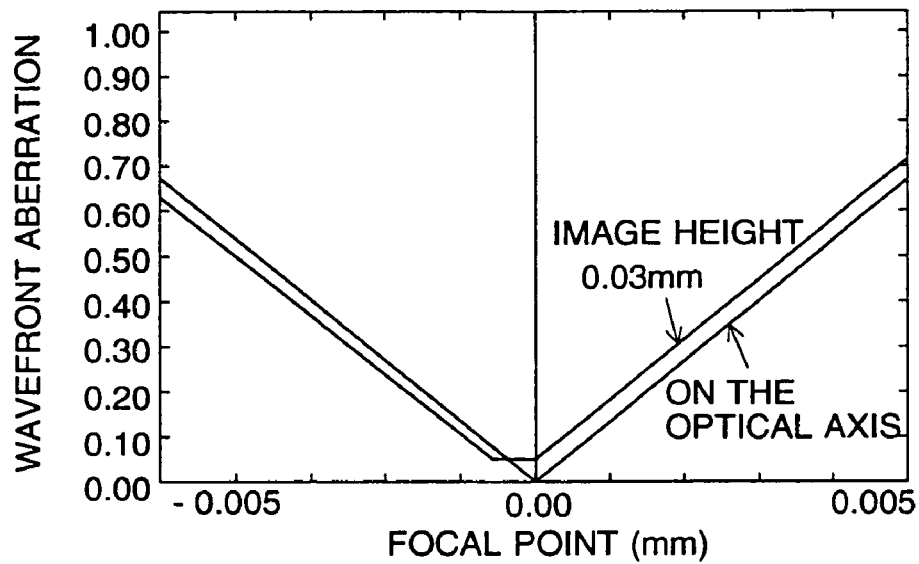
FIG. 11 is a view of the wave front aberration to the wavelength $\lambda=405$ nm by the diffraction optical lens of Example 2 of the present invention.

Next, Example 2 and Example 3 will be described. Views of the optical paths of the diffraction optical lens, which is the objective lens in Example 2, to $\lambda=405$ nm and 635 nm will be respectively shown in FIG. 7 and FIG. 8. Further, in FIG. 9 and FIG. 10, views of the spherical aberration up to the numerical aperture 0.60 to $\lambda=405$ nm and 635 nm for the diffraction optical lens in Example 2 will be respectively shown. Further, in FIG. 11 and FIG. 12, views of the wave front aberration to the wavelengths $\lambda=405$ nm and 635 nm for the diffraction optical lens in Example 2 will be respectively shown.

Figure 13:
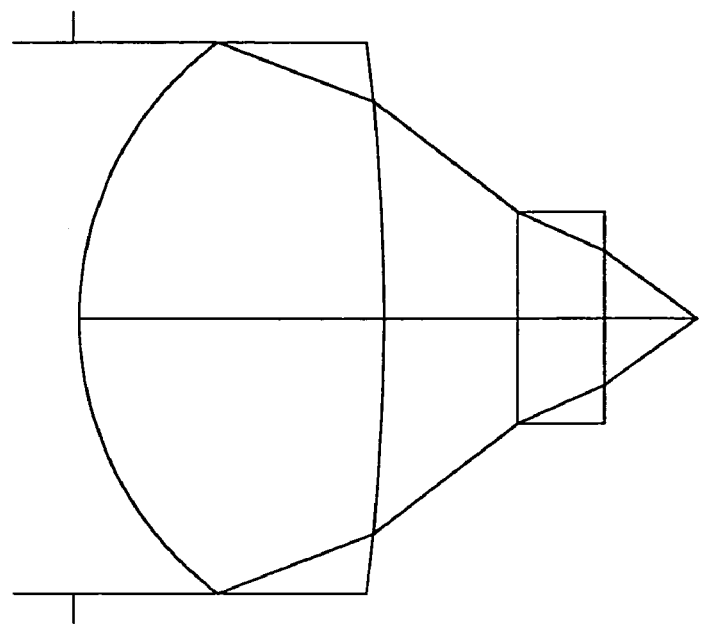
FIG. 13 is a view of the optical path to the wavelength $\lambda=405$ nm by a diffraction optical lens of Example 3 of the present invention.
Figure 14:
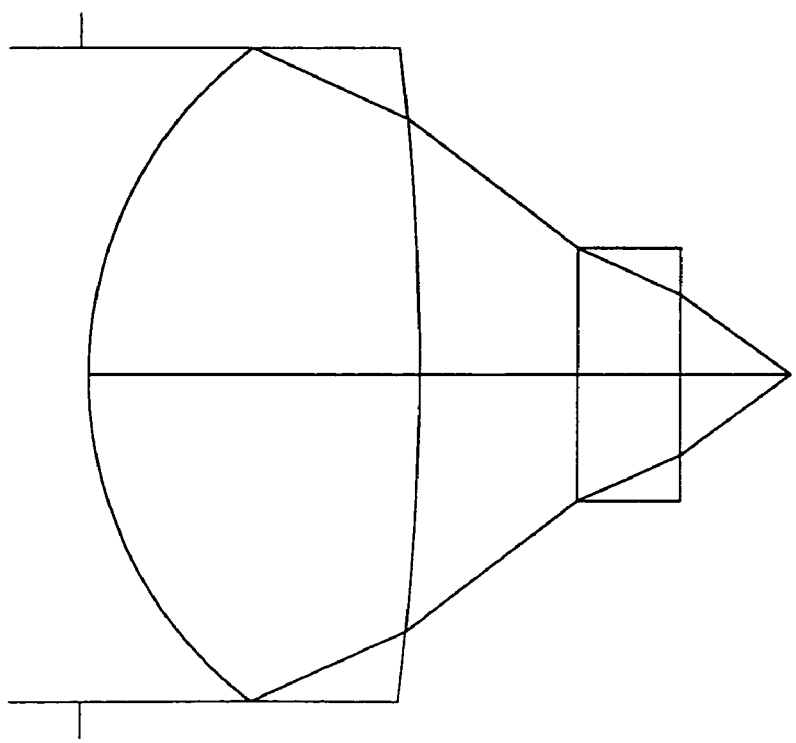
FIG. 14 is a view of the optical path to the wavelength $\lambda=635$ nm by the diffraction optical lens of Example 3 of the present invention.
Figure 15:
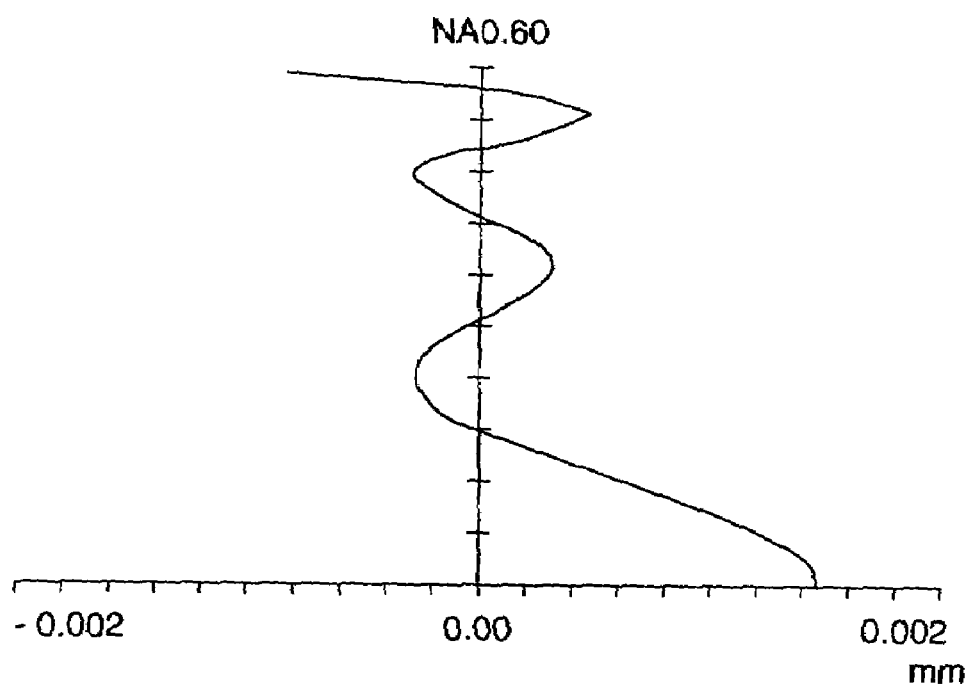
FIG. 15 is a view of the spherical aberration to the wavelength $\lambda=405$ nm by the diffraction optical lens of Example 3 of the present invention.
Figure 16:
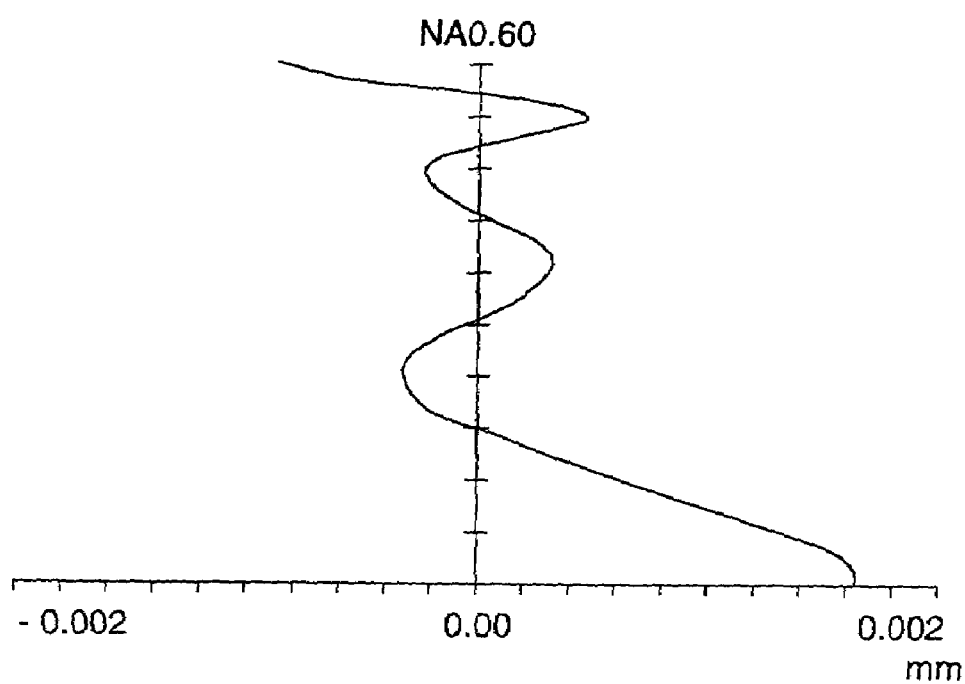
FIG. 16 is a view of the spherical aberration to the wavelength $\lambda=635$ nm by the diffraction optical lens of Example 3 of the present invention.
Figure 17:
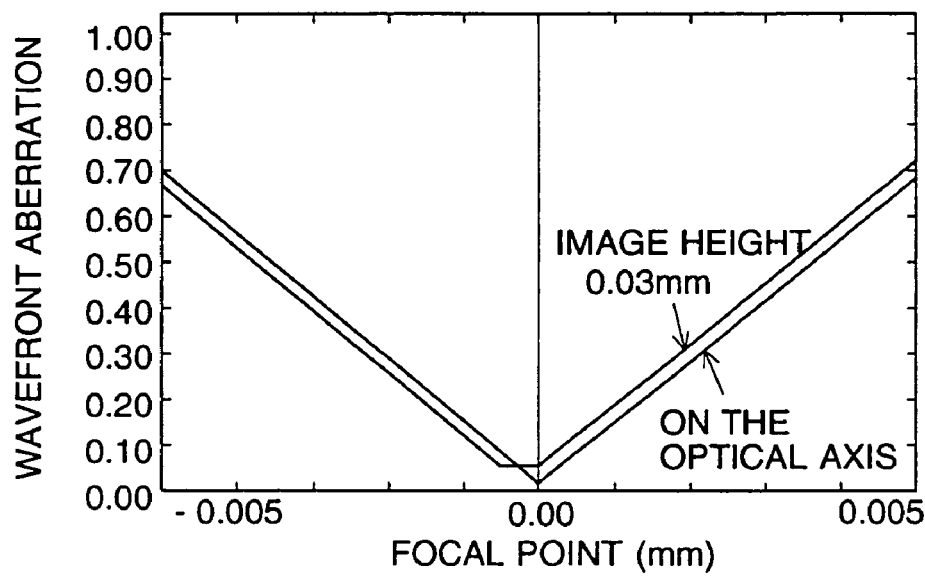
FIG. 17 is a view of the wave front aberration to the wavelength $\lambda=405$ nm by the diffraction optical lens of Example 3 of the present invention.
Figure 18:
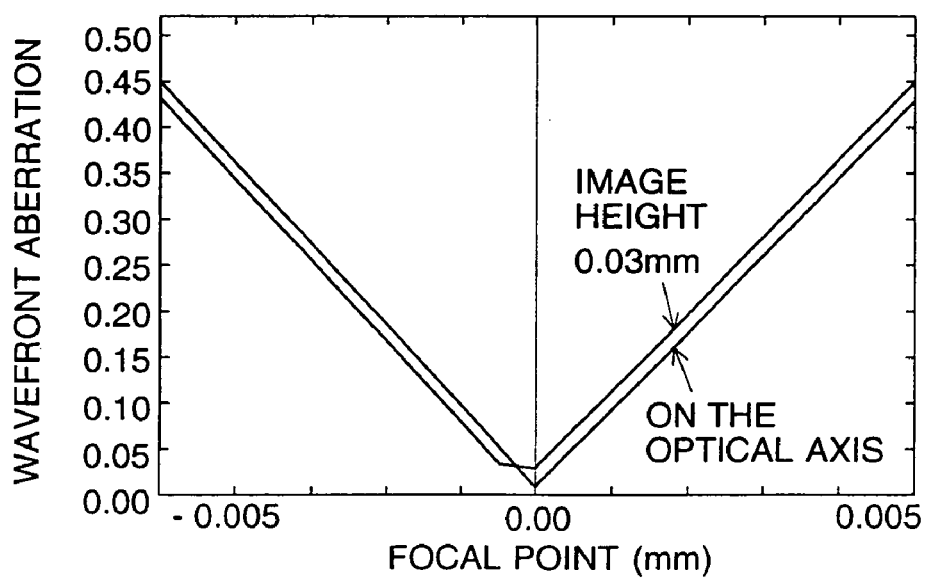
FIG. 18 is a view of the wave front aberration to the wavelength $\lambda=635$ nm by the diffraction optical lens of Example 3 of the present invention.

Further, in FIG. 13 and FIG. 14, views of the optical paths of the diffraction optical lens, which is the objective lens in Example 3, to $\lambda=405$ nm and 635 nm will be respectively shown. Further, in FIG. 15 and FIG. 16, views of the spherical aberration up to the numerical aperture 0.60 to $\lambda=405$ nm and 635 nm for the diffraction optical lens in Example 3 will be respectively shown. Further, in FIG. 17 and FIG. 18, views of the wave front aberration to the wavelengths $\lambda=405$ nm and 635 nm for the diffraction optical lens in Example 3 will be respectively shown.

In Examples 2 and 3, the thickness of the substrates are both 0.6 mm to the wavelength $\lambda=405$ nm and the wavelength $\lambda=635$ nm, and NA is 0.6, and the wave front aberration is almost no aberration on the optical axis, and even at the image height 0.03 mm, it is on the level of practically almost no-aberration.

Lens data of Examples 2 and 3 will be shown below.

Example 2

When the wavelength of the light source $\lambda1=405$ nm, the focal distance f1=3.23, the numerical aperture NA1=0.60, infinite specification.

When the wavelength of the light source $\lambda2=635$ nm, the focal distance f2=3.34, the numerical aperture NA2=0.60, infinite specification.

In this embodiment, in the light flux of $\lambda1$, an amount of +first ordered diffracted ray is generated to be greater than that of any other ordered diffracted ray. Also, in the light flux of $\lambda2$, an amount of +first ordered diffracted ray is generated to be greater than that of any other ordered diffracted ray.

TABLE 2

| Surface No. | R | $d_1$ | $d_2$ | $n_1$ | $n_2$ | vd | nd |
|---|---|---|---|---|---|---|---|
| 1 (Aspherical surface 1 · diffraction surface) | 2.128 | 2.2 | 2.2 | 1.55682 | 1.53829 | 56 | 1.5405 |
| 2 (Aspherical surface 2) | −7.359 | 1.0 | 1.0 | | | | |
| 3 Cover glass | ∞ | 0.6 | 0.6 | 1.62230 | 1.58139 | 30 | 1.585 |
| 4 | ∞ | | | | | | |

(Subscript 1 is at $\lambda_1 = 405$ nm, subscript 2 is at $\lambda_2 = 635$ nm, vd and nd respectively show values to d-line.)

Aspherical coefficient

| Aspherical surface 1 | Aspherical surface 2 |
|---|---|
| $\kappa = -0.15079$ | $\kappa = -3.8288$ |
| $A4 = -0.0021230$ | $A4 = 0.0036962$ |
| $A6 = -0.00076528$ | $A6 = -0.020858$ |
| $A8 = -8.84957 \times 10^{-5}$ | $A8 = 0.0079732$ |
| $A10 = -3.49803 \times 10^{-5}$ | $A10 = -0.0018713$ |
| $A12 = -2.38916 \times 10^{-6}$ | $A12 = 0.00022504$ |

Diffraction surface coefficient $B2 = 0.0$
$B4 = -6.7169$
$B6 = 2.0791$
$B8 = -0.31970$
$B10 = 0.00016708$

Example 3

When the wavelength of the light source $\lambda1=405$ nm, the focal distance f1=3.31, the numerical aperture NA1=0.60, infinite specification.

When the wavelength of the light source $\lambda2=635$ nm, the focal distance f2=3.34, the numerical aperture NA2=0.60, infinite specification.

In this embodiment, in the light flux of $\lambda1$, an amount of +first ordered diffracted ray is generated to be greater than that of any other ordered diffracted ray. Also, in the light flux of λ2, an amount of +first ordered diffracted ray is generated to be greater than that of any other ordered diffracted ray.

TABLE 3

| Surface No. | R | $d_1$ | $d_2$ | $n_1$ | $n_2$ | vd | nd |
|---|---|---|---|---|---|---|---|
| 1 (Aspherical surface 1 · diffraction surface) | 2.300 | 2.2 | 2.2 | 1.55682 | 1.53829 | 56 | 1.5404 |
| 2 (Aspherical surface 2) | −7.359 | 1.0 | 1.0 | | | | |
| 3 Cover glass | ∞ | 0.6 | 0.6 | 1.62230 | 1.58139 | 30 | 1.585 |
| 4 | ∞ | | | | | | |

(Subscript 1 is at $\lambda_1 = 405$ nm, subscript 2 is at $\lambda_2 = 635$ nm, vd and nd respectively show values to d-line.)

Aspherical coefficient

| Aspherical surface 1 | Aspherical surface 2 |
|---|---|
| κ = −0.19029 | κ = 6.4430 |
| A4 = 0.00030538 | A4 = 0.037045 |
| A6 = −0.0010619 | A6 = −0.021474 |
| A8 = −7.5747 × $10^{-5}$ | A8 = 0.0078175 |
| A10 = −6.7599 × $10^{-5}$ | A10 = −0.0016064 |
| A12 = −3.3788 × $10^{-6}$ | A12 = 0.00014332 |

Diffraction surface coefficient

B2 = −96.766
B4 = −2.9950
B6 = −0.25560
B8 = −0.08789
B10 = 0.014562

Example 4, Example 5

Figure 19:
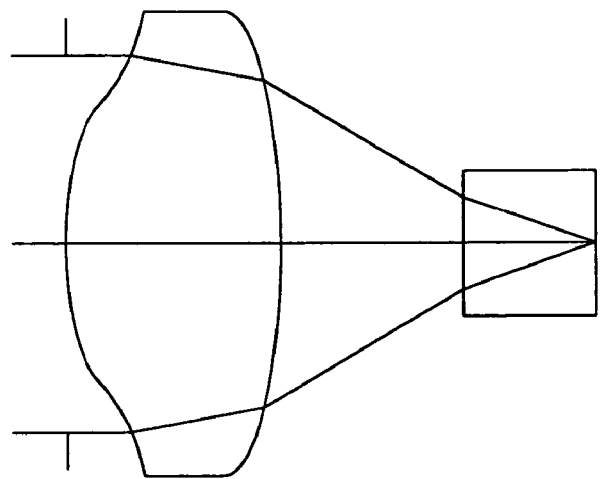
FIG. 19 is a view of the optical path by a diffraction optical lens of Example 4 of the present invention.

Next, Example 4 and Example 5 on which the chromatic aberration correction is conducted, will be described. Views of the optical paths of the diffraction optical lens, which is the objective lens in Example 4, will be respectively shown in FIG. 19. Further, in FIG. 20, views of the spherical aberration up to the numerical aperture 0.50 to λ=635 nm, 650 nm and 780 nm for the diffraction optical lens in Example 4 will be respectively shown. Further, in FIG. 21, views of the optical paths of the diffraction optical lens, which is the objective lens in Example 5, will be respectively shown. Further, in FIG. 22, views of the spherical aberration up to the numerical aperture 0.50 to λ=635 nm, 650 nm and 780 nm for the diffraction optical lens in Example 5 will be respectively shown.

Figure 20:
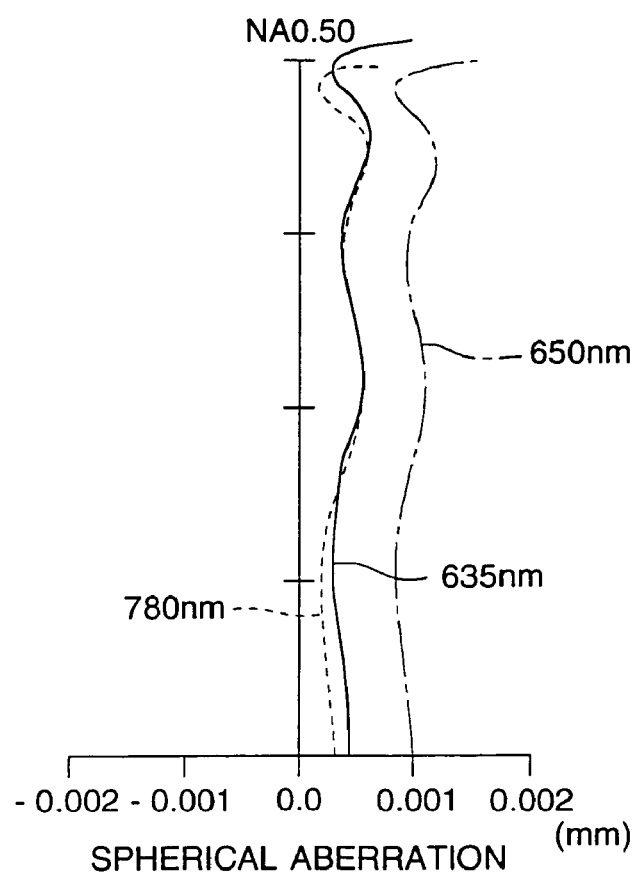
FIG. 20 is a view of the spherical aberrations to the wavelengths $\lambda=635$ nm, 650 nm, and 780 nm by the diffraction optical lens of Example 4 of the present invention.
Figure 21:
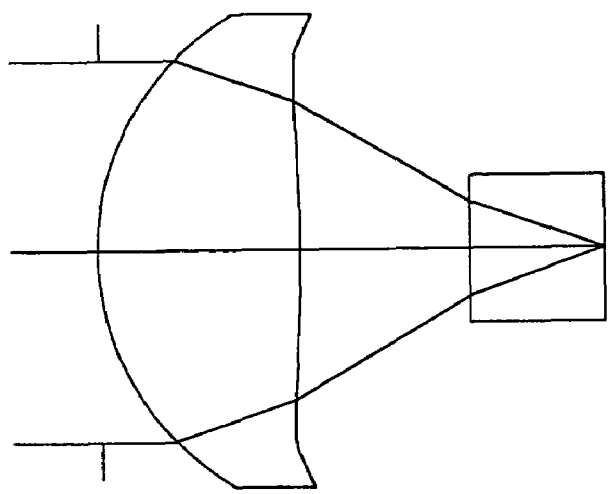
FIG. 21 is a view of the optical path by a diffraction optical lens of Example 5 of the present invention.
Figure 22:
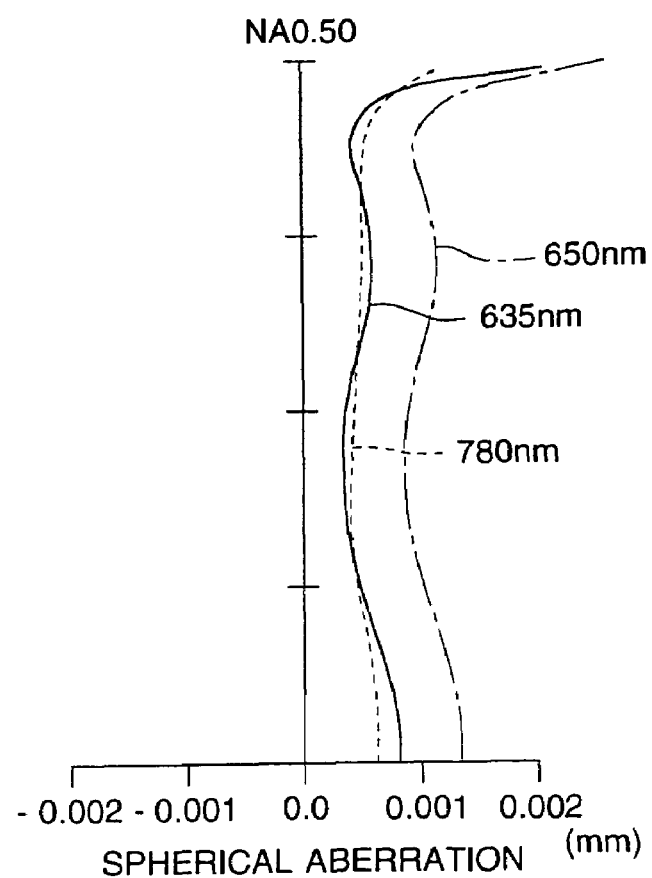
FIG. 22 is a view of the spherical aberrations to the wavelengths $\lambda=635$ nm, 650 nm, and 780 nm by the diffraction optical lens of Example 5 of the present invention.

As can be seen from FIG. 20 and FIG. 22, according to the diffraction optical lens in Examples 4 and 5, to the wavelength λ=635 nm and the wavelength λ=780 nm, slippage due to color is almost perfectly corrected, and to the wavelength λ=650 nm, it is also corrected to the degree of practically no-problem.

Lens data of Examples 4 and 5 will be shown below.

Example 4

When the wavelength of the light source λ1=635 nm, the focal distance f1=3.40, the numerical aperture NA1=0.50, infinite specification.

When the wavelength of the light source 2=780 nm, the focal distance f2=3.41, the numerical aperture NA2=0.50, infinite specification.

In this embodiment, in the light flux of λ1, an amount of +first ordered diffracted ray is generated to be greater than that of any other ordered diffracted ray. Also, in the light flux of λ2, an amount of +first ordered diffracted ray is generated to be greater than that of any other ordered diffracted ray.

TABLE 4

| Surface No. | R | $d_1$ | $d_2$ | $n_1$ | $n_2$ | vd | nd |
|---|---|---|---|---|---|---|---|
| 1 (Aspherical surface 1 · diffraction surface) | 2.442 | 1.90 | 1.90 | 1.5417 | 1.5373 | 56 | 1.5438 |
| 2 (Aspherical surface 2) | −5.990 | 1.68 | 1.68 | | | | |
| 3 Cover glass | ∞ | 1.20 | 1.20 | 1.5790 | 1.5708 | 30 | 1.5830 |
| 4 | ∞ | | | | | | |

(Subscript 1 is at $\lambda_1 = 635$ nm, subscript 2 is at $\lambda_2 = 780$ nm, vd and nd respectively show values to d-line.)

Aspherical coefficient

| Aspherical surface 1 | Aspherical surface 2 |
|---|---|
| κ = −0.53245 | κ = 7.3988 |
| A4 = 0.24033 × $10^{-2}$ | A4 = 0.90408 × $10^{-2}$ |
| A6 = −0.91472 × $10^{-3}$ | A6 = −0.18704 × $10^{-2}$ |
| A8 = 0.15590 × $10^{-4}$ | A8 = −0.47368 × $10^{-3}$ |
| A10 = −0.11131 × $10^{-3}$ | A10 = 0.16891 × $10^{-3}$ |

Diffraction surface coefficient b2 = −0.36764 × $10^{-2}$
b4 = −0.91727 × $10^{-4}$
b6 = −0.34903 × $10^{-4}$
b8 = 0.77485 × $10^{-5}$
b10 = −0.15750 × $10^{-5}$

Example 5

When the wavelength of the light source λ1=635 nm, the focal distance f1=3.40, the numerical aperture NA1=0.50, infinite specification.

When the wavelength of the light source λ2=780 nm, the focal distance f2=3.40, the numerical aperture NA2=0.50, infinite specification.

In this embodiment, in the light flux of λ1, an amount of +first ordered diffracted ray is generated to be greater than that of any other ordered diffracted ray. Also, in the light flux of λ2, an amount of +first ordered diffracted ray is generated to be greater than that of any other ordered diffracted ray.

TABLE 5

| Surface No. | R | $d_1$ | $d_2$ | $n_1$ | $n_2$ | vd | nd |
|---|---|---|---|---|---|---|---|
| 1 (Aspherical surface 1 · diffraction surface) | 2.160 | 1.80 | 1.80 | 1.5417 | 1.5373 | 56 | 1.5438 |
| 2 (Aspherical surface 2) | −11.681 | 1.64 | 1.64 | | | | |
| 3 Cover glass | ∞ | 1.20 | 1.20 | 1.5790 | 1.5708 | 30 | 1.5830 |
| 4 | ∞ | | | | | | |

(Subscript 1 is at $\lambda_1 = 635$ nm, subscript 2 is at $\lambda_2 = 780$ nm, vd and nd respectively show values to d-line.)

Aspherical coefficient

| Aspherical surface 1 | Aspherical surface 2 |
|---|---|
| κ = −0.17006 | κ = −40.782 |
| A4 = −0.30563 × $10^{-2}$ | A4 = 0.73447 × $10^{-2}$ |
| A6 = −0.45119 × $10^{-3}$ | A6 = 0.85177 × $10^{-3}$ |
| A8 = 0.58811 × $10^{-5}$ | A8 = −0.82795 × $10^{-3}$ |
| A10 = −0.13002 × $10^{-4}$ | A10 = 0.23029 × $10^{-3}$ |

TABLE 5-continued

Diffraction surface coefficient b2 = −0.74461 × 10$^{-2}$
b4 = 0.11193 × 10$^{-2}$
b6 = −0.85257 × 10$^{-3}$
b8 = 0.50517 × 10$^{-3}$
b10 = −0.11242 × 10$^{-3}$ Examples 6-8

Figure 23:
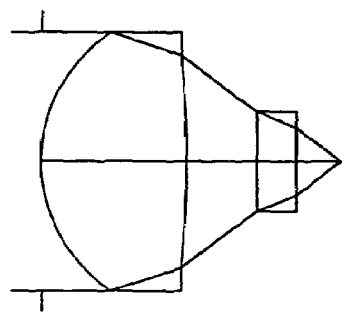
FIG. 23 is a view of the optical path to the wavelength $\lambda=650$ nm, by a diffraction optical lens of Example 6 of the present invention.
Figure 24:
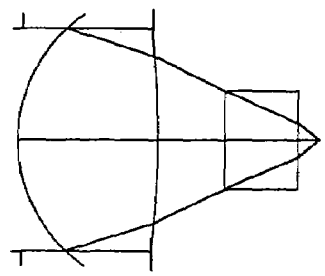
FIG. 24 is a view of the optical path to the wavelength $\lambda=780$ nm (NA=0.5), by the diffraction optical lens of Example 6 of the present invention.
Figure 25:
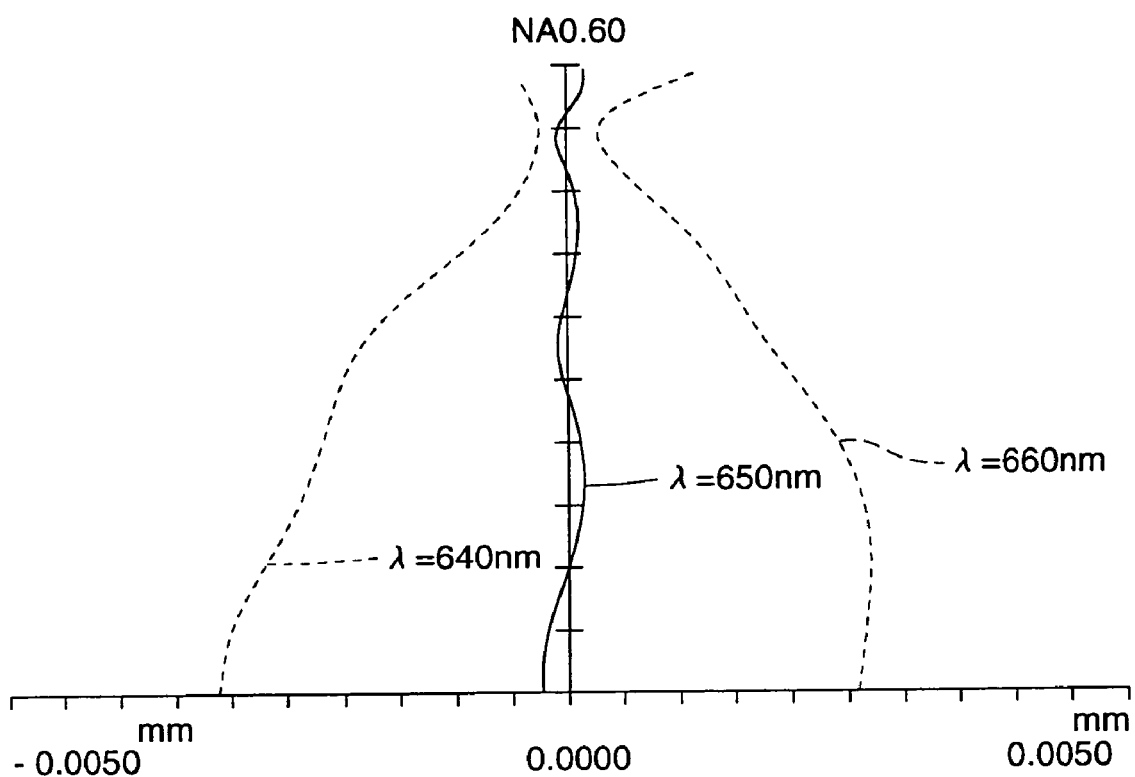
FIG. 25 is a view of the spherical aberration up to the numeral aperture 0.60 to the wavelength $\lambda=650\pm10$ nm, by the diffraction optical lens of Example 6 of the present invention.
Figure 26:
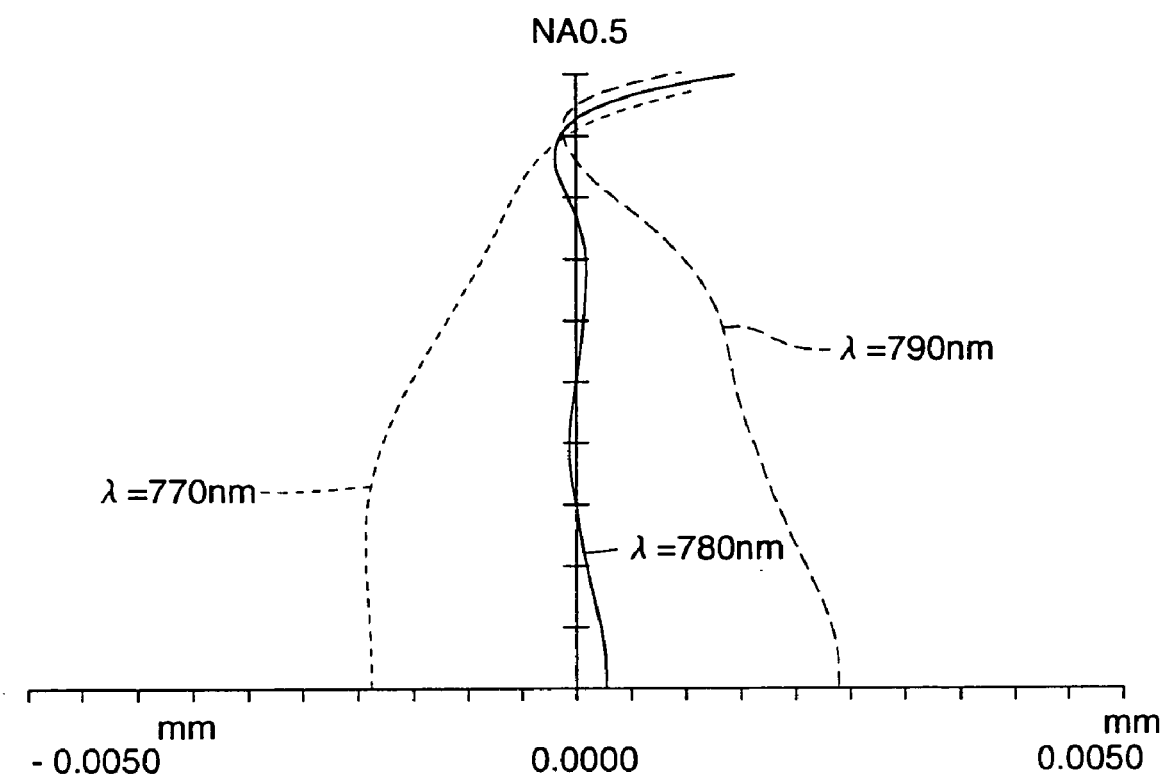
FIG. 26 is a view of the spherical aberration up to the numeral aperture 0.50 to the wavelength $\lambda=780\pm10$ nm, by the diffraction optical lens of Example 6 of the present invention.
Figure 30:
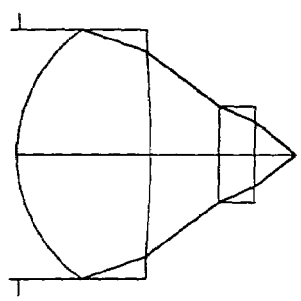
FIG. 30 is a view of the optical path to the wavelength $\lambda=650$ nm, by a diffraction optical lens of Example 7 of the present invention.
Figure 31:
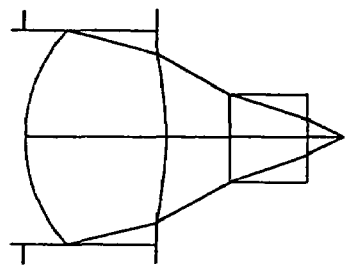
FIG. 31 is a view of the optical path to the wavelength $\lambda=780$ nm (NA=0.5), by the diffraction optical lens of Example 7 of the present invention.
Figure 32:
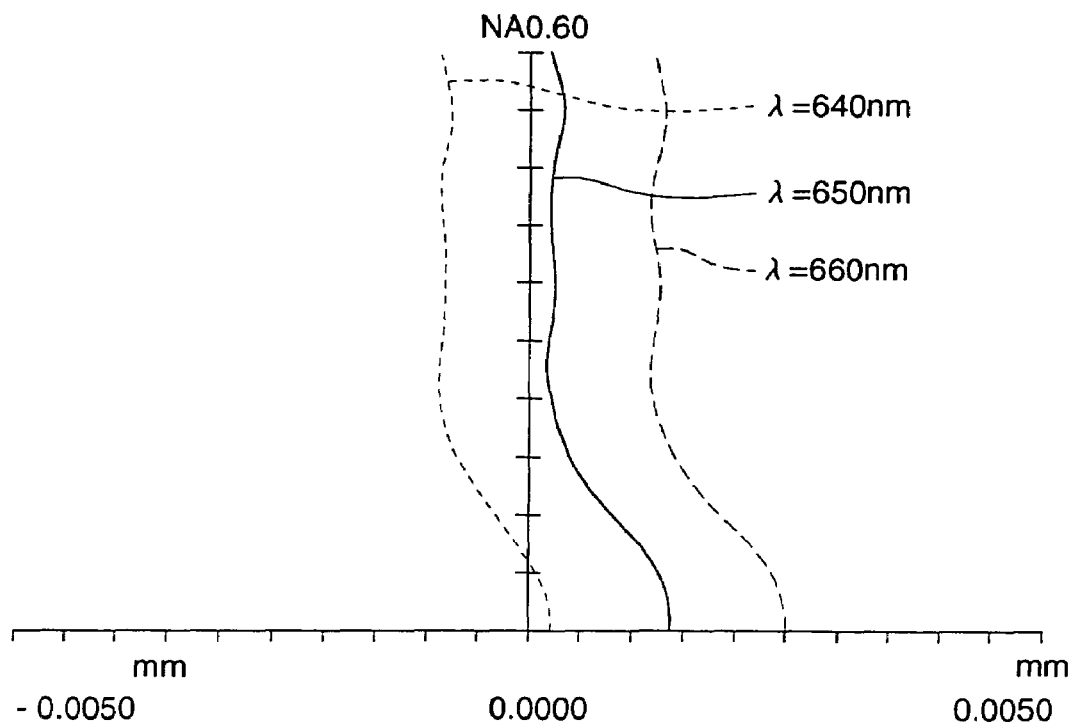
FIG. 32 is a view of the spherical aberration up to the numeral aperture 0.60 to the wavelength λ=650±10 nm, by the diffraction optical lens of Example 7 of the present invention.
Figure 33:
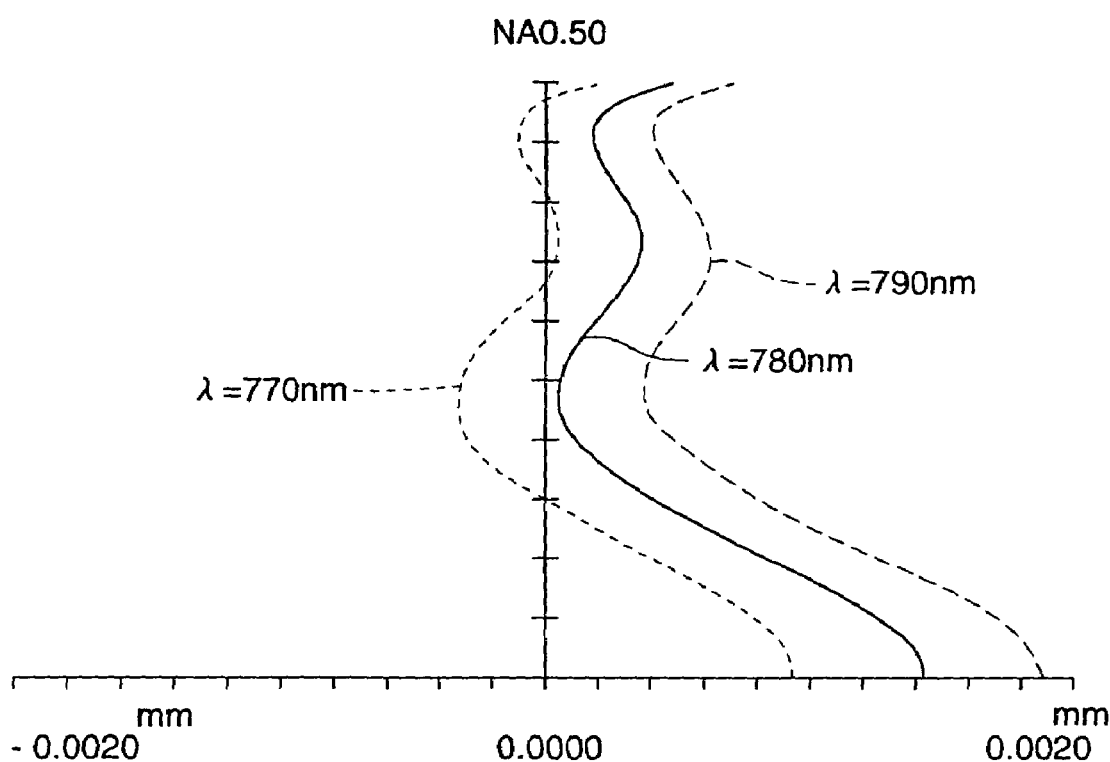
FIG. 33 is a view of the spherical aberration up to the numeral aperture 0.50 to the wavelength λ=780±10 nm, by the diffraction optical lens of Example 7 of the present invention.
Figure 34:
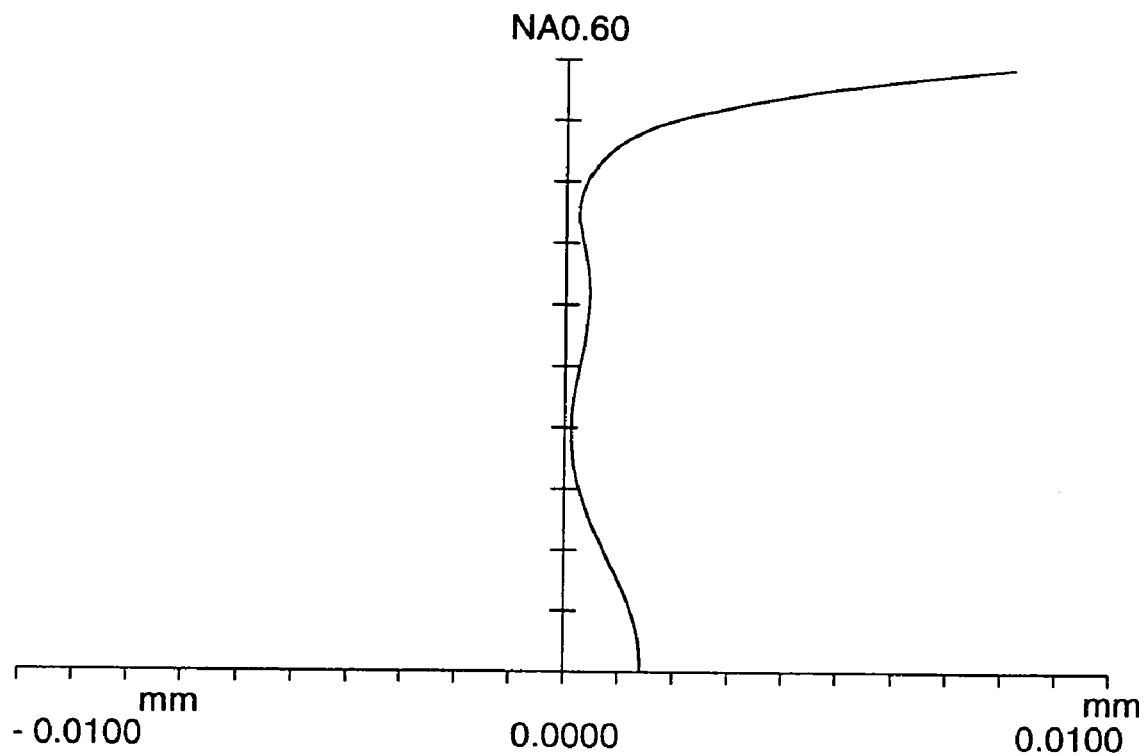
FIG. 34 is a view of the spherical aberration up to the numeral aperture 0.60 to the wavelength λ=780 nm, by the diffraction optical lens of Example 7 of the present invention.
Figure 37:
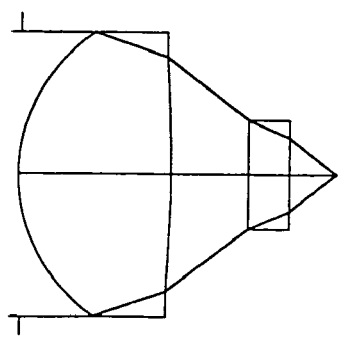
FIG. 37 is a view of the optical path to the wavelength λ=650 nm, by a diffraction optical lens of Example 8 of the present invention.
Figure 38:
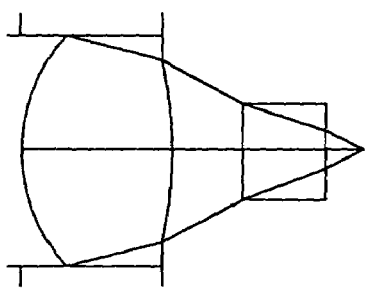
FIG. 38 is a view of the optical path to the wavelength λ=780 nm (NA=0.5), by the diffraction optical lens of Example 8 of the present invention.
Figure 39:
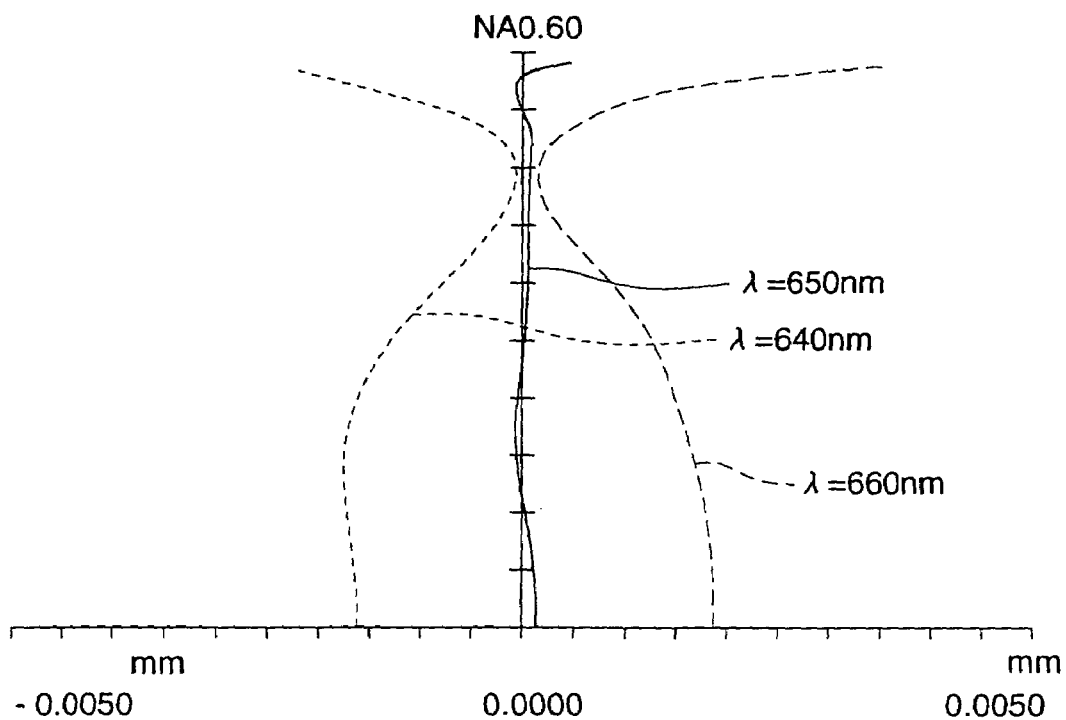
FIG. 39 is a view of the spherical aberration up to the numeral aperture 0.60 to the wavelength λ=650±10 nm, by the diffraction optical lens of Example 8 of the present invention.
Figure 40:
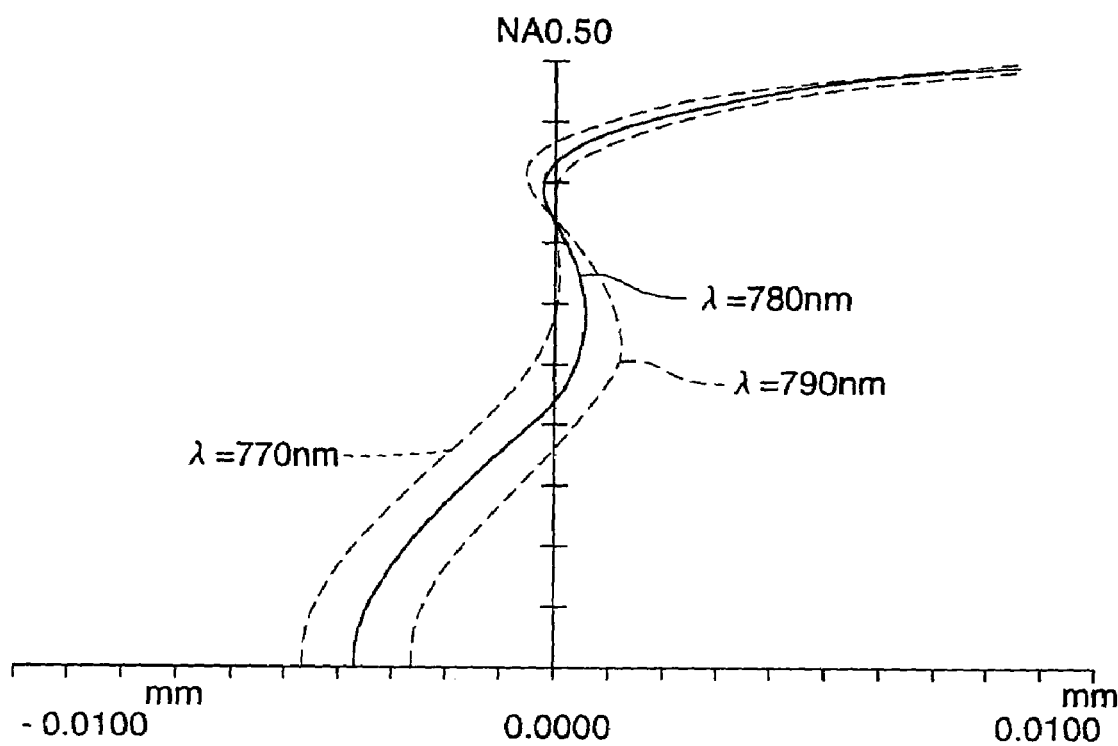
FIG. 40 is a view of the spherical aberration up to the numeral aperture 0.50 to the wavelength λ=780±10 nm, by the diffraction optical lens of Example 8 of the present invention.

Next, Examples 6-8 will be described. Views of the optical paths of the diffraction optical lenses, which are the objective lenses in Examples 6-8, to λ=650 nm will be respectively shown in FIG. 23, FIG. 30 and FIG. 37. Further, in FIG. 24, FIG. 31 and FIG. 38, views of the optical paths of the diffraction optical lenses in Example 6-8, to λ=780 nm (NA=0.5) will be respectively shown. Further, in FIG. 25, FIG. 32 and FIG. 39, views of the spherical aberration up to the numerical aperture 0.60 to λ=650±10 nm for the diffraction optical lenses in Examples 6-8 will be respectively shown. Further, in FIG. 26, FIG. 33 and FIG. 40, views of the spherical aberration up to the numerical aperture 0.50 to λ=780±10 nm for the diffraction optical lenses in Examples 6-8 will be respectively shown. Further, in FIG. 27, FIG. 34 and FIG. 41, views of the spherical aberration up to the numerical aperture 0.60 to λ=780 nm for the diffraction optical lenses in Examples 6-8 will be respectively shown.

Figure 28:
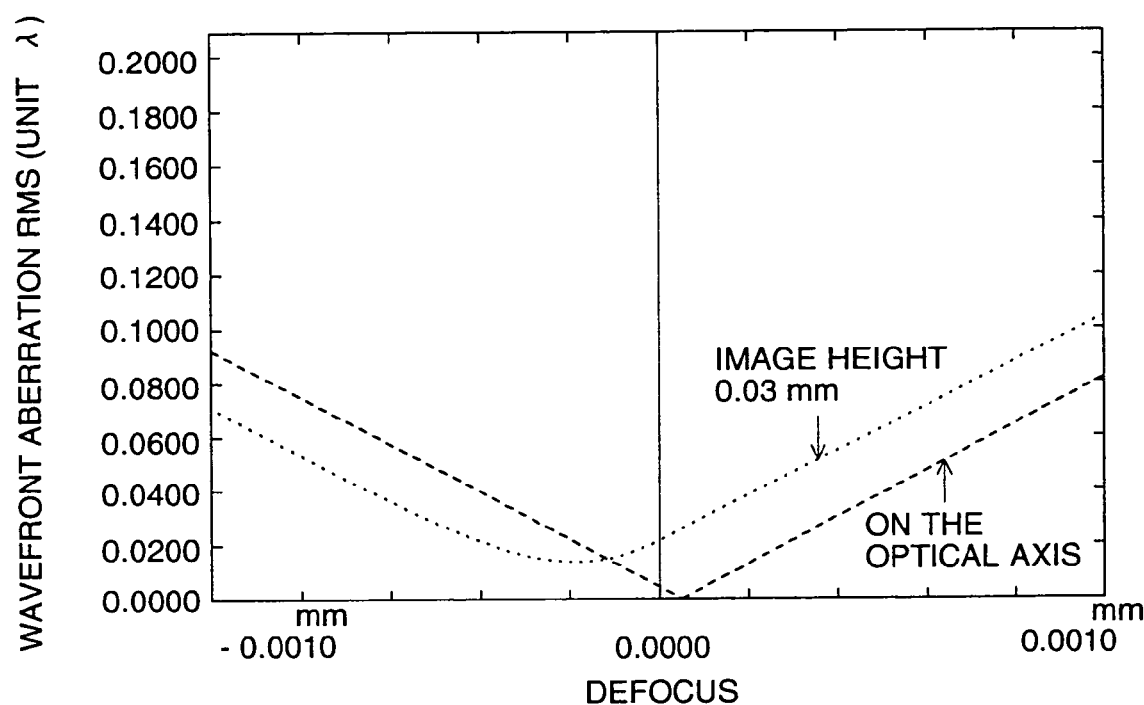
FIG. 28 is a view of the wave front aberration rms to the wavelength $\lambda=650$ nm, by the diffraction optical lens of Example 6 of the present invention.
Figure 29:
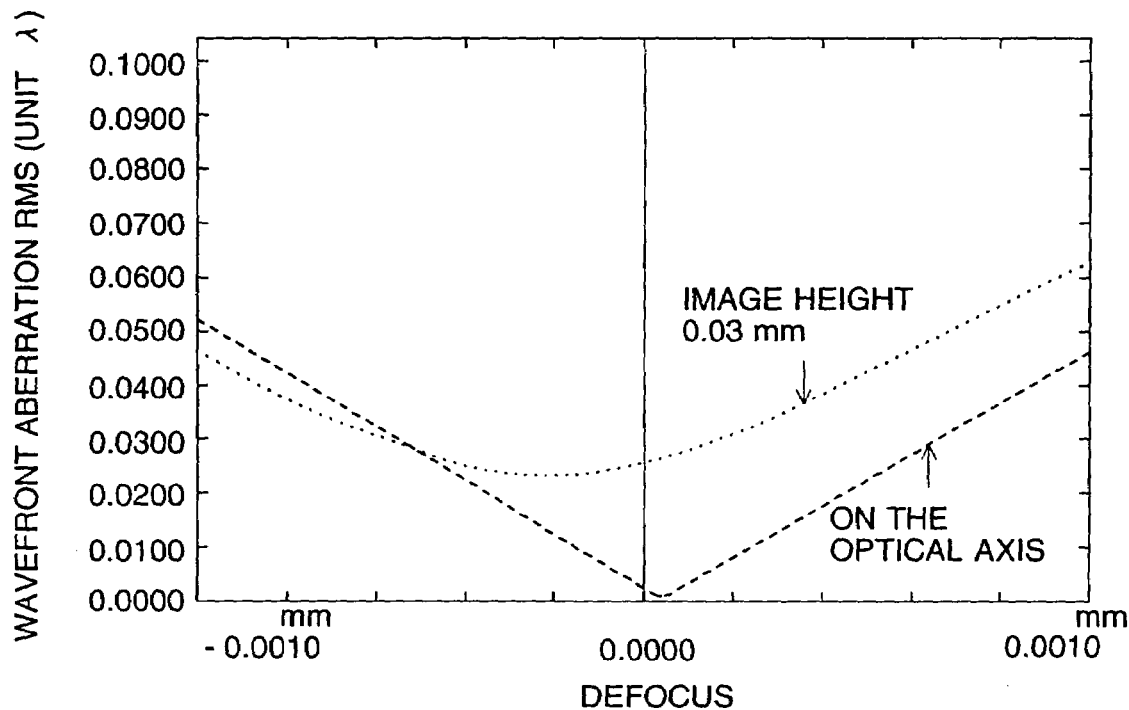
FIG. 29 is a view of the wave front aberration rms to the wavelength $\lambda=780$ nm, by the diffraction optical lens of Example 6 of the present invention.
Figure 35:
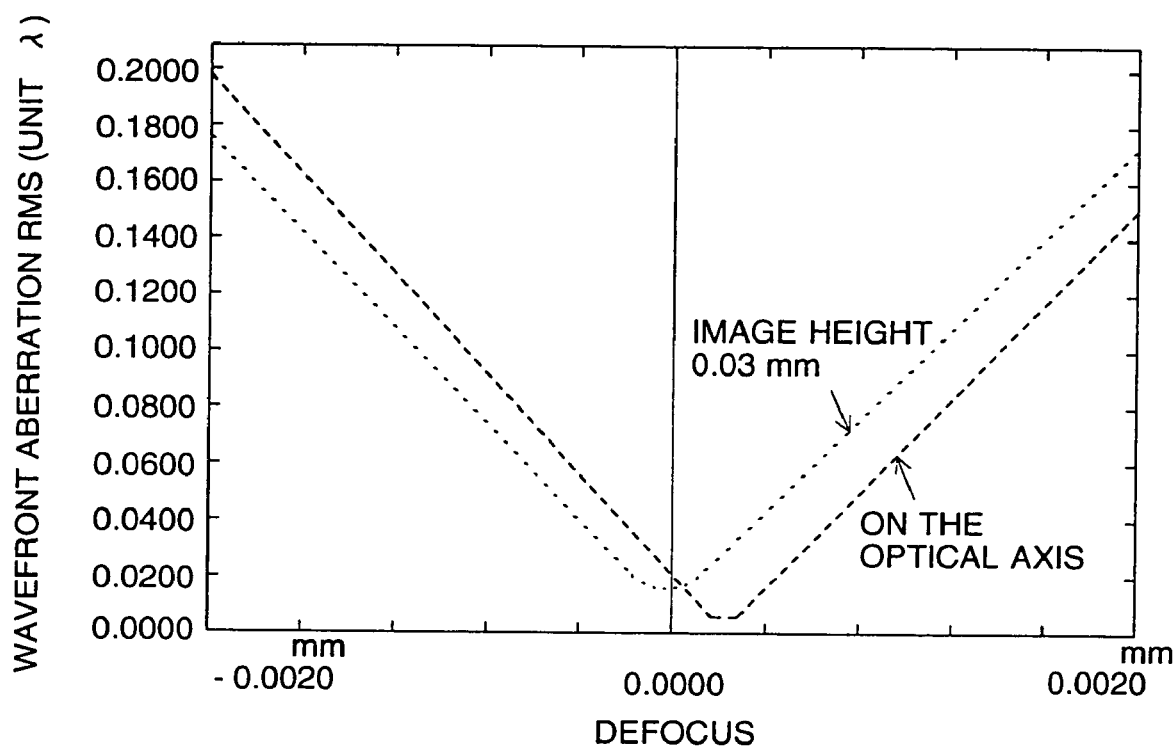
FIG. 35 is a view of the wave front aberration rms to the wavelength λ=650 nm, by the diffraction optical lens of Example 7 of the present invention.
Figure 36:
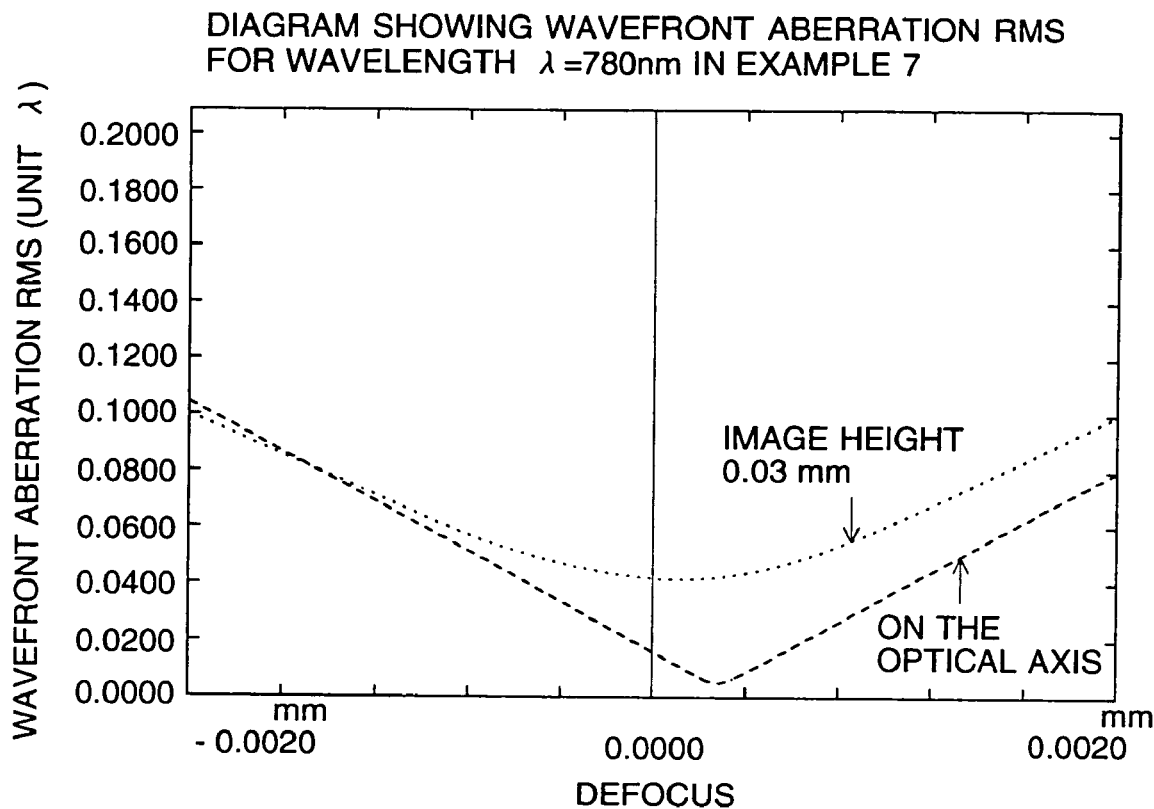
FIG. 36 is a view of the wave front aberration rms to the wavelength λ=780 nm, by the diffraction optical lens of Example 7 of the present invention.
Figure 42:
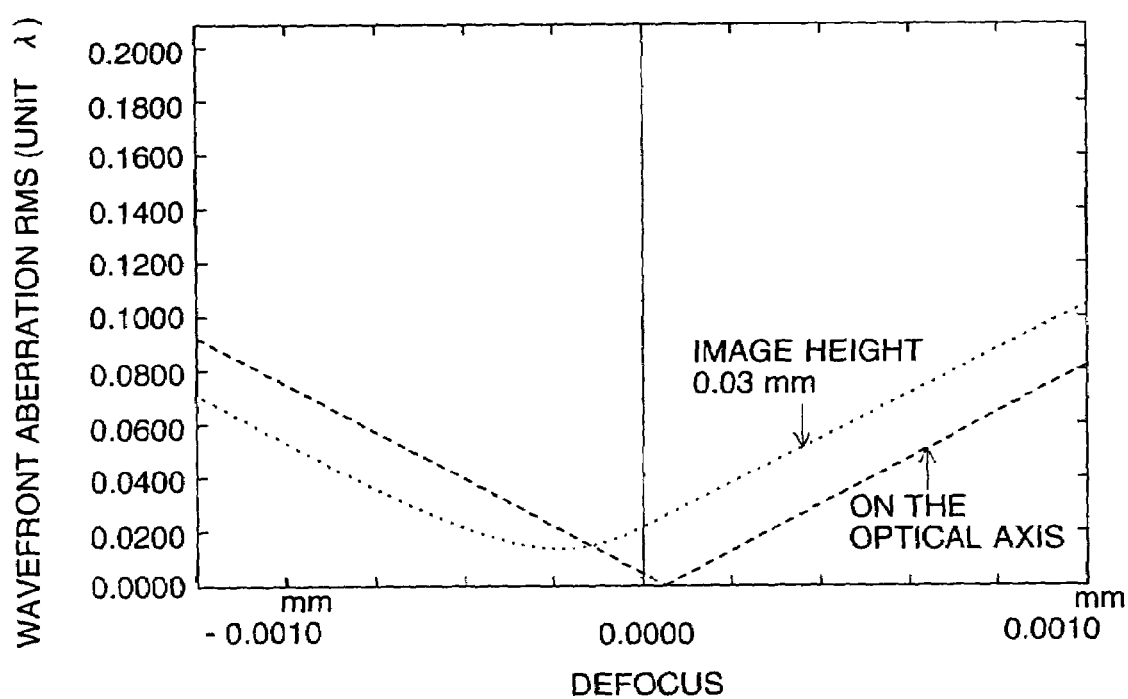
FIG. 42 is a view of the wave front aberration rms to the wavelength λ=650 nm, by the diffraction optical lens of Example 8 of the present invention.
Figure 43:
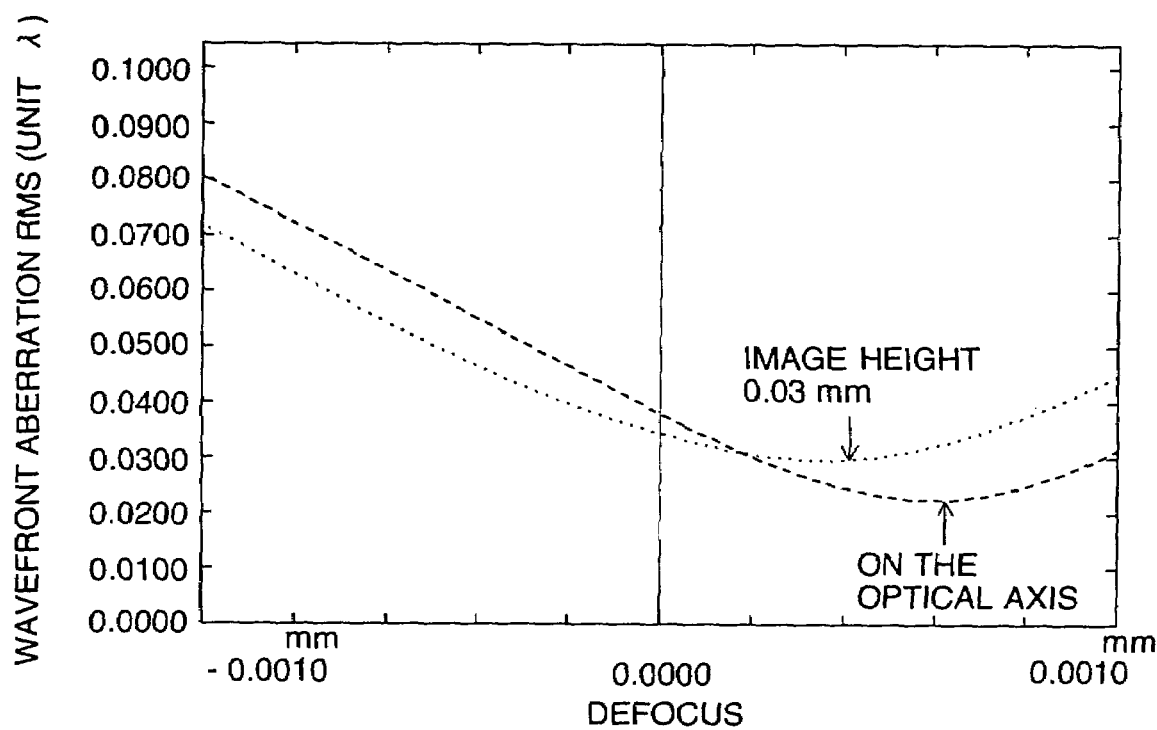
FIG. 43 is a view of the wave front aberration rms to the wavelength λ=780 nm, by the diffraction optical lens of Example 8 of the present invention.

Further, in FIG. 28, FIG. 35 and FIG. 42, views of the wave front aberration rms to λ=650 nm for the diffraction optical lenses in Examples 6-8 will be respectively shown. Further, in FIG. 29, FIG. 36 and FIG. 43, views of the wave front aberration rms to λ=780 nm for the diffraction optical lenses in Examples 6-8 will be respectively shown. Further, in FIG. 44, FIG. 45 and FIG. 46, graphs showing the relationship between the number of diffraction annular bands and the height from the optical axis, for the diffraction optical lenses in Examples 6-8 will be respectively shown. Herein, the number of diffraction annular bands is defined as a value in which the phase difference function is divided by 2π.

In Examples 6-8, as shown in the view of spherical aberration, at all apertures up to NA 0.60 to the wavelength λ=650 nm, there is almost no aberration. Further, to the wavelength λ=780 nm, up to NA 0.50 which is a range of practical use, there is almost no aberration, however, in the portion of NA 0.50-0.60 of the outside of it, the spherical aberration is large, and it becomes the flare. According to this, to the wavelength λ=780 nm, an appropriate spot diameter can be obtained.

Next, lens data in Examples 6=8 will be shown. In [Table 6]-[Table 8], STO expresses the diaphragm, and IMA expresses the image surface and is expressed in the form including the diaphragm.

Example 6

When the wavelength of the light source λ=650 nm, the focal distance f=3.33, the image side numerical aperture NA=0.60, infinite specification.

When the wavelength of the light source λ=780 nm, the focal distance f=3.37, the image side numerical aperture NA=0.50 (NA=0.60), infinite specification. When a diameter of 13.5%-strength beam of 780 nm light flux on the image forming surface is w, w=1.20 µm.

Figure 44:
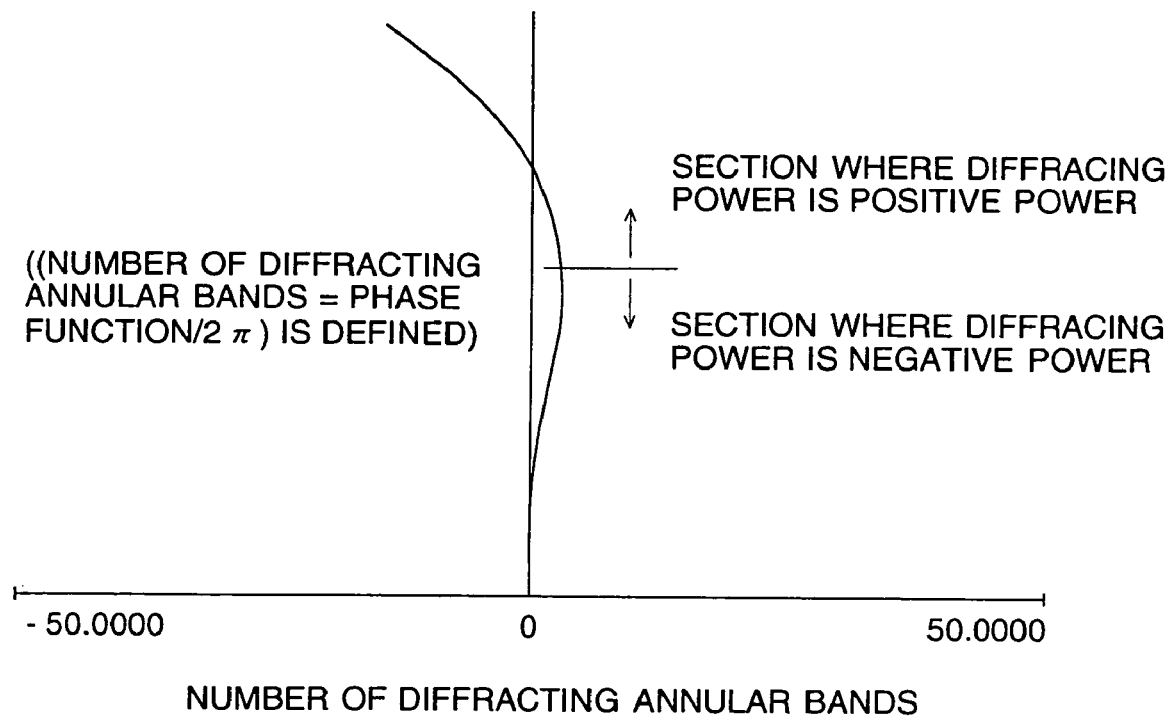
FIG. 44 is a graph showing the relationship of the number of the diffraction annular bands and the height from the optical axis of the diffraction optical lens of the Example 6 of the present invention.

In this embodiment, as shown in FIG. 44, in the central section where a height from the optical axis is almost smaller than half of the effective radius in the light flux of λ1 and the light flux of λ2, an amount of −first ordered diffracted ray is generated so as to be greater than that of any other ordered diffracted ray, and in the peripheral section where a height from the optical axis is almost larger than half of the effective radius, an amount of +first ordered diffracted ray is generated so as to be greater than that of any other ordered diffracted ray. However, in the present embodiment, it may be possible that the same ordered diffractive ray of the high order may be generated by multiplying the pitch of annular bands with an integer instead of − or +first ordered diffracted ray.

Further, in the present embodiment, as shown in FIG. 27, in the second optical information recording medium, the spherical aberration at NA1=0.6 is +29 µm, and the spherical aberration at NA2=0.5 is +1 µm.

Further, in the present invention, the pitch of the diffractive portion at NA=0.4 is 14 µm.

TABLE 6

| Surface No. | R | d | n (λ = 650 nm) | n (λ = 780 nm) |
|---|---|---|---|---|
| OBJ | Infinity | Infinity | | |
| STO | Infinity | 0.0 | | |
| 2 (Aspheric surface 1 Diffraction surface) | 2.057515 | 2.2 | 1.54113 | 1.53728 |
| 3 (Aspheric surface 2) | −7.8997731 | 1.0287 | | |
| 4 | Infinity | d4 | 1.57789 | 1.57079 |
| 5 | Infinity | d5 | | |
| IMA | Infinity | | | |

| | d4 | d5 |
|---|---|---|
| For λ = 650 nm | 0.6 | 0.7500 |
| For λ = 780 nm | 1.2 | 0.35 |

Aspherical coefficient

| Aspherical surface 1 | Aspherical surface 2 |
|---|---|
| κ = −1.7952 | κ = −3.452929 |
| A4 = 0.51919725 × 10$^{-2}$ | A4 = 0.15591292 × 10$^{-1}$ |
| A6 = 0.10988861 × 10$^{-2}$ | A6 = −0.44528738 × 10$^{-2}$ |
| A8 = −0.44386519 × 10$^{-3}$ | A8 = 0.65423404 × 10$^{-3}$ |
| A10 = 5.4053137 × 10$^{-5}$ | A10 = −4.7679992 × 10$^{-5}$ |

Diffraction surface coefficient

B2 = 29.443104
B4 = −14.403683
B6 = 3.9425951
B8 = −2.1471955
B10 = 0.31859248

Example 7

When the wavelength of the light source λ=650 nm, the focal distance f=3.33, the image side numerical aperture NA=0.60, infinite specification.

When the wavelength of the light source λ=780 µm, the focal distance f=3.37, the image side numerical aperture NA=0.50 (NA=0.60), infinite specification.

Figure 45:
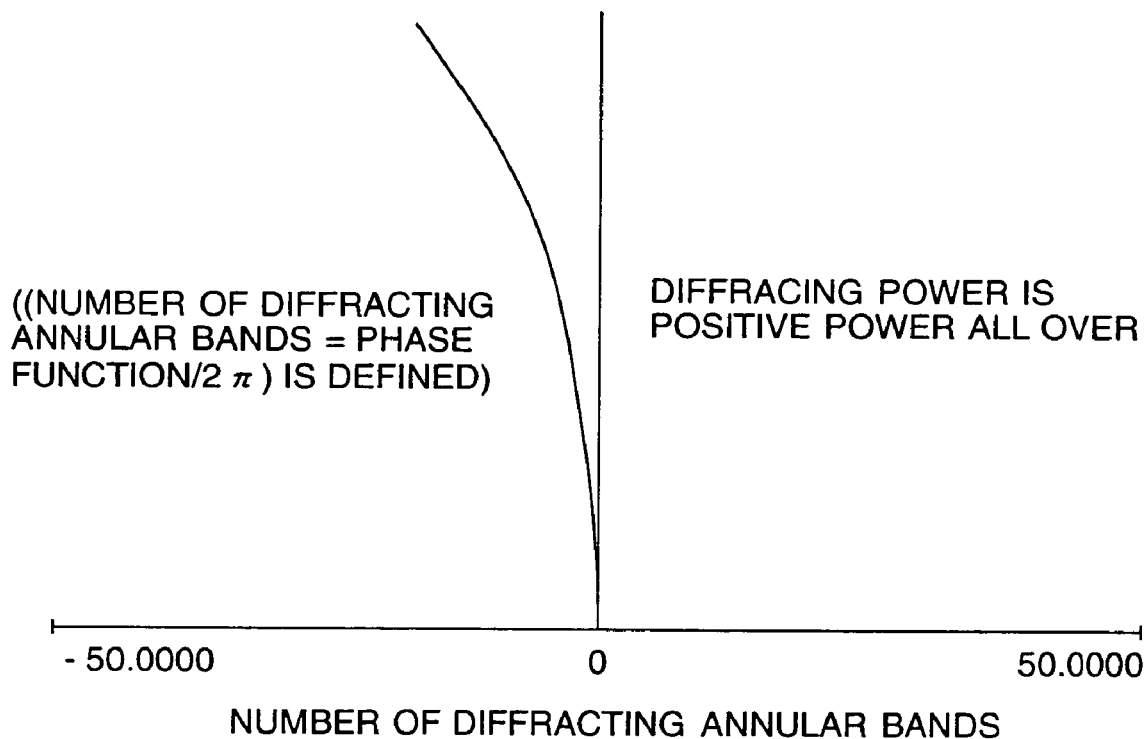
FIG. 45 is a graph showing the relationship of the number of the diffraction annular bands and the height from the optical axis of the diffraction optical lens of the Example 7 of the present invention.

In this embodiment, as shown in FIG. 45, in the entire section, an amount of +first ordered diffracted ray is generated so as to be greater than that of any other ordered diffracted ray in the light flux of λ1 and the light flux of λ2. However, in the present embodiment, it may be possible that the same ordered diffractive ray of the high order may be generated by multiplying the pitch of annular bands with an integer instead of +first ordered diffracted ray.

TABLE 7

| Surface No. | R | d | n (λ = 650 nm) | n (λ = 780 nm) |
|---|---|---|---|---|
| OBJ | Infinity | d0 | | |
| STO | Infinity | 0.0 | | |
| 2 (Aspheric surface 1 Diffraction surface) | 2.145844 | 2.2 | 1.54113 | 1.53728 |
| 3 (Aspheric surface 2) | −7.706496 | 1.0326 | | |
| 4 | Infinity | d4 | 1.57789 | 1.57079 |
| 5 | Infinity | d5 | | |
| IMA | Infinity | | | |

| | d | d4 | d5 |
|---|---|---|---|
| For λ = 650 nm | Infinity | 0.60 | 0.70 |
| For λ = 780 nm | 64.5 | 1.20 | 0.35 |

Aspherical coefficient

| Aspherical surface 1 | Aspherical surface 2 |
|---|---|
| κ = −1.801329 | κ = −8.871647 |
| A4 = 0.1615422 × 10⁻¹ | A4 = 0.1492511 × 10⁻¹ |
| A6 = −0.4937969 × 10⁻³ | A6 = −0.4447445 × 10⁻² |
| A8 = 0.11038322 × 10⁻³ | A8 = 0.60067143 × 10⁻³ |
| A10 = −2.1823306 × 10⁻⁵ | A10 = −3.4684206 × 10⁻⁵ |

Diffraction surface coefficient

B2 = −17.150237
B4 = −4.1227045
B6 = 1.1902249
B8 = −0.26202222
B10 = 0.018845315

Example 8

For light source wavelength λ=650 nm

Focal distance f=3.33 Image side numerical aperture NA=0.60 Infinity specification For light source wavelength λ=780 nm Focal distance f=3.35 Image side numerical aperture NA=0.50 (NA=0.60) Infinity specification w (Diameter of a beam of 13.5% intensity on an image-forming plane of a light flux having a wavelength of 780 nm)=1.27 µm.

Figure 46:
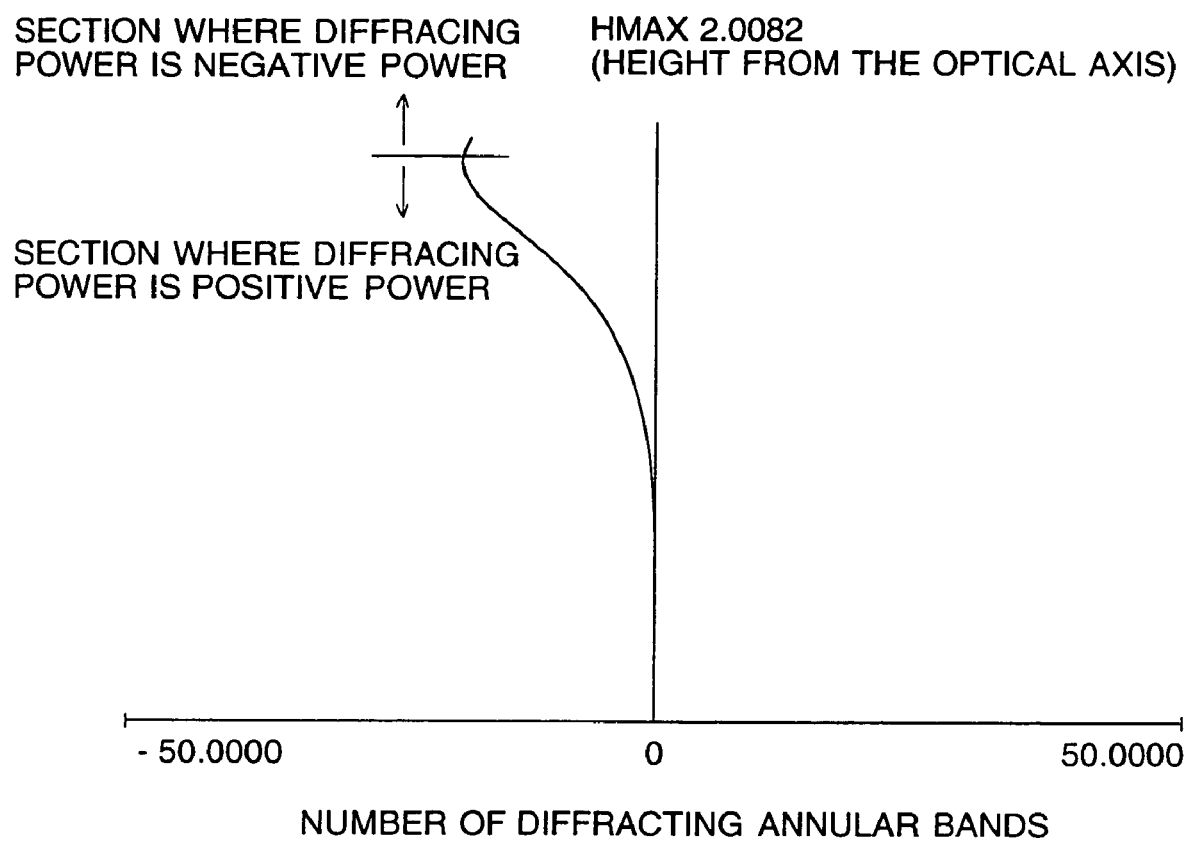
FIG. 46 is a graph showing the relationship of the number of the diffraction annular bands and the height from the optical axis of the diffraction optical lens of the Example 8 of the present invention.

In this embodiment, as shown in FIG. 46, in the light flux of λ1 and the light flux of λ2, in only the extremely peripheral section, an amount of −first ordered diffracted ray is generated so as to be greater than that of any other ordered diffracted ray and in the other section, an amount of +first ordered diffracted ray is generated so as to be greater than that of any other ordered diffracted ray. However, in the present embodiment, it may be possible that the same ordered diffractive ray of the high order may be generated by multiplying the pitch of annular bands with an integer instead of − or +first ordered diffracted ray.

Figure 41:
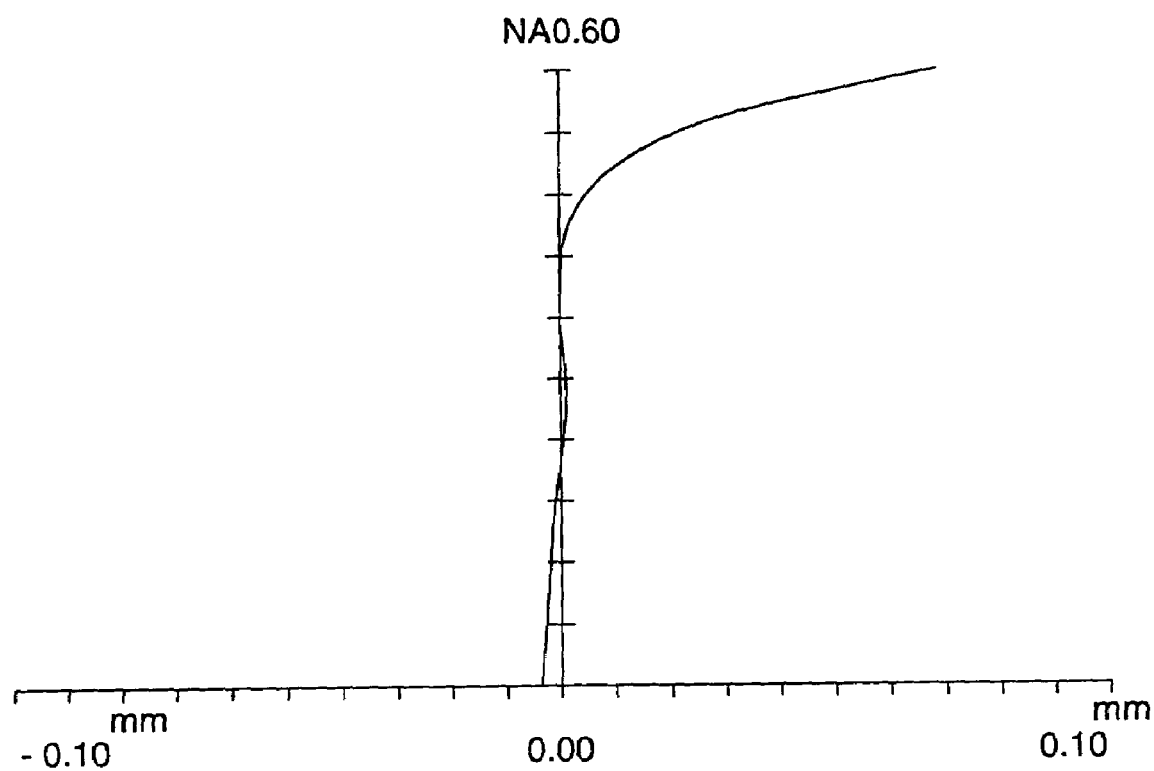
FIG. 41 is a view of the spherical aberration up to the numeral aperture 0.60 to the wavelength λ=780 nm, by the diffraction optical lens of Example 8 of the present invention.

Further, in the present embodiment, as shown in FIG. 41, in the second optical information recording medium, the spherical aberration at NA1=0.6 is +68 µm, and the spherical aberration at NA2=0.5 is +9 µm.

Further, the pitch at NA=0.4 is 61 µm.

TABLE 8

| Surface No. | R | d | n (λ = 650 nm) | n (λ = 780 nm) |
|---|---|---|---|---|
| OBJ | Infinity | d0 | | |
| STO | Infinity | 0.0 | | |
| 2 (Aspheric surface 1 Diffraction surface) | 2.10598 | 2.2 | 1.54113 | 1.53728 |
| 3 (Aspheric surface 2) | −7.90392 | 1.0281 | | |
| 4 | Infinity | d4 | 1.57789 | 1.57079 |
| 5 | Infinity | d5 | | |
| IMA | Infinity | | | |

| | d4 | d5 |
|---|---|---|
| For λ = 650 nm | 0.6 | 0.70 |
| For λ = 780 nm | 1.2 | 0.34 |

Aspheric surface coefficient

| Aspheric surface 1 | κ = −1.2532 |
| | A4 = 0.1007 × 10⁻¹ |
| | A6 = −0.85849 × 10⁻³ |
| | A8 = −0.1.5773 × 10⁻⁵ |
| | A10 = 3.2855 × 10⁻⁵ |
| Aspheric surface 2 | κ = −9.151362 |
| | A4 = 0.133327 × 10⁻¹ |
| | A6 = −0.378682 × 10⁻² |
| | A8 = 0.3001 × 10⁻³ |
| | A10 = 4.02221 × 10⁶ |
| Diffraction surface coefficient | B2 = 3.4251 × 10⁻²¹ |
| | B4 = 0.0763977 |
| | B6 = −5.5386 |
| | B8 = 0.05938 |
| | B10 = 0.2224 |

Now, causes for fluctuation of a wavelength of a semi-conductor laser beam which enters a lens will be considered based on Examples 6-8. It is considered that individual dispersion of a wavelength of a semiconductor laser is ±2-±3 nm, a width of multi-mode oscillation is about ±2 nm, and a mode hop for writing is about 2 nm. There will be explained an occasion wherein fluctuation of spherical aberration of a lens caused by wavelength fluctuation of a semiconductor laser which is also caused by the causes stated above.

When a thickness of a transparent substrate of an optical disk is different respectively for two light sources each having a different wavelength, a lens corrected to be no-aberration for infinite light (parallel light flux) emitted from each of two light sources each having a different wavelength has relatively large fluctuation of spherical aberration, compared with wavelength fluctuation of about 10 nm for one light source, as understood from data concerning Example 6. In Example 6, though the wave-front aberration is 0.001 λrms in the wavelength of 65 nm, it is deteriorated to about 0.035 λrms in the wavelength of 640 nm and 660 nm. For an optical system with well-controlled laser wavelength, Example 6 can naturally be put to practical use sufficiently. On the contrary, in the case of a lens which is almost no-aberration for infinite light from either one light source and is corrected to be almost no-aberration for finite light (non-parallel light flux) from the other wavelength light source, like the lens in Example 0.7, it is possible to control the spherical aberration fluctuation to be extremely small, for wavelength fluctuation of about 10 nm for one light source.

Next, temperature-caused capacity fluctuation of a diffraction optical system (optical system having a diffraction optical lens) of the present embodiment will be explained.

First, a wavelength of a semiconductor laser has a tendency to extend by 6 nm when temperature rises by 30° C. On the contrary, when a diffraction-optical system is composed of a plastic lens, the index of refraction has a tendency to be reduced by about 0.003-0.004 when temperature rises by 30° C. In the case of a lens corrected to be no-aberration for infinite light for any of two wavelengths like that in Example 6, a factor of a wavelength of a semiconductor laser caused by temperature change and a factor of the index of refraction of a plastic lens caused by temperature change display effect of mutual compensation, and make it possible to create an optical system which is extremely resistant to temperature change. Further, in Example 6, even when raw material is glass, it is possible to create an optical system having an allowable range for temperature change. Further, even in the case of Example 7, deterioration of wave-front aberration is about 0.035 λrms for the temperature change of 30° C. to be sufficient temperature compensation for practical use, which, however, is behind Example 6.

The compensation effect of temperature change stated above will further be explained. When recording and/or reproduction is conducted on two types of optical information recording media each having a transparent substrate with a different thickness by two light sources each having a different wavelength, it is possible to obtain image forming characteristic which is the same as an exclusive objective lens, because it is possible to make the rms value of wave-front aberration to be 0.07 of each wavelength or less even in the case of a numerical aperture required for information recording surface on each optical disk or in the case of a numerical aperture equal to or greater than the aforesaid aperture, by using an objective lens having a diffraction pattern. In ordered to make an optical pickup apparatus which is inexpensive and compact, a semiconductor laser is commonly used as a light source, and a plastic lens is commonly used as an objective lens.

There are various types of plastic materials which are used as a lens, but their refractive index changes caused by temperature change and their coefficient of linear expansion are greater than those of glass. In particular, the refractive index changes caused by temperature change have an influence on various characteristics of a lens. In the case of a plastic material used as an optical element of an optical pickup, the refractive index change caused by temperature change in the vicinity of 25° C. is $-0.0002/°$ C.$--0.00005/°$ C. Further, $-0.0001/°$ C. is for the most of materials having low double refraction. Refractive index changes of thermosetting plastics used as a lens which are caused by temperature change are further greater, and some of them exceed the aforesaid range.

Even in the case of a semiconductor laser, an oscillation wavelength is dependent on temperature, as far as those manufactured by the present technology are concerned, the oscillation wavelength change caused by temperature change in the vicinity of 25° C. is 0.05 nm/° C.-0.5 nm/° C.

When a wave-front aberration of a light flux for reproducing information on an optical information recording medium or for recording information on an optical information recording medium is changed by temperature to cause an rms value to be 0.07 or more, it is difficult to maintain the characteristics as an optical pickup apparatus. In the case of the optical information medium of high density, in particular, it is necessary to pay attention to the change of wave-front aberration caused by temperature. In the case of a wave-front aberration change of a plastic lens caused by temperature change, both of a shift of focus and a change of spherical aberration are caused by this wave-front aberration change, but the latter is important because the focus control is conducted in an optical pickup apparatus for the former. In this case, when the plastic material satisfies the relationship of $$-0.0002/° \text{ C.} < \Delta n/\Delta T < -0.00005/° \text{ C.}$$

when $\Delta T$ represents an amount of a change of a refractive index for the temperature change $\Delta T$ (° C.), and when a semiconductor laser satisfies the relationship of $$0.05 \text{ nm}/° \text{ C.} < \Delta\lambda1/\Delta T < 0.5 \text{ nm}/° \text{ C.}$$

when $\Delta\lambda1$ represents an amount of a change of oscillation wavelength for the temperature change $\Delta T$, fluctuations of wave-front aberration caused by refractive index change of a plastic lens caused by temperature change and fluctuations of wave-front aberration caused by a wavelength change of the semiconductor laser caused by temperature change act to contradict mutually, thereby, an effect of compensation can be obtained.

When an amount of change of a component of cubic spherical aberration of wave-front aberration for ambient temperature change of $\Delta T$ (° C.) is represented by $\Delta WSA3$ (λrms), this is proportional to the fourth power of a numerical aperture (NA) of an objective lens on the optical information medium side for a light flux passing through the objective lens as well as to focal distance f (mm) of the plastic lens, and is inversely proportional to wavelength λ (mm) of the light source because the wave-front aberration is evaluated in a unit of wavelength. Therefore, the following expression holds, $$\Delta WSA3 = k \cdot (NA)^4 \cdot f \cdot \Delta T/\lambda \tag{a1}$$

wherein, k represents an amount which is dependent on a type of an objective lens. Incidentally, a plastic double aspherical objective lens optimized under the conditions that a focal distance is 3.36 mm, a numerical aperture on the optical information medium side is 0.6, and an incident light flux is a collimated light is described in MOC/GRIN'97 Technical Digest C5 p40-p43, "The Temperature characteristics of a new optical system with quasi-finite conjugate plastic objective for high density optical disk use" It is estimated that the wavelength λ is 650 nm, because the graph in this document shows that WSA3 varies by 0.045 λrms for the temperature change of 30° C., and thereby, the objective lens is considered to be used for DVD. When the data stated above are substituted in expression (a1), $k=2.2\times 10^{-6}$ is obtained. Though there is no description about an influence of wavelength change caused by temperature change, when a change of oscillation wavelength is small, an influence of refractive index caused by temperature change is greater as far as the objective lens using no diffraction is concerned.

With regard to the optical pickup apparatus for recording and/or reproducing concerning DVD, it is necessary that k is not more than the above-mentioned value. When recording and/or reproducing for two types of optical information recording media each having a transparent substrate with a different thickness, one can not ignore an influence of wavelength change caused by temperature change, in an objective lens having a diffraction pattern. With regard to k, in particular, the value of k varies depending on a focal distance, a refractive index change of a plastic material caused by temperature change, a thickness difference between transparent substrates and a difference of oscillation wavelength between two light sources, and in Example 6, both a main cause of wavelength change of a semiconductor laser caused by temperature change and a main cause of a refractive index change of a plastic lens caused by temperature change act to be effective for compensation, and even when the objective lens is a plastic lens, a change of wave-front aberration caused by temperature change is small, resulting in k=2.2×10$^{-6}$/° C. and k=0.4×10$^{-6}$/° C. in simulation.

It is possible for k to take a range of 0.3<k<2.2. Therefore, from expression (a1), the following holds.

$$k=\Delta WSA3 \cdot \lambda / \{f \cdot (NA1)^4 \cdot \Delta T(NA)\} \quad (a2)$$

Therefore, the following holds.

$$0.3 \times 10^{-6}/° C. < \Delta WSA3 \cdot \lambda / \{f \cdot (NA1)^4 \cdot \Delta T\} < 2.2 \times 10^{-6}/° C. \quad (a3)$$

In expression (a3), when the value of k exceeds the upper limit, it is difficult to maintain characteristics of an optical pickup apparatus due to temperature change, while when the lower limit is exceeded, it tends to be difficult to maintain characteristics of an optical pickup apparatus in the case where a wavelength only is changed, though variation for temperature change is small.

In Example 8, by worsening efficiency of wavelength on one side, namely, of wavelength of 780 nm, slightly within an allowable range, compared with Example 6, it is possible to make the spherical aberration variation at ±10 nm in the vicinity of the wavelength on the other side, namely, of the wavelength of 650 nm to be small. Though wave-front aberration at wavelength of 640 nm or 660 nm is about 0.035 λrms in Example 6, wave-front aberration at wavelength of 640 nm or 660 nm can be improved to about 0.020 λrms in Example 8. These two factors are in the relationship of trade-off, and it is important to have a balance, and when 0.07 λrms is exceeded, lens performance is deteriorated and it is difficult to use as an optical system for an optical disk.

Figure 8:
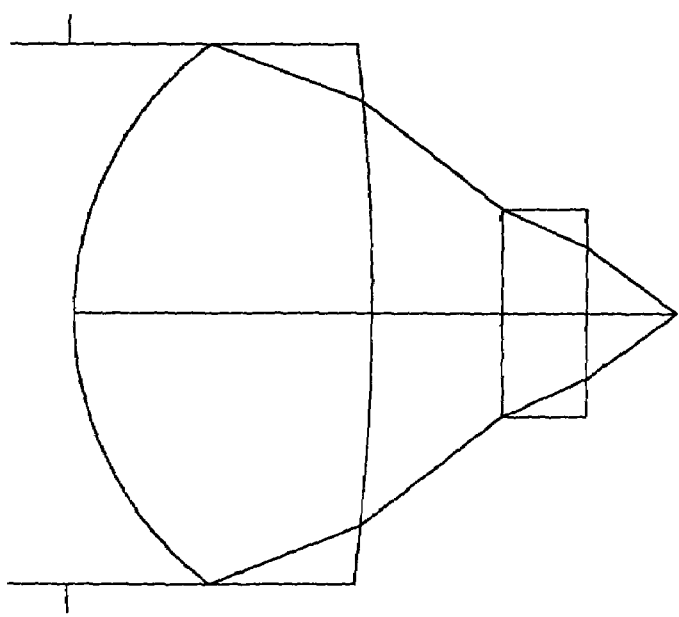
FIG. 8 is a view of the optical path to the wavelength $\lambda=635$ nm by the diffraction optical lens of Example 2 of the present invention.

Now, the relationship between diffraction power and a lens shape will be explained. In FIG. 47, the relationship between diffraction power and a lens shape is shown illustratively. FIG. 47(a) is a diagram showing that diffraction power is a positive lens shape at all port ions, while, FIG. 47(b) is a diagram showing that diffraction power is a negative lens shape at all portions. As shown in FIG. 47(c), a lens in FIG. 6 is designed so that diffraction power is negative in the vicinity of an optical axis and is changed to be positive on the half way. Due to this, it is possible to prevent diffracting annular band whose pitch is too fine. Further, by designing a lens so that diffraction power is changed from the positive power to the negative one in the vicinity of a peripheral portion of the lens as shown in FIG. 8, it is also possible to obtain satisfactory aberration between two wavelengths. It is possible to arrange so that diffraction power is positive in the vicinity of an optical axis and is changed to the negative power on the half way, for example, as shown in FIG. 47(d).

In FIG. 47(c), a diffraction surface has plural diffracting annular bands which are blazed, and a step portion of the diffracting annular band which is closer to an optical axis is located to be away from the optical axis, and a step portion of the diffracting annular band which is away from an optical axis is located to be closer to the optical axis. In FIG. 47(d), a diffraction surface has plural diffracting annular bands which are blazed, and a step portion of the diffracting annular band which is closer to an optical axis is located to be closer to the optical axis, and a step portion of the diffracting annular band which is away from an optical axis is located to be away from the optical axis.

Examples 9 and 10

An objective lens in Examples 9 and 10 has on its refraction surface an aspherical shape shown by expression (a3), and Example 9 is a finite conjugate type complying with two light sources, and Example 10 is a concrete example of an objective lens related to the second embodiment and is a finite conjugate type complying with three light sources. In Examples 9 and 10, the diffraction surface is expressed by expression (a1) as phase difference function ΦB wherein a unit is radian.

Figure 50:
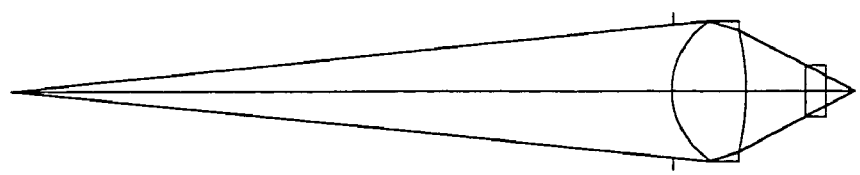
FIG. 50 is a view of the optical path to the wavelength λ=650 nm of the objective lens in Example 9 of the present invention.
Figure 51:
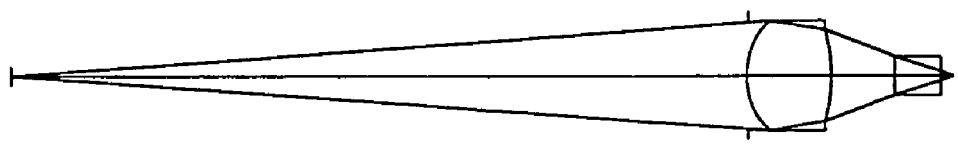
FIG. 51 is a view of the optical path to the wavelength λ=780 nm of the objective lens in Example 9 of the present invention.
Figure 52:
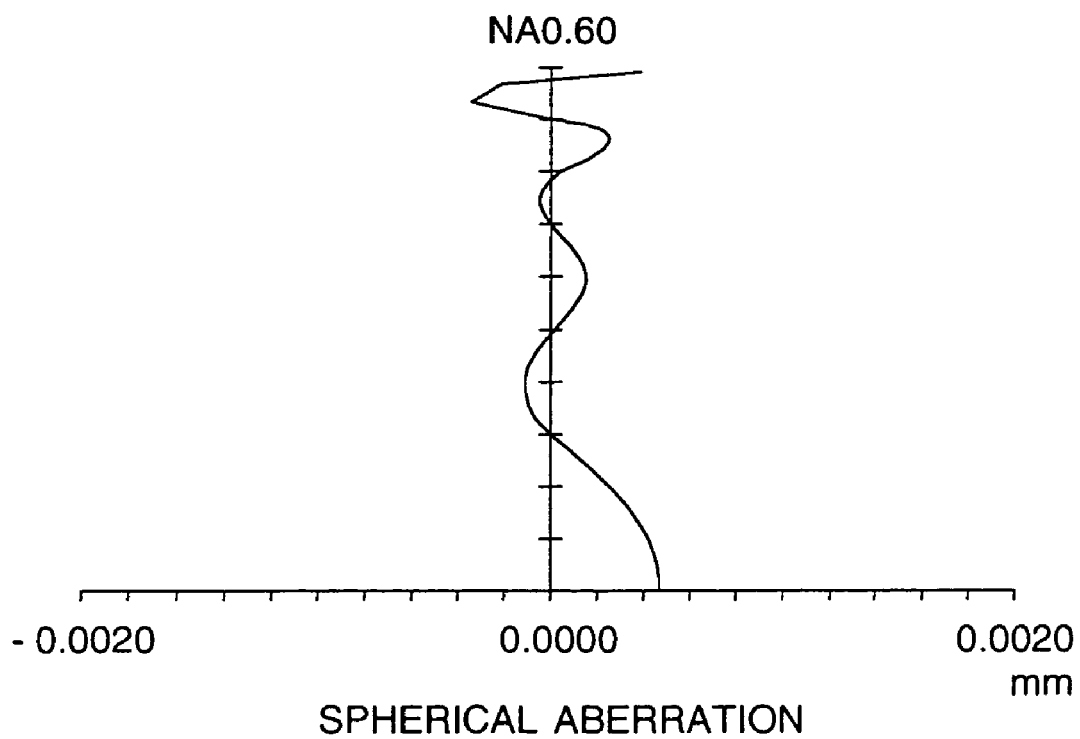
FIG. 52 is a view of the spherical aberration to the wavelength λ=650 nm of the objective lens of Example 9 of the present invention.
Figure 53:
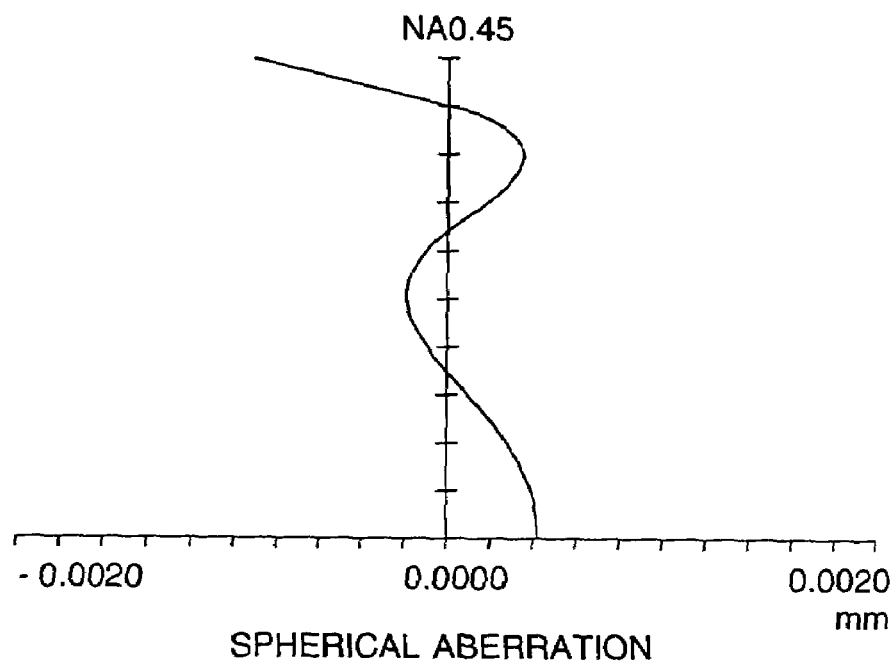
FIG. 53 is a view of the spherical aberration up to NA 0.45 to the wavelength λ=780 nm of the objective lens of Example 9 of the present invention.
Figure 54:
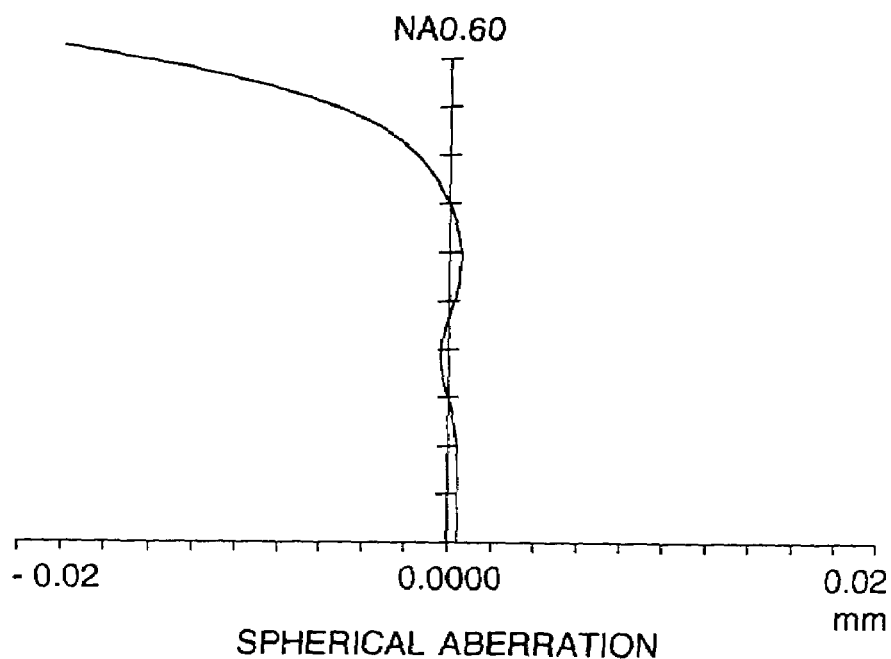
FIG. 54 is a view of the spherical aberration up to 0.60 to the wavelength λ=780 nm of the objective lens of Example 9 of the present invention.
Figure 55:
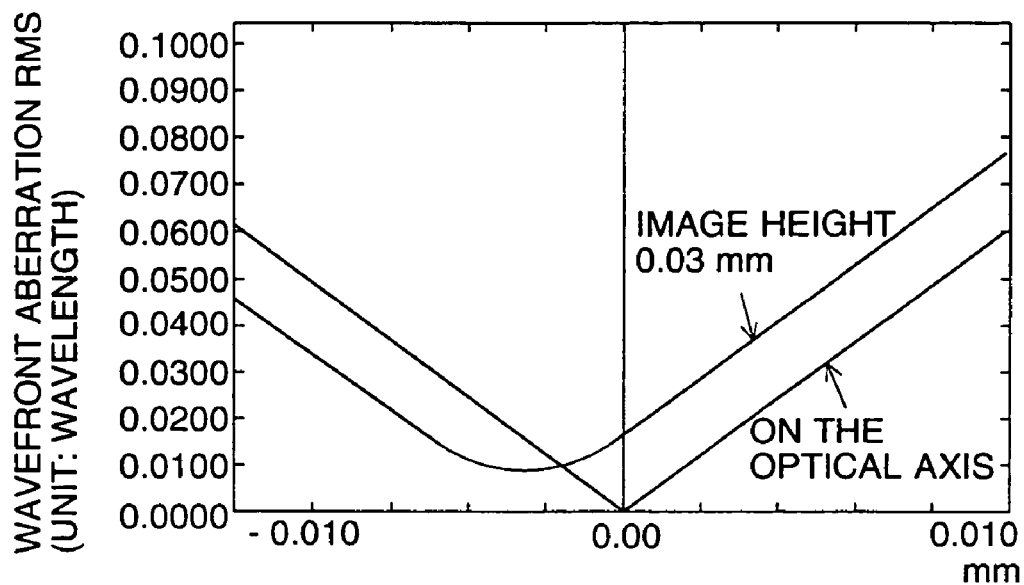
FIG. 55 is a view of the wave front aberration to the wavelength λ=650 nm of the objective lens of Example 9 of the present invention.
Figure 56:
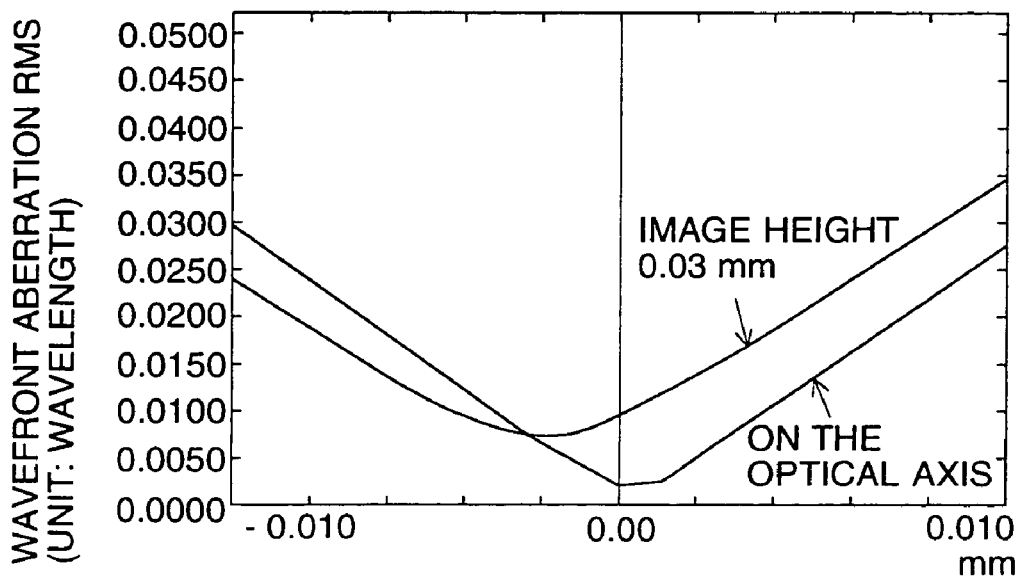
FIG. 56 is a view of the wave front aberration to the wavelength λ=780 nm of the objective lens of Example 9 of the present invention.

FIGS. 50 and 51 show optical paths of the objective lens in Example 9 for λ=650 nm and λ=780 nm. FIG. 52 shows a diagram of spherical aberration covering up to numerical aperture 0.60 of the objective lens in Example 9 for λ=650 nm. FIGS. 53 and 54 show diagrams of spherical aberration covering up to numerical apertures 0.45 and 0.60 of the objective lens in Example 9 for λ=780 nm. FIGS. 55 and 56 show diagrams of wave-front aberration of the objective lens in Example 9 for wavelength λ=650 nm and λ=780 nm.

Figure 57:
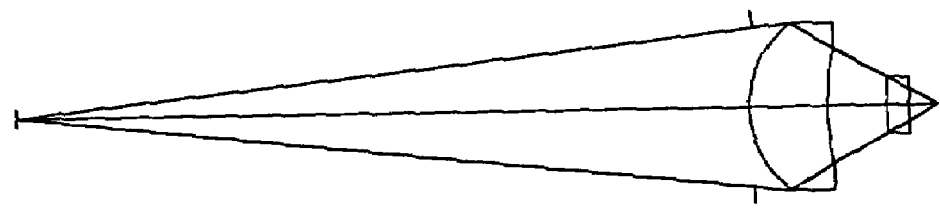
FIG. 57 is a view of the optical path to the wavelength λ=650 nm of the objective lens of Example 10 of the present invention.
Figure 58:
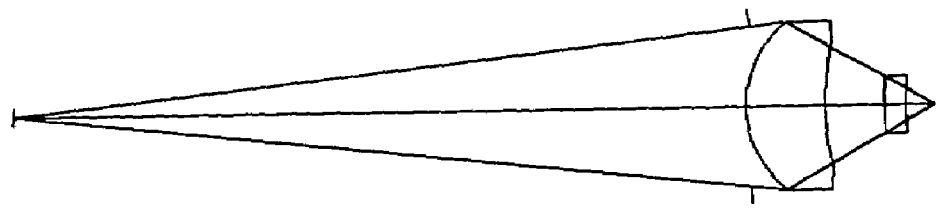
FIG. 58 is a view of the optical path to the wavelength λ=400 nm of the objective lens of Example 10 of the present invention.
Figure 59:
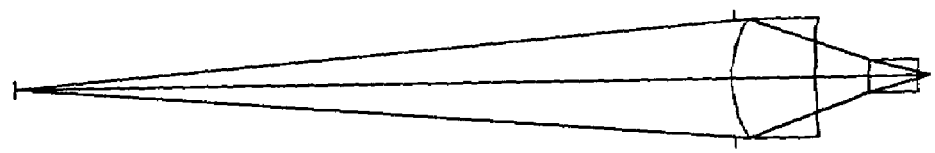
FIG. 59 is a view of the optical path to the wavelength λ 780 nm of the objective lens of Example 10 of the present invention.
Figure 60:
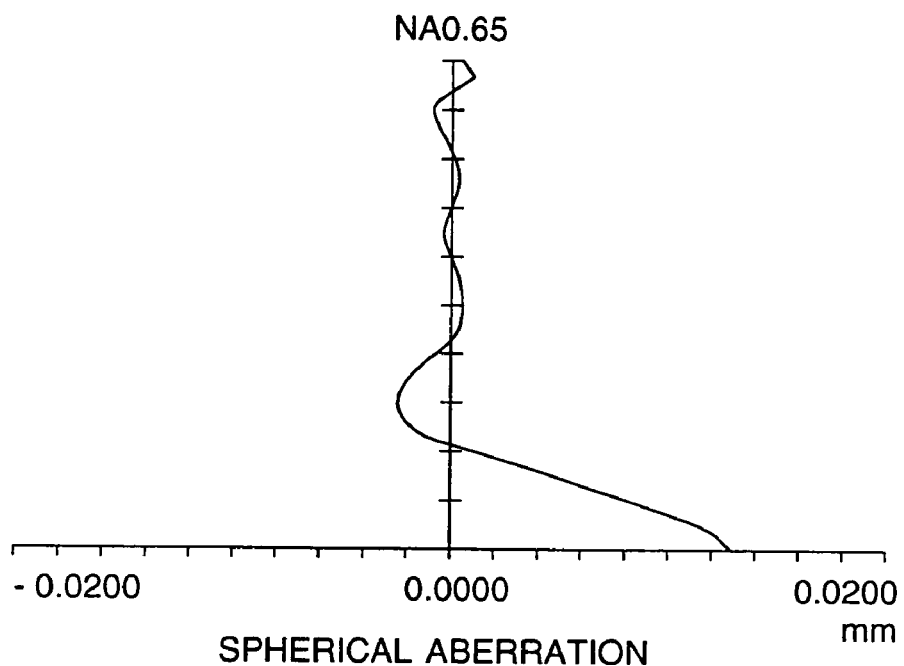
FIG. 60 is a view of the spherical aberration to the wavelength λ=650 nm of the objective lens of Example 10 of the present invention.
Figure 61:
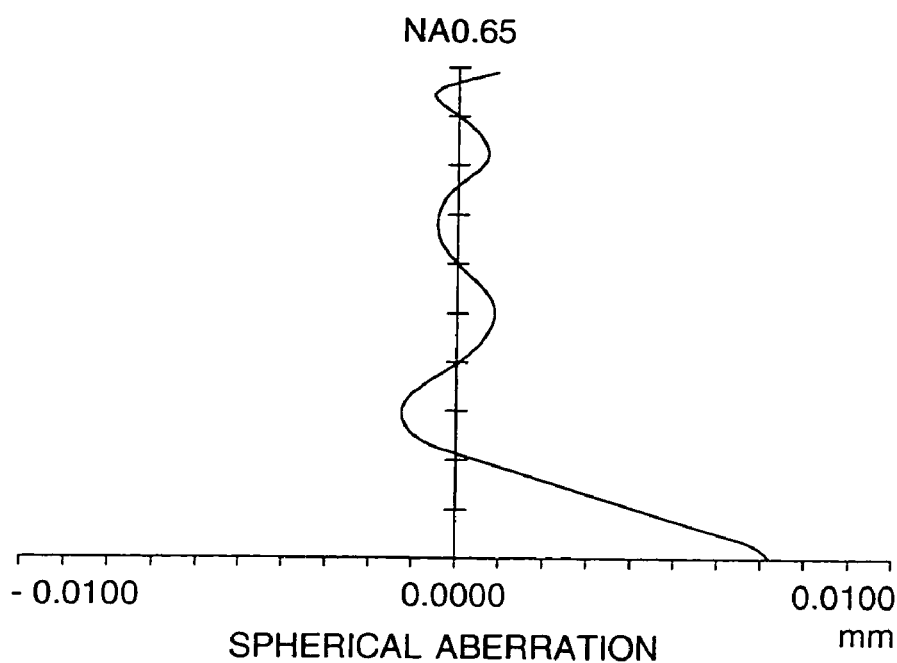
FIG. 61 is a view of the spherical aberration to the wavelength λ=400 nm of the objective lens of Example 10 of the present invention.
Figure 62:
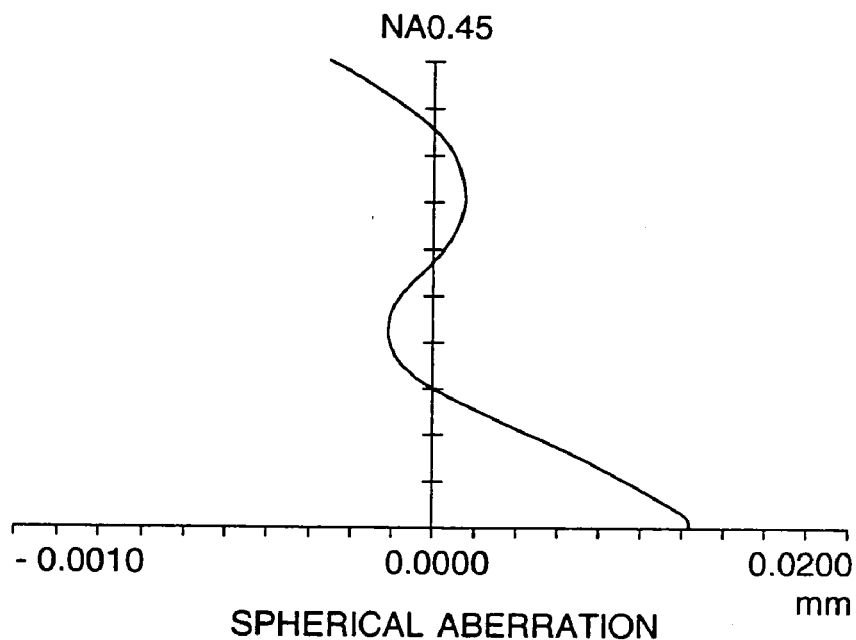
FIG. 62 is a view of the spherical aberration up to NA 0.45 to the wavelength λ=780 nm of the objective lens of Example 10 of the present invention.
Figure 63:
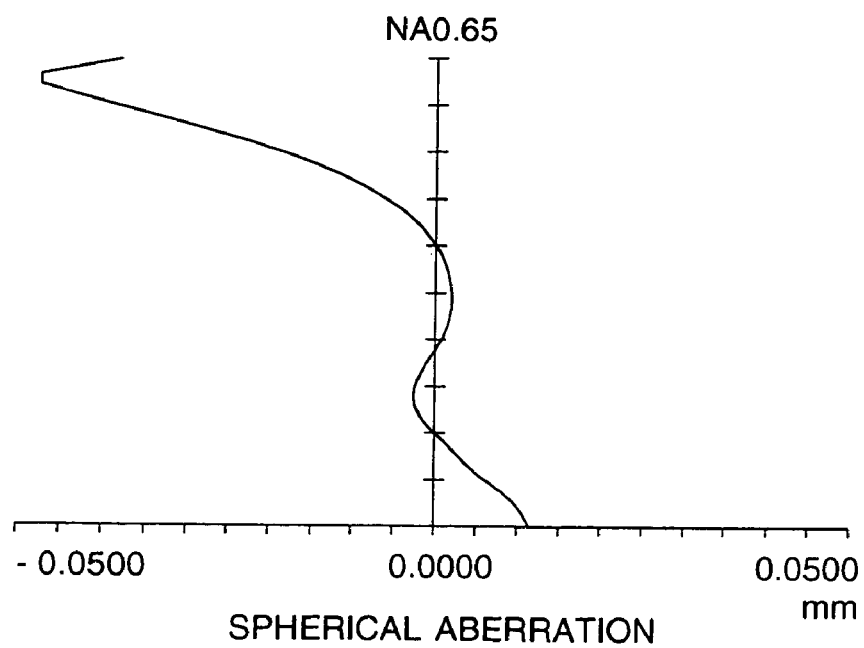
FIG. 63 is a view of the spherical aberration up to NA 0.65 to the wavelength λ=780 nm of the objective lens of Example 10 of the present invention.
Figure 64:
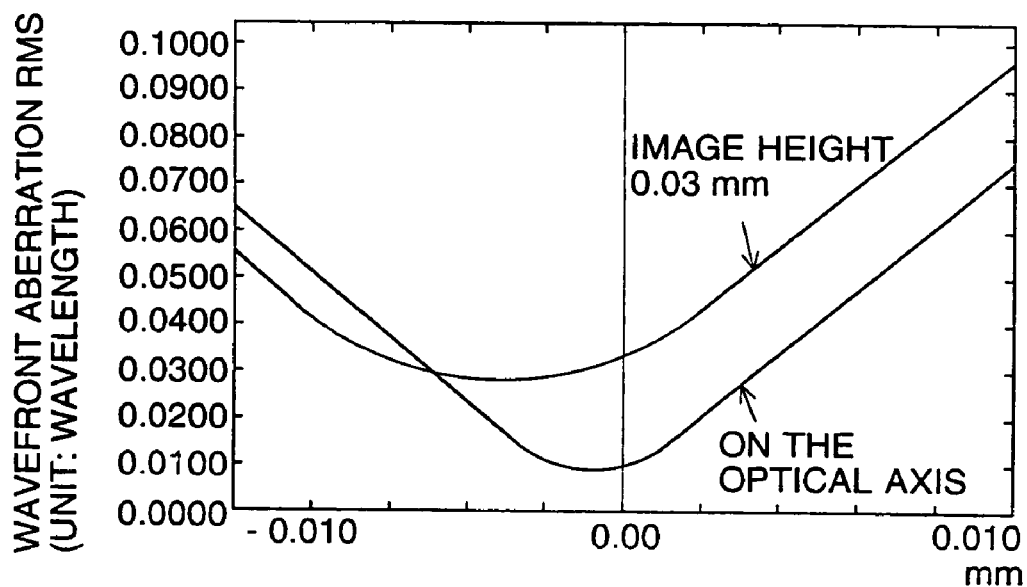
FIG. 64 is a view of the wave front aberration to the wavelength λ=650 nm of the objective lens of Example 10 of the present invention.
Figure 65:
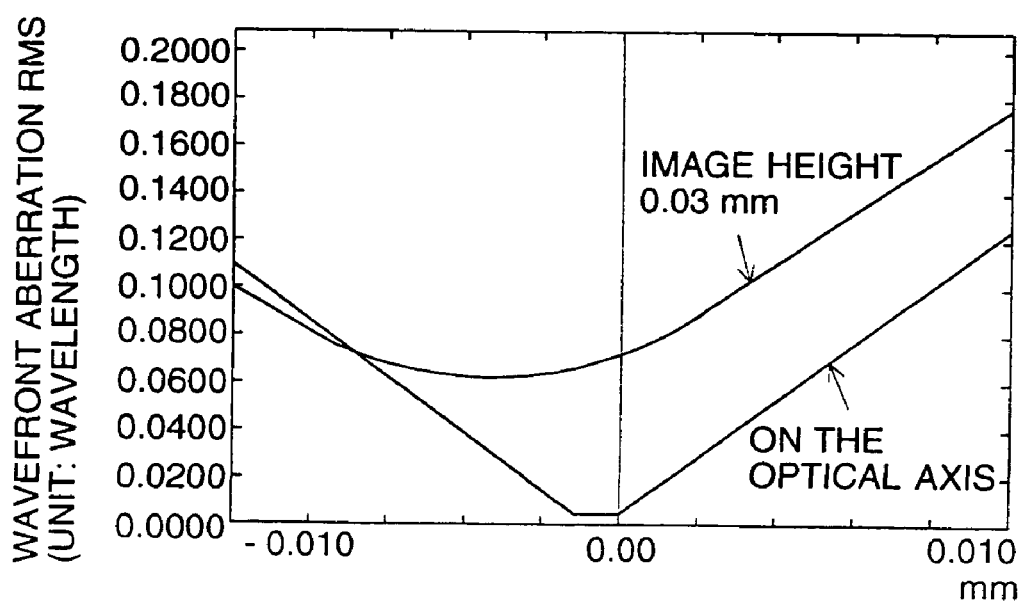
FIG. 65 is a view of the wave front aberration to the wavelength λ=400 nm of the objective lens of Example 10 of the present invention.
Figure 66:
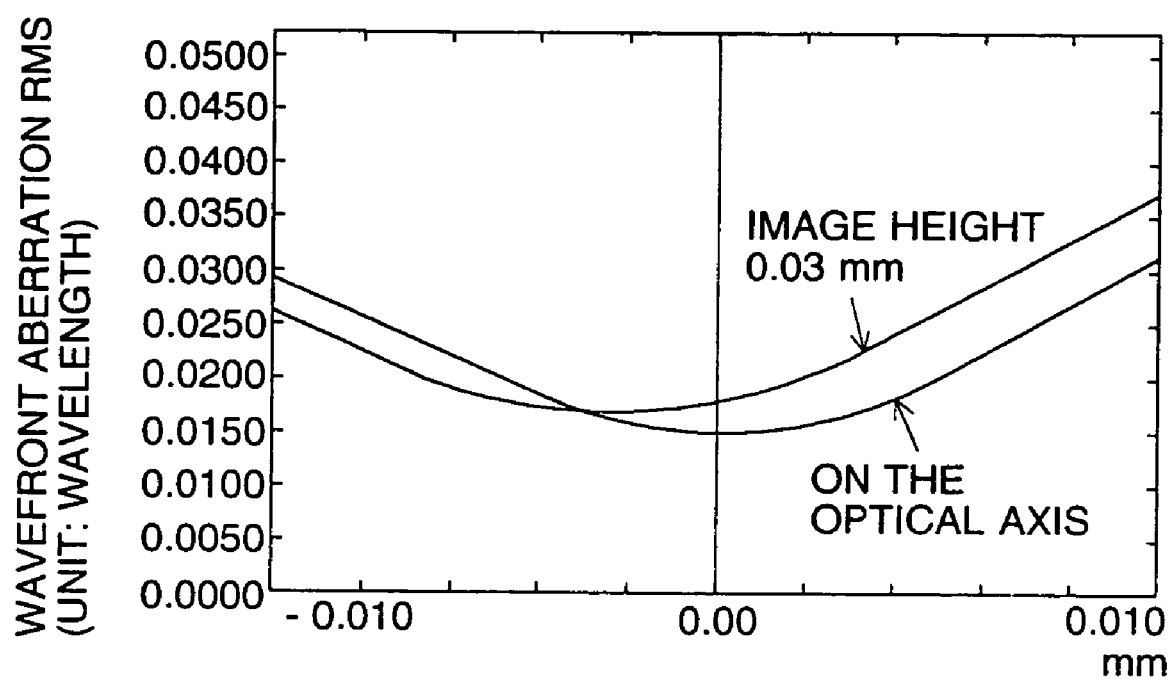
FIG. 66 is a view of the wave front aberration to the wavelength λ=780 nm of the objective lens of Example 10 of the present invention.

FIGS. 57-59 show optical paths of the objective lens in Example 10 for λ=650 nm, λ=400 nm and λ=780 nm. FIGS. 61 and 61 show diagrams of spherical aberration covering up to numerical apertures 0.65 of the objective lens in Example 10 for λ=650 nm and λ=400 nm. FIGS. 62 and 63 show diagrams of spherical aberration covering up to numerical apertures 0.45 and 0.65 of the objective lens in Example 10 for λ=780 nm. FIGS. 64-66 show wave-front aberration diagrams of the objective lens in Example 10 for λ=650 nm, λ=400 nm and λ=780 nm.

According to an objective lens in each of Examples 9 and 10, in any of the examples, a light flux exceeding NA 0.45 in practical use causes large spherical aberration for light with wavelength of 780 nm, and it does not contribute to recording and/or reproduction of information, as a flare.

Lens data of Examples 9 and 10 will be shown as follows. In Table 9 and Table 10, r represents a radius of curvature of the lens, d represents a distance between surfaces, n represents a refractive index at each wavelength, and ν represents Abbe's number. As a reference, there will be described the refractive index for d line (λ=587.6 nm) and νd (Abbe's number). The figure for the surface number is shown including an aperture, and in the present example, an air space is divided, for convenience' sake, into two locations before and after the portion corresponding to the transparent substrate of an optical disk.

Example 9 f=3.33 Image side NA 0.60 Magnification −0.194 (for wavelength λ=650 nm)

f=3.35 Image side NA 0.45 (NA 0.60) Magnification −0.195 (for wavelength λ=780 nm)

TABLE 9

| Surface No. | r | d | n | n | nd vd (Reference) | |
|---|---|---|---|---|---|---|
| Light source | · | 20.0 | | | | |
| Aperture | · | 0.0 | | | | |
| 2 (Aspheric surface 1 · Diffraction surface) | | 2.2 | 1.53771 | 1.5388 | 1.5404 | 56.0 |

TABLE 9-continued

| | | | | | |
|---|---|---|---|---|---|
| 2 (Aspheric surface 2) | 1.7467 | 1.58030 | 1.57346 | 1.585 | 29.9 |
| 4 | · | d4 | | | |
| 5 | · | d5 | | | |
| Image point | · | | | | |

| | d4 | d5 |
|---|---|---|
| for λ = 650 nm | 0.6 | 0.7500 |
| for λ = 780 nm | 1.2 | 0.3964 |

| | |
|---|---|
| Aspheric surface 1 | κ = −0.1295292<br>A4 = −0.045445253<br>A8 = −0.00011777995<br>A10 = −5.3843777 × 10-5<br>A12 = −9.0807729 × 10-6 |
| Diffraction surface 1 | B2 = 0<br>B4 = −7.6489594<br>B6 = 0.9933123<br>B8 = −0.28305522<br>B10 = 0.011289605 |
| Aspheric surface 2 | A4 = 0.019003845<br>A6 = −0.010002187<br>A8 = 0.004087239<br>A10 = −0.00085994626<br>A12 = 7.5491556 × 10-5 |

Example 10

| | | | |
|---|---|---|---|
| f = 3.31 | Image side NA 0.65 | Magnification | −0.203 (for wavelength λ = 650 nm) |
| f = 3.14 | Image side NA 0.65 | Magnification | −0.190 (for wavelength λ = 400 nm) |
| f = 3.34 | Image side NA 0.65 | Magnification | −0.205 (for wavelength λ = 780 nm) |

TABLE 10

| Surface No. | r | d | n (λ = 650 nm) | n (λ = 400 nm) | n (λ = 780 nm) |
|---|---|---|---|---|---|
| Light source | ∞ | 20.0 | | | |
| Aperture | ∞ | 0.0 | | | |
| 2 (Aspheric surface 1 Diffraction surface 1) | 2.450359 | 2.2 | 1.87707 | 1.92261 | 1.86890 |
| 3 (Aspheric surface 2 Diffraction surface 2) | 9.108348 | 1.4503 | | | |
| 4 | ∞ | d4 | 1.58030 | 1.62441 | 1.57346 |
| 5 | ∞ | d5 | | | |
| Image point | ∞ | | | | |

| | for λ = 650 nm | for λ = 400 nm | for λ = 780 nm |
|---|---|---|---|
| d4 | 0.6 | 0.6 | 1.2 |
| d4 | 0.7500 | 0.5540 | 0.4097 |

| | |
|---|---|
| Aspheric surface 1 | κ = −0.08796008<br>A4 = −0.010351744<br>A6 = 0.0015514472<br>A8 = −0.00043894535<br>A10 = 5.481801 × 10-5<br>A12 = −4.2588508 × 10-6 |

TABLE 10-continued

| | |
|---|---|
| Diffraction surface 1 | B2 = 0<br>B4 = −61.351934<br>B6 = 5.9668445<br>B8 = −1.2923244<br>B10 = 0.041773541 |
| Aspheric surface 2 | κ = −302.6352<br>A4 = 0.002<br>AE = −0.0014<br>A8 = 0.0042<br>A10 = −0.0022<br>A12 = 0.0004 |
| Diffraction surface 2 | B2 = 0<br>B4 = 341.19136<br>B6 = −124.16233<br>B8 = 49.877242<br>B10 = −5.9599182 |

Incidentally, the concrete example of the objective lens in the Example 10 can also be applied equally to the third embodiment.

Examples 11-14

An objective lens in each of Examples 11-14 has on its refraction surface an aspherical shape shown by expression (a3). In Examples 11-13, the diffraction surface is expressed by expression (a1) as phase difference function ΦB wherein a unit is radian. In Example 14, the diffraction surface is expressed by expression (a2) as optical path difference function Φb wherein a unit is mm.

When obtaining characteristics of an objective lens in each of the Examples 11-14, a light source wavelength for the first optical disk (DVD) is made to be 650 nm, a light source wavelength for the second optical disk (advanced high density optical disk employing blue laser) is made to be 400 nm, and transparent substrate thickness t1 for both of the first optical disk and the second optical disk is 0.6 mm. The light source wavelength for the third optical disk (CD) having transparent substrate thickness t2 which is different from t1 and is 1.2 mm was made to be 780 nm. Numerical apertures NA corresponding respectively to light source wavelengths 400 nm, 650 nm and 780 nm are assumed to be 0.65, 0.65 and 0.5.

Example 11

Example 11 is a concrete example of an objective lens related to the fourth embodiment, and it is structured so that a collimated light enters the objective lens. In this example, the square terms are not included in coefficients of the phase difference function, and coefficients of terms other than the square terms only are used.

Figure 68:
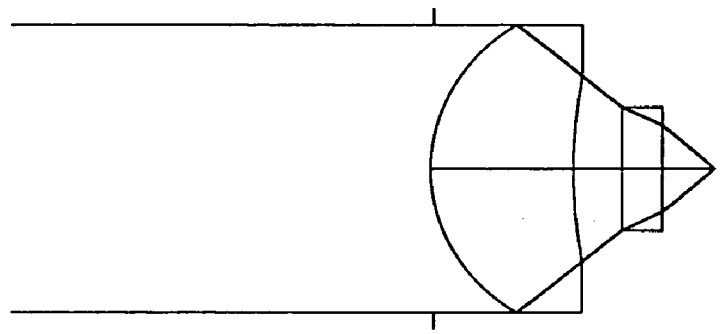
FIG. 68 is a view of the optical path to the wavelength λ=650 nm of the objective lens of Example 11 of the present invention.
Figure 69:
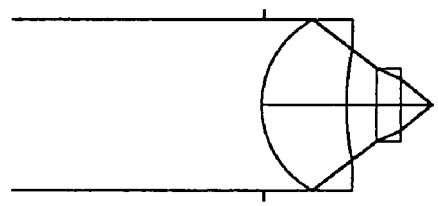
FIG. 69 is a view of the optical path to the wavelength λ=400 nm of the objective lens of Example 11 of the present invention.
Figure 70:
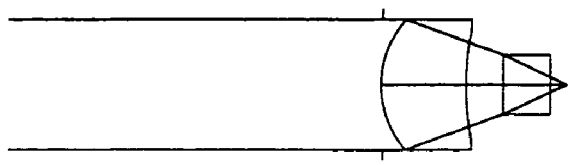
FIG. 70 is a view of the optical path to the wavelength λ=780 nm of the objective lens of Example 11 of the present invention.
Figure 71:
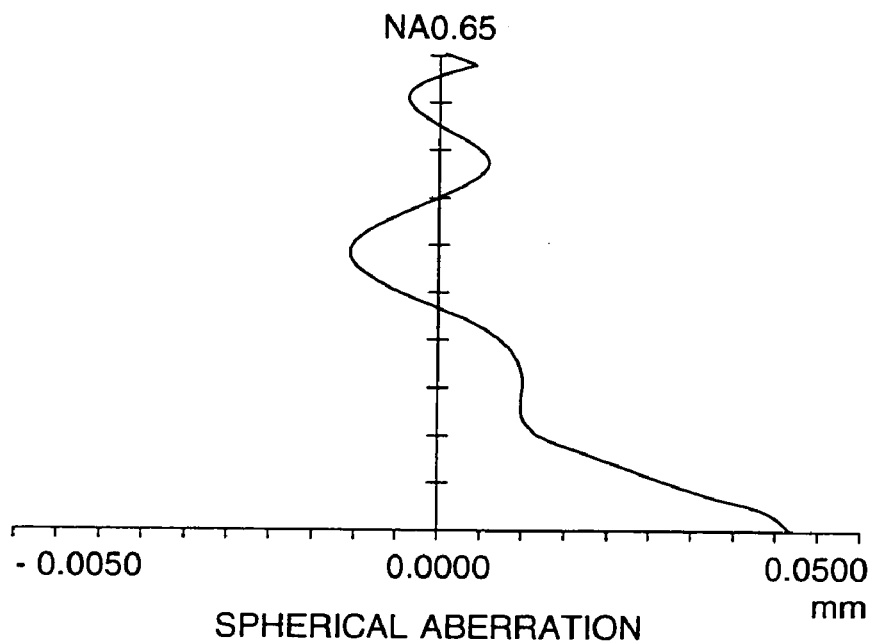
FIG. 71 is a view of the spherical aberration to the wavelength λ=650 nm of the objective lens of Example 1.1 of the present invention.
Figure 72:
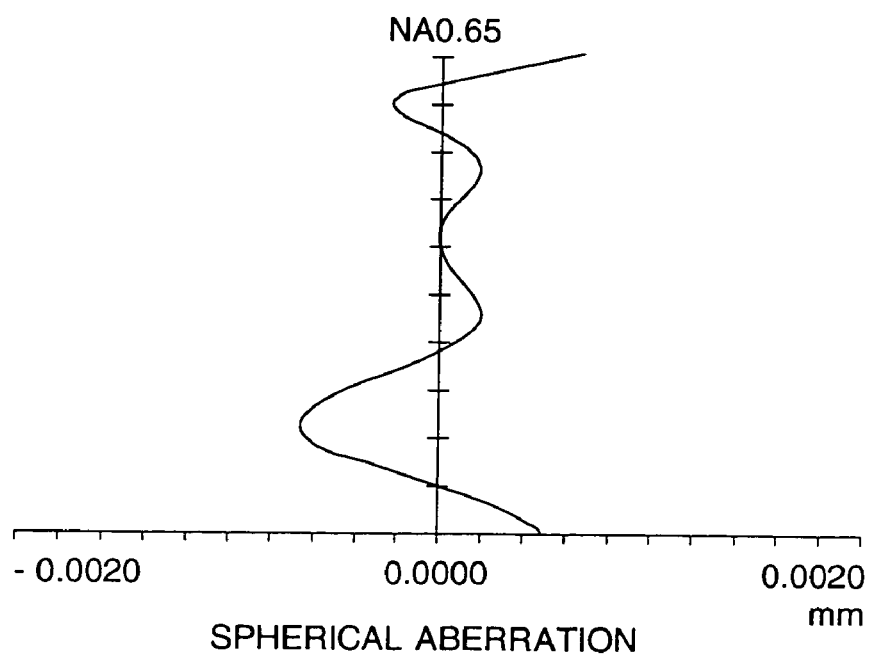
FIG. 72 is a view of the spherical aberration to the wavelength λ=400 nm of the objective lens of Example 11 of the present invention.
Figure 73:
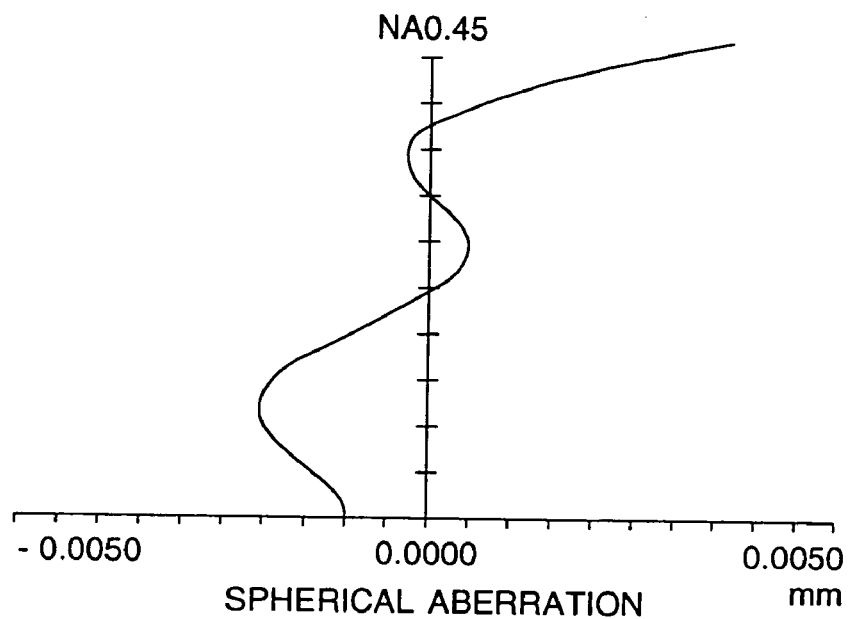
FIG. 73 is a view of the spherical aberration up to the numerical aperture 0.45 to the wavelength λ=780 nm of the objective lens of Example 11 of the present invention.
Figure 74:
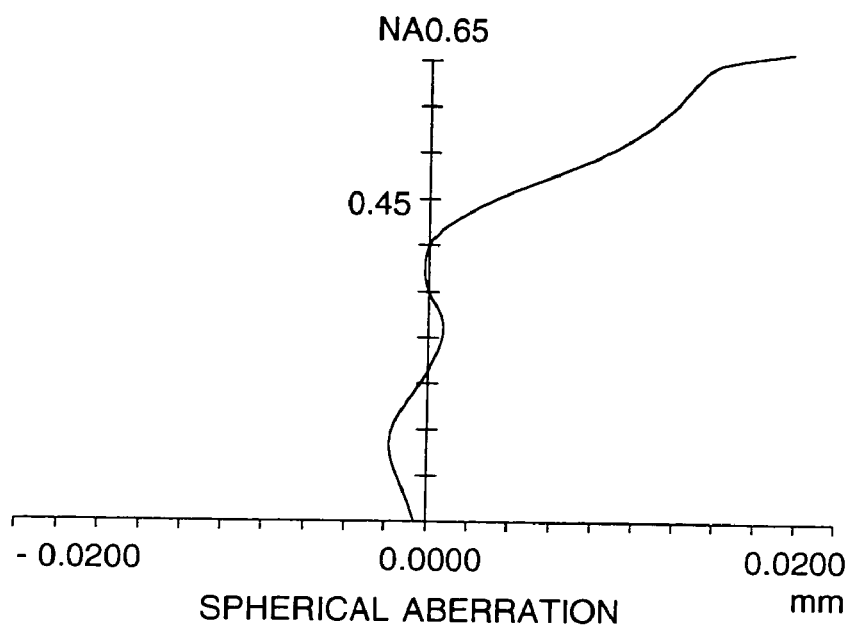
FIG. 74 is a view of the spherical aberration up to the numerical aperture 0.65 to the wavelength λ=780 nm of the objective lens of Example 11 of the present invention.
Figure 75:
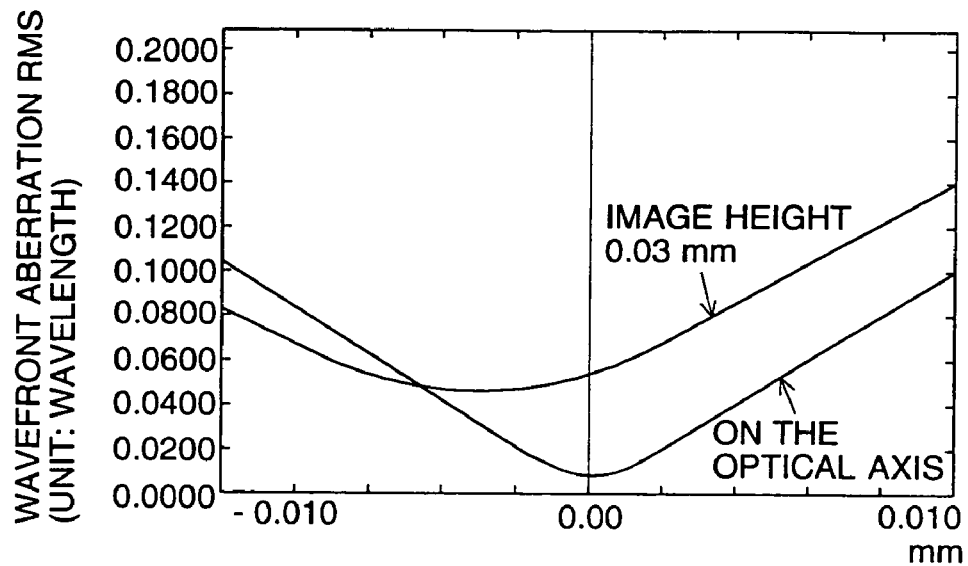
FIG. 75 is a view of the wave front aberration to the wavelength λ=650 nm of the objective lens of Example 11 of the present invention.
Figure 76:
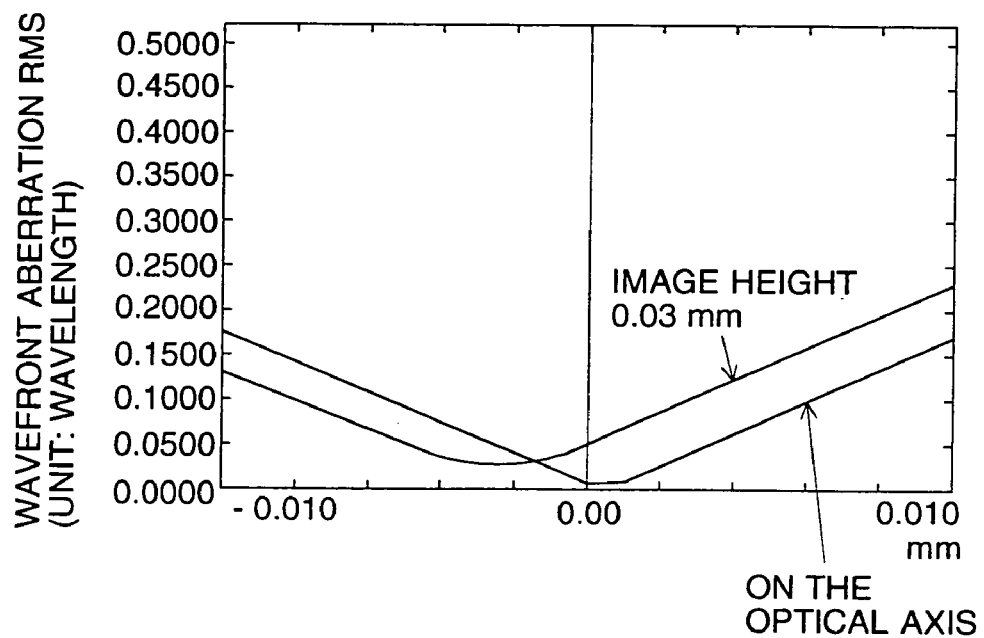
FIG. 76 is a view of the wave front aberration to the wavelength λ=400 nm of the objective lens of Example 11 of the present invention.
Figure 77:
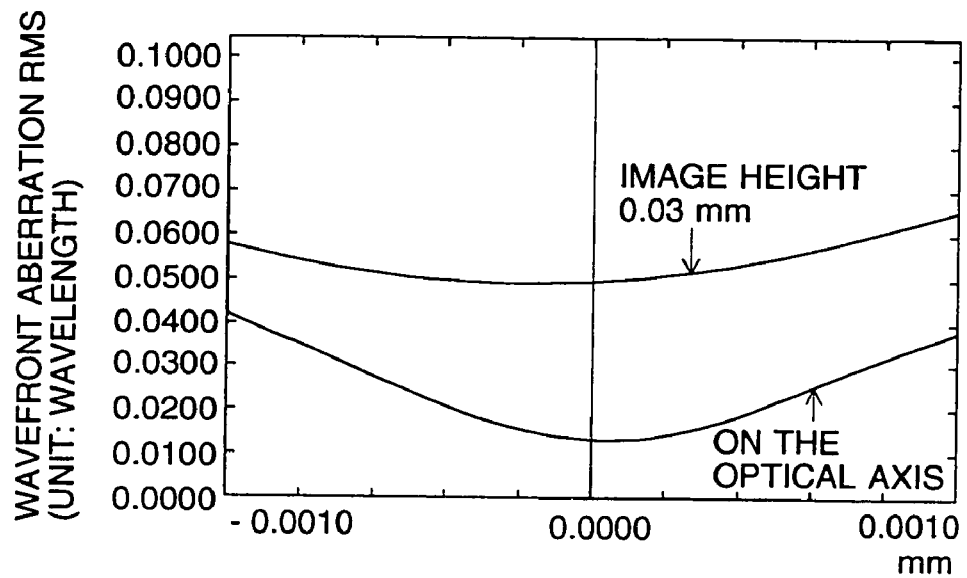
FIG. 77 is a view of the wave front aberration to the wavelength λ=780 nm of the objective lens of Example 11 of the present invention.

FIGS. 68-70 show diagrams for the optical path of the objective lens in Example 11 respectively for λ=650 nm. λ=400 nm and λ=780 nm. FIG. 71 and FIG. 72 show the diagrams of spherical aberration of the objective lens in Example 11 up to numerical aperture 0.65, respectively for λ=650 mm and λ=400 nm. FIG. 73 and FIG. 74 show the diagrams of spherical aberration of the objective lens in Example 11 up to numerical aperture 0.45 and numerical aperture 0.65, for wavelength λ=780 nm. FIGS. 75-77 show diagrams of spherical aberration of the objective lens in Example 11 respectively for λ=650 nm, λ=400 nm and λ=780 nm.

Lens data of Example 11 will be shown as follows. In Table 11, r represents a radius of curvature of the lens, d represents a distance between surfaces and n represents a refractive index at each wavelength. The figure for the surface number is shown including an aperture.

Example 11

| f = 3.33 | Image side NA 0.65 (for wavelength λ = 650 nm) |
|---|---|
| f = 3.15 | Image side NA 0.65 (for wavelength λ = 400 nm) |
| f = 3.37 | Image side NA 0.45 (for wavelength λ = 780 nm) (NA 0.65) |

TABLE 11

| Surface No. | r | d | n (λ = 650 nm) | n (λ = 400 nm) | n (λ = 780 nm) |
|---|---|---|---|---|---|
| Aperture | ∞ | 0.0 | | | |
| 2 (Aspheric surface 1 Diffraction surface 1) | 2.177303 | 2.2 | 1.80256 | 1.84480 | 1.79498 |
| 3 (Aspheric surface 2 Diffraction surface 2) | 6.457315 | 0.6985 | | | |
| 4 | ∞ | d4 | 1.58030 | 1.62441 | 1.57346 |
| 5 | ∞ | d5 | | | |
| Image point | ∞ | | | | |

| | for λ = 650 nm | for λ = 400 nm | for λ = 780 nm |
|---|---|---|---|
| d4 | 0.6 | 0.6 | 1.2 |
| d4 | 0.7500 | 0.6228 | 0.3995 |

| Aspheric surface 1 | κ = −0.1847301<br>A4 = −0.0090859227<br>A6 = 0.0016821871<br>A8 = −0.0071180761<br>A10 = 0.00012406905<br>A12 = −1.4004589 × 10-5 |
|---|---|
| Diffraction surface 1 | B2 = 0<br>B4 = −69.824562<br>B6 = 0.35641549<br>B8 = 0.6877372<br>B10 = −0.18333885 |
| Aspheric surface 2 | κ = −186.4056<br>A4 = 0.002<br>A6 = −0.0014<br>A8 = 0.0042<br>A10 = −0.0022<br>A12 = 0.0004 |
| Diffraction surface 2 | B2 = 0<br>B4 = 745.72117<br>B6 = −334.75078<br>B8 = 81.232224<br>B10 = −5.3410176 |

In an optical pickup apparatus having therein an objective lens like that in Example 11 (and Example 12 which will be described later) and three light sources, it is possible to correct spherical aberration caused by the difference of transparent substrate thickness and chromatic aberration of spherical aberration caused by the difference of wavelength for each disk, by designing aspherical surface coefficients and coefficients of a phase difference function. As is clear from FIG. 74, an outside of the numerical aperture NA 0.45 in practical use is made to be flare on the third optical disk.

Example 12

An objective lens of Example 12 is structured so that diverged light from a finite distance may enter the objective lens. In this example, the square terms are not included in coefficients of the phase difference function, and coefficients of terms other than the square terms only are used.

Figure 78:
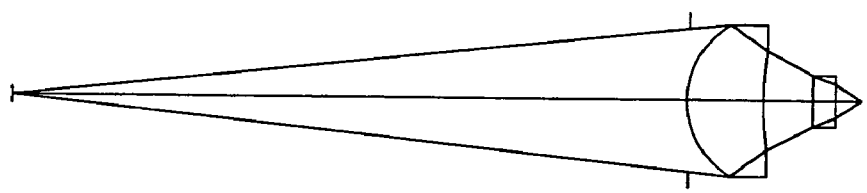
FIG. 78 is a view of the optical path to the wavelength λ=650 nm of the objective lens of Example 12 of the present invention.
Figure 79:
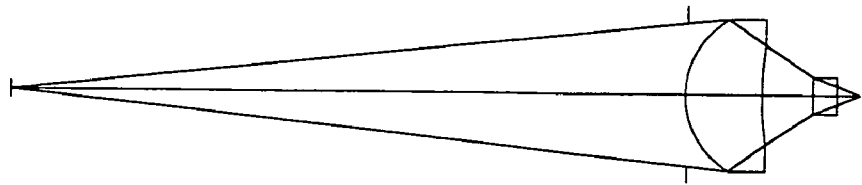
FIG. 79 is a view of the optical path to the wavelength λ=400 nm of the objective lens of Example 12 of the present invention.
Figure 80:
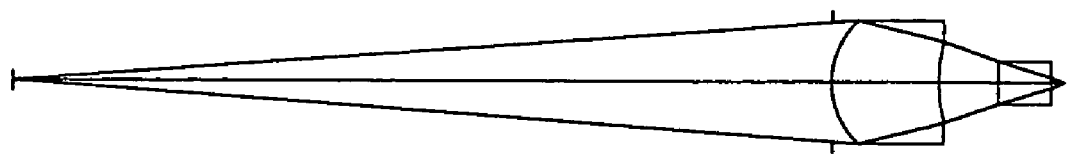
FIG. 80 is a view of the optical path to the wavelength λ=780 nm of the objective lens of Example 12 of the present invention.
Figure 81:
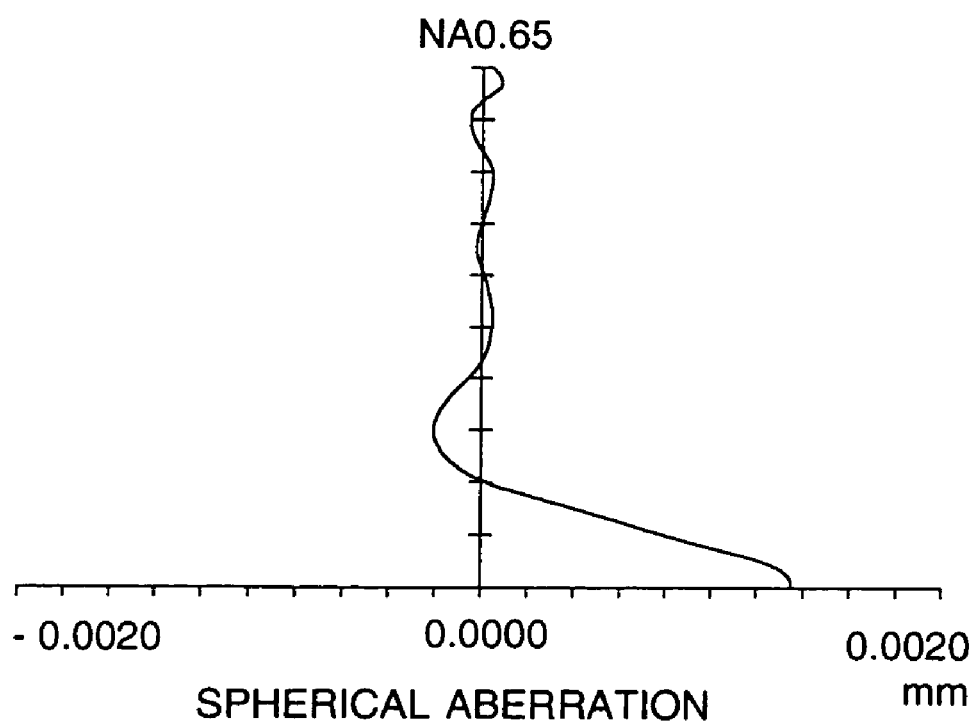
FIG. 81 is a view of the spherical aberration to the wavelength λ=650 nm of the objective lens of Example 12 of the present invention.
Figure 82:
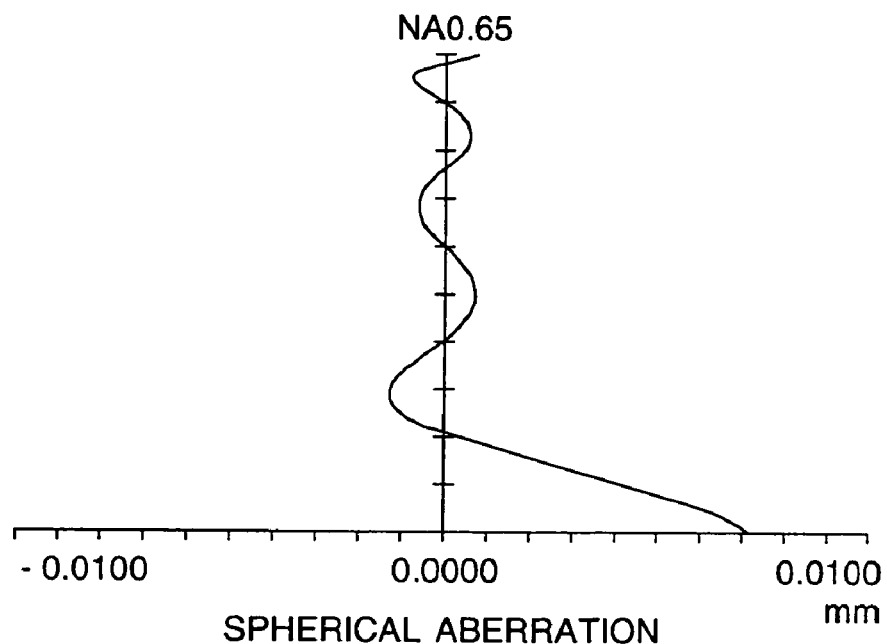
FIG. 82 is a view of the spherical aberration to the wavelength λ=400 nm of the objective lens of Example 1.2 of the present invention.
Figure 83:
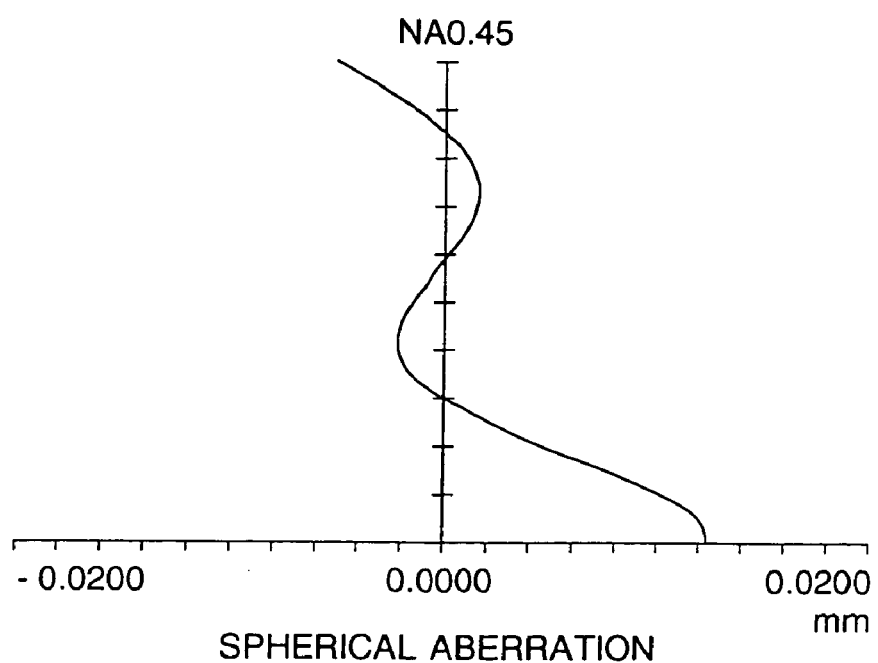
FIG. 83 is a view of the spherical aberration up to the numerical aperture 0.45 to the wavelength λ=780 nm of the objective lens of Example 12 of the present invention.
Figure 84:
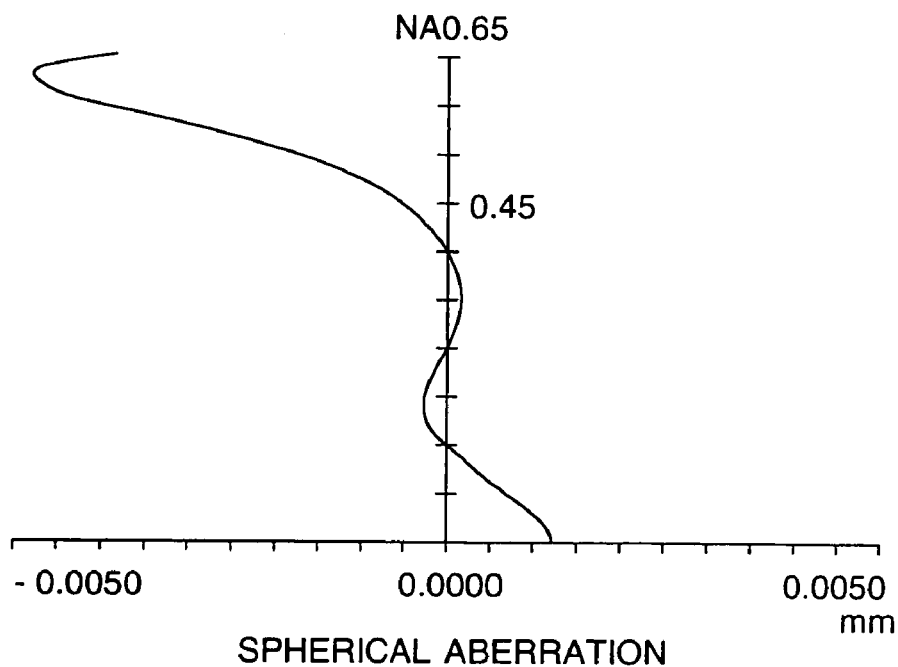
FIG. 84 is a view of the spherical aberration up to the numerical aperture 0.65 to the wavelength λ=780 nm of the objective lens of Example 12 of the present invention.
Figure 85:
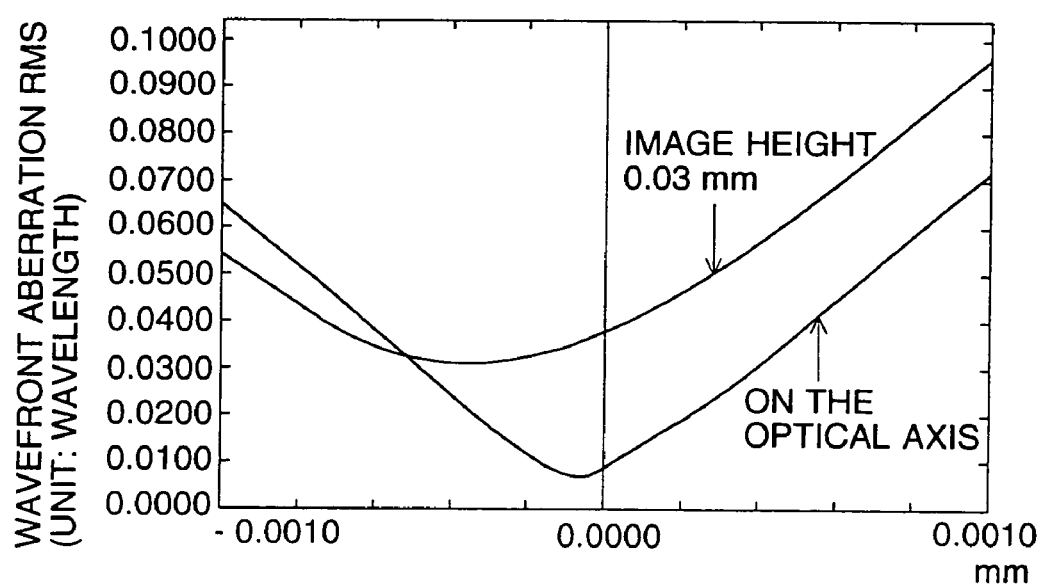
FIG. 85 is a view of the wave front aberration to the wavelength λ=650 nm of the objective lens of Example 12 of the present invention.
Figure 86:
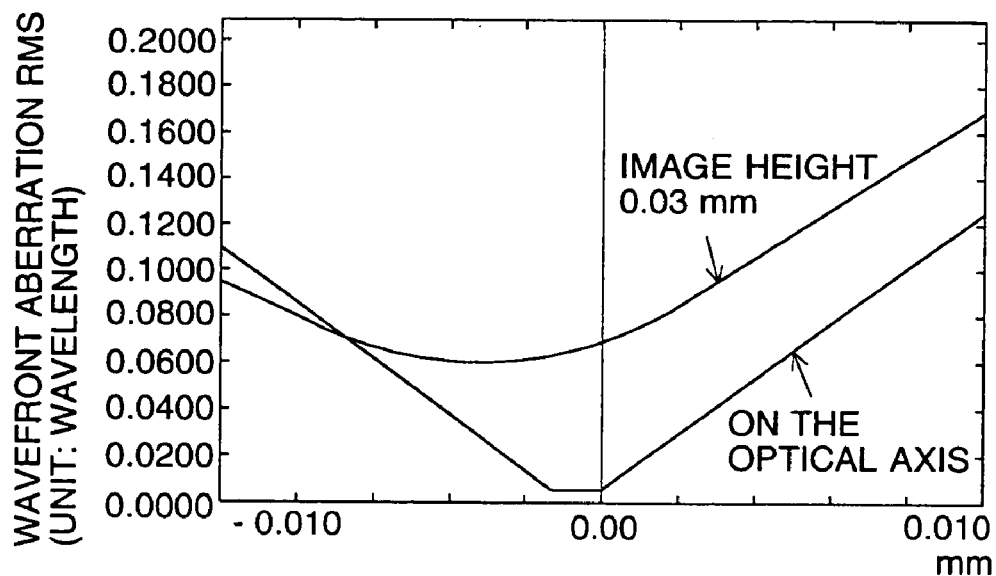
FIG. 86 is a view of the wave front aberration to the wavelength λ=400 nm of the objective lens of Example 12 of the present invention.
Figure 87:
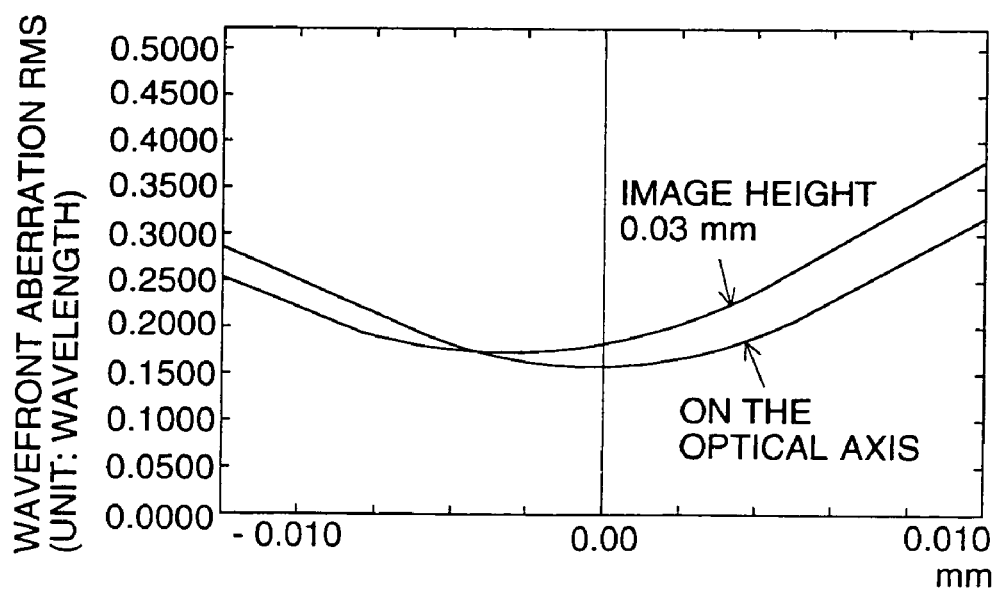
FIG. 87 is a view of the wave front aberration to the wavelength λ=780 nm of the objective lens of Example 12 of the present invention.

FIGS. 78-80 show diagrams for the optical path of the objective lens in Example 12 respectively for λ=650 nm. λ=400 nm and λ=780 nm. FIG. 81 and FIG. 82 show the diagrams of spherical aberration of the objective lens in Example 12 up to numerical aperture 0.65, respectively for λ=650 nm and λ=400 nm. FIG. 83 and FIG. 84 show the diagrams of spherical aberration of the objective lens in Example 12 up to numerical aperture 0.45 and numerical aperture 0.65, for wavelength λ=780 nm. FIGS. 85-87 show diagrams of spherical aberration of the objective lens in Example 12 respectively for λ=650 nm, =400 nm and λ=780 nm.

Lens data of Example 12 will be shown as follows.

Example 12

| f = 3.31 | Image side NA 0.65 | Magnification | −0.203 | (for wavelength λ = 650 nm) |
|---|---|---|---|---|
| f = 3.14 | Image side NA 0.65 | Magnification | −0.190 | (for wavelength λ = 400 nm) |
| f = 3.34 | Image side NA 0.65 (NA 0.65) | Magnification | −0.205 | (for wavelength λ = 780 nm) |

TABLE 12

| Surface No. | r | d | n (λ = 650 nm) | n (λ = 400 nm) | n (λ = 780 nm) |
|---|---|---|---|---|---|
| Light source | ∞ | 20.0 | | | |
| Aperture | ∞ | 0.0 | | | |
| 2 (Aspheric surface 1 Diffraction surface 1) | 2.450359 | 2.2 | 1.87707 | 1.92261 | 1.86890 |
| 3 (Aspheric surface 2 Diffraction surface 2) | 9.108348 | 1.4503 | | | |
| 4 | ∞ | d4 | 1.58030 | 1.62441 | 1.57346 |
| 5 | ∞ | d5 | | | |
| Image point | ∞ | | | | |

| | for λ = 650 nm | for λ = 400 nm | for λ = 780 nm |
|---|---|---|---|
| d4 | 0.6 | 0.6 | 1.2 |
| d4 | 0.7500 | 0.5540 | 0.4097 |

| Aspheric surface 1 | κ = −0.08796008<br>A4 = −0.010351744<br>A6 = 0.0015514472<br>A8 = −0.00043894535<br>A10 = 5.481801 × 10-5<br>A12 = −4.2588508 × 10-6 |
|---|---|
| Diffraction surface 1 | B2 = 0<br>B4 = −61.351934<br>B6 = 5.9668445<br>B8 = −1.2923244<br>B10 = 0.041773541 |
| Aspheric surface 2 | κ = −302.6352<br>A4 = 0.002<br>A6 = −0.0014<br>A8 = 0.0042<br>A10 = −0.0022<br>A12 = 0.0004 |

TABLE 12-continued

| | |
|---|---|
| Diffraction surface 2 | B2 = 0 |
| | B4 = 341.19136 |
| | B6 = −124.16233 |
| | B8 = 49.877242 |
| | B10 = −5.9599182 |

In an optical pickup apparatus having therein an objective lens like that in Example 12 and three light sources, it is possible to correct spherical aberration caused by the difference of transparent substrate thickness and chromatic aberration of spherical aberration caused by the difference of wavelength, for each disk. As is clear from FIG. 84, an outside of the numerical aperture NA 0.45 in practical use is made to be flare on the third optical disk.

Example 13

An objective lens of Example 13 is another concrete example of an objective lens related to the fourth embodiment, and is structured so that collimated light from an infinite distance may enter the objective lens. In this example, the square terms and terms other than the square term are used as coefficients of the phase difference function of the diffraction surface.

Figure 88:
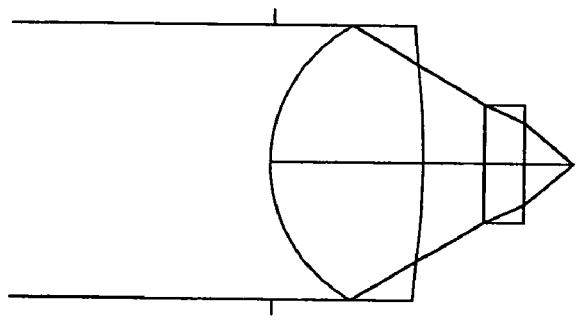
FIG. 88 is a view of the optical path to the wavelength λ=650 nm of the objective lens of Example 13 of the present invention.
Figure 89:
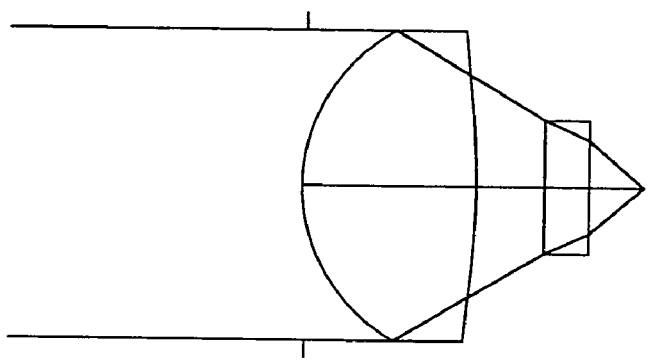
FIG. 89 is a view of the optical path to the wavelength λ=400 nm of the objective lens of Example 13 of the present invention.
Figure 90:
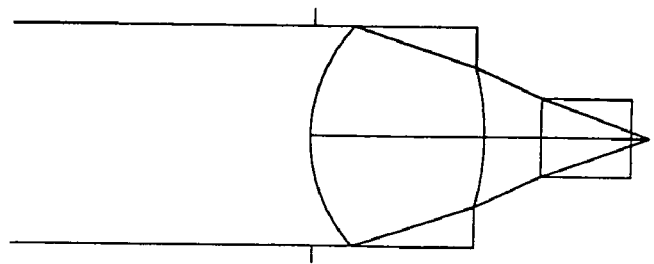
FIG. 90 is a view of the optical path to the wavelength λ=780 nm of the objective lens of Example 13 of the present invention.
Figure 91:
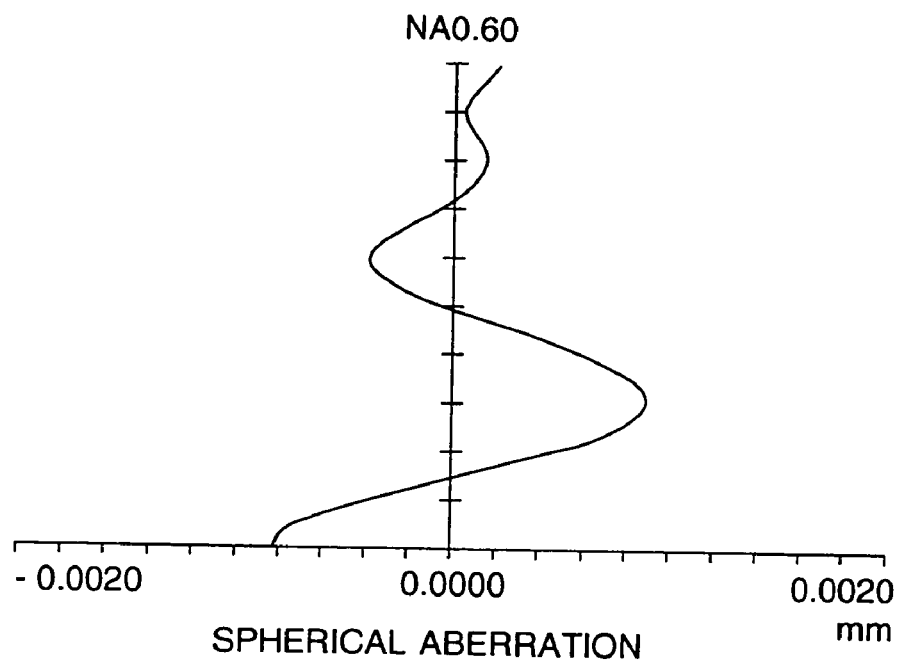
FIG. 91 is a view of the spherical aberration to the wavelength λ=650 nm of the objective lens of Example 13 of the present invention.
Figure 92:
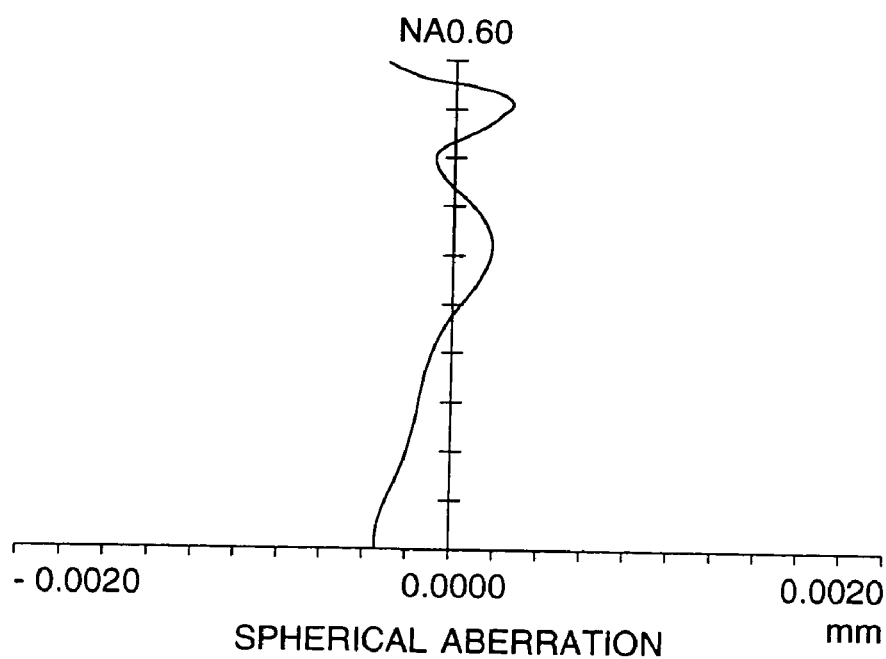
FIG. 92 is a view of the spherical aberration to the wavelength λ=400 nm of the objective lens of Example 13 of the present invention.
Figure 93:
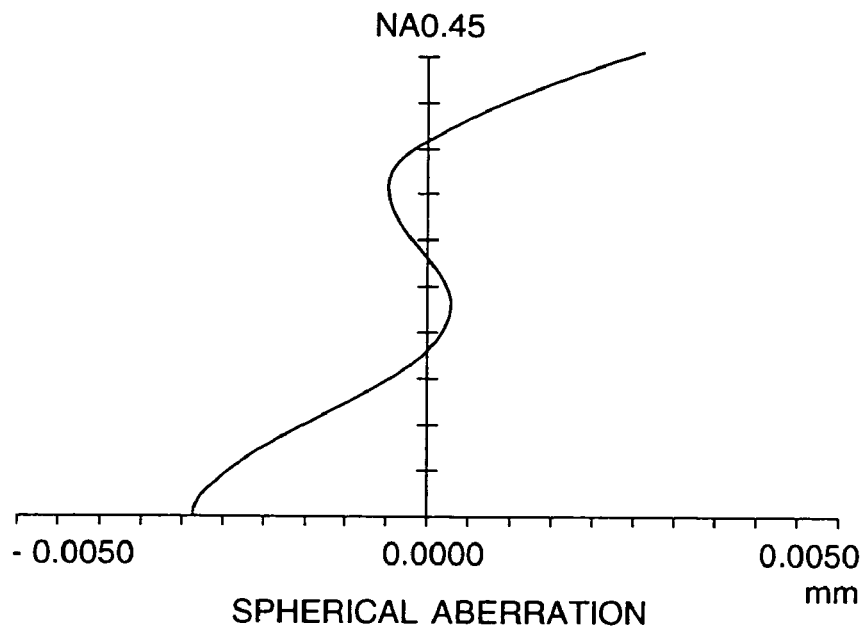
FIG. 93 is a view of the spherical aberration up to the numerical aperture 0.45 to the wavelength λ=780 nm of the objective lens of Example 13 of the present invention.
Figure 94:
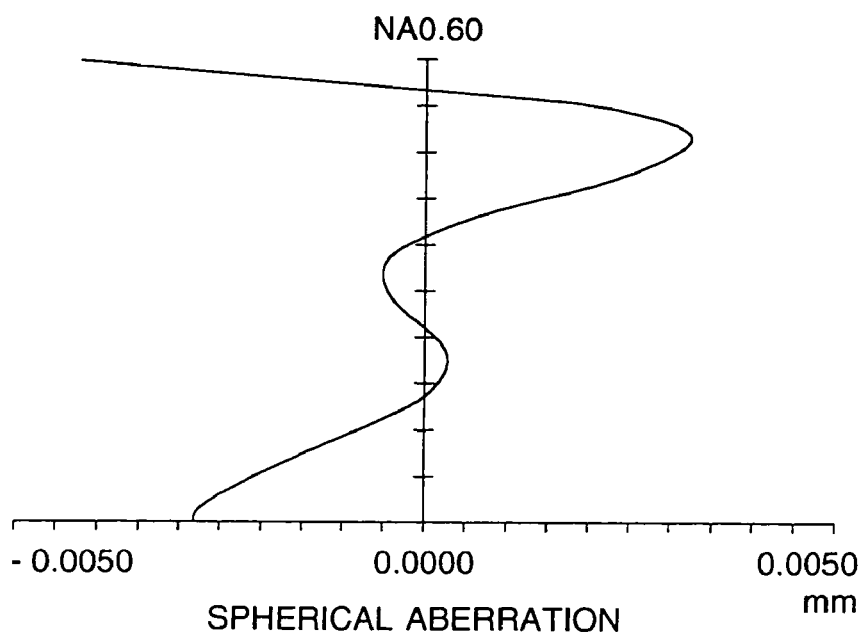
FIG. 94 is a view of the spherical aberration up to the numerical aperture 0.65 to the wavelength λ=780 nm of the objective lens of Example 13 of the present invention.
Figure 95:
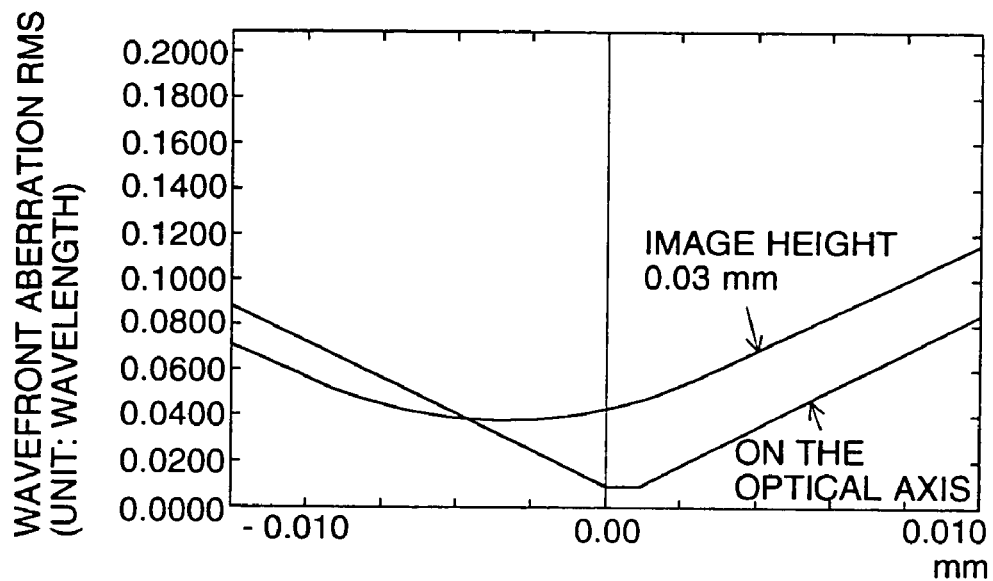
FIG. 95 is a view of the wave front aberration to the wavelength λ=650 nm of the objective lens of Example 13 of the present invention.
Figure 96:
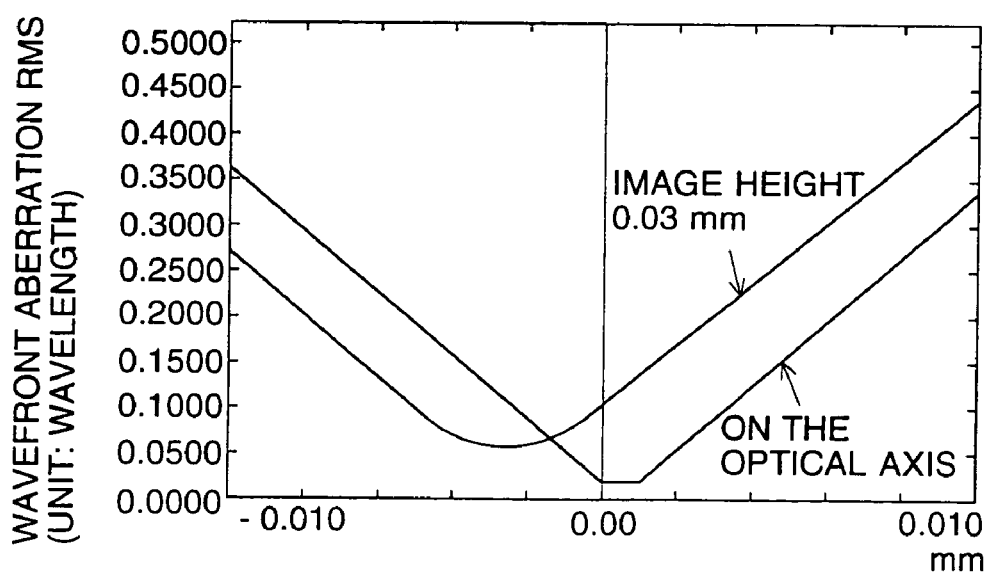
FIG. 96 is a view of the wave front aberration to the wavelength λ=400 nm of the objective lens of Example 13 of the present invention.
Figure 97:
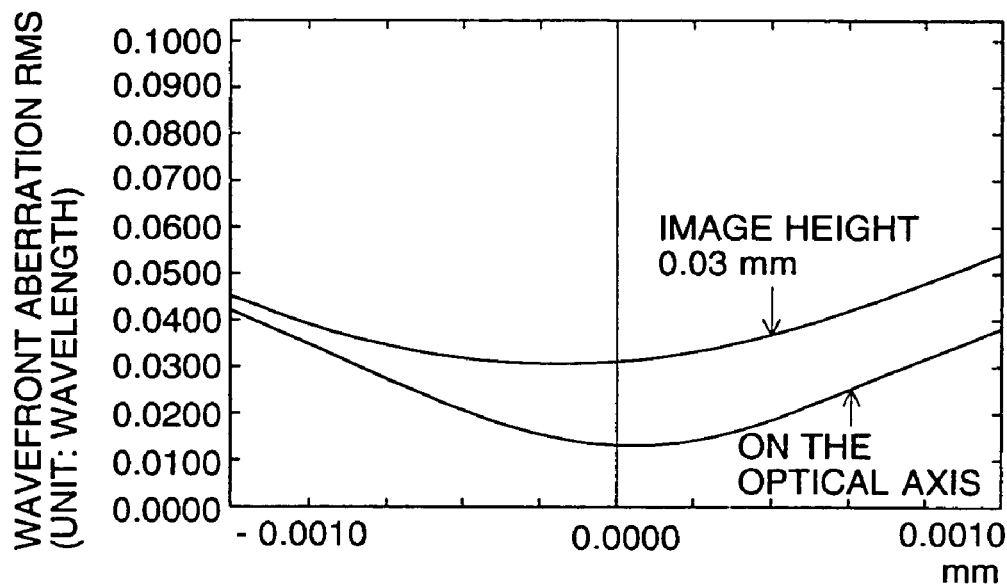
FIG. 97 is a view of the wave front aberration to the wavelength λ=780 nm of the objective lens of Example 13 of the present invention.

FIGS. 88-90 show diagrams for the optical path of the objective lens in Example 13 respectively for λ=650 nm. λ=400 nm and λ=780 nm. FIG. 91 and FIG. 92 show the diagrams of spherical aberration of the objective lens in Example 13 up to numerical aperture 0.60, respectively for λ=650 mm and λ=400 nm. FIG. 93 and FIG. 94 show the diagrams of spherical aberration of the objective lens in Example 13 up to numerical aperture 0.45 and numerical aperture 0.60, for wavelength λ=780 nm. FIGS. 95-97 show diagrams of spherical aberration of the objective lens in Example 13 respectively for λ=650 nm, λ=400 nm and λ=780 nm.

Lens data of Example 13 will be shown as follows.

Example 13

| | |
|---|---|
| f = 3.31 | Image side NA 0.60 (for wavelength λ = 650 nm) |
| f = 3.14 | Image side NA 0.60 (for wavelength λ = 400 nm) |
| f = 3.34 | Image side NA 0.45 (for wavelength λ = 780 nm) (NA 0.60) |

TABLE 13

| Surface No. | r | d | n (λ = 650 nm) | n (λ = 400 nm) | n (λ = 780 nm) |
|---|---|---|---|---|---|
| Aperture | ∞ | 0.0 | | | |
| 2 (Aspheric surface 1 Diffraction surface 1) | 2.016831 | 2.2 | 1.53771 | 1.55765 | 1.53388 |
| 3 (Aspheric surface 2 Diffraction surface 2) | −12.04304 | 0.7555 | | | |

TABLE 13-continued

| | | | | | |
|---|---|---|---|---|---|
| 4 | ∞ | d4 | 1.58030 | 1.62441 | 1.57346 |
| 5 | ∞ | d5 | | | |
| Image point | ∞ | | | | |

| | for λ = 650 nm | for λ = 400 nm | for λ = 780 nm |
|---|---|---|---|
| d4 | 0.6 | 0.6 | 1.2 |
| d4 | 0.7500 | 0.7500 | 0.3409 |

| | |
|---|---|
| Aspheric surface 1 | κ = −0.3363369 |
| | A4 = −0.0025421455 |
| | A6 = −0.0010660122 |
| | A8 = 4.7189743 × 10-5 |
| | A10 = 1.5406396 × 10-6 |
| | A12 = −7.0004876 × 10-6 |
| Diffraction surface 1 | B2 = −177.66083 |
| | B4 = −46.296284 |
| | B6 = −6.8014831 |
| | B8 = 1.6606499 |
| | B10 = −0.39075825 |
| Aspheric surface 2 | κ = 43.44262 |
| | A4 = 0.002 |
| | A6 = −0.0014 |
| | A8 = 0.0042 |
| | A10 = −0.0022 |
| | A12 = 0.0004 |
| Diffraction surface 2 | B2 = 241.52445 |
| | B4 = 402.41974 |
| | B6 = −191.87213 |
| | B8 = 64.779696 |
| | B10 = −8.6741764 |

In the present example, it is possible to correct spherical aberration caused by the difference of thickness of the transparent substrate and to correct chromatic aberration of spherical aberration and axial chromatic aberration both caused by the difference of wavelength, for each disk, because square terms and terms other than the square terms are used as coefficients of the phase difference function of the diffraction surface. As is clear from FIG. 94, an outside of the numerical aperture NA 0.45 in practical use is made to be flare on the third optical disk.

Example 14

An objective lens of Example 14 is a concrete example of an objective lens related to the sixth embodiment, and is structured so that collimated light with wavelengths of 400 nm and 650 nm from an infinite distance and diverged light with wavelength of 780 nm may enter the objective lens. In this example, square terms and terms other than the square terms are used as coefficients of the phase difference function of the diffraction surface.

Figure 98:
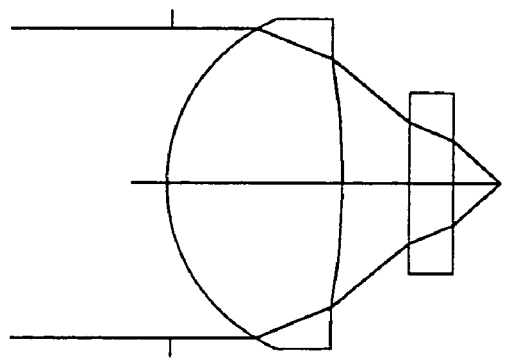
FIG. 98 is a view of the optical path to the wavelength λ=400 nm, of the objective lens of Example 13 of the present invention.
Figure 99:
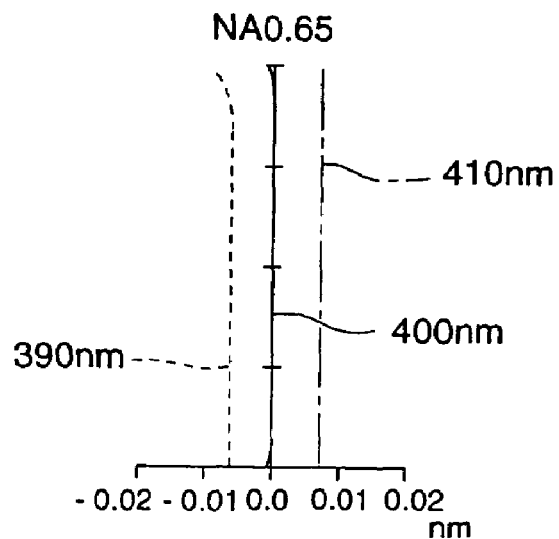
FIG. 99 is a view of the spherical aberration to the wavelength λ=400 nm±10 nm, of the objective lens of Example 13 of the present invention.
Figure 100:
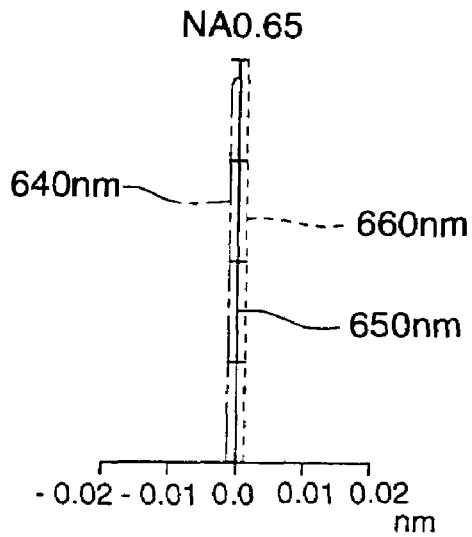
FIG. 100 is a view of the spherical aberration to the wavelength λ=650 nm±10 nm, of the objective lens of Example 13 of the present invention.
Figure 101:
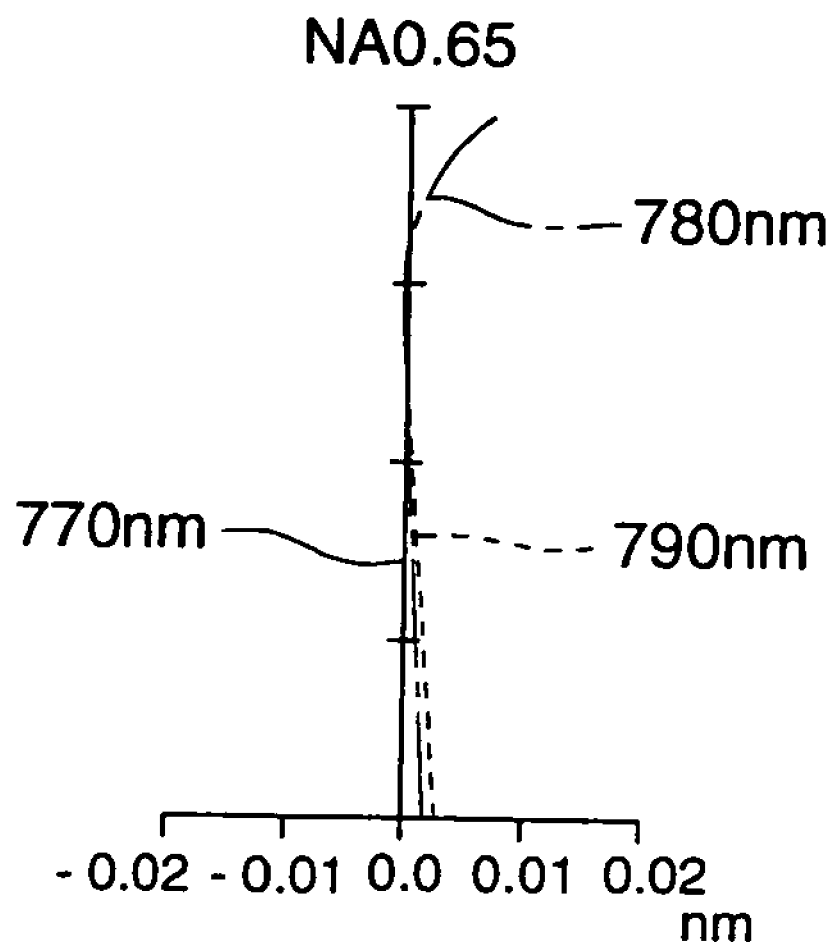
FIG. 101 is a view of the spherical aberration to the wavelength λ=780 nm±10 nm, of the objective lens of Example 13 of the present invention.

FIG. 98 shows a diagram for the optical path of the objective lens in Example 14 for λ=400 nm. FIGS. 99-101 show the diagrams of spherical aberration of the objective lens in Example 14 up to numerical aperture 0.65, respectively for λ=400 nm±10 nm, =650 nm±10 nm and λ=780 nm±10 nm.

Lens data of Example 14 will be shown as follows.

Example 14

| | |
|---|---|
| f = | Image side NA 0.65 (for wavelength λ = 650 nm) |
| f = | Image side NA 0.65 (for wavelength λ = 400 nm) |
| f = | Image side NA 0.45 (for wavelength λ = 780 nm) (NA 0.65) |

TABLE 14

| Surface No. | r | d | n (λ = 650 nm) | n (λ = 400 nm) | n (λ = 780 nm) |
|---|---|---|---|---|---|
| Light source | ∞ | d0 | | | |
| Aperture | ∞ | 0 | | | |
| 2 (Aspheric surface 1 Diffraction surface) | 2.15759 | 2.400 | 1.561 | 1.541 | 1.537 |
| 3 (Aspheric surface 2) | | 0.976 | | | |
| 4 | ∞ | d4 | 1.622 | 1.578 | 1.571 |
| 5 | ∞ | d5 | | | |
| Image point | ∞ | | | | |

| | for λ = 400 nm | for λ = 650 nm | for λ = 780 nm |
|---|---|---|---|
| d0 | ∞ | ∞ | 75.17 |
| d4 | 0.6 | 0.6 | 1.2 |
| d5 | 0.649 | 0.733 | 0.532 |
| Focal distance | 3.33 | 3.44 | 3.46 |

| | |
|---|---|
| Aspheric surface 1 | κ = −2.0080<br>A4 = 0.18168 × 10-1<br>A6 = −0.91791 × 10-3<br>A8 = 0.16455 × 10-3<br>A10 = −0.11115 × 10-4 |
| Diffraction surface | b2 = −0.51589 × 10-3<br>b4 = −0.24502 × 10-3<br>b6 = 0.49557 × 10-4<br>b8 = −0.14497 × 10-4 |
| Aspheric surface 2 | κ = 3.1831<br>A4 = 0.14442 × 10-1<br>A6 = −0.17506 × 10-2<br>A8 = 0.21593 × 10-4<br>A10 = 0.12534 × 10-4 |

Incidentally, the invention is not limited to the examples explained above. Though the diffraction surface is formed on each of both sides of the objective lens, it may also be provided on a certain surface of an optical element in an optical system of the optical pickup apparatus. Further, though the ring-zonal diffraction surface is formed on the entire surface of the lens, it may also be formed partially. In addition, though optical design has been advanced under the assumption that a light source wavelength is 400 nm and a thickness of a transparent substrate is 0.6 mm, for the target of an advanced high density optical disk employing blue laser, the invention can also be applied to the optical disk with specifications other than the aforesaid specifications.

Next, the seventh embodiment of the invention will be explained as follows.

Figure 117:
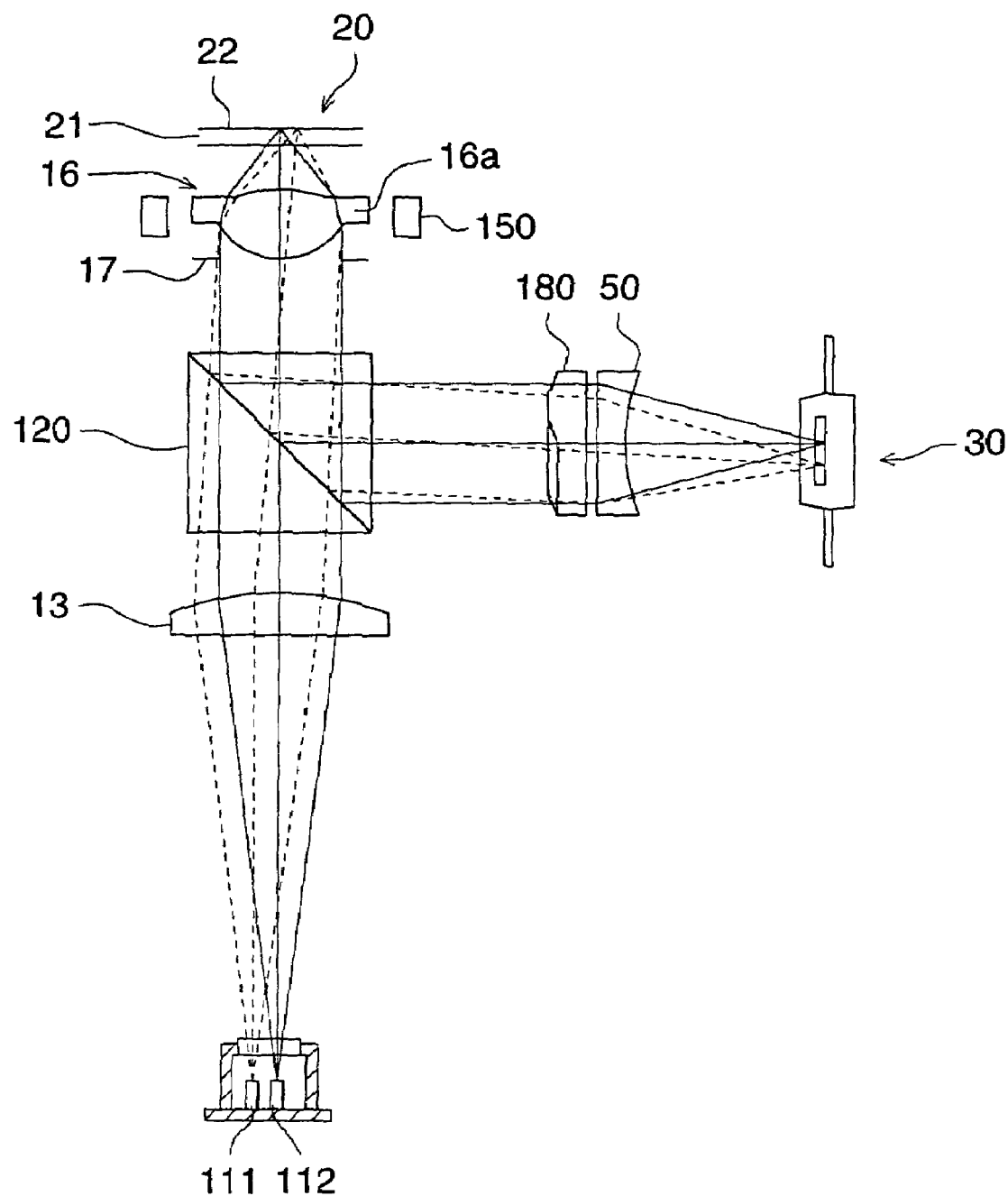
FIG. 117 is a view of the optical path showing the structure of the optical pickup apparatus according to Embodiment 7 of the present invention.

FIG. 117 shows a schematic structure of an objective lens and an optical pickup apparatus including the objective lens in the present embodiment. As is shown in FIG. 117, first semiconductor laser 111 and second semiconductor laser 112 are unitized as a light source. Between collimator 13 and objective lens 16, there is arranged beam splitter 120 through which a beam collimated mostly by the collimator 13 passes to advance to the objective lens 16. Further, the beam splitter 120 serving as an optical path changing means changes an optical path of a light flux reflected on information recording surface 22 so that the light flux may advance to optical detector 30. The objective lens 16 has on its peripheral portion flange section 16a which makes it easy to mount the objective lens 16 on the optical pickup apparatus. Further, since the flange section 16a has its surface extending in the direction which is almost perpendicular to an optical axis of the objective lens 16, it is possible to mount the objective lens more accurately.

When reproducing the first optical disk, a light flux emitted from the first semiconductor laser 111 passes through collimator 13 to become a collimated light flux which further passes through beam splitter 120 to be stopped down by aperture 17, and is converged by objective lens 16 on information recording surface 22 through transparent substrate 21 of the first optical disk 20. Then, the light flux modulated by information bits and reflected on the information recording surface 22 is reflected on beam splitter 120 through aperture 17, then, is given astigmatism by cylindrical lens 180, and enters optical detector 30 through concave lens 50. Thereby, signals outputted from the optical detector 30 are used to obtain reading signals of information recorded on the first optical disk 20.

Further, a change in quantity of light caused by a change in shape and position of a spot on the optical detector 30 is detected to detect a focused point and a track. Based on this detection, objective lens 16 is moved so that a light flux from the first semiconductor laser 111 may be caused by two-dimensional actuator 150 to form an image on information recording surface 22 on the first optical disk 20, and objective lens 16 is moved so that a light flux from the first semiconductor laser 111 may form an image on a prescribed track.

When reproducing the second optical disk, a light flux emitted from the second semiconductor laser 112 passes through collimator 13 to become a collimated light flux which further passes through beam splitter 120 to be stopped down by aperture 17, and is converged by objective lens 16 on information recording surface 22 through transparent substrate 21 of the second optical disk 20. Then, the light flux modulated by information bits and reflected on the information recording surface 22 is reflected on beam splitter 120 through aperture 17, then, is given astigmatism by cylindrical lens 180, and enters optical detector 30 through concave lens 50. Thereby, signals outputted from the optical detector 30 are used to obtain reading signals of information recorded on the second optical disk 20. Further, a change in quantity of light caused by a change in shape and position of a spot on the optical detector 30 is detected to detect a focused point and a track. Based on this detection, objective lens 16 is moved so that a light flux from the first semiconductor laser 112 may be caused by two-dimensional actuator 15 to form an image on information recording surface 22 on the second optical disk 20, and objective lens 16 is moved so that a light flux from the second semiconductor laser 112 may form an image on a prescribed track.

Objective lens (diffraction lens) 16 is designed so that its wave-front aberration may be 0.07 λrms or less for each wavelength (λ) for incident light from each semiconductor laser, up to the numerical aperture (maximum numerical aperture which is greater than those necessary for recording and/or reproducing of the first and second optical disks. Therefore, the wave-front aberration on the image forming surface of each: light flux is 0.07 λrms or less. Accordingly, no flare is caused on an image forming surface and on the detector 30 when recording and/or reproducing either disk, resulting in better characteristics for focusing error detection and track error-detection.

Incidentally, there are assumed a case wherein the first optical disk is DVD (light source wavelength ~650 nm) and the second optical disk is CD (light source wavelength 780 nm), and a case wherein the first optical disk is an advanced high density disk (light source wavelength 400 nm) and the second optical disk is DVD (light source wavelength 650 nm). In particular, when there is a big difference between necessary numerical apertures of both optical disks like the aforesaid occasion, a spot is sometimes too small compared with a necessary spot diameter. In this case, an aperture regulating means explained in other places in this document can be introduced to obtain the desired spot diameter.

Examples 15, 16, 17 and 18 for spherical-aberration-corrected lens will be explained as follows, as a concrete example of an objective lens related to the seventh embodiment. In each example, the wave-front aberration is corrected to be 0.07 λrms or less for the maximum numerical aperture. Incidentally, the image side mentioned in the following explanation means the optical information recording medium side.

Example 15

Figure 118:
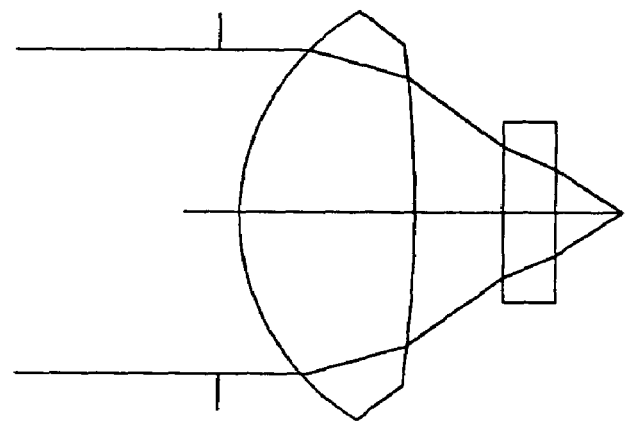
FIG. 118 is a view of the optical path of the diffraction optical lens (the objective lens having the diffraction surface) which is the objective lens of Example 15 according to Embodiment 7 of the present invention.
Figure 119:
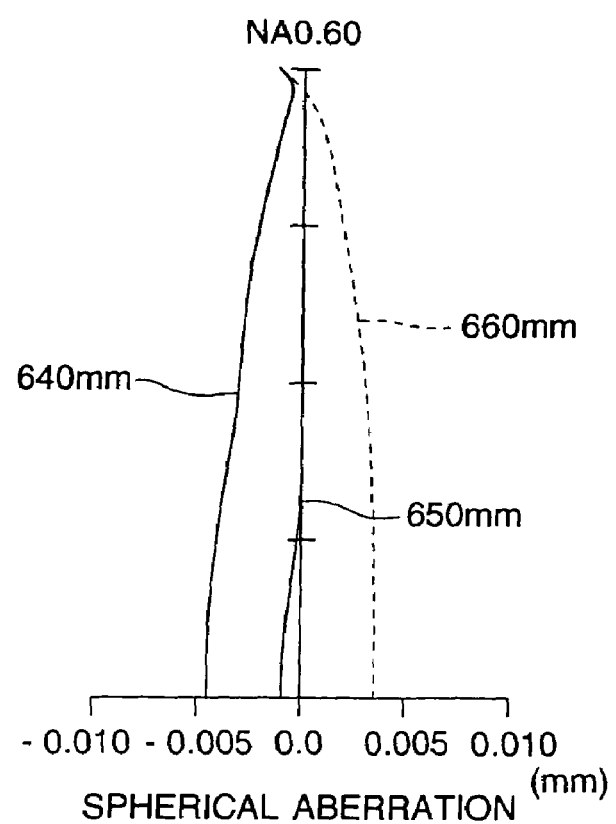
FIG. 119 is a view of the spherical aberration up to the numerical aperture 0.60 to the wavelengths ($\lambda$)=640, 650, 660 nm of the diffraction optical lens in FIG. 118.
Figure 120:
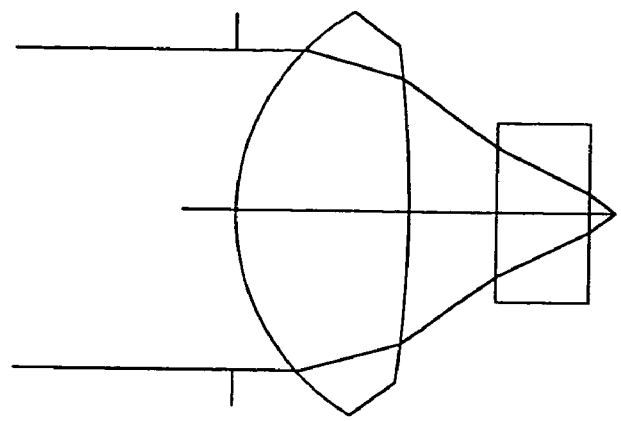
Figure 121:
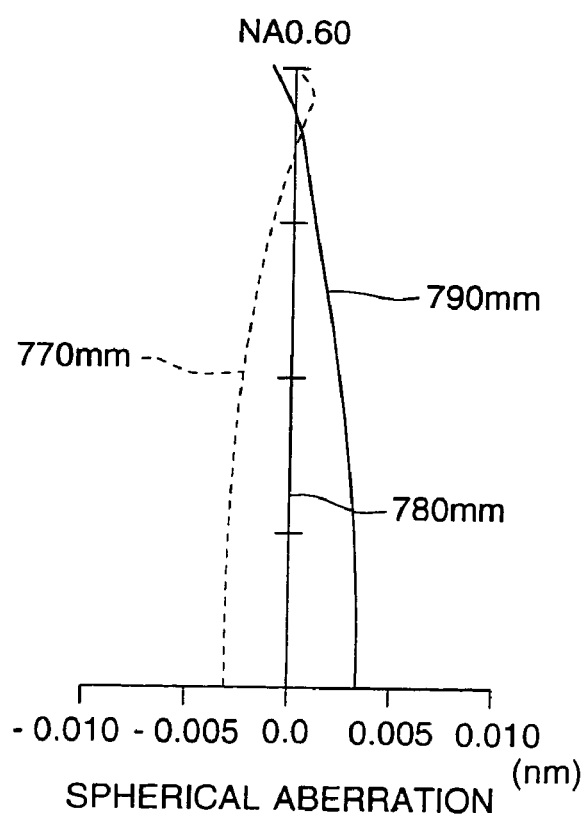

FIG. 118 shows a diagram of an optical path of a diffraction optical lens (objective lens having a diffraction surface) representing the objective lens in Example 15. FIG. 119 shows a spherical aberration diagram up to numerical aperture 0.60 for wavelengths (λ)=640, 650 and 660 nm concerning the diffraction optical lens of Example 15. FIG. 120 shows a diagram of an optical path of the diffraction optical lens of the Example 15 wherein the thickness of the transparent substrate of the optical information recording medium is greater than that in FIG. 118. FIG. 121 shows diagrams of spherical aberration up to numerical aperture 0.60 for wavelengths λ=770, 780 and 790 nm concerning the diffraction optical lens in the case of FIG. 120.

According to the diffraction optical lens of Example 15, all apertures up to NA 0.60 are almost no-aberration for wavelength λ=650 nm as shown in FIG. 119. As shown in FIGS. 120 and 121 where the transparent substrate is thick, all apertures up to NA 0.60 are almost no-aberration for wavelength λ=780 nm. Incidentally, a prescribed numerical aperture for λ=780 nm is 0.45.

As stated above, in the Example 15, the spherical aberration in the case of wavelength 780 nm where the transparent substrate of the optical information recording medium is thicker than that in Examples 1, 6 and 8 can be corrected up to the numerical aperture (NA 0.60) which is th same as that in the case where the transparent substrate is thinner and wavelength is 650 nm.

Lens data in Example 15 will be shown as follows.

For wavelength λ=650 nm,

Focal distance f=3.33 Numerical aperture on the image side NA=0.60 Infinite specification (incident collimated light flux)

(0453

For wavelength λ=780 nm,

Focal distance f=3.38 Numerical aperture on the image side NA=0.60 Infinite specification

TABLE 15

| Surface No. | R | d | n (λ = 650 nm) | n (λ = 780 nm) |
|---|---|---|---|---|
| OBJ | Infinity | Infinity | | |
| STO | Infinity | 0.0 | | |
| 2 (Aspheric surface 1 Diffraction surface) | 2.06085 | 2.2 | 1.54113 | 1.53728 |
| 3 (Aspheric surface 2) | −6.98986 | 1.059 | | |
| 4 | Infinity | d4 | 1.57787 | 1.57084 |
| 5 | Infinity | d5 | | |

| | d4 | d5 |
|---|---|---|
| For λ = 650 nm | 0.6 | 0.700 |
| For λ = 780 nm | 1.2 | 0.364 |

| Aspheric surface coefficient | |
|---|---|
| Aspheric surface 1 | K = −1.0358<br>$A_4 = 4.8632 \times 10^{-3}$<br>$A_6 = 5.3832 \times 10^{-4}$<br>$A_6 = -1.5773 \times 10^{-4}$<br>$A_{10} = 3.8683 \times 10^{-7}$ |
| Aspheric surface 2 | K = −9.256352<br>$A_4 = 1.5887 \times 10^{-2}$<br>$A_6 = -5.97422 \times 10^{-3}$<br>$A_6 = 1.11613 \times 10^{-3}$<br>$A_{10} = -9.39682 \times 10^{-5}$ |
| Diffraction surface coefficient (Standard wavelength 650 nm) | $b_2 = 6.000 \times 10^{-3}$<br>$b_4 = -1.317 \times 10^{-3}$<br>$b_6 = 1.5274 \times 10^{-4}$<br>$b_8 = -6.5757 \times 10^{-5}$<br>$b_{10} = 6.2211 \times 10^{-6}$ |

Example 16

Figure 122:
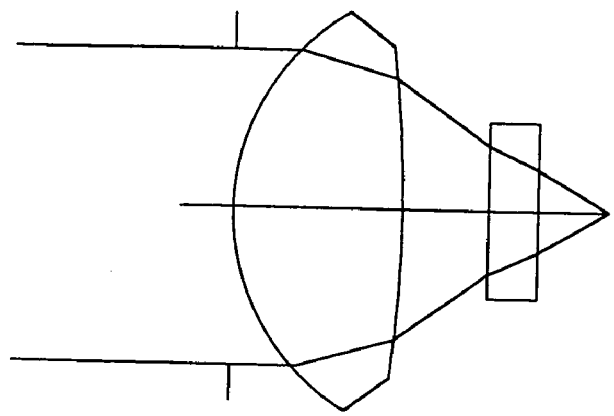
Figure 123:
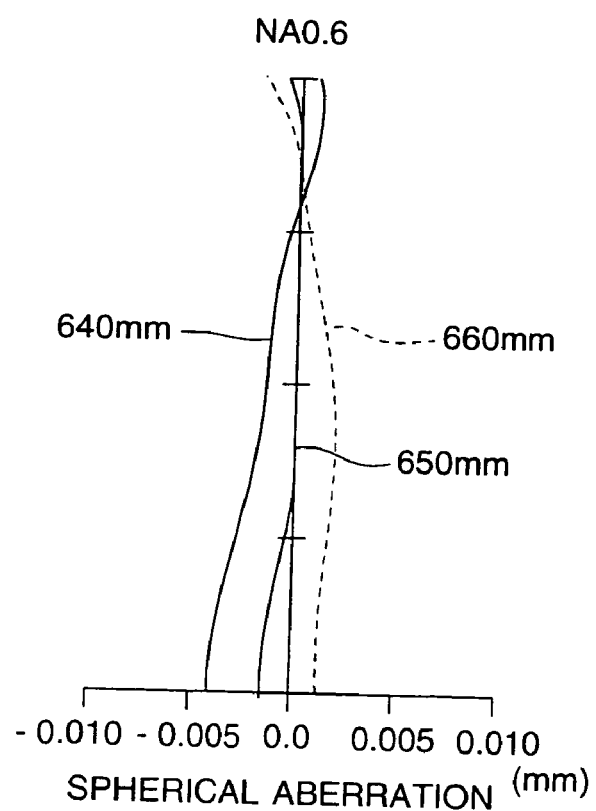
Figure 124:
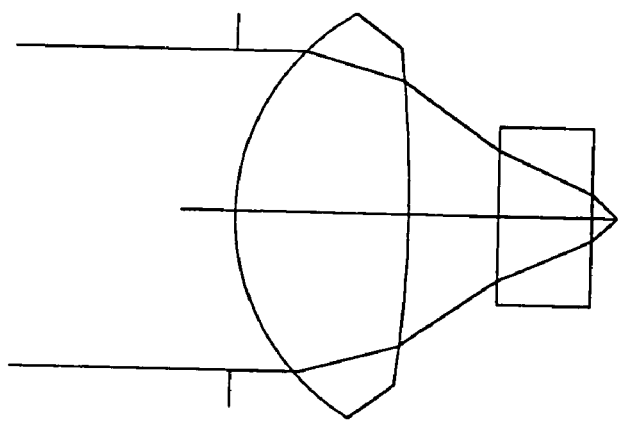
Figure 125:
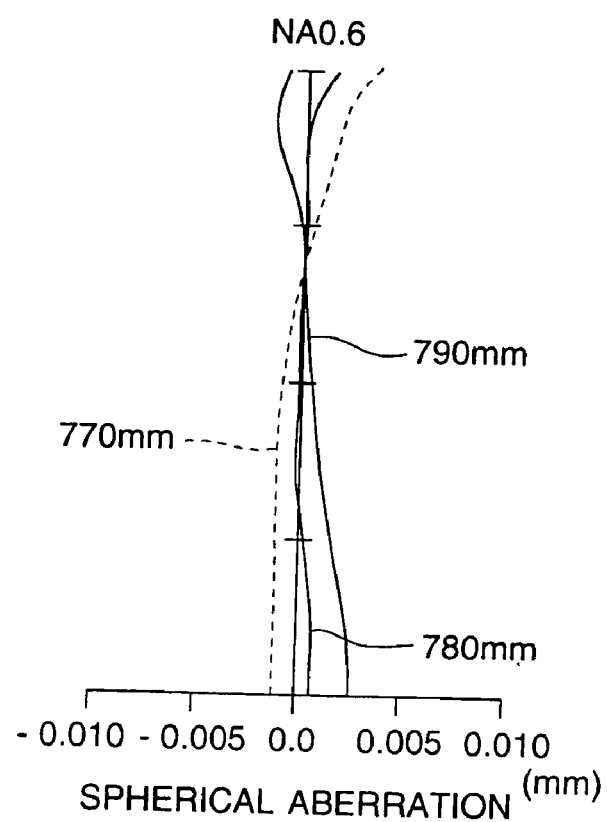

FIG. 122 shows a diagram of an optical path of a diffraction optical lens (objective lens having a diffraction surface) representing the objective lens in Example 16. FIG. 123 shows a spherical aberration diagram up to numerical aperture 0.60 for wavelengths (λ)=640, 650 and 660 nm concerning the diffraction optical lens of Example 16. FIG. 124 shows a diagram of an optical path of the diffraction optical lens of the Example 16 wherein the thickness of the transparent substrate of the optical information recording medium is greater than that in FIG. 122. FIG. 125 shows diagrams of spherical aberration up to numerical aperture 0.60 for wavelengths λ=770, 780 and 790 nm concerning the diffraction optical lens in the case of FIG. 124.

According to the diffraction optical lens of Example 16, all apertures up to NA 0.60 are almost no-aberration for wavelength λ=650 nm as shown in FIG. 123. As shown in FIGS. 124 and 125 where the transparent substrate is thick, all apertures up to NA 0.60 are almost no-aberration for wavelength λ=780 nm. Incidentally, a prescribed numerical aperture for λ=780 nm is 0.45.

As stated above, in the Example 16, the spherical aberration in the case of wavelength 780 nm where the transparent substrate of the optical information recording medium is thicker than that in Examples 1, 6 and 8 can be corrected up to the numerical aperture (NA 0.60) which is the same as that in the case where the transparent substrate is thinner and wavelength is 650 nm. Incidentally, in Examples 15 and 16, a powerful correcting action for spherical aberration caused by diffraction is necessary for correcting spherical aberration caused by a difference in transparent substrate thickness up to NA 0.6. For this reason, a ring-zonal pitch is reduced, but the reduction of the pitch is relieved by making the paraxial power of diffraction to be negative.

Lens data in Example 16 will be shown as follows.
For wavelength λ=650 nm,

Focal distance f=3.33 Numerical aperture on the image side NA=0.60 Infinite specification 0463.
For wavelength λ=780 nm, Focal distance f=3.36 Numerical aperture on the image side NA=0.60 Infinite specification

TABLE 16

| Surface No. | R | d | n (λ = 650 nm) | n (λ = 780 nm) |
|---|---|---|---|---|
| OBJ | Infinity | Infinity | | |
| STO | Infinity | 0.0 | | |
| 2 (Aspheric surface 1 Diffraction surface) | 2.09216 | 2.200 | 1.54113 | 1.53728 |
| 3 (Aspheric surface 2) | −7.49521 | 1.024 | | |
| 4 | Infinity | d4 | 1.57787 | 1.57084 |
| 5 | Infinity | d5 | | |

| | d4 | d5 |
|---|---|---|
| For λ = 650 nm | 0.6 | 0.699 |
| For λ = 780 nm | 1.2 | 0.345 |

| Aspheric surface coefficient | |
|---|---|
| Aspheric surface 1 | K = −1.1331<br>$A_4 = 4.5375 \times 10^{-3}$<br>$A_6 = 1.2964 \times 10^{-3}$<br>$A_6 = -3.6164 \times 10^{-4}$<br>$A_{10} = 2.0765 \times 10^{-5}$ |
| Aspheric surface 2 | K = −4.356298<br>$A_4 = 1.57427 \times 10^{-2}$<br>$A_6 = -4.91198 \times 10^{-3}$<br>$A_6 = 7.72605 \times 10^{-4}$<br>$A_{10} = -5.75456 \times 10^{-5}$ |
| Diffraction surface coefficient (Standard wavelength 650 nm) | $b_2 = 2.1665 \times 10^{-3}$<br>$b_4 = -2.0272 \times 10^{-3}$<br>$b_6 = 5.5178 \times 10^{-4}$<br>$b_8 = -1.8391 \times 10^{-4}$<br>$b_{10} = 1.8148 \times 10^{-5}$ |

Example 17

Figure 126:
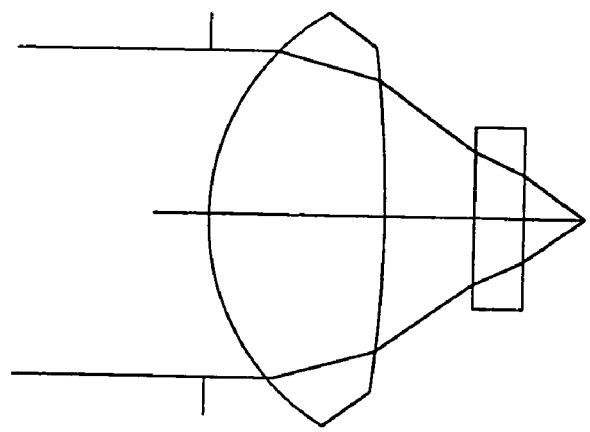
Figure 127:
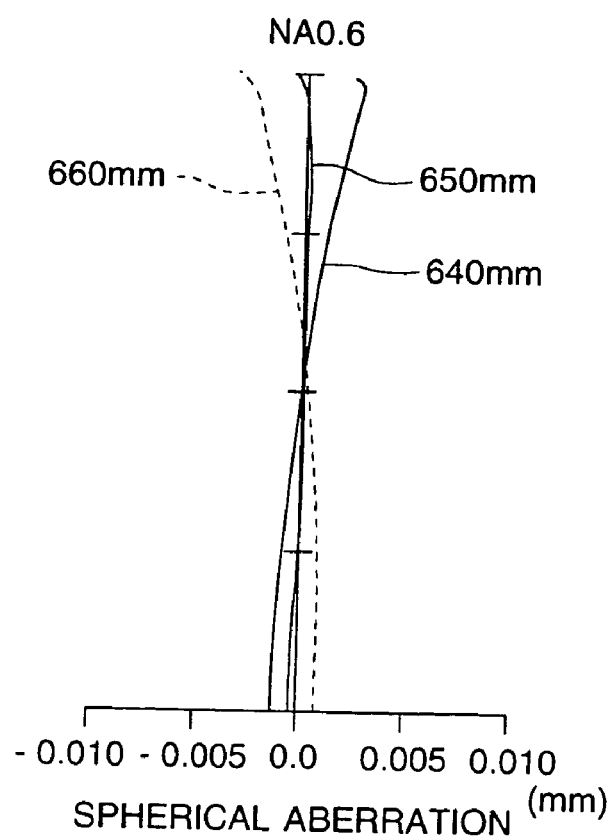
Figure 128:
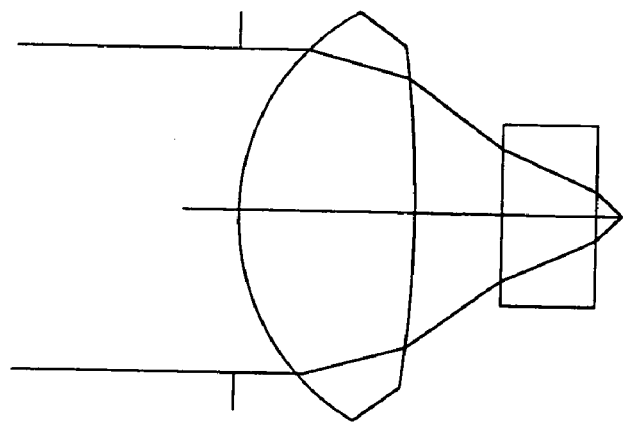
Figure 129:
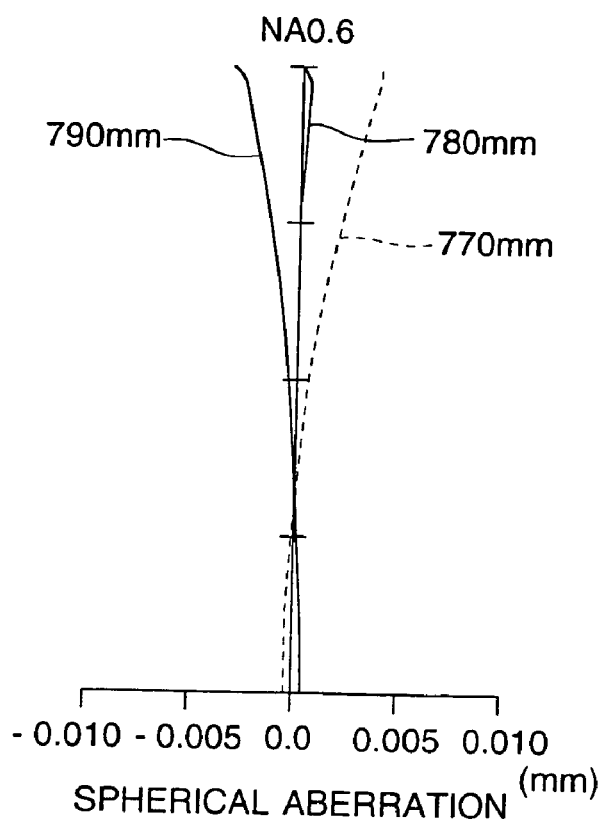

FIG. 126 shows a diagram of an optical path of a diffraction optical lens (objective lens having a diffraction surface) representing the objective lens in Example 17. FIG. 127 shows a spherical aberration diagram up to numerical aperture 0.60 for wavelengths (λ)=640, 650 and 660 nm concerning the diffraction optical lens of Example 17. FIG. 128 shows a diagram of an optical path of the diffraction optical lens of the Example 17 wherein the thickness of the transparent substrate of the optical information recording medium is greater than that in FIG. 126. FIG. 129 shows diagrams of spherical aberration up to numerical aperture 0.60 for wavelengths λ=770, 780 and 790 nm concerning the diffraction optical lens in the case of FIG. 128.

According to the diffraction optical lens of Example 17, all apertures up to NA 0.60 are almost no-aberration for wavelength λ=650 nm as shown in. FIG. 127. As shown in FIGS. 128 and 129 where the transparent substrate is thick, all apertures up to NA 0.60 are almost no-aberration for wavelength λ=780 nm. Incidentally, a prescribed numerical aperture for λ=780 nm is 0.45. Axial chromatic aberration in each of Examples 15-17 is different from others, and a ring-zonal pitch is also different from others.

As stated above, in the Example 17, the spherical aberration in the case of wavelength 780 nm where the transparent substrate of the optical information recording medium is thicker than that in Examples 1, 6 and 8 can be corrected up to the numerical aperture (NA 0.60) which is the same as that in the case where the transparent substrate is thinner and wavelength is 650 nm.

Lens data in Example 17 will be shown as follows.
For wavelength λ=650 nm,

Focal distance f=3.33 Numerical aperture on the image side NA=0.60 Infinite specification
For wavelength λ=780 nm, Focal distance f=3.34 Numerical aperture on the image side NA=0.60 Infinite specification

TABLE 17

| Surface No. | R | d | n (λ = 650 nm) | n (λ = 650 nm) |
|---|---|---|---|---|
| OBJ | Infinity | Infinity | | |
| STO | Infinity | | | |
| 2 (Aspheric surface 1 Diffraction surface) | 2.14757 | 2.200 | 1.54113 | 1.53728 |
| 3 (Aspheric surface 2) | −7.74682 | 1.0333 | | |
| 4 | Infinity | d4 | 1.57787 | 1.57084 |
| 5 | Infinity | d5 | | |

| | d4 | d5 |
|---|---|---|
| For λ = 650 nm | 0.6 | 0.700 |
| For λ = 780 nm | 1.2 | 0.327 |

| Aspheric surface coefficient | |
|---|---|
| Aspheric surface 1 | K = −1.0751<br>$A_4 = 5.0732 \times 10^{-3}$<br>$A_6 = 4.3722 \times 10^{-4}$<br>$A_8 = -1.4774 \times 10^{-4}$<br>$A_{10} = 9.6694 \times 10^{-7}$ |
| Aspheric surface 2 | K = −10.41411<br>$A_4 = 1.59463 \times 10^{-2}$<br>$A_6 = -6.02963 \times 10^{-3}$<br>$A_8 = 1.11268 \times 10^{-3}$<br>$A_{10} = -9.3151 \times 10^{-5}$ |
| Diffraction surface coefficient (Standard wavelength 650 nm) | $b_2 = -2.000 \times 10^{-3}$<br>$b_4 = -1.4462 \times 10^{-3}$<br>$b_6 = 1.1331 \times 10^{-4}$<br>$b_8 = -6.6211 \times 10^{-5}$<br>$b_{10} = 6.8220 \times 10^{-6}$ |

Example 18

Figure 131:
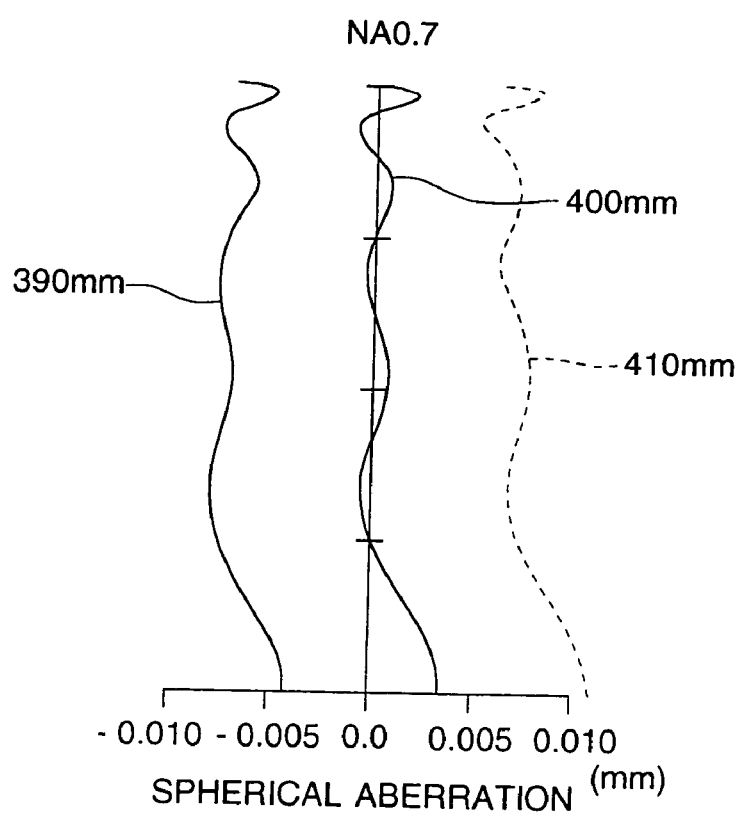

FIG. 130 shows a diagram of an optical path of a diffraction optical lens (objective lens having a diffraction surface) representing the objective lens in Example 18. FIG. 131 shows a spherical aberration diagram up to numerical aperture 0.70 for wavelengths (λ)=390, 400 and 410 nm concerning the diffraction optical lens of Example 18. FIG. 132 shows a diagram of an optical path of the diffraction optical lens of the Example 18 wherein the thickness of the transparent substrate of the optical information recording medium is greater than that in FIG. 130. FIG. 133 shows diagrams of spherical aberration up to numerical aperture 0.70 for wavelengths λ=640, 650 and 660 nm concerning the diffraction optical lens in the case of FIG. 132.

According to the diffraction optical lens of Example 18, all apertures up to NA 0.70 are almost no-aberration for wavelength λ=400 nm as shown in FIG. 131. As shown in FIGS. 132 and 133 where the transparent substrate is thick, all apertures up to NA 0.70 are almost no-aberration for wavelength λ=650 nm.

As stated above, in the Example 17, the spherical aberration in the case of wavelength 650 nm where the transparent substrate of the optical information recording medium is thicker than that in Examples 1, 6 and 8 can be corrected up to the numerical aperture (NA 0.70) which is the same as that in the case where the transparent substrate is thinner and wavelength is 0.400 nm.

Lens data in Example 18 will be shown as follows.

For wavelength λ=400 nm,

Focal distance f=3.33 Numerical aperture on the image side NA=0.70 Infinite specification For wavelength λ=650 nm, Focal distance f=3.43 Numerical aperture on the image side NA=0.70 Infinite specification

TABLE 18

| Surface No. | R | d | n (λ = 650 nm) | n (λ = 650 nm) |
|---|---|---|---|---|
| OBJ | Infinity | Infinity | | |
| STO | Infinity | | | |
| 2 (Aspheric surface 1 Diffraction surface) | 2.65858 | 2.40 | 1.71657 | 1.68987 |
| 3 (Aspheric surface 2) | −15.86969 | 1.297 | | |
| 4 | Infinity | d4 | 1.62158 | 1.57787 |
| 5 | Infinity | d5 | | |

| | d4 | d5 |
|---|---|---|
| For λ = 650 nm | 0.1 | 0.704 |
| For λ = 780 nm | 0.6 | 0.469 |

Aspheric surface coefficient

| | |
|---|---|
| Aspheric surface 1 | $K = 0.0$ |
| | $A_4 = -7.9616 \times 10^{-4}$ |
| | $A_6 = -5.7265 \times 10^{-4}$ |
| | $A_8 = 8.3209 \times 10^{-5}$ |
| | $A_{10} = -4.1599 \times 10^{-5}$ |
| Aspheric surface 2 | $K = 0.0$ |
| | $A_4 = 3.11131 \times 10^{-2}$ |
| | $A_6 = -1.18548 \times 10^{-2}$ |
| | $A_8 = 1.63937 \times 10^{-3}$ |
| | $A_{10} = -6.60514 \times 10^{-5}$ |
| Diffraction surface coefficient (Standard wavelength 400 nm) | $b_2 = -1.4046 \times 10^{-3}$ |
| | $b_4 = -8.6959 \times 10^{-4}$ |
| | $b_6 = 2.3488 \times 10^{-4}$ |
| | $b_8 = -5.2455 \times 10^{-5}$ |
| | $b_{10} = 3.6385 \times 10^{-6}$ |

Next, a pitch of plural annular bands of a diffraction optical lens in each of the Examples 1-3 and Examples 14-18 will be explained. Each of the plural annular bands is formed to be almost in a form of a concentric circle whose center is an optical axis, and values of pitch Pf (mm) of the annular band corresponding to the maximum numerical aperture of the lens on the image side, pitch Pf (mm) of the annular band corresponding to the numerical aperture representing a half of the maximum numerical aperture, and ((Ph/Pf)−2) are shown in Table 19.

TABLE 19

| Example | Pf | Ph | Ph/Pf − 2 |
|---|---|---|---|
| 1 | 0.009 | 0.110 | 10.2 |
| 2 | 0.067 | 0.255 | 1.8 |
| 3 | 0.012 | 0.032 | 0.67 |
| 14 | 0.039 | 0.221 | 3.7 |
| 15 | 0.027 | 0.091 | 1.4 |
| 16 | 0.014 | 0.353 | 23.2 |
| 17 | 0.010 | 0.065 | 4.5 |
| 18 | 0.011 | 0.060 | 3.5 |

$$0.4 \leq |(Ph/Pf) - 2| \leq 25 \qquad (b1)$$

According to the further study of the inventors of the present invention, it has been found that when the aforesaid expression (b1) holds, namely, when the value of |(Ph/Pf)−2| is not less than the lower limit of the expression, the diffraction action to correct spherical aberration of a high ordered is not attenuated, and therefore, a difference of spherical aberration between two wavelengths caused by a difference of thickness of transparent substrates can be corrected by the diffraction action, while, when the aforesaid value is not more than the upper limit, a portion where the pitch of diffraction annular bands is too small is hardly caused, and it is possible to manufacture a lens having high diffraction efficiency.

With regard to the aforesaid relational expression, the following expression (b2) is preferable, and expression (b3) is more preferable.

$$0.8 \leq |(Ph/Pf) - 2| \leq 6.0 \qquad (b2)$$
$$1.2 \leq |(Ph/Pf) - 2| \leq 2.0 \qquad (b3)$$

Next, 8th Embodiment of the invention will be explained.

Necessary numerical aperture NA1 of the objective lens on the optical information recording medium side which is needed for recording and reproducing DVD by the use of a light source having wavelength of 650 nm is about 0.6, and necessary numerical aperture NA2 of the objective lens on the optical information recording medium side which is needed for reproducing CD by the use of a light source having wavelength of 780 nm is about 0.45 (0.5 for recording). Therefore, the diffraction pattern for the correction of aberration stated above is not indispensable, up to numerical aperture NA1.

Further, the diffraction pattern is not indispensable in the vicinity of an optical axis, because a depth of focus is great and an amount of spherical aberration is small.

By forming a diffraction pattern on a necessary and least portion and by making the residual portion to be a refraction surface, it is possible to prevent damage of a tool in the course of metal mold processing, to improve releasing property, and to prevent deterioration of capacity which is caused when there is a thickness difference in disks caused by that a light-converging spot is narrowed down more than necessary on the CD side, or is caused when a disk is inclined.

For this purpose, the diffraction pattern of the objective lens needs to be rotation-symmetrical about an optical axis, and the following conditions need to be satisfied, when +primary diffracted ray coming from the circumference of a circle of the diffraction pattern on the objective lens farthest from the optical axis for the light flux emitted from the first light source is converted into a light flux with numerical aperture NAH1 on the optical information recording medium side, and when +primary diffracted ray coming from the circumference of a circle of the diffraction pattern on the objective lens closest to the optical axis for the light flux emitted from the first light source is converted into a light flux with numerical aperture NAL1 on the optical information recording medium side.

NAH1<NA1

0≦NAL1≦NA2

When the first optical information recording medium is DVD, wavelength λ1 of the first light source is 650 nm, the second optical information recording medium is CD and wavelength λ2 of the second light source is 780 nm, it is preferable that NAH1 is from 0.43 to 0.55 and NAL1 is from 0.10 to 0.40.

An optical design of an objective lens concerning the portion having a diffraction pattern is conducted so that +primary diffracted ray of a light flux entering the objective lens from the first light source may be a light-converging spot which is almost no-aberration. On the other hand, an optical design of an objective lens concerning the portion having no diffraction pattern is conducted so that a light flux entering the objective lens from the first light source may be a light-converging spot which is almost no-aberration.

Light-converging positions for both of them stated above need to agree mostly. Further, it is important that a phase of each light flux agrees with others. Incidentally, with regard to the phase, when k represents a small integer, light-converging characteristic under the designed wavelength is hardly changed despite deviation of 2kπ, but when an absolute value of |k| is great, the light-converging characteristic is easily changed by the wavelength fluctuation. It is preferable that |k| is in a range of 1-10.

Among light fluxes emitted from the second light source, in this case, +primary diffracted ray from the circumference of a circle of diffraction pattern on the objective lens which is farthest from an optical axis is converted into a light flux whose numerical aperture on the optical information recording medium side is NAH2, and concurrently with this, +primary diffracted ray from the circumference of a circle of the diffraction pattern which is closest to an optical axis is converted into a light flux whose numerical aperture on the optical information recording medium side is NAL2.

Spherical aberration of a light flux passing through an objective lens is established, so that a light-converging position and a phase difference for each of a light flux from a portion having a diffraction pattern and a light flux from a portion having no diffraction pattern may be optimum, and thereby, a spot making recording and reproduction of the second optical information recording medium possible may be formed on an information recording surface of the optical information recording medium by the use of a light flux whose numerical aperture through an objective lens is NAH2 or less, among light fluxes emitted from the second light source.

In practice, it is preferable that wave-front aberration at a best image point through a transparent substrate of the first optical information recording medium for a light flux whose numerical aperture through an objective lens is NA1 or less among light fluxes emitted from the first light source is 0.07 λrms or less, and wave-front aberration at a best image point through a transparent substrate of the second optical information recording medium for a light flux whose numerical aperture through an objective lens is NAH2 or less among light fluxes emitted from the second light source is 0.07 λrms or less.

Incidentally, in particular, it is preferable that a spherical aberration component of wave-front aberration at a best image point through a transparent substrate of the first optical information recording medium for a light flux whose numerical aperture through an objective lens is NA1 or less among light fluxes emitted from the first light source is 0.05 λrms or less.

When an optical pickup apparatus is made to be one wherein at least one collimator is provided between the first light source and an objective lens and between the second light source and an objective lens, and thereby, each of a light flux entering the objective lens from the first light source and a light flux entering the objective lens from the second light source is collimated light, adjustment of a pickup is easy.

Further, it is possible to reduce cost of an optical pickup apparatus by using one collimator for both light fluxes emitted respectively from the first light source and the second light source.

Incidentally, when each of the first light source and the second light source is in a separate package, apposition of each light source can be set for the collimator so that each light flux may be in parallel with each other.

When the first light source and the second light source are in the same package, it is also possible to make each incident light to an objective lens to be in parallel with each other by setting the difference between positions of both light sources in the optical direction to be appropriate, or it is also possible, when adjustment is impossible, to make each incident light to an objective lens to be in parallel with each other by using one wherein chromatic aberration of a collimator is made to be optimum.

In addition, a light flux entering an objective lens may be either a converged light flux or a diverged light flux, and by making the light flux entering an objective lens from the second light source to be higher in terms of divergence than that entering an objective lens from the first light source, there is generated under spherical aberration caused by the difference of divergence, which can reduce an amount of spherical aberration corrected by diffraction pattern.

Figure 114:
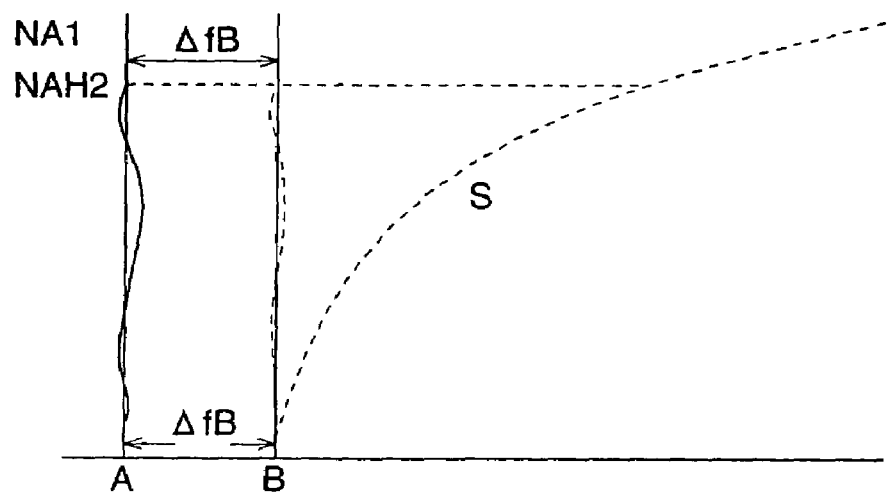
FIG. 114 is a typical view showing an influence of the chromatic aberration on the spherical aberration of the objective lens according to Embodiment 8 of the present invention.

FIG. 114 is an illustration wherein numerical aperture NAH2 is the same as numerical aperture NAL2, and spherical aberration of the light flux passing through a transparent substrate of the second optical information recording medium (CD) is shown for the light flux emitted from the second light source, for the occasion where paraxial chromatic aberration is not corrected and the occasion where paraxial chromatic aberration is corrected (ΔfB=0).

A converged position of a light flux contributing to reproduction of the second optical information recording medium having NAH2 or less is at point B when it is not corrected by a diffraction pattern, and it is converged to point A after being corrected by diffraction pattern to cause ΔfB to be almost 0. However, outside the NAH2, no correction is made by the diffraction pattern, and its aberration shows aberration curve S by the refraction surface only.

As is apparent from the diagram, the gap between the converging point of a light flux and spherical aberration in NAH2 grows greater by correction amount ΔfB of paraxial chromatic aberration, and a position where a flare-component from NAH2 to NA1 is converged is away greatly from the converging position of the light flux contributing to reproduction of the second optical information recording medium for NAH2 or less. Therefore, an influence of the flare component is small on the optical detector.

Further, by correcting paraxial chromatic aberration at. λ1 and λ2, paraxial chromatic aberration is small even in the vicinity of λ1 and λ2, and even when oscillated wavelength is varied by fluctuation of laser power in the course of recording information on an optical information recording medium, shift of focus is hardly caused, and high speed recording is possible.

To make a position where a flare component from NAH2 to NA1 is converged and the converging position of the light flux for NAH2 or less to be away from each other, it is possible to obtain the state of correcting aberration shown in FIG. 115, by designing the second diffraction pattern so that the second diffraction pattern is arranged outside the aforesaid diffraction pattern, thereby, +primary diffracted ray of the second diffraction pattern is converged at the aforesaid converging position for a light flux from the first light source, and a light source from the second light source is transmitted through the second diffraction pattern without being diffracted by it.

Namely, FIG. 115(a) shows the state of correcting aberration for the light flux emitted from the first light source, wherein aberration caused by the diffraction surface established to be relatively large is made to be no-aberration by the correcting effect of +primary diffracted ray for both NAH1 or more and NAH1 or less, and the light flux is converged at the converging position. However, the light flux passing through the diffraction pattern outside NAH2 out of light fluxes emitted from the second light source is zero ordered light which is not subjected to diffraction action, as shown in FIG. 115(b). Therefore, in its state of correcting aberration, aberration which is not subjected to correction by the diffraction pattern appears as it is. Accordingly, the gap of the spherical aberration in NAH2 grows greater, and the converging position of the flare component is away greatly from the converging position of the light flux contributing to reproduction of information. Therefore, an influence of the flare component is small on the optical detector.

Figure 113:
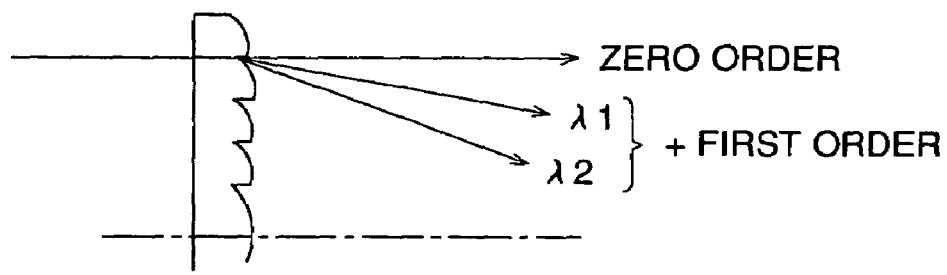
FIG. 113 is an illustration of an action of the diffraction pattern.
Figure 113:
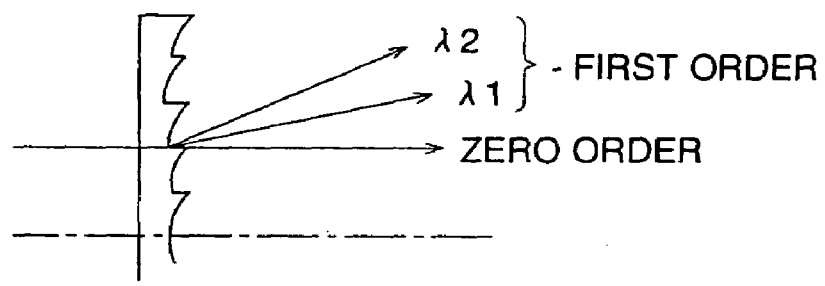

The second diffraction pattern may also be designed so that the light flux from the first light source may not be diffracted by the second diffraction pattern, and the light flux from the second light source may mainly become – primary diffracted ray. Due to this, when diffraction-caused spherical aberration of the light flux ranging from NAH2 to NA1 is exaggerated, spherical aberration through a transparent substrate of the second optical information recording medium of the light flux whose numerical aperture through an objective lens is NAH2 or less can be corrected properly for the second light source, as shown in FIG. 113, and on the other hand, exaggerated spherical aberration of the light flux outside NAH2 can be made to be greater. As a result, as shown in FIG. 116(b), the gap of the spherical aberration in NAH2 grows greater, and the converging position of the flare component is away greatly from the converging position of the light flux contributing to reproduction of information. Therefore, an influence of the flare component is small on the optical detector.

In the same way, it is possible to make an influence of flare components to be small, by providing in a optical path from a light source to an objective lens an aperture regulating means which transmits a light flux from the first light source and does not transmit a light flux passing through an area opposite to an optical axis of the first diffraction pattern out of light fluxes from the second light source, and thereby, by reducing flare components reaching an optical detector.

For the aperture regulating means, a ring-zonal filter which transmits the light flux from the first light source and reflects or absorbs the light flux passing through an area opposite to an optical axis of the first diffraction pattern among light fluxes from the second light source may be arranged in the optical path after compounding an outgoing light flux from the first light source and an outgoing light flux from the second light source with a light compounding means.

For the filter of this kind, it is possible to use, for example, a dichroic filter employing multiple layers. It is naturally possible to make either surface of an objective lens to have the filter effect stated above.

The aperture regulating means may also be a ring-zonal filter which transmits a light flux from the first light source and makes the light flux passing through an area opposite to an optical axis of the diffraction pattern among light fluxes from the second light source to be diffracted.

The first optical pickup apparatus—the seventh optical pickup apparatus relating to the eighth embodiment of the invention will be explained concretely as follows, referring to the drawings.

Figure 102:
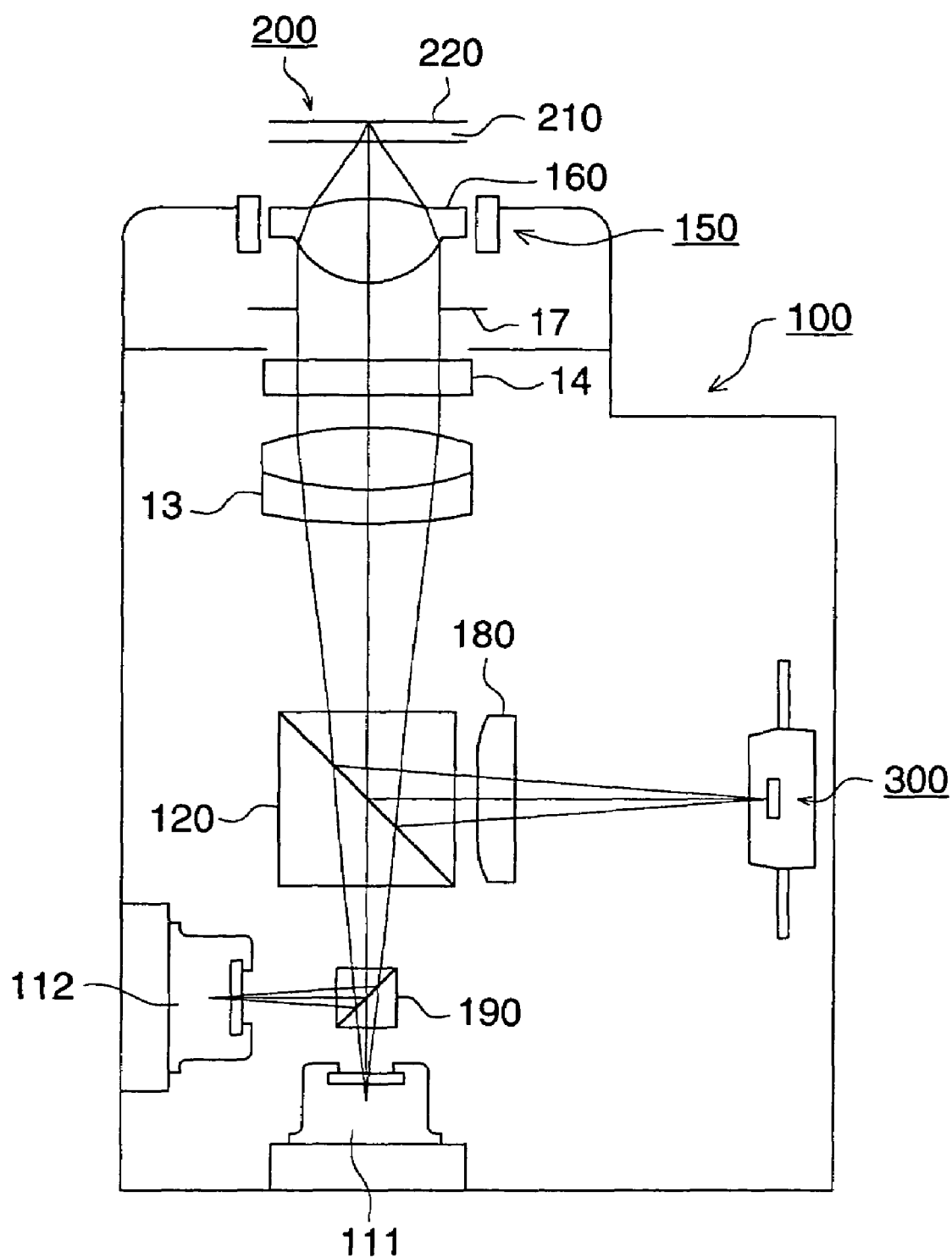
FIG. 102 is a view of the optical path showing the first structure of the optical pickup apparatus according to Embodiment 8 of the present invention.

The first optical pickup apparatus shown in FIG. 102 has therein semiconductor laser 111 representing the first light source for reproduction of the first optical disk and semiconductor laser 112 for reproduction of the second optical disk.

First, when reproducing the first optical disk, a beam is emitted from the first semiconductor laser 111, and the emitted beam is transmitted through beam splitter 190 representing a compounding means for beams emitted from both semiconductor lasers 111 and 112, and then is transmitted through polarized beam splitter 120, collimator 130 and ¼ wavelength plate 14 to become a circularly polarized and collimated light flux. This light flux is stopped down by aperture 170, and is converged by objective lens 160 on information recording surface 220 through transparent substrate 210 of the first optical disk 200.

The light flux modulated by information bit and reflected on the information recording surface 220 is transmitted again through objective lens 160, aperture 170, ¼ wavelength plate 140 and collimator 130 to enter polarized beam splitter 120 where the light flux is reflected and is given astigmatism by cylindrical lens 18. Then, the light flux enters optical detector 300 where signals outputted therefrom are used to obtain signals to read information recorded on the first optical disk 200.

A change in quantity of light caused by changes of a form and a position of a spot on the optical detector 300 is detected to conduct focusing detection and track detection. Based on this detection, two-dimensional actuator 150 moves objective lens 160 so that a light flux from the first semiconductor laser 111 may form an image on recording surface 220 of the first optical disk 200, and moves objective lens 160 so that a light flux from the semiconductor laser 111 may form an image on a prescribed track.

When reproducing the second optical disk, a beam is emitted from the second semiconductor laser 112, and the emitted beam is reflected on beam splitter 190 representing a light compounding means, and is converged on information recording surface 220 through polarized beam splitter 120, collimator 130, ¼ wavelength plate 140, aperture 170 and objective lens 160, and through transparent substrate 210 of the second optical disk 200, in the same way as that for the light flux from the first semiconductor 111.

The light flux modulated by information bit and reflected on the information recording surface 220 enters optical detector 300 again through objective lens 160, aperture 170, ¼ wavelength plate 140, collimator 130, polarized beam splitter 120 and cylindrical lens 180, and signals outputted from the optical detector are used to obtain signals to read information recorded on the second optical disk 200.

In the same way as in the case of the first optical disk, a change in quantity of light caused by changes of a form and a position of a spot on optical detector 300 is detected to conduct focusing detection and track detection, and two-dimensional actuator 150 moves objective lens 160 for focusing and tracking.

Figure 103:
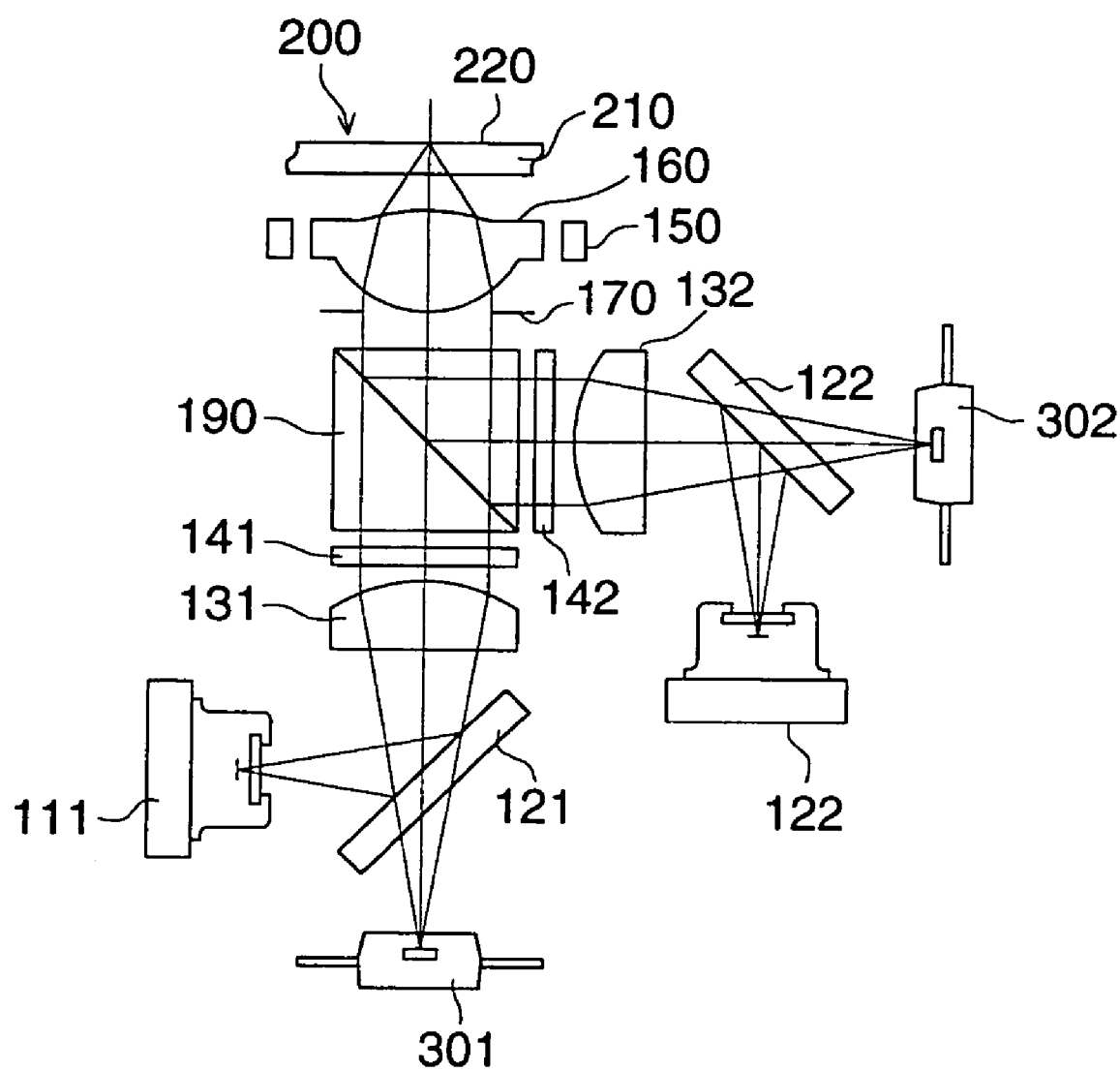
FIG. 103 is a view of the optical path showing the second structure of the optical pickup apparatus according to Embodiment 8 of the present invention.

The second optical pickup apparatus in FIG. 103 has structure which is suitable for an optical system for recording and reproduction, and an occasion of reproduction will be explained as follows. Incidentally, in the following example, members which are the same as those in the optical pickup apparatus in FIG. 102 are given the same symbols.

When reproducing the first optical disk, abeam is emitted from the first semiconductor laser 111, and the emitted beam is reflected on polarized beam splitter 121 and is transmitted through collimator 131 and ¼ wavelength plate 141 to become circularly polarized and collimated light. It is further transmitted through beam splitter 190 representing a light compounding means, then, is stopped down by aperture 170, and is converged by objective lens 160 on information recording surface 220 through transparent substrate 210 of the first optical disk 200.

The light flux modulated by information bit and reflected on information recording surface 220 is transmitted again through beam splitter 190, ¼ wavelength plate 141 and collimator 131 through objective lens 160 and aperture 170 to enter polarized beam splitter 121 where astigmatism is given to the light flux when it is transmitted therethrough. Then, the light flux enters optical detector 301 where signals outputted therefrom are used to obtain signals to read information recorded on the first optical disk 200.

A change in quantity of light caused by changes of a form and a position of a spot on the optical detector 301 is detected to conduct focusing detection and track detection. Based on this detection, two-dimensional actuator 150 moves objective lens 160 so that a light flux from the first semiconductor laser 111 may form an image on recording surface 220 of the second optical disk 200, and moves objective lens 160 so that a light flux from the semiconductor laser 111 may form an image on a prescribed track.

When reproducing the second optical disk, a beam is emitted from the second semiconductor laser 112, and the emitted beam is reflected on polarized beam splitter 122 and is transmitted through collimator 132 and ¼ wavelength plate 142 to become circularly polarized and collimated light. It is further reflected on beam splitter 190 representing a light compounding means, then, is converged by aperture 170 and objective lens 160 on information recording surface 220 through transparent substrate 210 of the second optical disk 200.

The light flux modulated by information bit and reflected on information recording surface 220 is reflected again on the beam splitter 190 through objective lens 160 and aperture 170, and is transmitted through ¼ wavelength plate 142 and collimator 132 to enter polarized beam splitter 122 where astigmatism is given to the light flux when it is transmitted therethrough. Then, the light flux enters optical detector 302 where signals outputted therefrom are used to obtain signals to read information recorded on the second optical disk 200.

A change in quantity of light caused by changes of a form and a position of a spot on the optical detector 302 is detected to conduct focusing detection and track detection. Based on this detection, two-dimensional actuator 150 moves objective lens 160 so that a light flux from the second semiconductor laser 112 may form an image on recording surface 220 of the first optical disk 200, and moves objective lens 160 so that a light flux from the semiconductor laser 112 may form an image on a prescribed track, which is the same as the foregoing.

Figure 104:
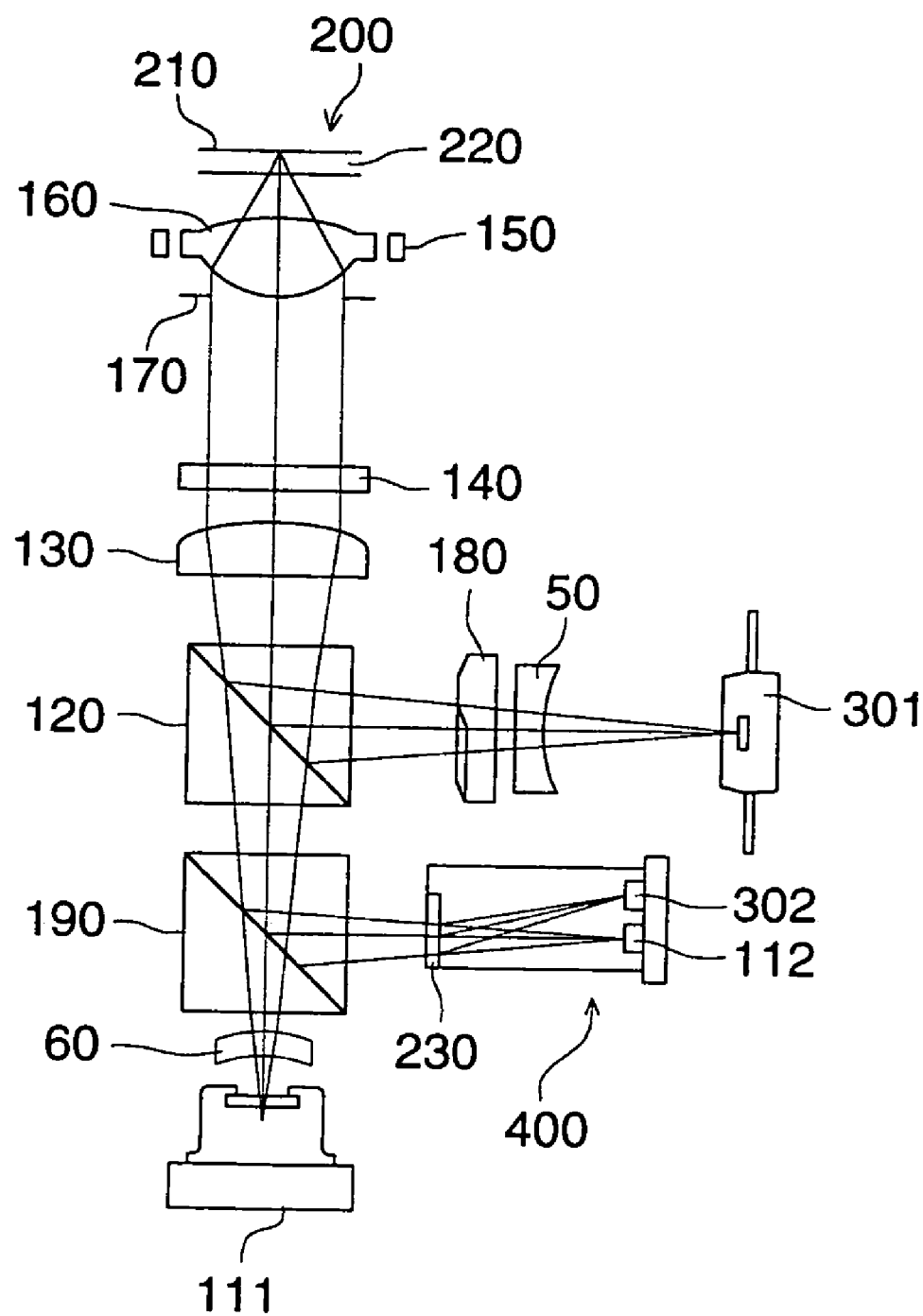
FIG. 104 is a view of the optical path showing the third structure of the optical pickup apparatus according to Embodiment 8 of the present invention.

The third optical pickup apparatus in FIG. 104 has structure which is suitable for an optical system for recording and reproduction, and an occasion of reproduction will be explained as follows.

When reproducing the first optical disk, a beam is emitted from the first semiconductor laser 111, and the emitted beam is transmitted through coupling lens 60 which makes divergence of diverged light source, beam splitter 190 representing a light compounding means and beam splitter 120, and is further transmitted through collimator 130 and ¼ wavelength plate 140 to become circularly polarized and collimated light. It is further stopped down by aperture 170 and is converged by objective lens 160 on information recording surface 220 through transparent substrate 210 of the first optical disk 200.

The light flux modulated by information bit and reflected on information recording surface 220 is transmitted again by ¼ wavelength plate 140 and collimator 130 through objective lens 160 and aperture 170 to enter beam splitter 120 where the light flux is reflected and is given astigmatism by cylindrical lens 180. Then, the light flux enters optical detector 301 through concave lens 50, where signals outputted therefrom are used to obtain signals to read information recorded on the first optical disk 200.

A change in quantity of light caused by changes of a form and a position of a spot on the optical detector 301 is detected to conduct focusing detection and track detection. Based on this detection, two-dimensional actuator 150 moves objective lens 160 so that a light flux from the first semiconductor laser 111 may form an image on recording surface 220 of the first optical disk 200, and moves objective lens 160 so that a light flux from the semiconductor laser 111 may form an image on a prescribed track.

In the second semiconductor laser 112 for reproducing the second optical disk, laser/detector accumulating unit 400, optical detector 302 and hologram 230 are unitized. "Unit" or "unitization" means that unitized members and means can be incorporated solidly in an optical pickup apparatus, and the unit can be incorporated as one part in assembly of an apparatus.

The light flux emitted from the second semiconductor laser 112 is transmitted through hologram 230, then, is reflected on beam splitter 190 representing a light compounding means, and is transmitted through beam splitter 120, collimator 130 and ¼ wavelength plate 140 to become collimated light. It is further converged on information recording surface 220 through aperture 170, objective lens 160 and through transparent substrate 210 of the second optical disk 200.

The light flux modulated by information bit and reflected on information recording surface 220 is transmitted again by ¼ wavelength plate 140 and collimator 130 and beam splitter 120 through objective lens 160 and aperture 170, then, is reflected on beam splitter 190 and is diffracted by hologram 230 to enter optical detector 302, where signals outputted therefrom are used to obtain signals to read information recorded on the second optical disk 200.

Focusing detection and track detection are conducted by detecting a change in a quantity of light caused by the change of form and position of a spot on optical detector 302, and thereby, objective lens 160 is moved by two-dimensional actuator 150 for focusing and tracking.

Figure 105:
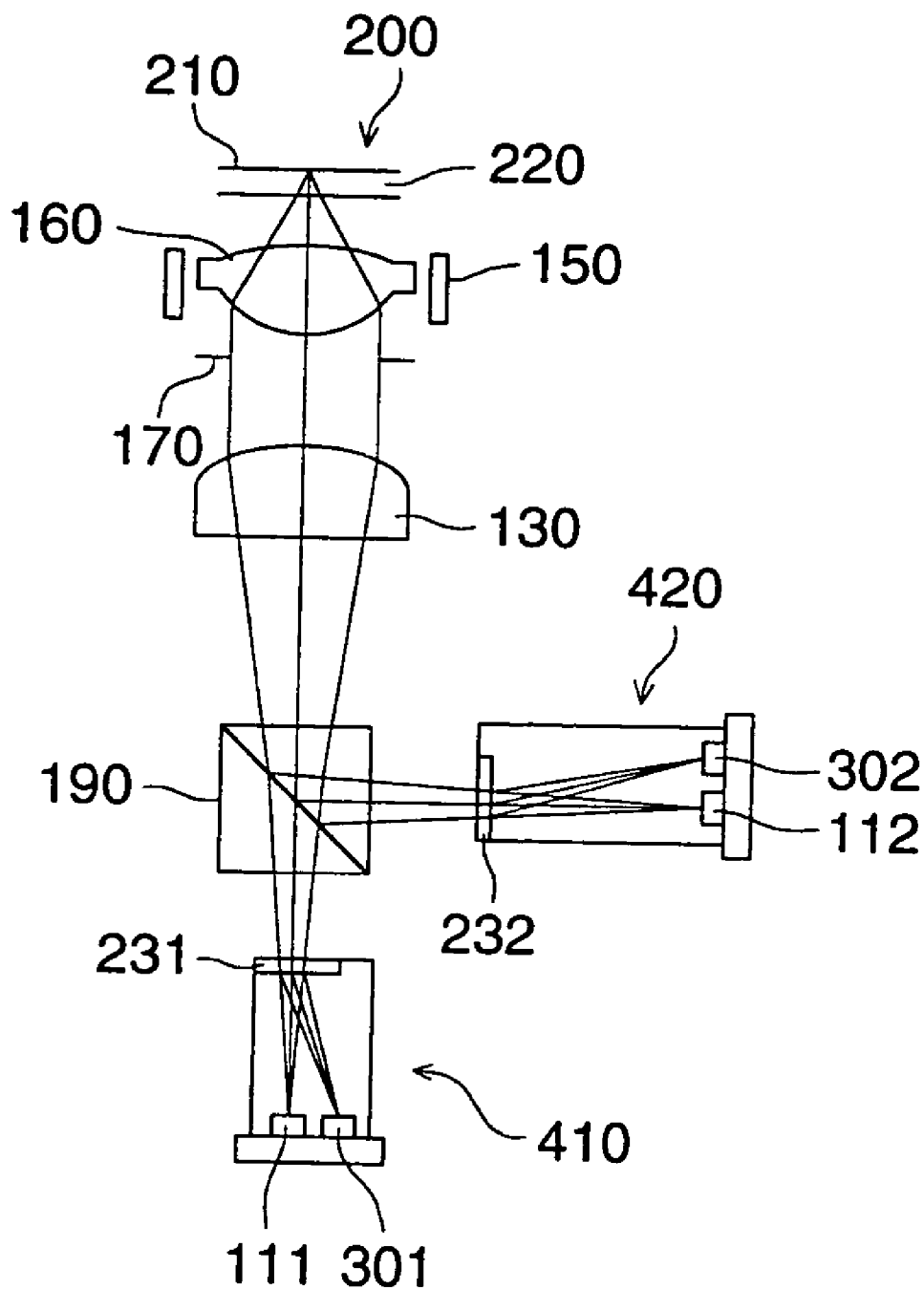
FIG. 105 is a view of the optical path showing the fourth structure of the optical pickup apparatus according to Embodiment 8 of the present invention.

When reproducing the first optical disk in the fourth optical pickup apparatus in FIG. 105 where laser/detector accumulating unit 410, optical detector 301 and hologram 231 are unitized to become the first semiconductor laser 111, the light flux emitted from the first semiconductor laser 111 passes through the hologram 231, and is transmitted through beam splitter 190 representing a light compounding, means and collimator 130 to become a collimated light flux, which is further stopped down by aperture 170 to be converged by objective lens 160 on information recording surface 220 through transparent substrate 210 of the first optical disk 200.

The light flux which is modulated by information bit and reflected on information recording surface 220 is transmitted by collimator 130 and beam splitter 190 through objective lens 160 and aperture 170 again, then, is diffracted by hologram 231 to enter optical detector 301 where the output signals therefrom are used to obtain reading signals for information recorded on the first optical disk 200.

Focusing detection and track detection are conducted by detecting a change in a quantity of light caused by the change of form and position of a spot on optical detector 302, and thereby, objective lens 160 is moved by two-dimensional actuator 150 for focusing and tracking. When reproducing the second optical disk where laser/detector accumulating unit 42, optical detector 302 and hologram 232 are unitized to become the second semiconductor laser 112, the light flux emitted from the second semiconductor laser 112 passes through the hologram 232, and is reflected on beam splitter 190 and is transmitted through collimator 130 to become a collimated light flux, which is further converged on information recording surface 220 through objective lens 160 and transparent substrate 210 of the second optical disk 200.

The light flux which is modulated by information bit and reflected on information recording-surface 220 is transmitted by collimator 130 through objective lens 160 and aperture 170 and is reflected on beam splitter 190, then, is diffracted by hologram 232 to enter optical detector 302 where the output signals therefrom are used to obtain reading signals for information recorded on the second optical disk 200.

Focusing detection and track detection are conducted by detecting a change in a quantity of light caused by the change of form and position of a spot on optical detector 302, and based on this detection, objective lens 160 is moved by two-dimensional actuator 150 for focusing and tracking.

Figure 106:
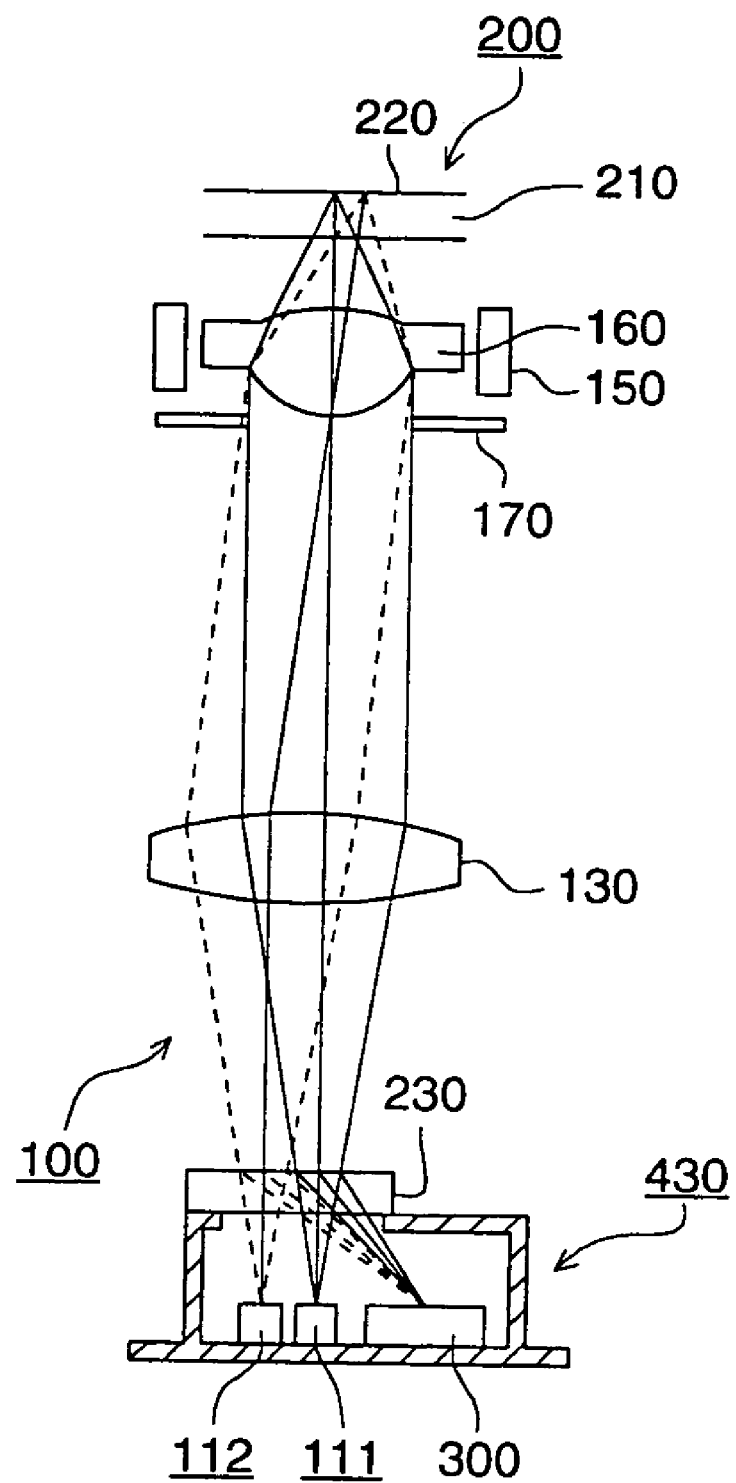
FIG. 106 is a view of the optical path showing the fifth structure of the optical pickup apparatus according to Embodiment 8 of the present invention.

In the optical pickup apparatus in FIG. 106, the first semiconductor laser 111, the second semiconductor laser 112, optical detector 30 and hologram 230 are unitized as laser/detector accumulated unit 430.

When reproducing the first optical disk, the light flux emitted from the first semiconductor laser 111 is transmitted by hologram 230 and collimator 130 to become a collimated light flux, which is further stopped down by aperture 170 to be converged by objective lens 160 on information recording surface 220 through transparent substrate 210 of the first optical disk 200.

The light flux which is modulated by information bit and reflected on information recording surface 220 is transmitted again by collimator 130 through objective lens 160 and aperture 170 and is diffracted by hologram 230 to enter optical detector 300 where the output signals therefrom are used to obtain reading signals for information recorded on the first optical disk 200.

Focusing detection and track detection are conducted by detecting a change in a quantity of light caused by the change of form and position of a spot on optical detector 300, and thereby, objective lens 160 is moved by two-dimensional actuator 150 for focusing and tracking.

When reproducing the second optical disk, the light flux emitted from the second semiconductor laser 112 is transmitted by hologram 230 and collimator 130 to become mostly a collimated light flux, which is further converged on information recording surface 220 through objective lens 160 and transparent substrate 210 of the second optical disk 200.

The light flux which is modulated by information bit and reflected on information recording surface 220 is transmitted again by collimator 130 through objective lens 160 and aperture 170 and is diffracted by hologram 230 to enter optical detector 300 where the output signals therefrom are used to obtain reading signals for information recorded on the second optical disk 200.

Focusing detection and track detection are conducted by detecting a change in a quantity of light caused by the change of form and position of a spot on optical detector 300, and based on this detection, objective lens 160 is moved by two-dimensional actuator 150 for focusing and tracking.

Figure 107:
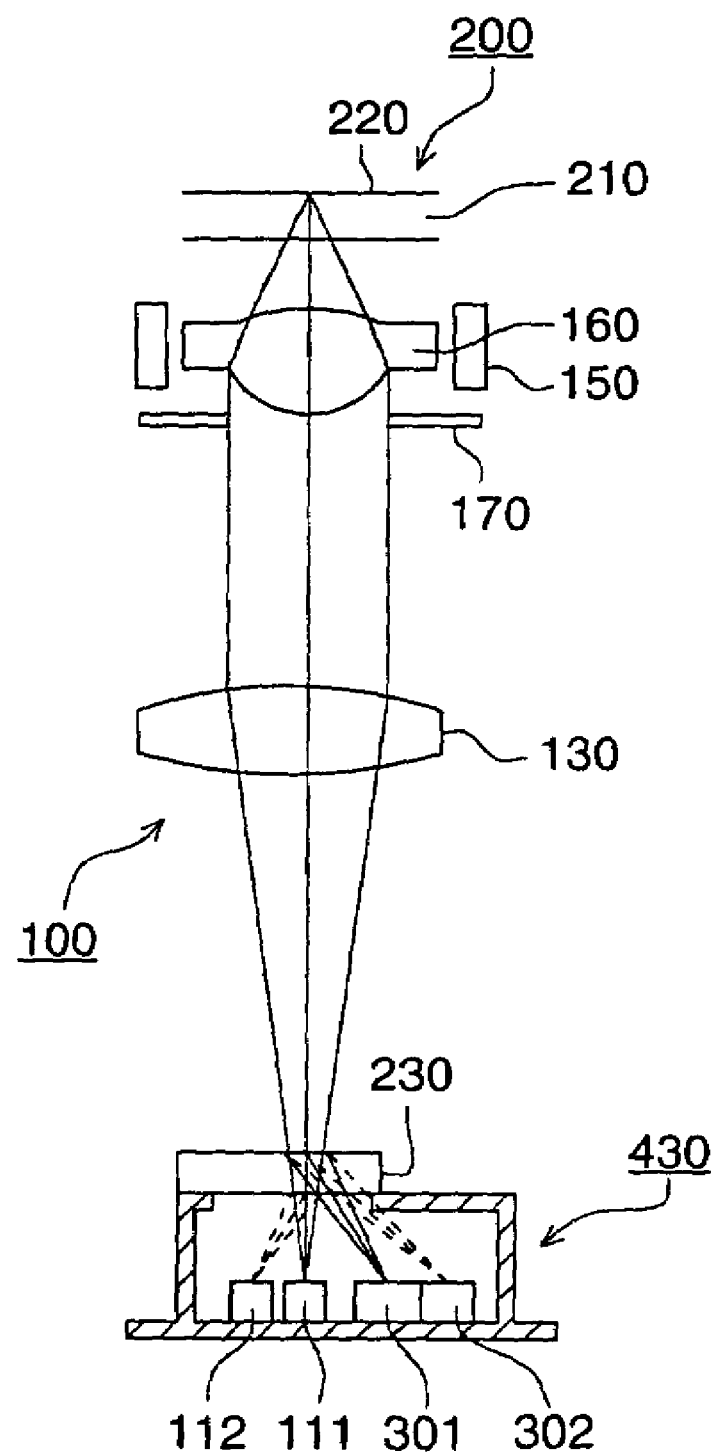
FIG. 107 is a view of the optical path showing the sixth structure of the optical pickup apparatus according to Embodiment 8 of the present invention.

In the optical pickup apparatus in FIG. 107, the first semiconductor laser 111, the second semiconductor laser 112, the first optical detector 301, the second optical detector 302 and hologram 230 are unitized as laser/detector accumulated unit 430.

When reproducing the first optical disk, the light flux emitted from the first semiconductor laser 111 is transmitted through the surface of hologram 230 on the disk side and collimator 130 to become a collimated light flux, which is further stopped down by aperture 170 and is converged by objective lens 160 on information recording surface 220 through transparent substrate 210 of the first optical disk 200.

The light flux which is modulated by information bit and reflected on information recording surface 220 is transmitted again by collimator 130 through objective lens 160 and aperture 170 and is diffracted by the surface of hologram 230 on the disk side to enter optical detector 301 corresponding to the first light source where the output signals therefrom are used to obtain reading signals for information recorded on the second optical disk 200.

Focusing detection and track detection are conducted by detecting a change in a quantity of light caused by the change of form and position of a spot on optical detector 301, and thereby, objective lens 160 is moved by two-dimensional actuator 150 for focusing and tracking.

When reproducing the second optical disk, the light flux emitted from the second semiconductor laser 112 is diffracted by the surface of hologram 230 on the semiconductor laser side and is transmitted through collimator 130 to become mostly a collimated light flux. This surface of hologram 230 on the semiconductor laser side has a function as a light compounding means. The light flux is converged on information recording surface 220 through aperture 170, objective lens 160 and transparent substrate 210 of the second optical disk 200.

The light flux which is modulated by information bit and reflected on information recording surface 220 is transmitted again by collimator 130 through objective lens 160 and aperture 170 and is diffracted by the surface of hologram 230 on the disk side to enter optical detector 302 corresponding to the second light source where the output signals therefrom are used to obtain reading signals for information recorded on the second optical disk 200.

Focusing detection and track detection are conducted by detecting a change in a quantity of light caused by the change of form and position of a spot on optical detector 302, and based on this detection, objective lens 160 is moved by two-dimensional actuator 150 for focusing and tracking.

Figure 108:
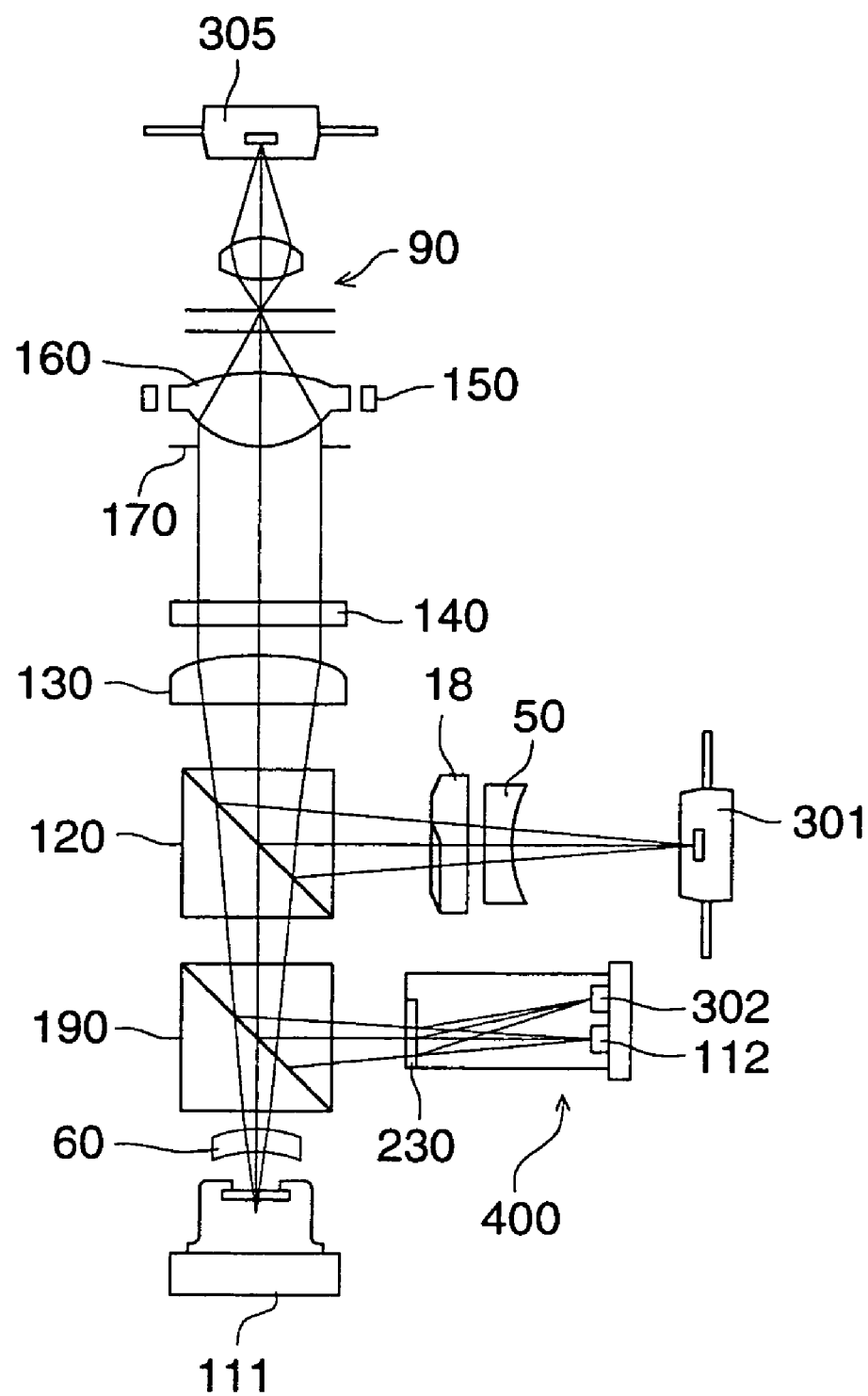
FIG. 108 is a view of the optical path showing the seventh structure of the optical pickup apparatus according to Embodiment 8 of the present invention.

The seventh optical pickup apparatus shown in FIG. 108 is of the structure which is suitable for an optical system for recording and reproducing, and an occasion of reproduction will be explained as follows.

When reproducing the first optical disk, the first semiconductor laser 111 emits a beam which is transmitted through coupling lens 60 which makes divergence of a diverged light source small, beam splitter 190 representing a light compounding means and beam splitter 120, and is further transmitted through collimator 130 and ¼ wavelength plate 140 to become a circularly polarized collimated light. It is further stopped down by aperture 170 to be converged by objective lens 160 on information recording surface 220 through transparent substrate 210 of the first optical disk 200.

The light flux modulated by information bit and reflected on information recording surface 220 is transmitted again by ¼ wavelength plate 140 and collimator 130 through objective lens 160 and aperture 170 to enter beam splitter 120 where the light flux is reflected and is given astigmatism by cylindrical lens 180. Then, the light flux enters optical detector 301 through concave lens 50, and output signals therefrom are used to obtain reading signals for information recorded on the first optical disk 200.

Focusing detection and track detection are conducted by detecting a change in a quantity of light caused by the change of form and position of a spot on optical detector 301. Then, based on this detection, two-dimensional actuator 150 moves objective lens 160 so that a light flux emitted from the first semiconductor laser 111 may form an image on recording surface 220 of the first optical disk 200, and moves objective lens 160 so that a light flux emitted from the first semiconductor laser 111 may form an image on the prescribed track.

In the second semiconductor laser 112 for reproducing the second optical disk, optical detector 302 and hologram 230 are unitized in laser/detector accumulating unit 400.

The light flux emitted from the second semiconductor laser 112 is transmitted through hologram 230, then, is reflected on beam splitter 190 representing a light compounding means, and is transmitted through beam splitter 120, collimator 130 and ¼ wavelength plate 140 to become a collimated light flux. It is further converged on information recording surface 220 through transparent substrate 210 of the second optical disk 200 through aperture 170 and objective lens 160.

The light flux modulated by information bit and reflected on information recording surface 220 is transmitted again by ¼ wavelength plate 140, collimator 130 and beam splitter 120 through objective lens 160 and aperture 170, then, is reflected on beam splitter 190 and is diffracted by hologram 230 to enter optical detector 302, where output signals therefrom are used to obtain reading signals for information recorded on the second optical disk 200.

Focusing detection and track detection are conducted by detecting a change in a quantity of light caused by the change of form and position of a spot on optical detector 302, and objective lens 160 is moved by two-dimensional actuator 150 for focusing and tracking.

There will be explained the occasion for recording and reproducing the disk of the third Super RENS system which is mostly the same as the first optical disk in terms of thickness t1 of transparent substrate and of necessary numerical aperture NA of the aforesaid objective lens on the optical information recording medium side which is needed for recording and reproducing with the first light source having wavelength of λ1.

Figure 109:
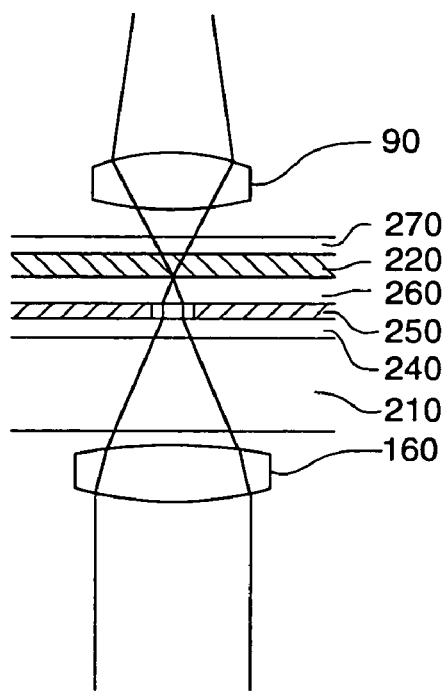
FIG. 109 is a typical view showing the structure of the optical disk of Super RENS system.

The disk of the third Super RENS system is one which is now studied intensively, and an example of its structure is shown in FIG. 109. Its recording and reproducing are based on near field optics, and reproduction signals include a system to use reflected light and a system using transmitted light, and the structure of the present example shows a system to obtain reproduction signals by the use of transmitted light.

When recording and reproducing the third disk of the Super RENS system, the first semiconductor laser 111 emits a beam which is transmitted through coupling lens 60 which makes divergence of diverged light flux to be small, beam splitter 190 representing a light compounding means and beam splitter 120, and is further transmitted through collimator 130 and ¼ wavelength plate 140 to become a collimated light flux. It is further stopped down by aperture 170, and is converged by objective lens 160 on non-linear optical film 250 through transparent substrate 210 of the first optical disk 200 and first protection film 240. On the non-linear optical film 250, there are formed minute openings, and energy is transmitted to information recording surface 220 on an information recording layer through second protection film 260. Then, the light modulated by information bit and is transmitted through information recording surface 220 is transmitted through protection film 270, then, is converged by converging lens 90 which is on the side opposite to the objective lens, to reach optical detector 305, where reading signals for information record on third optical disk 200 are obtained by the signals outputted from the optical detector.

On the other hand, the light flux reflected on non-linear optical film 250 is transmitted again by ¼ wavelength plate 140 and collimator 130 through objective lens 160 and aperture 170 to enter beam splitter 120 where the light flux is reflected and is given astigmatism by cylindrical lens 180 to enter optical detector 301 through concave lens 50. Focusing detection and track detection are conducted by detecting a change in a quantity of light caused by the change of form and position of a spot on optical detector 301. Based on this detection, two-dimensional actuator 150 moves objective lens 160 so that the light flux emitted from the first semiconductor laser 111 may form an image on non-linear optical film 250 of the first optical disk, and moves objective lens 160 so that the light flux emitted from the semiconductor laser 111 may form an image on the prescribed track.

When an exclusive objective lens designed so that no-aberration collimated light flux may enter from the first light source and an no-aberration spot may be formed through transparent substrate of DVD is used as an objective lens off the aforesaid optical pickup apparatus, and when no-aberration collimated light enters the objective lens from the second light source and a spot is formed through a transparent substrate of CD, there is generated spherical aberration caused by (1) wavelength-dependence of a refractive index of an objective lens, (2) a thickness difference between transparent substrates of information recording media, and (3) wavelength-dependence of a refractive index of a transparent substrate, and most of the spherical aberrations are caused by the above item (2), which has already been stated.

Figure 110:
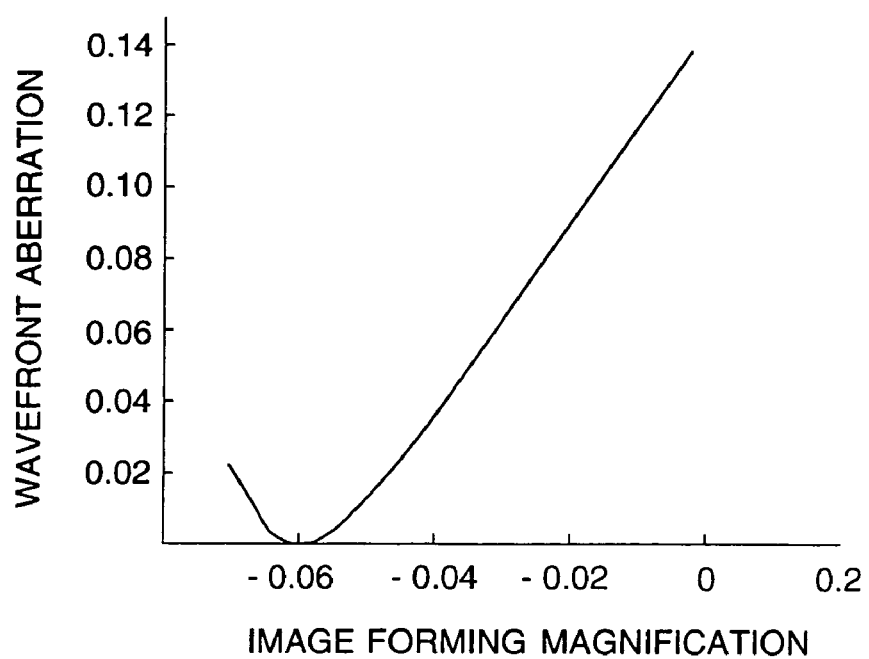
FIG. 110 is a graph showing the relationship of the image formation magnification m2 and the wave front aberration of the objective lens of the Example 15 according to Embodiment 8 of the present invention.

The spherical aberration caused by the factor of above-mentioned item (2) is proportional mostly to |t2−t1| and to $(NA2)^4$, under the condition of numerical aperture NA2 which is necessary for recording and reproducing of CD. FIG. 110 shows relationship between image forming magnification M2 and wave-front aberration for the exclusive lens designed to be no-aberration through a transparent substrate of DVD when a collimated light flux having wavelength $\lambda1$=650 nm enters an objective lens, under the conditions that the transparent substrate is the same as CD in terms of thickness, a light source with wavelength $\lambda2$=780 nm is used, and the numerical aperture of the light flux emerging from the objective lens is 0.45. When the image forming magnification M2 is 0, a collimated light flux enters the objective lens, which is the same as DVD.

In the case of M2=0 as illustrated, spherical aberration of about 0.13 $\lambda$rms is generated, which is greater than 0.07 $\lambda$rms which is Marechal limit of diffraction limit power. Therefore, it is necessary to set spherical aberration by some means for both DVD and CD so that the wave-front aberration may not be more than Marechal limit.

When the image forming magnification is made to be negative in this objective lens, negative spherical aberration is generated in the objective lens, and it takes the minimum value within the Marechal limit in the case of M≈−0.06. As stated above, an amount of spherical aberration which needs to be corrected varies depending on the image forming magnification, and in the illustrated example, it is not necessary to correct the spherical aberration with other means in the case of M≈0.06. Further, when NA which is necessary for information recording of CD-R is 0.5, the spherical aberration to be corrected further grows greater.

Next, there will be explained a preferable collimator adjusting means in each optical pickup apparatus stated above. To simplify the explanation, an optical pickup apparatus employing a light converging optical system composed of a collimator and an objective lens will be considered. With regard to the distance between the collimator and a light source, when the light source is arranged at the focal point of the collimator on its optical axis, a desirable collimated light is emerged from the collimator. Since manufacturing dispersion for the back focus of the collimator, the distance between the mounting position of a semiconductor laser and a light-emitting point and the housing of the optical pickup apparatus, is kept to be small, it is possible to obtain a collimated light having accuracy which is not problematic for practical use, even when the distance between the semiconductor laser and the collimator is not adjusted.

When recording and/or reproducing two types of optical information recording media each having a transparent substrate with different thickness, by the use of two light sources each having different wavelength, and when using an objective lens having a diffraction pattern and using the diffracted ray with the same degree other than zero for each light source, fluctuation of spherical aberration caused by variation of oscillation wavelength of the laser is greater, compared with a conventional double aspheric objective lens. In particular, in the case of the objective lens in Example 6, wave-front aberration of 0.001 $\lambda$rms at wavelength of 650 nm is deteriorated to 0.03 $\lambda$rms when the wavelength varies by ±10 nm. What is generated in this case is spherical aberration. In the semiconductor laser, there is an individual difference of oscillation wavelength, and when a semiconductor laser having a large individual difference is used in the optical pickup apparatus, criteria for spherical aberration of an objective lens having diffraction pattern become strict, which is a problem.

In an objective lens used in an optical pickup apparatus, when an incident light flux is changed from collimated light to diverged light, negative 3-ordered spherical aberration is increased, and when it is changed from collimated light to converged light, positive 3-ordered spherical aberration is increased, thus, it is possible to control 3-ordered spherical aberration by changing divergence of an incident light flux to the objective lens. In the objective lens as in Example 6, main components of spherical aberration caused by the individual difference in oscillated wavelength of the semiconductor laser are 3-ordered spherical aberration, thus, it is possible to make 3-ordered spherical aberration of the total light converging optical system to be the designed value, by changing divergence of an incident light flux to the objective lens.

Incidentally, when there is a coupling lens such as a collimator in a light converging optical system, it is possible to control the 3-ordered spherical aberration of an objective lens by moving the coupling lens in the direction of its optical axis. Further, when there is a coupling lens such as a collimator, the same object as in the foregoing can be attained by moving a semiconductor laser in the direction of the optical axis. The semiconductor laser may naturally be moved in the optical axis direction even when a coupling lens such as a collimator exists.

Example 19

Figure 111:
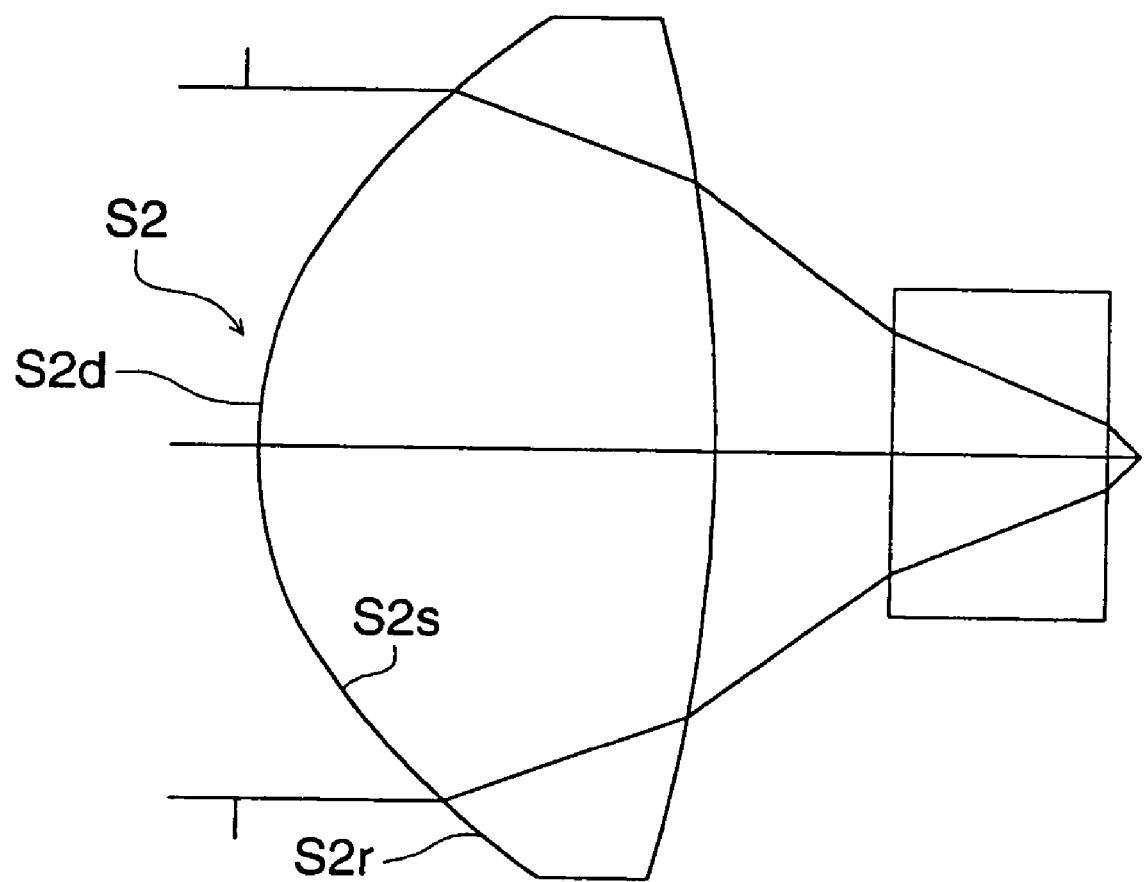
FIG. 111 is a sectional view of Example 15 according to Embodiment 8 of the present invention.

As concrete examples of an objective lens related to the 8th embodiment, Example 19 of spherical-aberration-corrected lens is shown in FIG. 111, Table 20 and Table 21 as follows.

In Table 20, ri represents a radius of curvature of the refraction surface, each of di and di' represents a distance between surfaces, and each of ni and ni' represent the refractive index at main wavelength. Further, the expression for surface form is shown below.

$$X = \frac{h^2/r}{1+\sqrt{1-(1+\kappa)(h/r)^2}} + \sum_j A_j h^{pj}$$

In the expression, X represents an axis in the direction of the optical axis, h represents an axis in the direction perpendicular to the optical axis, the direction for advancement of light is positive, r represents a paraxial radius of curvature, $\kappa$ represents constant of the cone, Aj represents aspheric surface coefficient, and Pj (Pi≧3) represents aspheric surface power number.

The diffraction surface is as shown in Expression 1 as a function of an optical path difference. The unit is in mm.

TABLE 20

| Wavelength | | 635 nm | 780 nm | | |
|---|---|---|---|---|---|
| Focal distance | | 3.370 | 3.397 | | |
| Aperture diameter | | Φ 4.40 mm | | | |
| Lateral magnification of objective lens | | 0 | | | |

| Surface No. | ri | di | di' | ni | ni' |
|---|---|---|---|---|---|
| 1 | ∞ | | | | |
| 2 | 2.131 | | 2.6 | 1.5300 | 1.5255 |
| 3 | −6.373 | 1.5657 | 1.2052 | | |
| 4 | ∞ | 0.6 | 1.2 | 1.5787 | 1.5709 |
| 5 | ∞ | | | | |

Both di and ni represent values for the first optical information recording medium (t1 = 0.6 mm).
Both di' and ni' represent values for the second optical information recording medium (t2 = 1.2 mm).

Both di and ni represent values for the first optical information recording medium (t1=0.6 mm).

Both di' and ni' represent values for the second optical information recording medium (t2=1.2 mm).

TABLE 21

| | | |
|---|---|---|
| Second surface | First split surface (Aspheric surface coefficient) | $0 \leq H \leq 1.6984$<br>$\kappa = -3.6612 \times 10^{-2}$<br>$A_1 = -3.2000 \times 10^{-3}$ P1 = 4.0<br>$A_2 = -9.5500 \times 10^{-4}$ P2 = 6.0<br>$A_3 = 9.4024 \times 10^{-5}$ P3 = 8.0<br>$A_4 = -2.8750 \times 10^{-5}$ P4 = 10.0 |
| | (Diffraction surface coefficient) | $B_2 = 0$<br>$B_4 = -8.3027 \times 10^{-4}$<br>$B_6 = -1.6462 \times 10^{-4}$<br>$B_8 = 1.3105 \times 10^{-5}$ |
| | Second split surface (Aspheric surface coefficient) | $1.6984 \leq H$<br>$\kappa = -9.8006 \times 10^{-1}$<br>$A_1 = 6.0790 \times 10^{-3}$ P1 = 4.0<br>$A_2 = 2.8149 \times 10^{-4}$ P2 = 6.0<br>$A_3 = 6.6735 \times 10^{-6}$ P3 = 8.0<br>$A_4 = -2.8790 \times 10^{-6}$ P4 = 10.0 |
| Third surface | Aspheric surface coefficient | $\kappa = -2.4934 \times 10$<br>$A_1 = 9.6641 \times 10^{-3}$ P1 = 4.0<br>$A_2 = -3.7568 \times 10^{-3}$ P2 = 6.0<br>$A_3 = 7.9367 \times 10^{-4}$ P3 = 8.0<br>$A_4 = -7.3523 \times 10^{-5}$ P4 = 10.0 |

A sectional view of the lens in the aforesaid example is shown in FIG. 111, and its spherical aberration diagram is shown in FIG. 112. In FIG. 111, portion S2d including an optical axis of the second surface S2 has a diffraction pattern, and portion S2r outside thereof is an aspheric surface refraction surface. FIG. 112(a) shows a spherical aberration diagram at wavelength of 635 nm and first optical information recording medium (t1=0.6 mm), which is sufficiently corrected in terms of aberration. FIG. 112(b) shows a spherical aberration diagram at wavelength of 780 nm and second optical information recording medium (t2=1.2 mm), wherein a light flux passing through the first split surface S2d is corrected in terms of spherical aberration by an effect of diffraction, and a light flux passing through second split surface S2r becomes flare light and has an effect which is the same as that of an aperture.

The lens in the aforesaid example is an objective lens with NAH2=0.5 and NAL2=0. The diffraction pattern section of this lens becomes a pattern on a annular band whose center is an optical axis, and its step number is about 13. A boundary between a circumferential section of the diffraction pattern which is farthest from the optical axis and the refraction surface has a step of about ~21 μm.

In the case of NAH2=0.45, the number of steps of the diffraction pattern is about 9, and an amount of the step is about 13 μm. An amount of the step and the number of steps of the diffraction pattern are roughly proportional to the fourth power of NAH2.

In the case of NAL2=0 as in the aforesaid example, the number of steps of the diffraction pattern is increased in proportional to spherical aberration to be corrected.

In the objective lens in the invention, satisfactory effects can be obtained even when the depth of the diffraction pattern in the direction of an optical axis is 2 μm or less. However, when the number of steps of the diffraction pattern is large, it is difficult to process the metal mold and to mold. thus, it is desirable that the number of steps is as small as possible.

This can be attained by the following.

(1) An image forming magnification for CD is made to be slightly smaller than that for DVD, and an amount of spherical aberration to be corrected is made to be small in advance. It is preferable that mCD (magnification for recording and reproducing of CD)-mDVD (magnification for recording and reproducing of DVD) is in a range of −1/15-0.

(2) A diffraction pattern is not provided on the portion where the depth is great and the numerical aperture is small.

For example, if image forming magnification of DVD is made to be 0, and image forming magnification of CD is made to be −0.03, the spherical aberration to be corrected is halved, and even when NAH2 is made to be 0.5 for covering CD-R, the number of steps is about 7 and an amount of a step is about 11 μm.

When an amount of step is small, the shape of step S2s may also be one which flows smoothly from diffraction pattern section S2d to refraction surface section S2r.

When image forming magnification for both DVD and CD is 0, if NAL2 is made to be 0.36, residual spherical aberration component WSA (NAL2) of the wave-front aberration of a light flux whose numerical aperture is not more than NAL2 is about 0.053 λrms. By providing the optimum diffraction pattern to this, it is possible to make the RMS value of the wave-front aberration up to NAH2 to be small, while keeping the wave-front aberration of DVD to 0.

Residual spherical aberration component WSA (NAH2) of the wave-front aberration of a light flux whose numerical aperture is not more than NAH2 can be approximated by the following expression.

$$WSA(NAH@)=(NAL2/NAH2)2 \times WSA(NAL2)$$

Therefore, the aforesaid value is 0.034 λrms for NAH2=0.45, and it is 0.027 λrms for NAH2=0.5, which are sufficiently smaller than the Marechal limit value.

In this case, excessive spherical aberration is generated for NAL2 or less. Therefore, the spherical aberration from NAL2 to NAH2 is not made to be zero, but it can be made to agree with the best focus of the light flux of NAL2 or less. Since this best focus position is at the position exceeding the paraxial focus point, the spherical aberration to be corrected by the diffraction pattern can be small. Further, for the light flux for NAL2 or less, the diffraction pattern is not necessary. Due to these two effects, the number of steps of the diffraction pattern in the case of NAH2=0.5 can be about 6, and the number of steps of the diffraction pattern in the case of NAH2=0.45 can be 4.

It is naturally possible to make the diffraction pattern to be smaller by making image forming magnification of CD to be smaller than that of DVD, and the minimum of two steps makes interchangeable reproduction for DVD and CD possible.

Incidentally, there is proposed a high density optical information recording medium whose transparent substrate has a thickness of 0.1 mm. For recording and reproduction for this, a blue semiconductor laser is used, a two-element objective lens is used, and 0.85 is needed as NA1. On the other hand, CD-RW employs a light source wherein a thickness of a transparent substrate is 1.2 mm and a wavelength is 780, and NA2 is made to be 0.55. In this interchangeable optical system, an amount of correction of spherical aberration is 2.7 times greater, because NA2 is large and t1−t2 is also large, compared with DVD and CD-R (NAH2=0.5). Therefore, the number of steps of the diffraction pattern is about 35.

For further correction of paraxial chromatic aberration, the number of steps of the diffraction pattern is increased. For the correction including paraxial chromatic aberration up to NA1, hundreds of steps are needed. In such a case, it is also possible to provide diffraction pattern to plural optical surfaces.

A certain portion within a range from NAL2 to NAH2 may also be made a refraction surface, when necessary.

Further, in the case of t1>t2, −first ordered light is used because a sign of the generated spherical aberration is reversed.

Equally, even in the case of DVD and CD, image forming magnification of an objective lens for CD is fairly smaller than that for DVD, and when under spherical aberration remains, −first ordered light is used equally.

Incidentally, with regard to DVD and CD which represent a matter of primary concern currently, there is shown an example to execute with a single objective lens by using two lasers each having different recording or wavelength. As stated already, when assuming that $\lambda 1$ represents a wavelength of the first light source and $\lambda 2$ ($\lambda 2 > \lambda 1$) represents a wavelength of the second light source, there is introduced the first diffraction pattern wherein +first ordered diffracted ray is used in the case of t1<t2, and −first ordered diffracted ray is used in the case of t1>t2, and the former is applied to DVD (using the first light source) and CD (using the second light source).

There have recently been put to practical use various light sources each having a different wavelength such as a blue semiconductor laser and an SHG laser, and it is estimated that lots of new optical information recording media will further appear on the market. In this case, though the necessary spot size is determined from the recording density of the optical information recording medium, NA which is necessary for recording or recording/reproduction varies dependent on a wavelength of the light source to be used. Therefore, each of the thickness of a transparent substrate of an optical information recording medium and of the necessary NA is classified into the following four cases, for two optical information recording media.

t1<t2, NA1>NA2  (1)

t1<t2, NA1<NA2  (2)

t1>t2, NA1>NA2  (3)

t1>t2, NA1<NA2  (4)

In the aforesaid explanation, there have especially been explained in detail various items such as the number of ordered of diffraction of the first diffraction pattern used in the case (1) above for each light source, a range (NAH1, NAL1, NAH2 and NAL2), types and NA ranges of a light source wherein a diffraction pattern section and a transparent section are required to be converged at the same position, a range of NA setting spherical aberration for each light source, a range of NA wherein wave-front aberration for each light source is required to be 0.07 $\lambda$rms or less, necessity to make the number of ordered of diffraction of the second diffraction pattern for each light source and the first diffraction pattern to be converged at the same position, and conditions for restricting a light flux from which light source in the case of introducing the aperture restriction. Detailed explanation for each of (2), (3) and (4) cases is omitted here, because they can be executed easily from the detailed description of (1).

For manufacturing of lenses, it is also possible either to mold plastic materials or glass materials solidly by the use of a metal mold in which the diffraction pattern is engraved, or to form, on the base material of glass or plastic, an optical surface including the diffraction pattern of the invention, by the use of UV-setting resins. It is further possible to manufacture through coating or direct processing.

As stated above, it is also possible to arrange so that the optical surface having the effect of the invention is provided on an optical element which is separate from an objective lens, and the optical surface is provided on the side of the objective lens closer to a light source or on the side closer to an optical information recording medium. It can also be provided naturally on an optical surface of a collimator or a light compounding means through which a light flux from the first light source and that from the second light source pass. However, an amount of tracking is restricted, because an optical axis of the diffraction pattern and that of the objective lens move relatively when the objective lens is moved for tracking.

Though the diffraction pattern is made to be in a form of a concentric circle which is concentric with an optical axis, for convenience' sake of explanation, the invention is not limited to this.

Though the objective lens shown concretely in Examples 1-19 is composed of a single lens as an example, the objective lens may also be composed of plural lenses, and an occasion wherein at least one surface of the plural lenses has the diffraction surface of the invention is included in the invention.

In the invention, selective generation of diffracted ray with specific number of ordered means that diffraction efficiency of the diffracted ray with the specific number of ordered is higher than that of each diffracted ray with number of ordered other than the specific number of ordered, for light with a prescribed wavelength, which has already been stated. It is preferable that, for rays of light having two wavelengths which are different from each other, diffraction efficiency of diffracted ray with a specific number of ordered is higher by 10% or more than that of each diffracted ray with another number of ordered, and it is more preferable that the efficiency is higher by 30% or more, while, the diffraction efficiency of 50% or more of the diffracted ray with the specific number of ordered is preferable, and the more preferable is 70% or more which lessen the loss of a quantity of light and is preferable from the viewpoint of practical use.

With regard to the diffraction surface of the invention, it is preferable that existence of the diffraction surface improves spherical aberration, compared with an occasion of no diffraction surface, namely an occasion where the surface enveloping the relief of the diffraction surface is simulated to be assumed, when diffraction rays of light generated selectively and have at least two wavelengths which are different from each other are focused respectively, as shown in the aforesaid embodiment and in the concrete examples of the lens.

Further, in the invention, it is preferable, from the viewpoint of obtaining a desirable spot which is effective on a practical use, that wave-front aberration of the diffracted ray with specific number of ordered generated selectively for each (wavelength λ) of rays of light having at least two wavelengths which are different from each other is 0.07 λrms.

As stated above, the invention makes it possible to obtain an optical system with simple structure employing at least one optical element having a diffraction surface wherein spherical aberration and axial chromatic aberration can be corrected for rays of light having at least two wavelengths which are different from each other, an optical pickup apparatus, a recording and reproducing apparatus, a lens, an optical element, a diffraction optical system for optical disks, a recording and/or reproducing apparatus for a sound and/or an image, and an objective lens. It is further possible to make an optical system to be small in size, light in weight and low in cost. When the optical element has a diffraction surface which makes the diffraction efficiency of the diffracted ray having the same number of ordered to be maximum for rays of light having at least two wavelengths which are different from each other, a loss of a quantity of light can be lessened, compared with an occasion where the diffraction efficiency of the diffracted ray of the diffraction surface having a different number of ordered is made to be maximum.

With regard to the inventions described in Items 72-88, in particular, it is possible, by providing a diffraction lens on the diffraction surface, to obtain a diffraction optical system wherein an optical system for recording and reproducing having two light sources each having a different wavelength is used, a loss of a quantity of light for each light source wavelength is little, and aberration can be corrected up to almost the diffraction limit.

With regard to the inventions described in Items 89-98, in particular, it is possible to conduct recording of information and/or reproducing of information for different optical disk with one objective lens, for three light sources each having a different wavelength, an optical pickup apparatus can be made thinner, and a problem of high cost can be solved, as stated above.

With regard to the inventions described in Items 99-112, in particular, it is possible to provide an optical pickup apparatus and an objective lens wherein spherical aberration caused by a difference of thickness of a transparent substrate, chromatic aberration of spherical aberration generated by a difference of wavelength and axial chromatic aberration are corrected, by designing an aspheric surface coefficient and a coefficient of a phase difference function properly, in an optical pickup apparatus having three light sources each having a different wavelength.

With regard to the inventions described in Items 113-181, in particular, it is possible to provide a spherical-aberration-corrected objective lens for recording and reproducing an optical information recording medium and an optical pickup apparatus wherein recording and reproducing can be conducted by light fluxes having different wavelengths and by a single light converging optical system, for optical information recording medium having a transparent substrate with a different thickness, by providing plural split surfaces on the objective lens and thereby by arranging the diffraction surface on the first split surface.

In addition, an objective lens for an optical pickup apparatus is composed of plural annular bands split to be in a form of a concentric circle, and each annular band is corrected in terms of aberration up to the diffraction limit mostly, for plural light sources each having a different wavelength and for transparent substrates each having a different thickness of a recording surface, thus, flare light entering an optical detector is reduced, and manufacturing of the objective lens is easy. "Disclosed embodiment can be varied by a skilled person without departing from the spirit and scope of the invention"

What is claimed is:

1. An optical pickup apparatus for recording and/or reproducing information for an optical disk, comprising:
    a first light source configured to emit a first light flux having a first wavelength for recording and/or reproducing a first optical disk provided with a transparent substrate;
    a second light source configured to emit a second light flux having a second wavelength shorter than the first wavelength, for recording and/or reproducing a second optical disk provided with a transparent substrate;
    a third light source configured to emit a third light flux having a third wavelength longer than the first wavelength, for recording and/or reproducing a third optical disk provided with a transparent substrate having a thickness thicker than that of each of the first and second optical disks; and
    a finite conjugation type optical system configured to converge the first, second, and third light fluxes, each of which is incident to the finite conjugation type optical system as a finite light flux, onto the first, second, and third optical disks respectively, the finite conjugation type optical system comprising an objective lens.

2. The optical pickup apparatus of claim 1, wherein when NA1 is an image side numerical aperture of the objective lens necessary for recording and/or reproducing information for the first optical disk, NA2 is an image side numerical aperture of the objective lens necessary for recording and/or reproducing information for the second optical disk, NA3 is an image side numerical aperture of the objective lens necessary for recording and/or reproducing information for the third optical disk, and NA1 and NA2 are larger than NA3.

3. The optical pickup apparatus of claim 2, wherein NA1 is equal to NA2.

4. The optical pickup apparatus of claim 2, wherein when recording and/or reproducing information is conducted for the third optical disk, the third light flux having passed through a region corresponding a numerical aperture larger than NA3 becomes flare and does not focus on the third optical disk.

5. The optical pickup apparatus of claim 1, wherein the finite conjugation type optical system has a ring-shaped diffractive portion on at least an optical surface thereof.

6. The optical pickup apparatus of claim 1, wherein the first wavelength is within a range of from 610 nm to 670 nm, the second wavelength is within a range of from 400 nm to 440 nm, and the third wavelength is within a range of from 740 nm to 870 nm.

7. The optical pickup apparatus of claim 6, wherein the first optical disk is a DVD, the second optical disk is a next-generation high-density optical disk, and the third optical disk is a CD.

8. The optical pickup apparatus of claim 1, wherein the thickness of the transparent substrate of the first optical disk is equal to that of the second optical disk.

9. The optical pickup apparatus of claim 1, wherein a relationship between the first to third light sources and the finite conjugation type optical system is kept constant.

10. The optical pickup apparatus of claim 9, wherein the first to third light sources of the finite conjugation type optical system are moved as one unit for focusing or tracking.

11. The optical pickup apparatus of claim 1, wherein at least one light flux among the first light flux to the third light flux is incident to the finite conjugation type optical system as a divergent light.

12. An optical system utilized in an optical pickup apparatus being capable of conducting recording and/or reproducing information of a first optical disk with a first light source configured to emit a first light flux having a first wavelength, conducting recording and/or reproducing information of a second optical disk with a second light source configured to emit a second light flux having a second wavelength, and conducting recording and/or reproducing information of a third optical disk with a third light source configured to emit a third light flux having a third wavelength, the optical system comprising at least an objective lens, wherein the optical system is a finite conjugate type optical system configured to converge the first, second, and third light fluxes, each of which is incident to the finite conjugation type optical system as a finite light flux, onto the first, second, and third optical disks respectively.

* * * * *